United States Patent
Funada et al.

(10) Patent No.: US 6,346,989 B1
(45) Date of Patent: *Feb. 12, 2002

(54) IMAGE PROCESSING APPARATUS AND METHOD

(75) Inventors: Masahiro Funada, Yokohama; Kenichi Ohta, Kawasaki; Yutaka Udagawa, Machida; Yoichi Takaragi, Yokohama; Mitsuru Kurita, Tokyo; Eiji Ohta, Fujisawa; Koichi Ishimoto, Yokohama, all of (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/775,891

(22) Filed: Jan. 2, 1997

Related U.S. Application Data

(63) Continuation of application No. 08/111,158, filed on Aug. 23, 1993, now abandoned.

(30) Foreign Application Priority Data

| Aug. 24, 1992 | (JP) | 4-223751 |
| Sep. 18, 1992 | (JP) | 4-249437 |
| Sep. 28, 1992 | (JP) | 4-282528 |
| Nov. 16, 1992 | (JP) | 4-305424 |

(51) Int. Cl.[7] .......................... G06F 15/00; H04N 1/46; G06K 9/00

(52) U.S. Cl. ..................... 358/1.14; 358/504; 382/149

(58) Field of Search .................... 358/406, 467, 358/468, 530, 515, 518, 520, 527, 504, 500, 501, 401, 442, 444, 101, 104, 109, 114; 382/181, 190, 218, 219, 220, 195

(56) References Cited

U.S. PATENT DOCUMENTS

| 4,538,267 A | * | 8/1985 | Uchida | 371/20 |
| 4,586,811 A | * | 5/1986 | Kubo et al. | 355/14 |
| 4,675,704 A | * | 6/1987 | Yamamoto | 358/520 |
| 4,678,322 A | * | 7/1987 | Finkel et al. | 355/133 |
| 4,723,149 A | * | 2/1988 | Harada | 355/14 |
| 4,728,984 A | * | 3/1988 | Daniele | 355/6 |
| 4,739,377 A | * | 4/1988 | Allen | 355/133 |
| 4,837,842 A | * | 6/1989 | Holt | 382/218 |
| 4,881,268 A | * | 11/1989 | Uchida et al. | 382/7 |
| 4,908,873 A | * | 3/1990 | Philibert et al. | 382/34 |
| 4,942,619 A | * | 7/1990 | Takagi et al. | 382/218 |
| 4,953,012 A | * | 8/1990 | Abe | 358/519 |
| 4,956,666 A | * | 9/1990 | Allen et al. | 355/201 |
| 4,972,476 A | * | 11/1990 | Nathans | 380/23 |
| 4,980,719 A | * | 12/1990 | Allen et al. | 355/201 |
| 5,075,767 A | * | 12/1991 | Takaragi | 358/515 |
| 5,077,795 A | * | 12/1991 | Rourke et al. | 380/55 |
| 5,124,754 A | * | 6/1992 | Higaki | 355/18 |

(List continued on next page.)

Primary Examiner—Madeleine Nguyen
(74) Attorney, Agent, or Firm—Fitzpatrick, Cella, Harper & Scinto

(57) ABSTRACT

A device for controlling the copying of an original includes a discriminator for discriminating a specific original in accordance with the degree of significance of the specific original, when discriminating a plurality of specific originals in forming one image. According to another embodiment, the device includes an inhibitor for inhibiting the copying of a specific original, when a memory or peripheral circuit having the discrimination criteria of the specific original is removed or exchanged, or it is out of order, and making a discrimination of the specific original by the same characteristic data of the specific original, even if the image is input from different input equipment, wherein the correct discrimination is effected based on the color tint distribution of the specific original.

13 Claims, 88 Drawing Sheets

U.S. PATENT DOCUMENTS

| | | | |
|---|---|---|---|
| 5,216,724 A | * 6/1993 | Suzuki et al. | 382/7 |
| 5,227,871 A |   7/1993 | Funada et al. | 358/75 |
| 5,235,681 A | * 8/1993 | Masuzaki et al. | 395/164 |
| 5,257,119 A |   10/1993 | Funada et al. | 358/438 |
| 5,282,247 A | * 1/1994 | McLean et al. | 380/4 |
| 5,365,311 A | * 11/1994 | Matsuoka | 355/205 |
| 5,379,093 A | * 1/1995 | Hashimoto | 382/218 |
| 5,424,807 A | * 6/1995 | Ohmura | 355/201 |
| 5,452,058 A | * 9/1995 | Umeda | 355/204 |
| 5,465,161 A | * 11/1995 | Funada et al. | 358/438 |
| 5,481,378 A | * 1/1996 | Sugano et al. | 358/467 |
| 5,528,490 A | * 6/1996 | Hill | 364/403 |
| 5,592,573 A | * 1/1997 | Eisenbarth | 382/218 |
| 5,604,596 A | * 2/1997 | Ukai et al. | 358/296 |
| 5,640,253 A | * 6/1997 | Uchida et al. | 358/501 |

* cited by examiner

FIG. 22

| ADDRESS | RID | PSEL | ACCESS CONDITION | STORED CONTENTS |
|---|---|---|---|---|
| 00000-07FFF | 0 | 0 | IMAGE PROC MODE<br><br>IN CASE OF FORMING M, Y IMAGES | 8-TYPE DISCRIMINATION DATA |
| 08000-0FFFF | 0 | 1 | IMAGE PROC MODE<br><br>IN CASE OF FORMING M, Y IMAGES | 8-TYPE DISCRIMINATION DATA |
| 10000-17FFF | 0 | 2 | IMAGE PROC MODE<br><br>IN CASE OF FORMING M, Y IMAGES | 8-TYPE DISCRIMINATION DATA |
| 18000-1FFFF | 0 | 3 | IMAGE PROC MODE<br><br>IN CASE OF DEVELOPING M, C, Y, K | 8-TYPE DISCRIMINATION DATA |
| 20000-27FFF | 0 | 4 | IMAGE PROC MODE<br><br>IN CASE OF FORMING C, K IMAGES | 8-TYPE DISCRIMINATION DATA |
| 28000-2FFFF | 0 | 5 | IMAGE PROC MODE<br><br>IN CASE OF FORMING C, K IMAGES | 8-TYPE DISCRIMINATION DATA |
| 30000-37FFF | 0 | 6 | IMAGE PROC MODE<br><br>IN CASE OF FORMING C, K IMAGES | 8-TYPE DISCRIMINATION DATA |
| 38000-3FFFE | — | — | — | NOT USED |
| 3FFFF | 1 | — | ID READING MODE | ID FOR ROM |

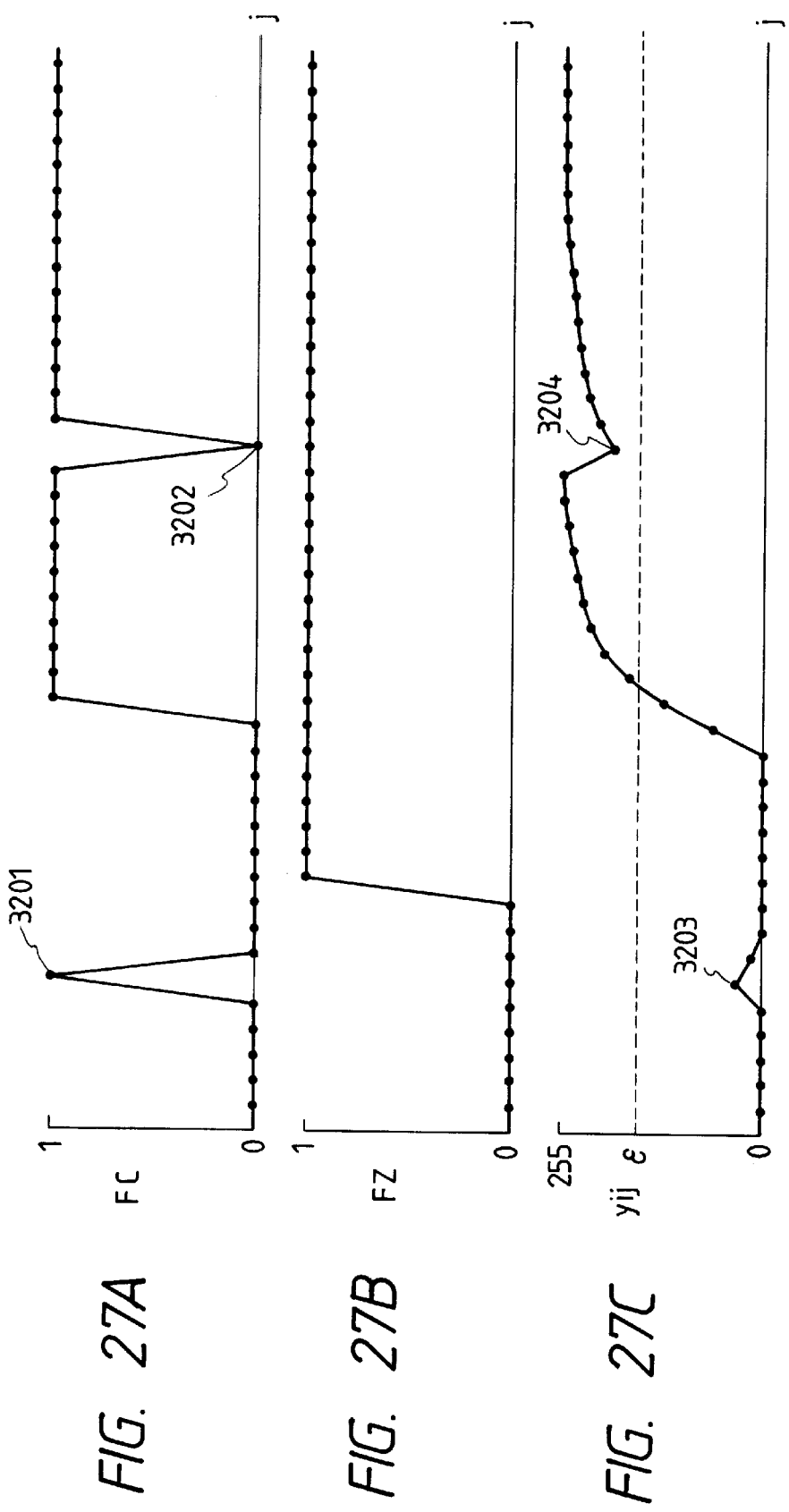

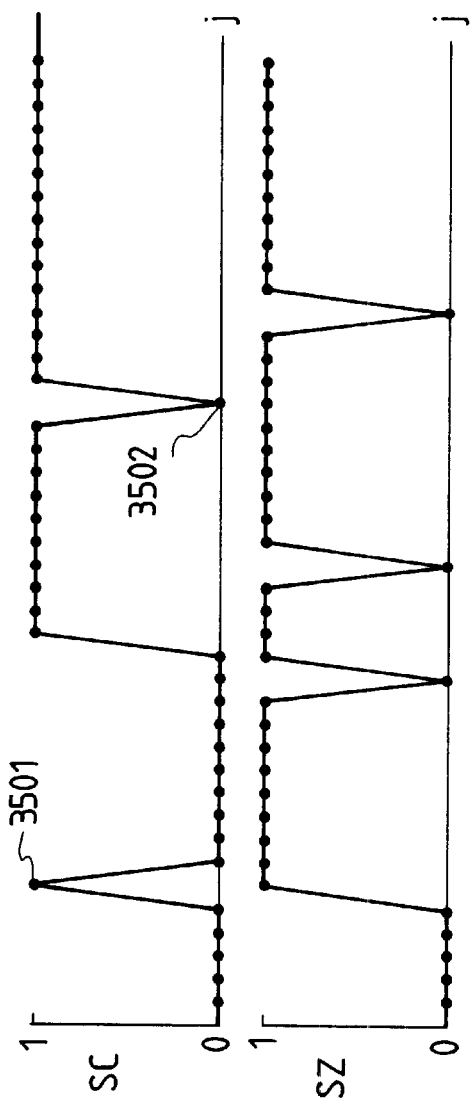
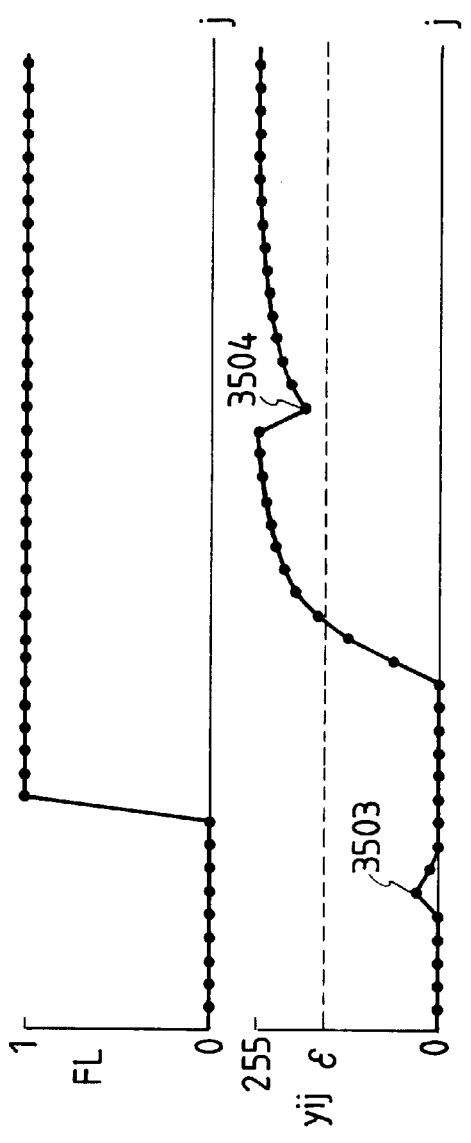
FIG. 32A
FIG. 32B
FIG. 32C
FIG. 32D

FIG. 36

| XPHS | RID | RWE | ROE | BI-DIRECTIONAL BUFFER 130 | SRAM |
|------|-----|-----|-----|---------------------------|---------|
| 0 | 1 | 1 | 0 | SRAM → VOLUME RATIO DISCRIMINATION CKT | READING |
| 1 | 1 | 1 | 0 | SRAM → VOLUME RATIO DISCRIMINATION CKT | READING |
| 2 | 0 | 0 | 1 | VOLUME RATIO DISCRIMINATION CKT → SRAM | WRITING |
| 3 | 0 | 1 | 1 | VOLUME RATIO DISCRIMINATION CKT → SRAM | |

FIG. 44

| ADDRESS | RID | PSEL | ACCESS CONDITION | STORED CONTENTS |
|---|---|---|---|---|
| 00000 | 1 | — | ID READING MODE | ID FOR ROM |
| 00001-07FFE | — | — | — | NOT USED |
| 08000-0FFFF | 0 | 1 | IMAGE PROC MODE<br><br>IN CASE OF FORMING<br>M, Y IMAGES | 8-TYPE DISCRIMINATION DATA |
| 10000-17FFF | 0 | 2 | IMAGE PROC MODE<br><br>IN CASE OF FORMING<br>M, Y IMAGES | 8-TYPE DISCRIMINATION DATA |
| 18000-1FFFF | 0 | 3 | IMAGE PROC MODE<br><br>IN CASE OF FORMING<br>M, Y IMAGES | 8-TYPE DISCRIMINATION DATA |
| 20000-27FFF | 0 | 4 | IMAGE PROC MODE<br><br>IN CASE OF DEVELOPING<br>M, C, Y, K | 8-TYPE DISCRIMINATION DATA |
| 28000-2FFFF | 0 | 5 | IMAGE PROC MODE<br><br>IN CASE OF FORMING<br>C, K IMAGES | 8-TYPE DISCRIMINATION DATA |
| 30000-37FFF | 0 | 6 | IMAGE PROC MODE<br><br>IN CASE OF FORMING<br>C, K IMAGES | 8-TYPE DISCRIMINATION DATA |
| 38000-3FFFF | 0 | 7 | IMAGE PROC MODE<br><br>IN CASE OF FORMING<br>C, K IMAGES | 8-TYPE DISCRIMINATION DATA |

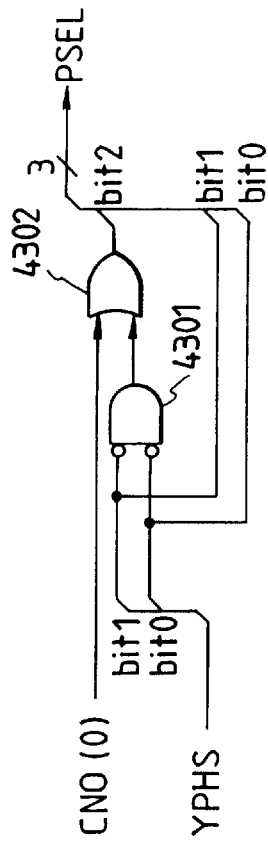
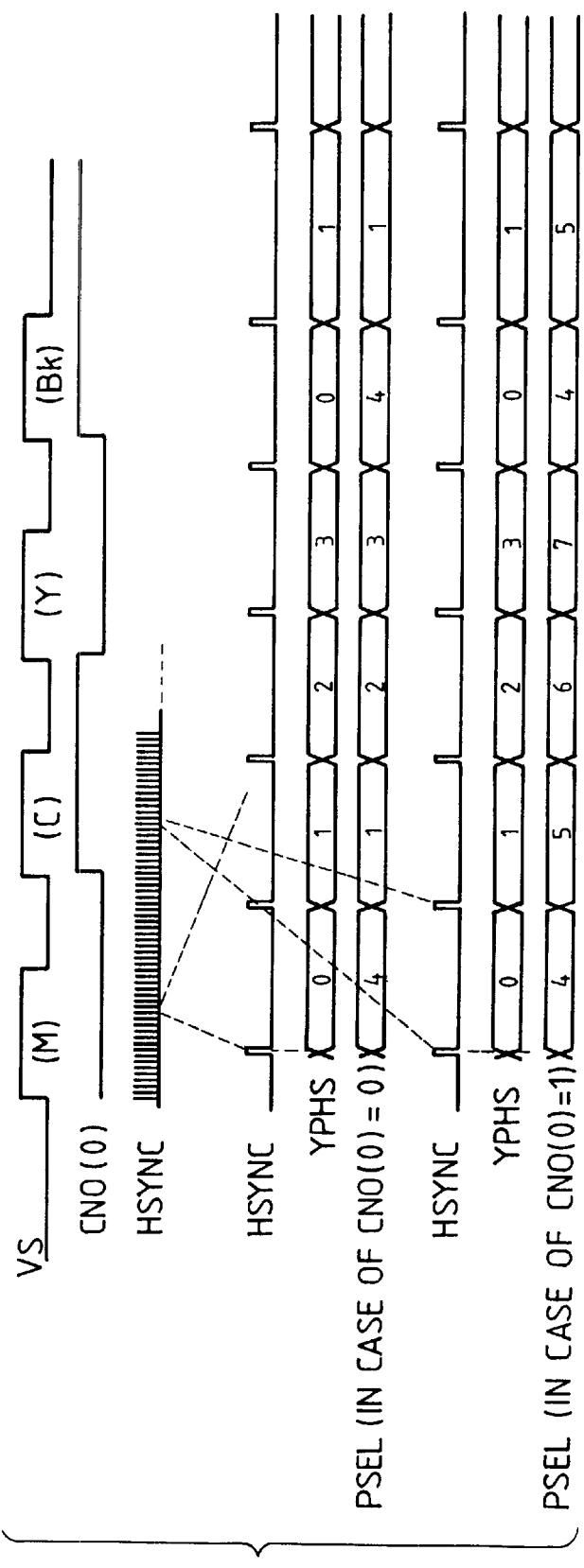
FIG. 45A
FIG. 45B

FIG. 50
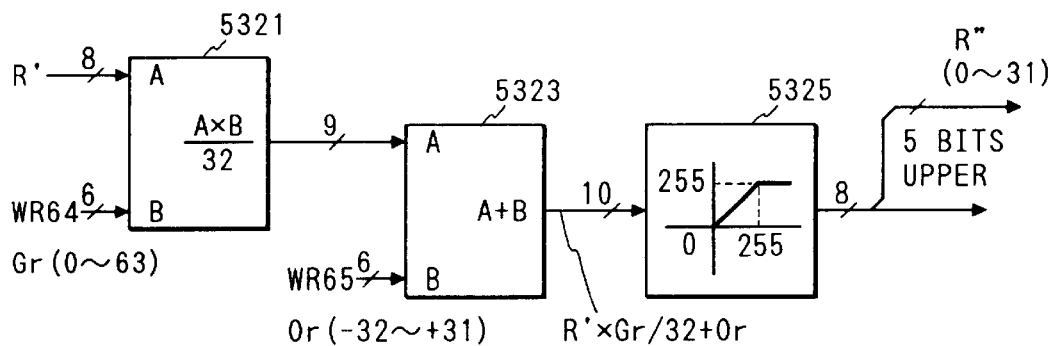
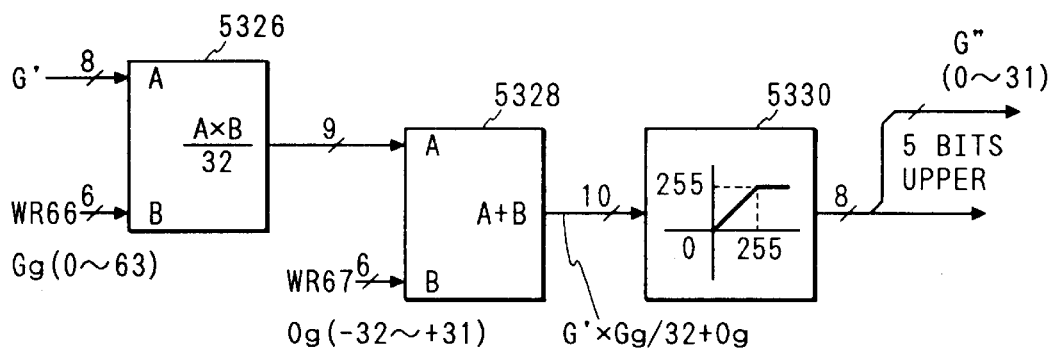
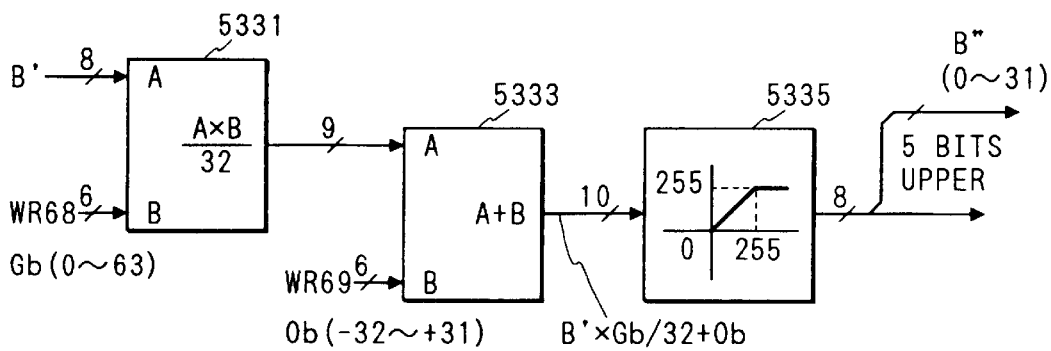

FIG. 65

| CNO SIGNAL | PRINT OUTPUT |
|---|---|
| 0 | MAGENTA (M) |
| 1 | CYAN (C) |
| 2 | YELLOW (Y) |
| 3 | BLACK (Bk) |

FIG. 66

| ADDRESS | RID | PSEL | ACCESS CONDITION | STORED CONTENTS |
|---|---|---|---|---|
| 00000-07FFF | 0 | 0 | IMAGE PROC MODE<br><br>IN CASE OF FORMING<br>M, Y IMAGES | 16-TYPE DISCRIMINATION DATA |
| 08000-0FFFF | 0 | 1 | IMAGE PROC MODE<br><br>IN CASE OF FORMING<br>M, Y IMAGES | 16-TYPE DISCRIMINATION DATA |
| 10000-17FFF | 0 | 2 | IMAGE PROC MODE<br><br>IN CASE OF FORMING<br>M, Y IMAGES | 16-TYPE DISCRIMINATION DATA |
| 18000-1FFFF | 0 | 3 | IMAGE PROC MODE<br><br>IN CASE OF DEVELOPING<br>M, C, Y, Bk | 16-TYPE DISCRIMINATION DATA |
| 20000-27FFF | 0 | 4 | IMAGE PROC MODE<br><br>IN CASE OF FORMING<br>C, Bk IMAGES | 16-TYPE DISCRIMINATION DATA |
| 28000-2FFFF | 0 | 5 | IMAGE PROC MODE<br><br>IN CASE OF FORMING<br>C, Bk IMAGES | 16-TYPE DISCRIMINATION DATA |
| 30000-37FFF | 0 | 6 | IMAGE PROC MODE<br><br>IN CASE OF FORMING<br>C, Bk IMAGES | 16-TYPE DISCRIMINATION DATA |
| 38000-3FFFE | — | — | — | NOT USED |
| 3FFFF | 1 | — | ID READING MODE | ID FOR ROM |

FIG. 67

| ADDRESS | RID | PSEL | ACCESS CONDITION | STORED CONTENTS |
|---|---|---|---|---|
| 00000 | 1 | — | ID READING MODE | ID FOR ROM |
| 00001-07FFF | — | — | — | NOT USED |
| 08000-0FFFF | 0 | 1 | IMAGE PROC MODE<br><br>IN CASE OF FORMING M, Y IMAGES | 16-TYPE DISCRIMINATION DATA |
| 10000-17FFF | 0 | 2 | IMAGE PROC MODE<br><br>IN CASE OF FORMING M, Y IMAGES | 16-TYPE DISCRIMINATION DATA |
| 18000-1FFFF | 0 | 3 | IMAGE PROC MODE<br><br>IN CASE OF FORMING M, Y IMAGES | 16-TYPE DISCRIMINATION DATA |
| 20000-27FFF | 0 | 4 | IMAGE PROC MODE<br><br>IN CASE OF DEVELOPING M, C, Y, Bk | 16-TYPE DISCRIMINATION DATA |
| 28000-2FFFF | 0 | 5 | IMAGE PROC MODE<br><br>IN CASE OF FORMING C, Bk IMAGES | 16-TYPE DISCRIMINATION DATA |
| 30000-37FFF | 0 | 6 | IMAGE PROC MODE<br><br>IN CASE OF FORMING C, Bk IMAGES | 16-TYPE DISCRIMINATION DATA |
| 38000-3FFFF | 0 | 7 | IMAGE PROC MODE<br><br>IN CASE OF FORMING C, Bk IMAGES | 16-TYPE DISCRIMINATION DATA |

FIG. 73
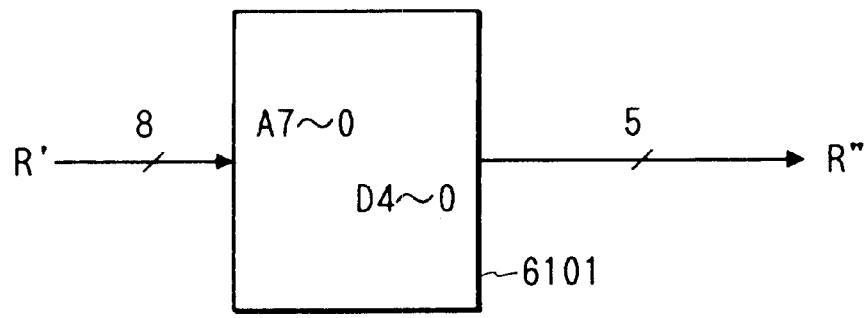
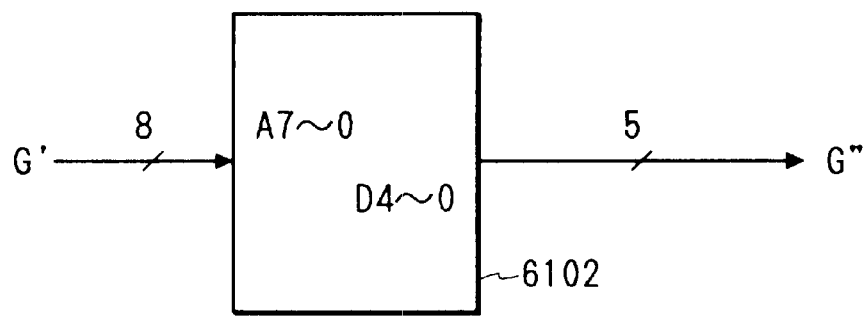
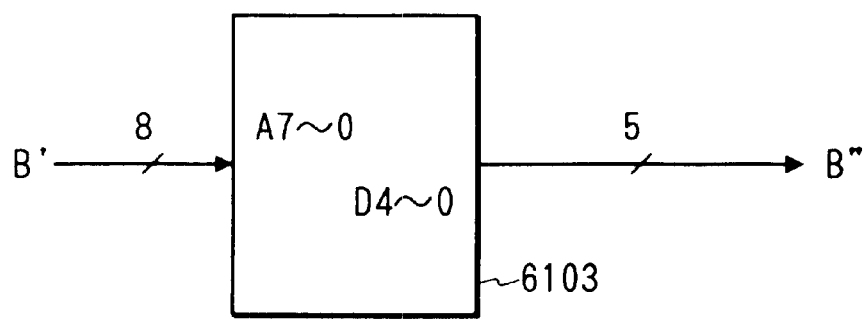

FIG. 86
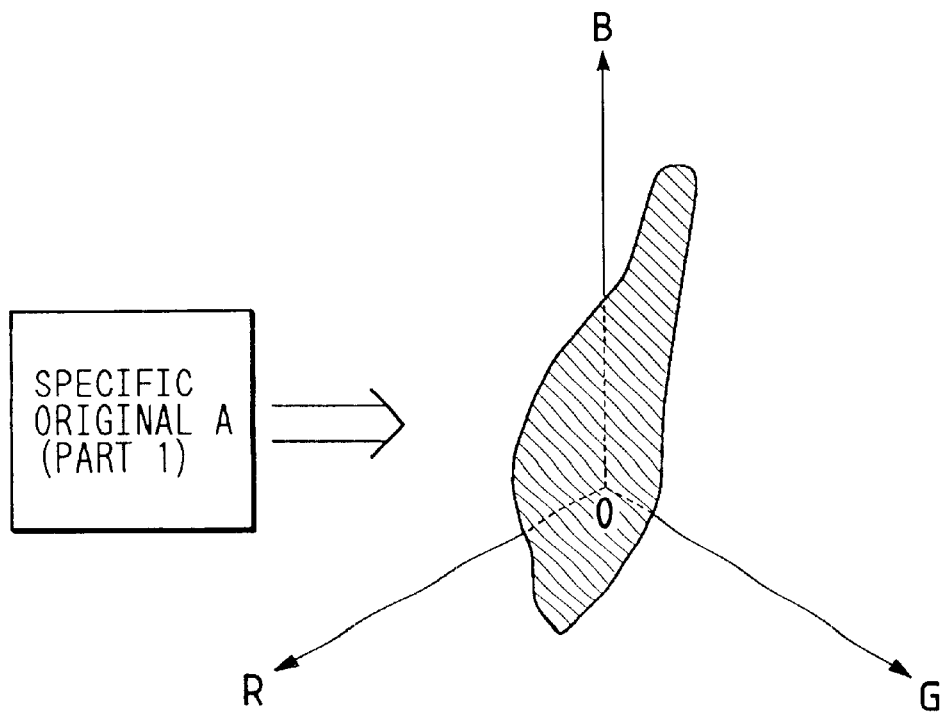
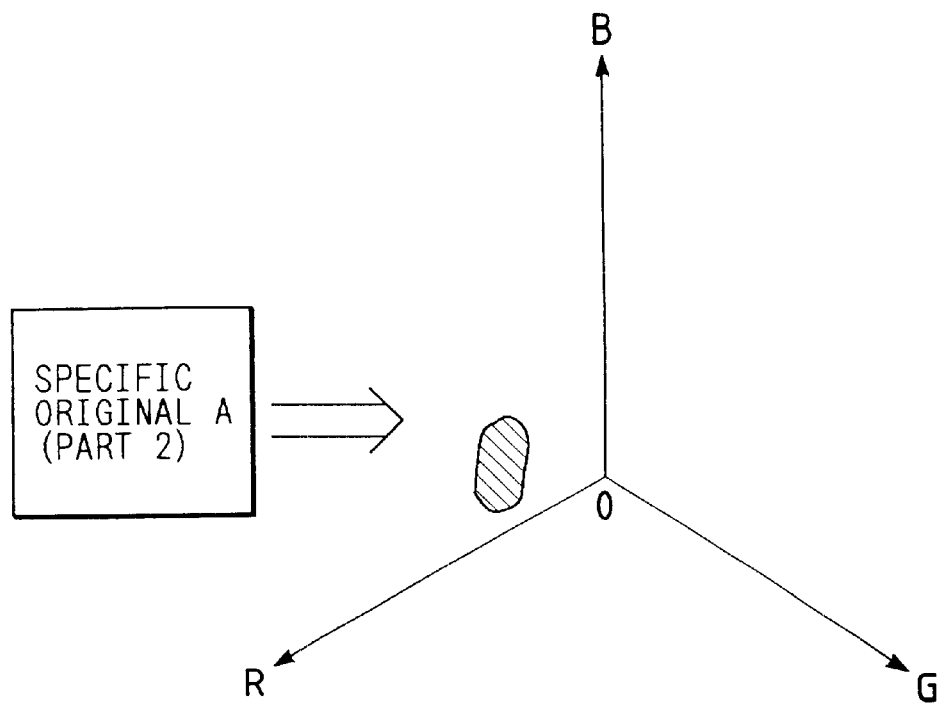

FIG. 87
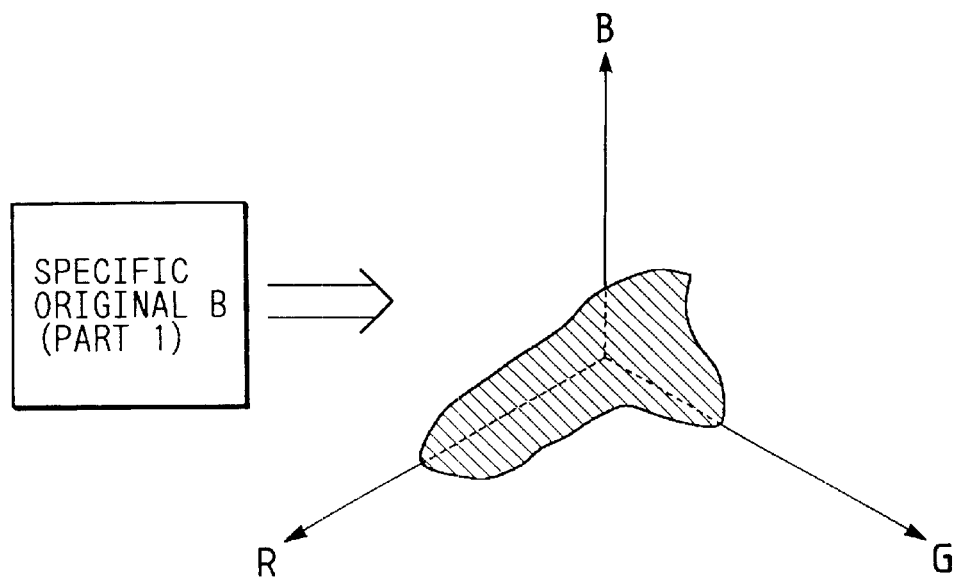
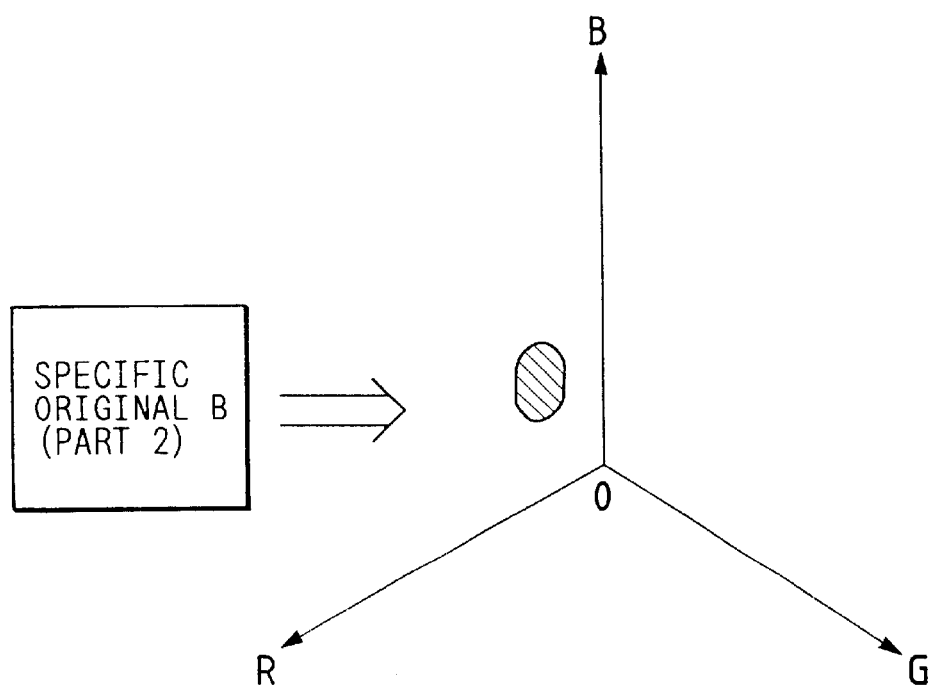

7501⋯SPECIFIC ORIGINAL A PART1

7502⋯SPECIFIC ORIGINAL A PART2
  RED-SEALED PORTION
  (PORTION HAVING REDDISH
   COLOR TINT DISTRIBUTION)

TOTAL DRAWING AMOUNT V = max((a), (b), (c), (d)) − min((a), (b), (c), (d))

IMAGE PROCESSING APPARATUS AND METHOD

This application is a continuation of Application Ser. No. 08/111,158 filed Aug. 23, 1993, now abandoned.

BACKGROUND OF THE INVENTION

1. Field of the Invention

The present invention relates to an image processing apparatus and method, and more specifically to an image processing apparatus, such as a copying machine or the like, provided with a detection function of specific original, and its method.

2. Related Background Art

In recent years, it is apprehended that a specific original which should not be copied may be counterfeited, when the copying machines progress toward higher image quality with the ability of color copying.

To allow an image processing apparatus such as a copying machine to recognize the specific original, a method has been proposed in which the feature data of specific original is prestored within the apparatus, and compared with a feature of input image signal to determine whether or not it is the specific original.

In the above-mentioned conventional example, to discriminate the presence of specific original, reference data regarding the discrimination of specific original is preheld in memory. However, when the memory or peripheral circuit is intentionally removed, or exchanged, or it is out of order, it is impossible to detect such state, resulting in a shortcoming of disenabling the discrimination of specific original with the apparatus.

Also, in the above-mentioned conventional example, in discriminating the specific original, if any reference value of white/black level for an image signal input into the image processing apparatus or any characteristic of the color space associated with an input color image signal is changed, the feature data must be changed in every case, and therefore the individual feature data for each apparatus must be changed. Further, when a plurality of kinds of images obtained from another apparatus such as an image scanner, a still video, a film scanner, a VTR or the like were input into one image processing apparatus to discriminate the presence of specific original for such all kinds of images, it was requisite that feature data for all the apparatuses were held.

Conventionally, a so-called frame-sequential printer has been known in which an image with a plurality of color components is formed corresponding to a plurality of scanning operations with the scanner to form a color image on the same paper. In such printer, the technique for detecting a specific original different in each scanning has been disclosed in U.S. Pat. No. 5,227,871.

In the above conventional example, the discrimination reference data of specific original is prestored in memory, and switched depending on the kind of specific original for discrimination to be made in multiple times of image formation. However, in the above conventional example, the kind of specific original for discrimination in forming each image was assigned without regard to the degree of significance of specific original (which should be inhibited from copying most significantly).

Therefore, it was difficult to make a reasonable discrimination in accordance with the degree of significance for the specific original.

Also, one of the techniques for inhibiting the original which should not be copied from copying has been proposed by the present applicant in U.S. patent application Ser. No. 715,922 filed on Jun. 14, 1991, wherein the specific original is identified by preregistering specific original data in the color space, and discriminating whether or not the distribution of input original image data is substantially the same as that of specific original data in the color space.

However, in the above conventional example, because the color distribution of an original to be detected is compared in the form of collective information as a whole, there was a drawback that when the distribution area of important information (e.g., red-sealed portion in FIG. 90) in the color space is small, image data may be discriminated as the specific original, even if the important portion of the image may lack from the image to be discriminated.

SUMMARY OF THE INVENTION

The present invention has been achieved in the light of the aforementioned drawback associated with the conventional examples, and its objective is to provide an image processing apparatus which can inhibit any false copying of specific original when a memory or peripheral circuit comprising the discrimination reference data of specific original is removed or exchanged, or it is out of order.

To accomplish such objective, according to the present invention, there is disclosed an image processing apparatus comprising, connection means for connecting a discrimination means for discriminating whether or not an input image is a predetermined image, and certification means for certifying whether the discrimination means connected with the connection means is genuine or not.

Also, it is another object of the present invention to provide an image processing apparatus which is capable of discriminating the specific original by using the same feature data of specific original even if an image is input from a different input apparatus.

To accomplish such object, there is disclosed an image processing apparatus comprising, input means for inputting a color image signal representing a color original, correction means for correcting signal characteristic of the color image signal, and discrimination means for discriminating whether the color original is a predetermined image based on the color image signal of which signal characteristic is corrected by the correction means.

It is still another object of the invention to make a discrimination in accordance with the degree of significance of specific original, when discriminating the identity between any of a plurality of specific originals and the input image.

To accomplish such object, there is disclosed an image processing apparatus comprising, input means for inputting image data representing an original, and discrimination means for discriminating whether the original is at least one of a plurality of predetermined images, wherein said discrimination means makes a discrimination in accordance with the degree of significance of the plurality of predetermined images.

Further, it is another object of the invention to make a discrimination at good accuracy based on a plurality of color tints for the specific original.

To accomplish such object, there is disclosed an image processing apparatus comprising, input means for inputting color image data representing a color original, first discrimination means for discriminating whether the color original is a predetermined image based on a first color of the predetermined image, second discrimination means for discriminating whether the color original is the predetermined image based on a second color of the predetermined image which is different from the first color, and third discrimination means for discriminating whether the color original is the predetermined image based on the discrimination results of the first and second discrimination means.

Other objects and forms of the present invention will be apparent from the following description with reference to the drawings and the appended claims.

BRIEF DESCRIPTION OF THE DRAWINGS

FIG. 22 is a table showing an example of information which a ROM b of this embodiment holds;

FIGS. 27A to 27C are graphs exemplifying processed results of the integrating circuit a of this embodiment;

FIGS. 32A to 32D are graphs exemplifying processed results of the integrating circuit b of this embodiment;

FIG. 36 is a table showing the operation example of the volume ratio discrimination circuit of this embodiment;

FIG. 44 is a table exemplifying information which a ROM b of the second embodiment holds;

FIGS. 45A and 45B are a block diagram showing a configurational example of bank switch portion and a timing chart showing its operation example in the second embodiment;

FIG. 50 is a block diagram showing the configuration of an image data correction circuit 5320 in the third embodiment;

FIG. 65 is a diagram showing the relation between CNO signal and print output in the third embodiment;

FIG. 66 is a table showing the hold content held at each address of a ROM 5311 and the access condition thereof;

FIG. 67 is a table showing the hold content held at each address of a ROM 5311' corresponding to ROM 5311 in the third embodiment and the access condition thereof;

FIG. 73 is a block diagram showing the configuration of an image data correction circuit according to the seventh embodiment;

FIG. 86 is a view showing the distribution shape of specific originals part 1 and part 2 in the color space;

FIG. 87 is a view showing the shape of specific original B in the color space;

DETAILED DESCRIPTION OF THE PREFERRED EMBODIMENTS

Embodiments

An image processing apparatus according to the embodiment of the present invention will be described below with reference to the drawings. In the following embodiments, a copying machine is exemplified as an application example of the present invention, but the present invention is not limited thereto, and is applicable to other apparatuses including a printer and a printer interface without departing the scope of the invention. Also, the specific original herein used is meant to encompass all originals ranging from copying forbidden originals such as banknotes and securities to special purpose originals such as confidential documents.

First Embodiment

A copying machine according to a first embodiment of the present invention will now be described.

[Shape of Apparatus]

Figure 1:
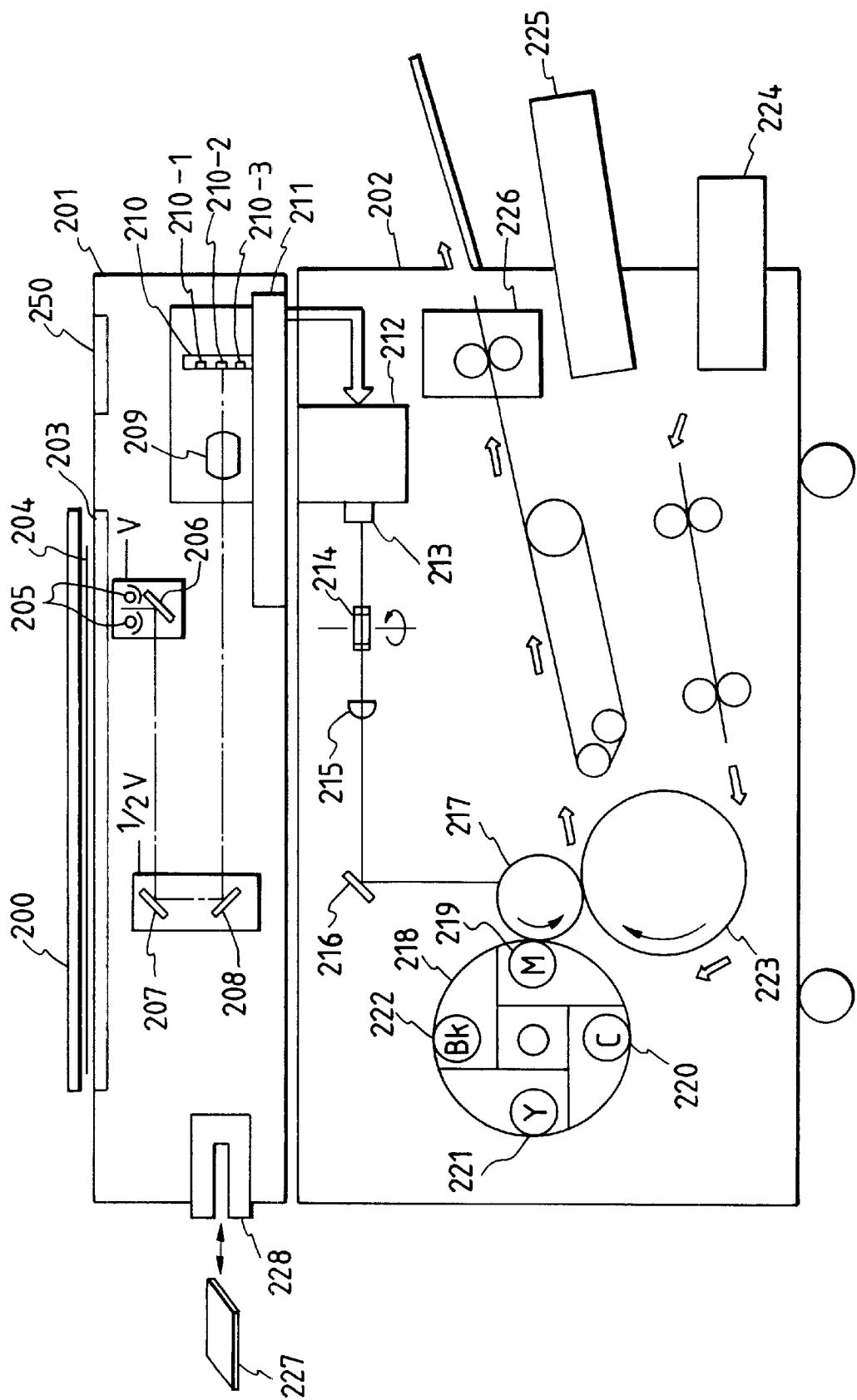
FIG. 1 is a schematic view of an apparatus according to one embodiment of the present invention.

FIG. 1 is a schematic view which illustrates an example of the structure of an apparatus according to an embodiment of the present invention.

Referring to FIG. 1, reference numeral 201 represents an image scanner that is a section for reading an original document to subject it to a digital signal process.

Reference numeral 202 represents a printer for printing out a full color image corresponding to an image of the original document read by the image scanner 201 onto a paper sheet.

In the image scanner 201, reference numeral 200 represents a mirror-surface pressure plate. An original document 204 placed on an original-document frame glass (hereinafter called a "platen") 203 is irradiated by a lamp 205. The image of the original document is introduced to mirrors 206 to 208, followed by forming the image on a 3-line sensor 210 by a lens 209 to be decomposed into full-color information, that is, color components red (R), green (G) and blue (B). As a result, the image is, in the form of a signal denoting the intensity of light of each component, transmitted to a signal processing portion 211. The mechanical movement of the lamp 205 and the mirror 206 at speed v and that of the mirrors 207 and 208 at speed v/2 each performed in the perpendicular direction with respect to the electronical scanning (the main scanning) direction of the CCD 210 cause the entire surface of the original document to be scanned (sub-scanned). The image of the original document thus read is transmitted to the signal processing portion 211.

In the signal processing portion 211, the image signal supplied from the image scanner 210 is electrically processed so that it is decomposed into color components magenta (M), cyan (C), yellow (Y) and black (K), followed by transmitting the signals denoting the color components to the printer 202. Any one of components M, C, Y or K is generated whenever the image scanner 201 performs one scanning operation, followed by transmitting the color component to the printer 202. That is, totaling four times of operations of scanning the original document enable one printing out to be completed.

The image signals denoting M, C, Y and K transmitted from the image scanner 201 are transmitted to a laser driver 212. The laser driver 212 modulates and actuates a semiconductor laser 213 in accordance with the transmitted image signal. Laser beams scan the surface of a photosensitive drum 217 via a polygonal mirror 214, an f-θ lens 215 and a mirror 216.

Reference numeral 218 represents a rotary developing device composed of a magenta developing section 219, a cyan developing section 220, a yellow developing section 221 and a black developing section 222. The foregoing four developing sections alternately come in contact with the photosensitive drum 217 so that a static latent image formed on the photosensitive drum 217 is developed with toner.

Reference numeral 223 represents a transferring drum to which a paper sheet supplied from a paper-sheet cassette 224 or 225 is wound to transfer the image developed on the photosensitive drum 217.

After the four colors M, C, Y and K have been sequentially transferred as described above, the paper sheet passes through a fixing unit 226 so that the toner is fixed to the paper sheet before the paper is discharged.

Reference numeral 227 represents an IC card to be inserted into a card reader 228 included by the image scanner 201 so that it transfers information to be stored to the signal processing portion 211 and so forth.

[Image Scanner]

Figure 2:
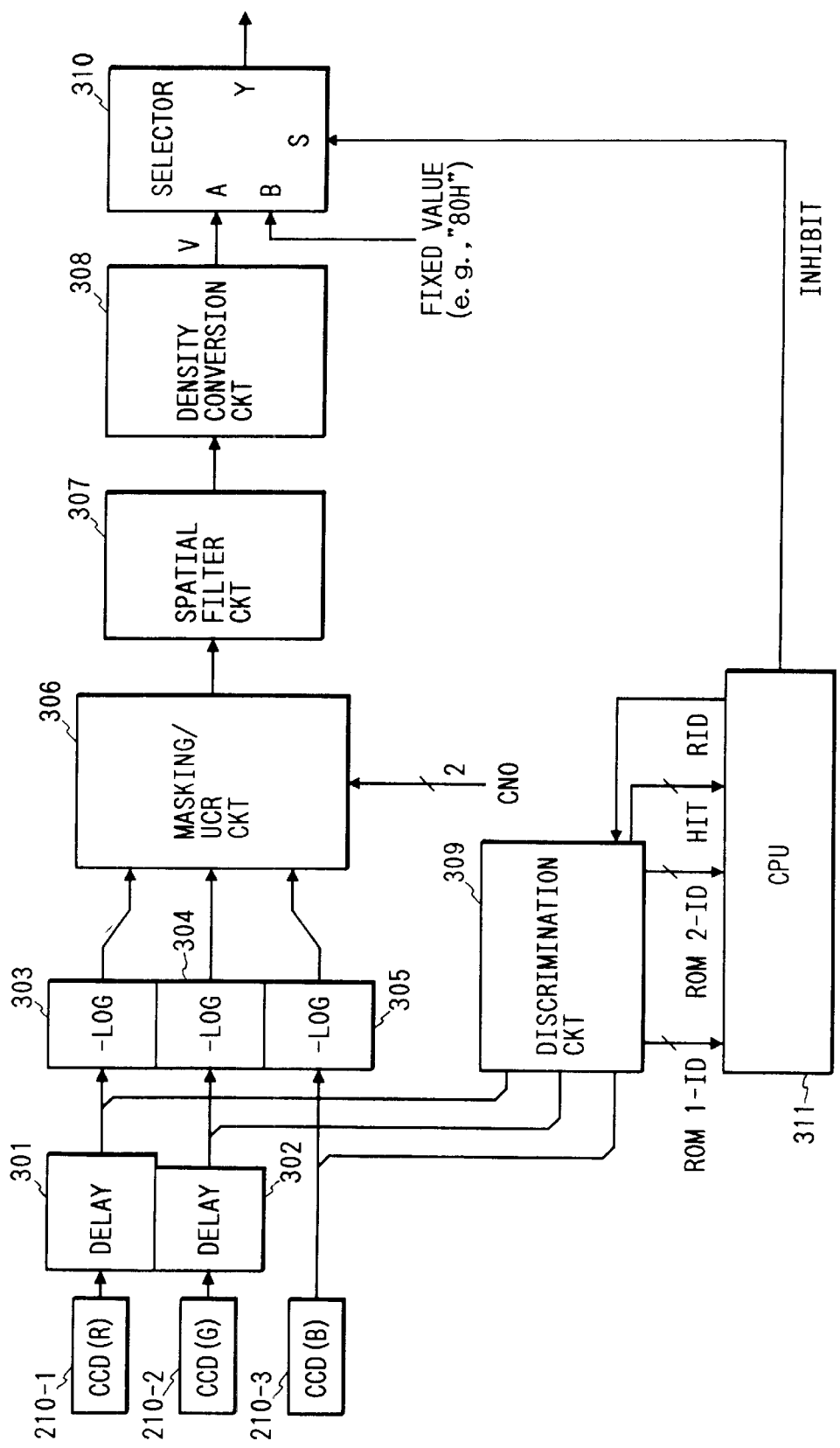
FIG. 2 is a block diagram showing an example of signal flow in an image scanner of this embodiment.

FIG. 2 is a block diagram which illustrates an example of the flow of the signal supplied from the image scanner 201.

Referring to FIG. 2, reference numerals 210-1 to 210-3 represent CCD sensors each having R, G and B spectrum sensitivity characteristics to transmit, for example, 8-bit signal that has been converted from an analog signal to a digital signal. Therefore, each of R, G and B colors is classified into levels from 0 to 255 in accordance with the intensity of light. The CCD sensors 210-1 to 210-3 are included in the 3-line sensor 210 shown in FIG. 1.

Since the CCD sensors 210-1 to 210-3 according to this embodiment are disposed at predetermined intervals, delays 301 and 302 are used to correct their spatial deviations.

Reference numerals 303 to 305 represent logarithmic converters formed into look-up table each comprising a ROM or a RAM to convert the image signals supplied from the CCD sensors 210-1 to 210-3 via the delays 301 and 302 from brightness signals into density signals.

Reference numeral 306 represents a known masking/UCR (Under Color Removal) circuit. Although the detail description about it is omitted here, the masking/UCR circuit 306 transmits M, C, Y and K signals in response to the supplied three signals at each reading operation, the M, C, Y and K signals being transmitted in a plane sequential manner while having a predetermined bit length, for example, 8 bits.

Signal CNO to be individually supplied to the masking/UCR circuit 306 is a 2-bit plane sequential signal, an example of which is shown in Table 1. The signal CNO controls the sequential order of the four reading operations to switch the operation conditions of the masking/UCR circuit 306.

TABLE 1

| CNO | Print Output |
|---|---|
| 0 | Magenta (M) |
| 1 | Cyan (C) |
| 2 | Yellow (Y) |
| 3 | Black (K) |

Reference numeral 307 represents a known spatial filter circuit for correcting the spatial frequency of the output signal.

Reference numeral 308 represents a density conversion circuit for correcting the density characteristics of the printer 202, the density conversion circuit 308 being formed into a look-up table comprising a ROM or a RAM.

Reference numeral 309 represents a discrimination circuit for discriminating a specific original document image. Although its detailed description will be described later, a discrimination is made as to whether or not at least one of a plurality of the specific original document images is being read, resulting in transmission of discrimination signal HIT.

Reference numeral 311 represents a CPU for controlling the structure according to this embodiment. The CPU 311 controls the discrimination circuit 309 to transmit copy inhibition signal INHIBIT in accordance with the discrimination signal HIT supplied from the discrimination circuit 309.

When the discrimination circuit 309 receives control signal RID supplied from the CPU 311, it transmits signal ROM1-ID and signal ROM2-ID so that the CPU 311 is, in response to the foregoing signal, given specific number ID added to the ROM included by the discrimination circuit 309.

Reference numeral 310 represents a selector for selecting and transmitting either, for example, 8-bit signal V supplied from the density conversion circuit 308 or a fixed value, for example, "80" (HEX) in response to the signal INHIBIT supplied from the CPU 311 to a selection terminal S. That is, the selector 310 selects and transmits the signal V supplied from the density conversion circuit 308 if the signal INHIBIT is "1", while the same selects and transmits the fixed value, for example "80" (HEX) if the signal INHIBIT is "0".

Namely, the selector 310 transmits "80" (HEX) if a discrimination has been made by the discrimination circuit 309 that the specific original document is being read regardless of the value of the signal V, while the same transmits the same output as the signal V in the residual cases.

[Timing Chart of Synchronizing Signal]

Figure 3:
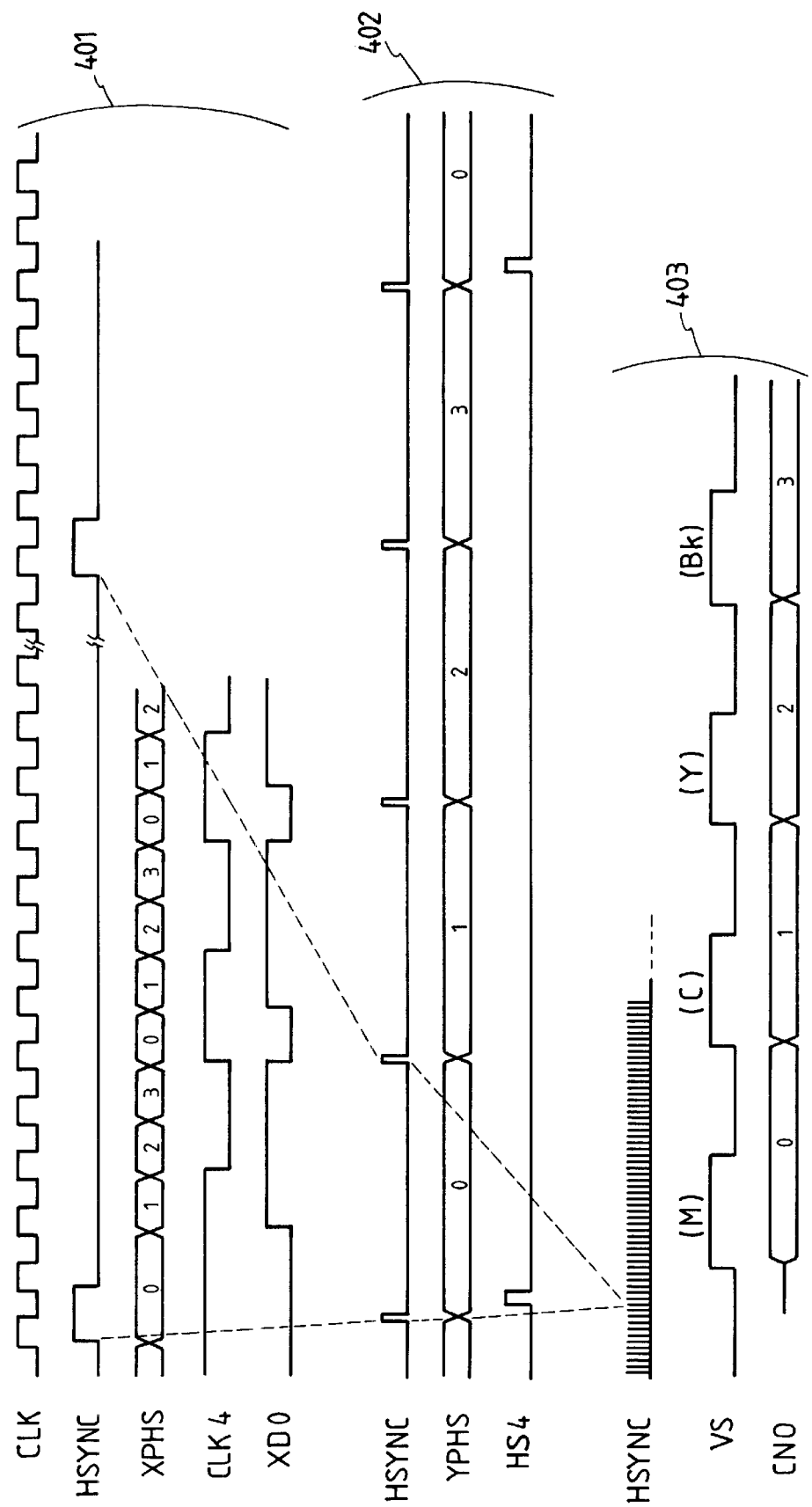
FIG. 3 is a timing chart showing an example of synchronizing signal in this embodiment.

FIG. 3 is a timing chart which illustrates an example of a synchronizing signal according to this embodiment.

Referring to FIG. 3, reference numeral 401 represents main scanning timing, 402 represents sub-scanning timing for a short region, and 403 represents a sub-scanning timing for a long region.

In a section 401, signal CLK that in a standard clock signal causes image processing for a pixel unit to be performed in this embodiment in synchronization with the first transition of the signal CLK.

Signal HSYNC is a main-scanning synchronizing signal so that the start of the main scanning is synchronized in this embodiment in synchronization with the first transition of the signal HSYNC.

Signal CLK4 is a block signal obtained by dividing the signal CLK into four sections, the signal CLK4 being used, together with the signal CLK, to synchronize the basic operation of the discrimination circuit 309.

Signal XPHS is a phase signal of the main scanning, the signal XPHS repeating values from 0 to 3 in response to the signal CLK4.

Signal XDO is a signal to be described later, the signal XDO being "0" when the signal XPHS is "0" and being "1" when the signal XPHS is not "0".

As shown in section 402, signal YPHS is a phase signal for the sub-scanning, the signal YPHS repeating values from 0 to 3 in synchronization with the first transition of the signal HSYNC.

Signal HS4 is a signal to be described later, the signal HS4 being "1" at a period which is four times that of the signal HSYNC in only one period of the signal CLK4.

As shown in section 403, signal VS is a sub-scanning enable signal which forms images in a sequential order as M, C, Y and K in a period in which the signal VS is "1" in this embodiment.

Signal CNO is the foregoing plane sequential signal which is 0, 1, 2, and 3 in synchronization with the first transition of the signal VS.

[Unit for Discrimination]

The discrimination circuit 309 performs discrimination in units of blocks composed of pixels 4×4.

Figure 4:
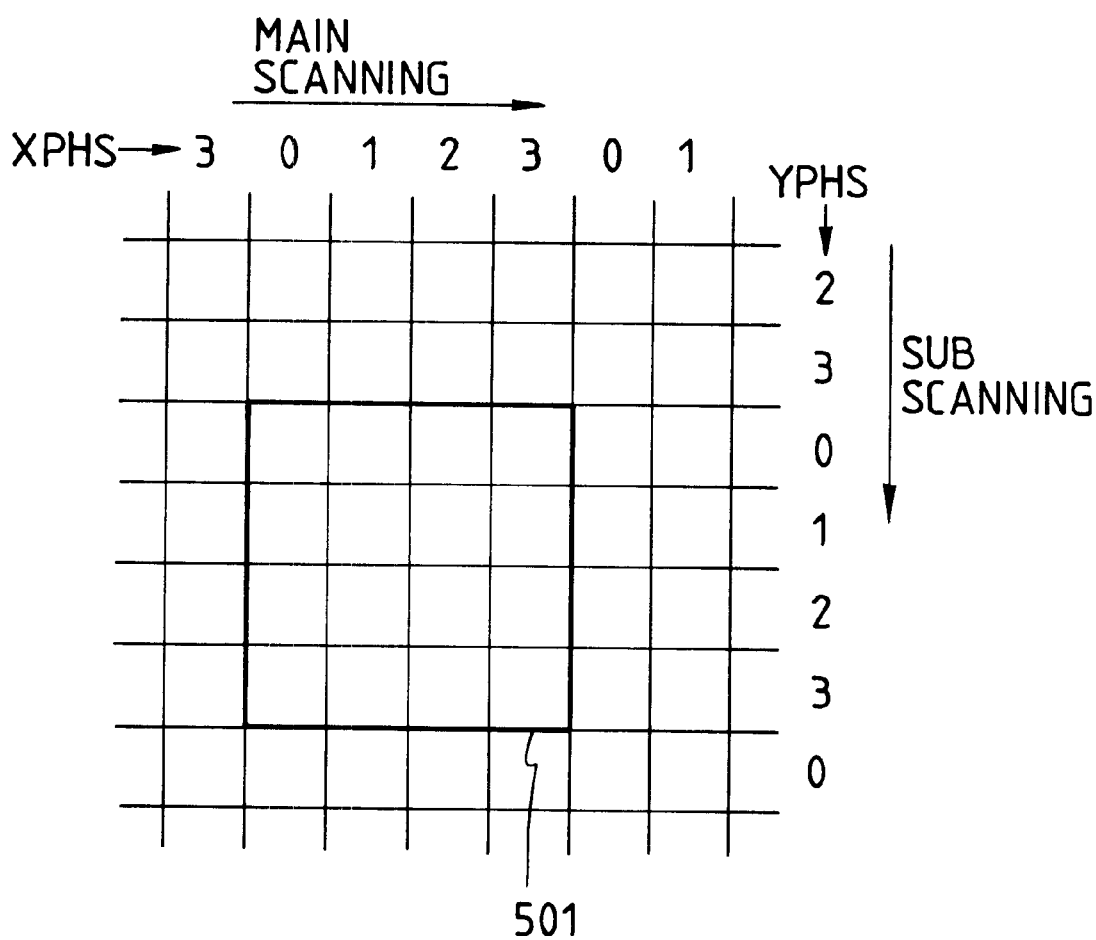
FIG. 4 is a view showing an example of 4×4 pixel block in this embodiment.

FIG. 4 illustrates an example of a block composed of 4×4 pixels.

The discrimination circuit 309 subjects, for example, a block 501 composed of 4×4 pixels shown in FIG. 4. In synchronization with the 4×4 pixel block, the signal XPHS repeats the values 0, 1, 2 and 3 in the main scanning direction, while the signal YPHS repeats the values 0, 1, 2 and 3 in the sub-scanning direction.

In this embodiment, for example, 8 types of specific original documents are discriminated in a time-division manner with the values from 0 to 3 of the signal YPHS so that, for example, 32 types of specific original documents are discriminated.

[Discrimination Means]

Figure 5:
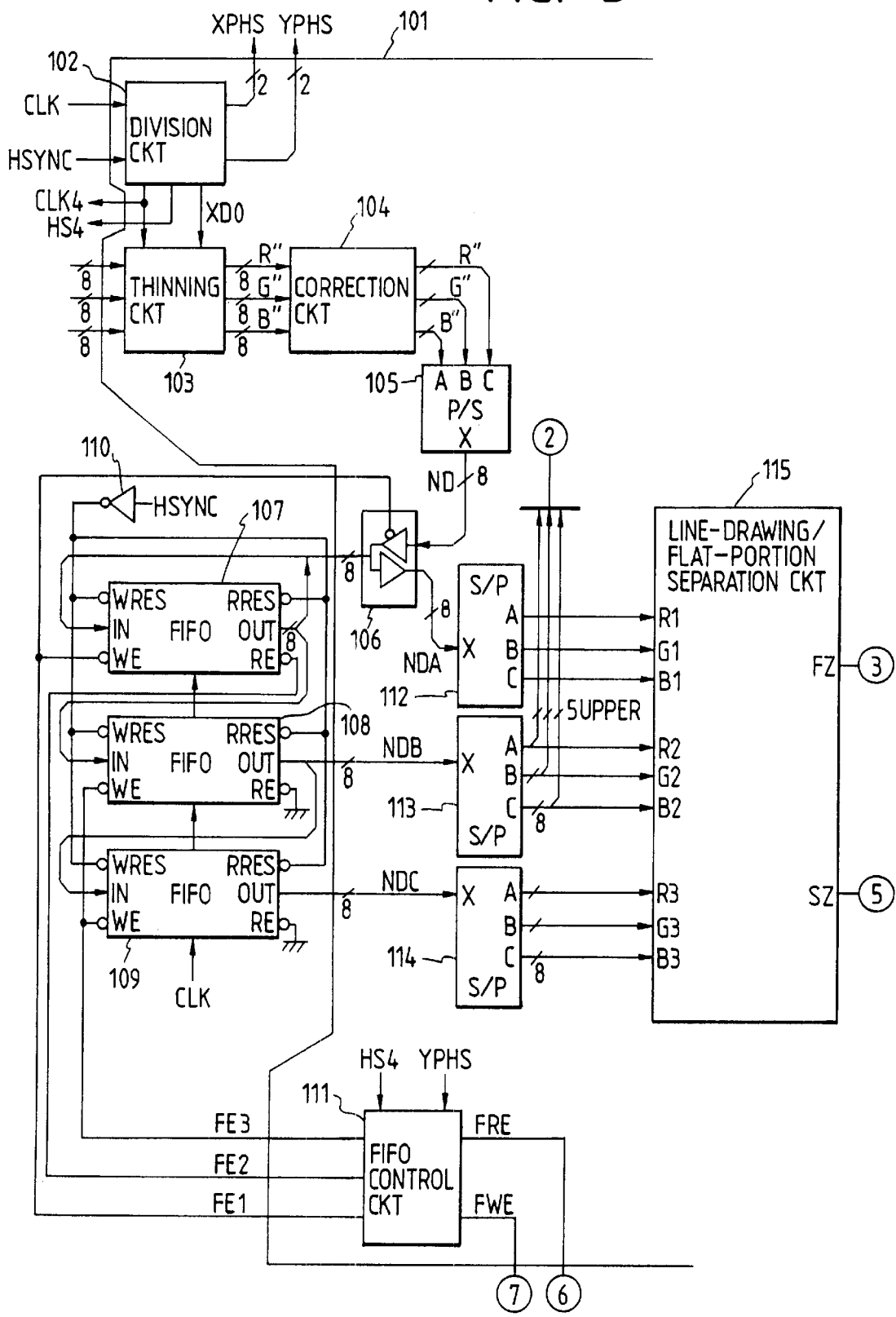
FIG. 5 is a block diagram showing a configurational example of discrimination circuit of this embodiment.
Figure 6:
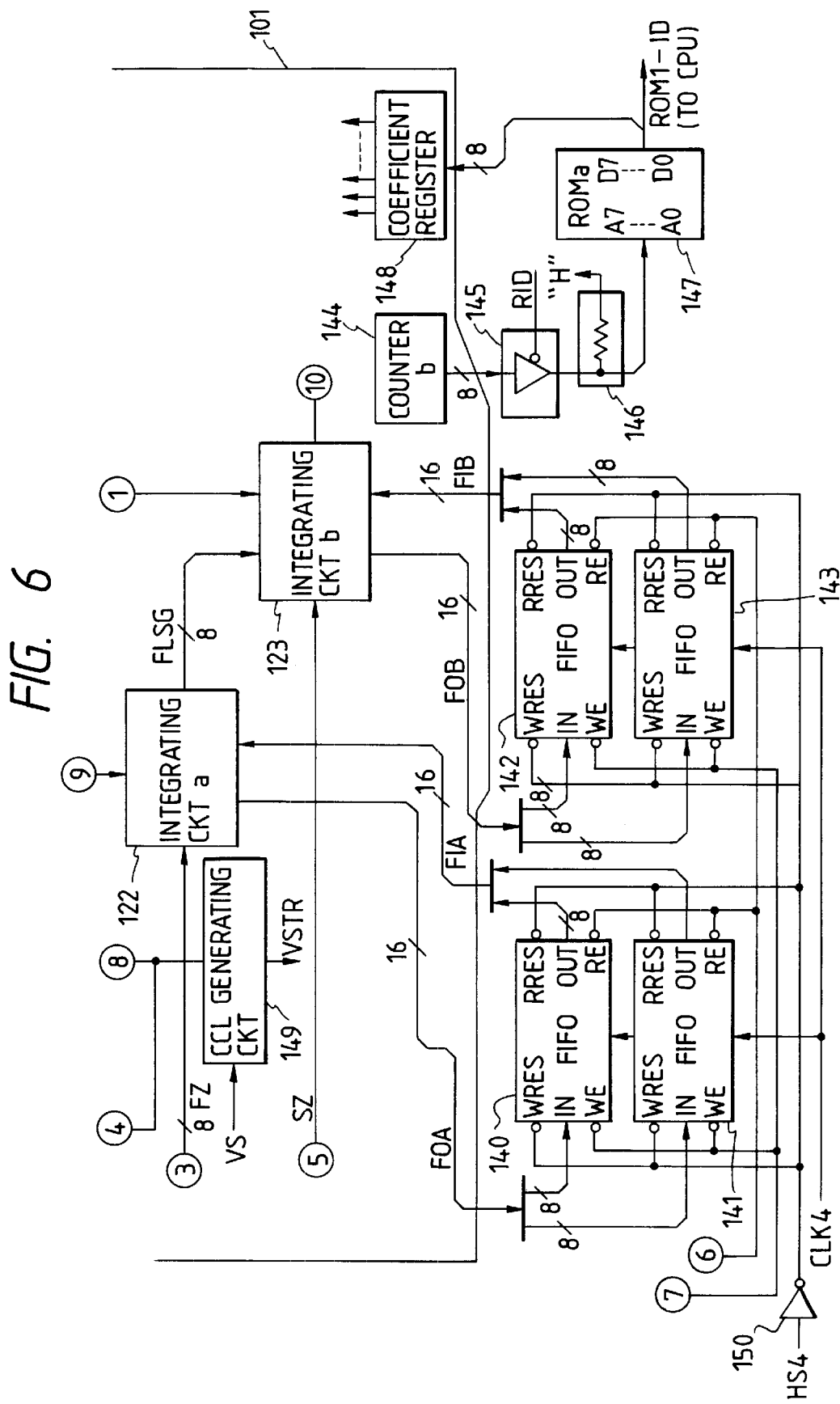
FIG. 6 is a block diagram showing another configurational example of discrimination circuit of this embodiment.
Figure 7:
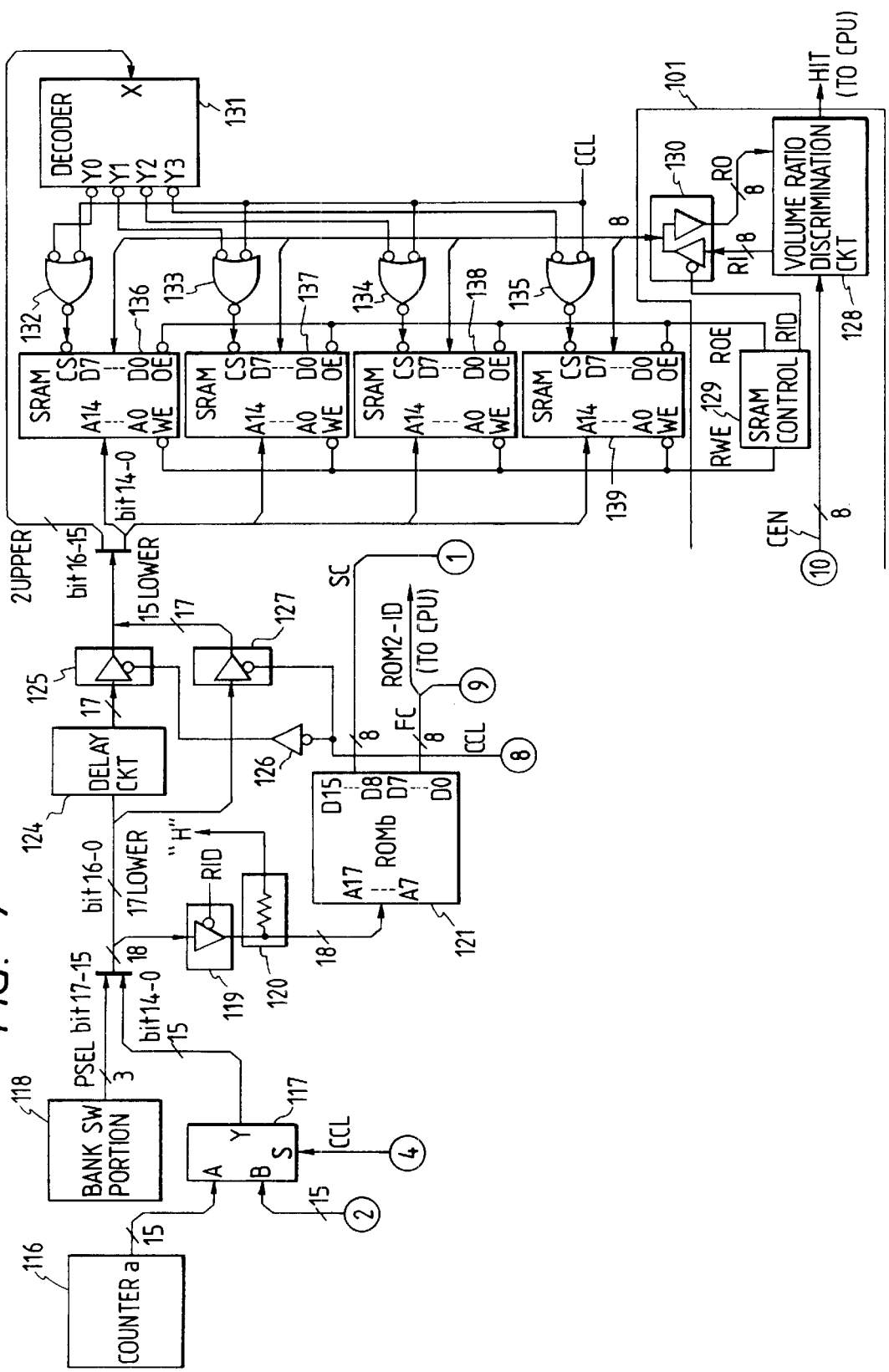
FIG. 7 is a block diagram showing another configurational example of discrimination circuit of this embodiment.

FIGS. 5, 6 and 7 are block diagrams which illustrate an example of the discrimination circuit 309.

The main structure of the discrimination 309 is formed into an LSI structure as represented by reference numeral 101 so that the discrimination circuit 309 receives RGB signals, that are digital color image signals, to transmit the signal HIT denoting the result of the discrimination.

The components of the discrimination circuit 309 will now be described.

Coefficient Register 148

A coefficient register 148 stores a variety of set coefficients for operating the LSI 101. A coefficient ROM (hereinafter called a "ROM a") 147 previously stores coefficients to be set in the coefficient register 148.

The addresses generated by a counter b144 pass through a 3-state gate 145, followed by being received by address terminals A0 to A7 of the ROMa 147. The ROMa 147 sequentially transmits the coefficients, which correspond to the addresses, to the coefficient register 148.

Although the control of the 3-state gate 145 will be described later, control input RID of the 3-state gate 145 is "0" in usual.

Division Circuit 102

A division circuit 102 divides the signals CLK and HSYNC.

Figure 8:
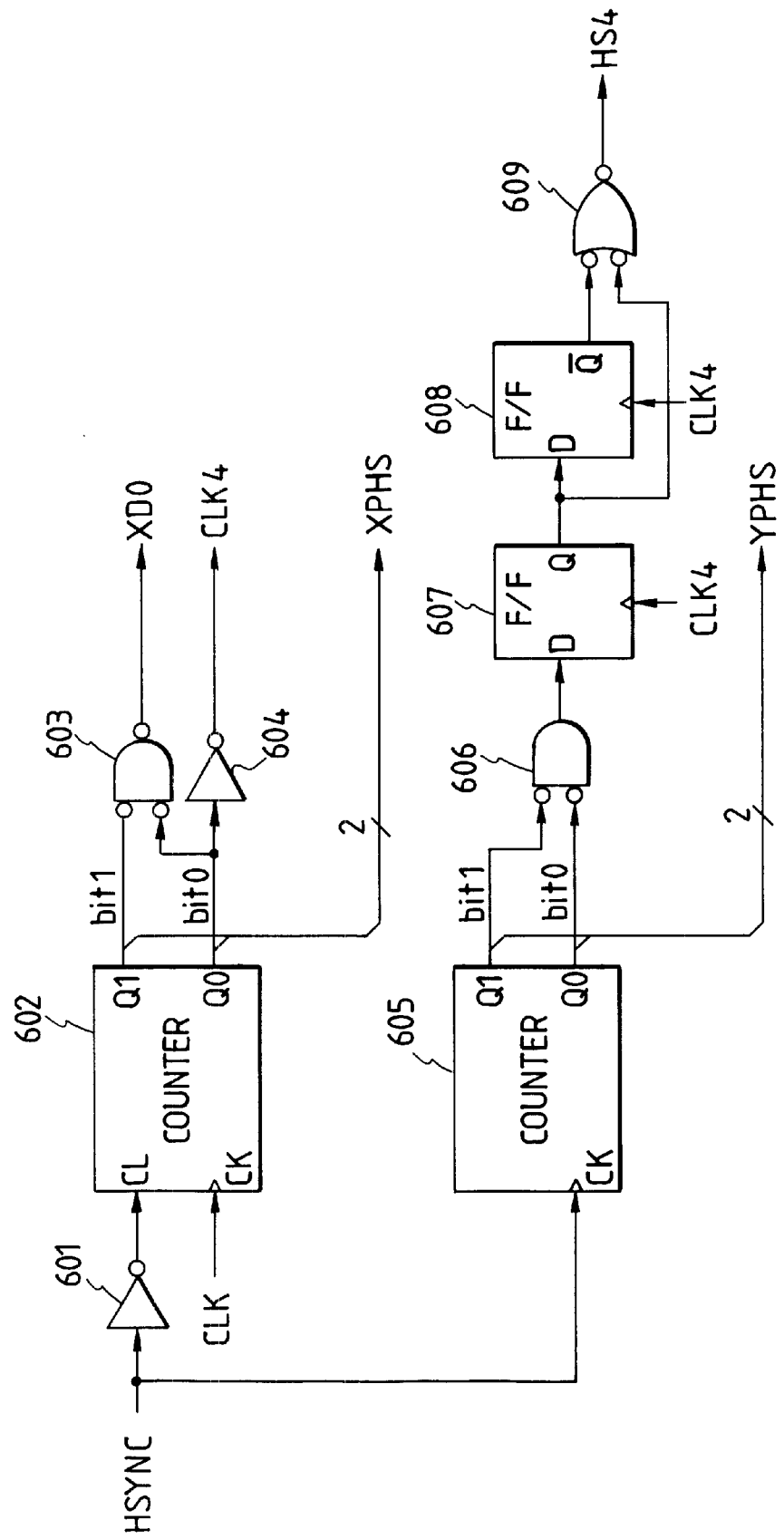
FIG. 8 is a block diagram showing a detailed configurational example of division circuit of this embodiment.

FIG. 8 is a block diagram which illustrates an example of the detailed structure of the division circuit 102.

Referring to FIG. 8, reference numerals 601 and 604 represent inverters, 602 represents a 2-bit counter, and 603 represents an OR gate.

The counter 602 transmits the foregoing signal XPHS. The signal XPHS is initialized to "0" when the signal HSYNC is "1", that is, at the standard position for main scanning, while it repeating the values from 0 to 3 in synchronization with the first transition of the signal CLK.

The OR gate 603 receives the both bits of the signal XPHS to transmit its logical sum as the foregoing signal XDO.

An inverter 604 inverts the lower bit (bit 0) of the signal XPHS to transmit it as the foregoing signal CLK4.

As a result of the foregoing structure, the control signal 401 shown in FIG. 3 can be obtained.

Reference numeral 605 represents a 2-bit counter, 606 represents a NOR gate, 607 and 608 represent flip-flops (hereinafter called "F/Fs"), and 609 represents an AND gate.

The counter 605 transmits the foregoing signal YPHS. The signal YPHS repeats the value from 0 to 3 in synchronization with the first transition of the signal HSYNC.

The NOR gate 606 receives the both bits of the signal YPHS to transmits its NOR signal. That is, the output from the NOR gate 606 is "1" in only a case where the signal YPHS is "00".

The F/Fs 607 and 608 respectively delay the supplied signals in synchronization with the signal CLK4.

The AND gate 609 receives a positive logical output from the F/F 607 and a negative logical output from the F/F 608 to transmit their logical product signal. That is, the AND gate 609 transmits the signal HS4 immediately after the signal YPHS has been "00", the signal HS4 having the pulse width that is substantially the same as one period of the signal CLK4.

As a result of the foregoing structure, the control signal 402 shown in FIG. 3 can be obtained.

Thinning Circuit 103

A thinning circuit 103 thins out the supplied RGB signals in the main scanning direction.

Figure 9A:
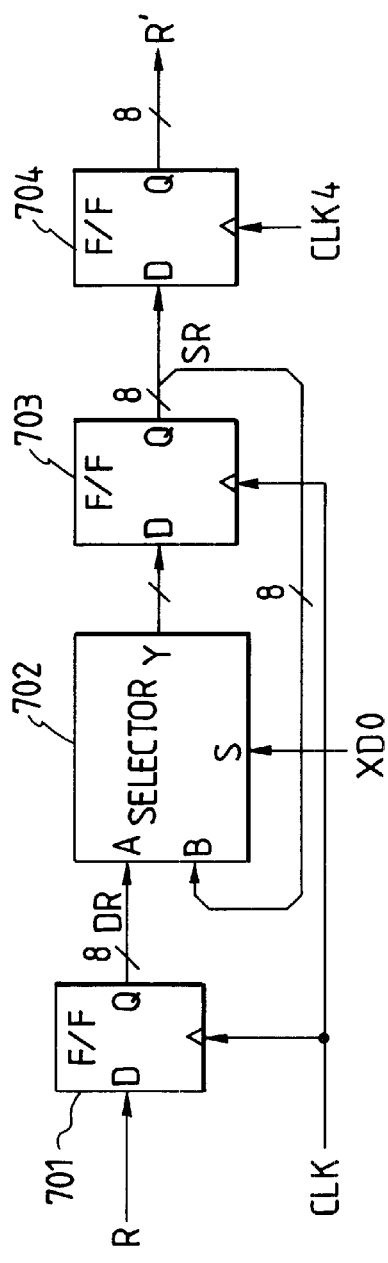
FIGS. 9A and 9B are a block diagram showing a detailed configurational example of thinning circuit and a timing chart showing an operation example in this embodiment.
Figure 9B:
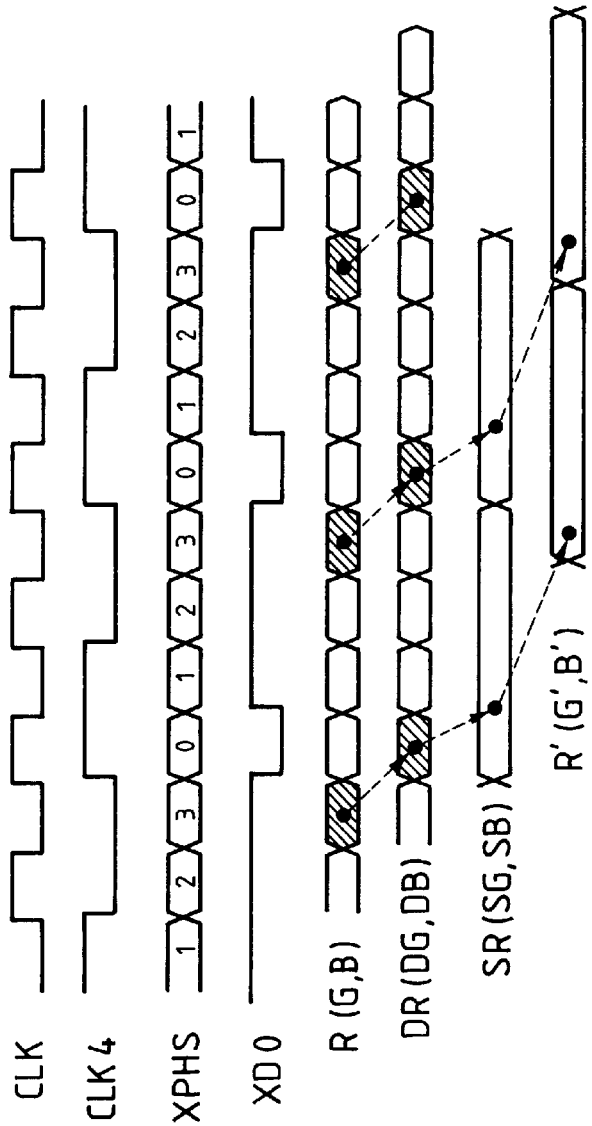

FIG. 9A is a block diagram which illustrates an example of the detailed structure of the thinning circuit 103. FIG. 9B is a timing chart which illustrates an example of the operation of the thinning circuit 103. The thinning circuit 103 is composed of three circuits for respectively processing the RGB signals. Since the three circuits have substantially the same structure, FIG. 9A illustrates only the circuit for processing the signal R, and the descriptions of the circuits for processing the signals G and B are omitted here.

Referring to FIG. 9A, reference numerals 701, 703 and 704 represent F/Fs, 702 represents a 2-input 1-output selector.

The F/F 701 delays the supplied signal R in synchronization with the first transition of the signal CLK to transmit signal SR.

If the selector 702 receives the signal XDO, the value of which is "0", at a selection terminal S thereof, it selects and transmits a signal supplied to a terminal A. If the value of the supplied signal XDO is "1", the selector 702 selects and transmits a signal supplied to a terminal B. That is, the selector 702 selects and transmits signal DR supplied to the terminal A, that is, delayed by the F/F 701 in only a case where the signal XDO is "0", that is, the signal XPHS is "00".

The F/F 703 delays the signal supplied from the selector 701 in synchronization with the first transition of the signal CLK to transmit the signal SR.

That is, if the signal XPHS is not "00", the signal XDO is "1" as shown in FIG. 9B, resulting in that the selector 702 selects the signal supplied to the terminal B thereof to transmit it. Therefore, the signal SR to be transmitted from the F/F 703 is held until the signal XPHS is "00".

As a result, the signal R when the signal XPHS is "00" to "10" is thinned as shown in FIG. 9B so that the signal R in the case where the signal XPHS is "11" is the signal SR.

Then, the signal SR is made to be in synchronization with the first transition of the signal CLK4 by the F/F 704 to be transmitted as signal R'.

Also thinning from the signal G to signal G' and that from the signal B to signal B' are performed in a similar manner to that described above.

Correction Circuit 104

A correction circuit 104 corrects scattering of the characteristics of the CCD 210 and so forth by correcting the gain or by performing an offset correction of the supplied signal.

Figure 10:
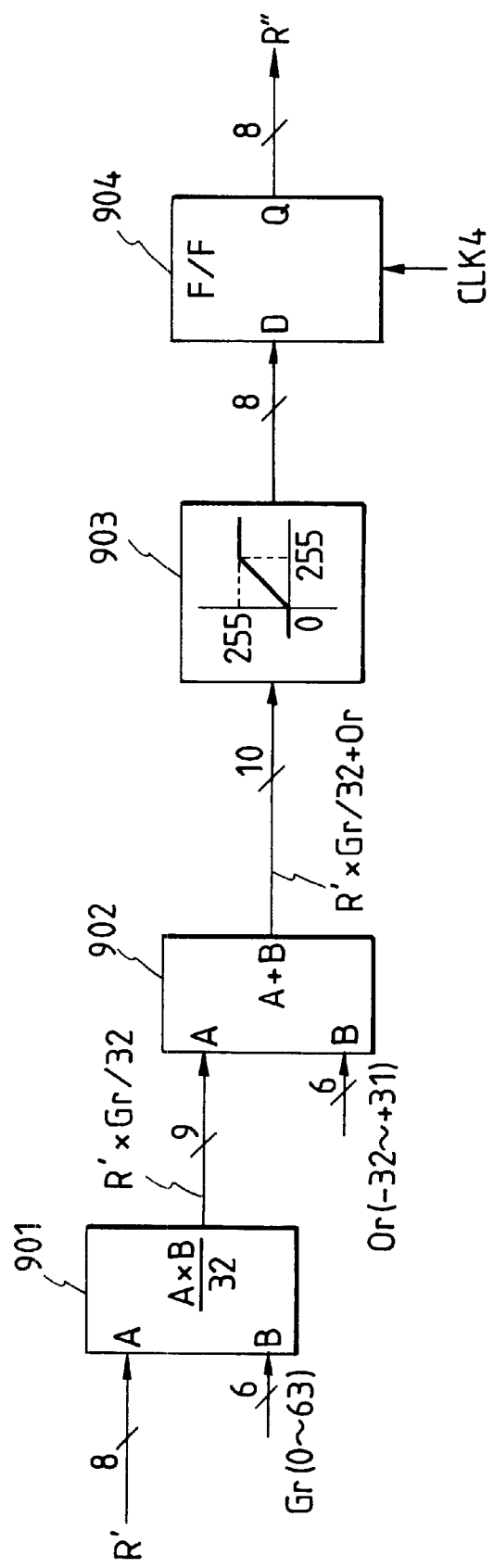
FIG. 10 is a diagram showing a detailed configurational example of correction circuit of this embodiment.

FIG. 10 illustrates an example of the detailed structure of the correction circuit 104. The correction circuit 104 is composed of three circuits for respectively processing the RGB signals. Since the three circuits are structured similarly, FIG. 10 illustrates only the circuit for processing the signal R', and descriptions about the circuits for processing the signals G' and B' are omitted here.

Referring to FIG. 10, reference numeral 901 represents a multiplier, 902 represents an adder, 903 represents a limiter, and 904 represents a F/F.

The multiplier 901 receives the signal R' and gain corrected value Gr to transmit, for example, a 9-bit result of multiplication R'×Gr/32. It should be noted that the gain correction value Gr is, for example, a 6-bit signal, the value of which is set to a range from 0 to 63.

The adder 902 receives the output from the multiplier 901 and an offset correction value Or to transmit, for example, a 10-bit result of addition R'×Gr/32 +Or. It should be noted that the offset correction value Or is, for example, a 6-bit signal, the value of which is set to a range from −32 to +32.

The gain correction value Gr and the offset correction value Or are stored in the foregoing coefficient register 148.

A limiter 903 controls the output from the adder 902 to make the output from the correction circuit 104 to be included in the width of, for example, 8 bits. The limiter 903 controls, for example, an input, that is larger than 255, to be 255 and controls an input, that is smaller than 0, to be 0.

The F/F 904 transmits the signal supplied from the limiter 903 as signal R" in synchronization with the first transition of the signal CLK4.

Also the correction from the signal G' to signal G" and that from the signal B' to signal B" are performed similarly to the foregoing descriptions.

Parallel/Serial Converter 105

Figure 11A:
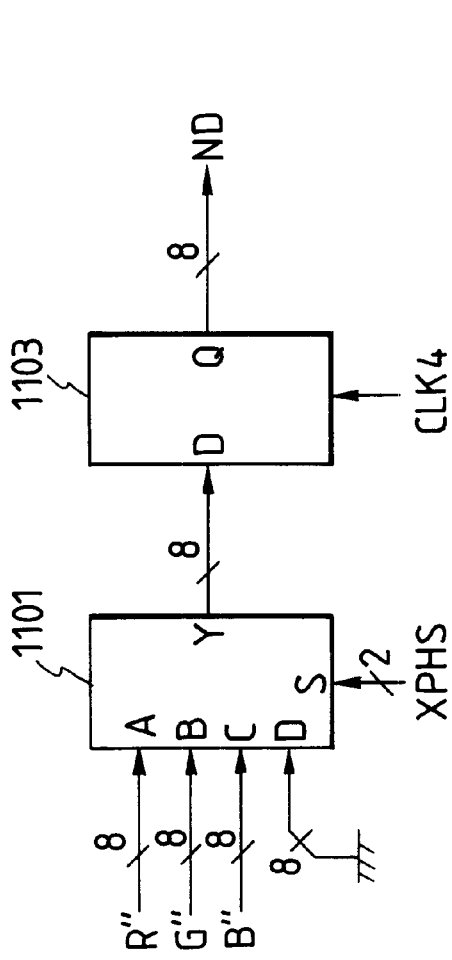
FIGS. 11A and 11B are a block diagram showing a detailed configurational example of P/S 105 and a timing chart showing an operation example in this embodiment.
Figure 11B:
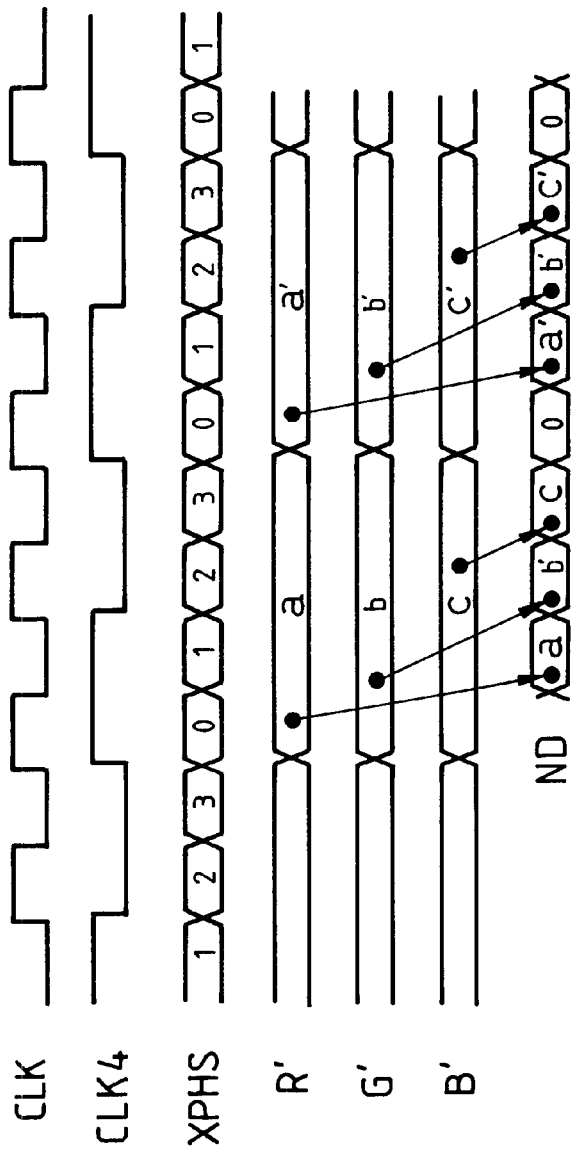

FIG. 11A is a block diagram which illustrates an example of the detailed structure of a parallel/serial converter (hereinafter called a "P/S") 105. FIG. 11B is a timing chart which illustrates an example of the operation of the P/S 105.

Referring to FIG. 11A, reference numeral 1101 represents a 4-input 1-output selector, and 1103 represents a F/F.

The selector 1101 selects the signal R", signal G", signal B" or "00" from the correction circuit 104 in synchronization with the signal XPHS supplied to the selection terminal S. That is, the selector 1101 selects and transmits the signal R" if the signal XPHS is "0", selects and transmits the signal G" if the signal XPHS is "1", selects and transmits the signal B" if the signal XPHS is "2", selects and transmits "00" if the signal XPHS is "3".

The F/F 1103 transmits the signal supplied from the selector 1101 as signal ND in synchronization with the first transition of the signal CLK.

Specifically, the P/S 105 is operated as shown in FIG. 11B for example. When the P/S 105 in parallel receives the signals R", G" and B" the values of which are a, b and c respectively, it transmits signal ND the value of which is a when the signal XPHS is "1", transmits signal ND the value of which is b when the signal XPHS is "2", and transmits signal ND the value of which is c when the signal XPHS is "3". That is, the RGB signals supplied to the P/S 105 in parallel are sequentially transmitted serially.

Control of FIFO

Referring to FIGS. 5, 6 and 7, reference numeral 106 represents a bi-diretional buffer, 107 to 109 represent FIFO memories (hereinafter called "FIFOs"), 110 represents an inverter, and 112 to 114 represent serial/parallel converters (hereinafter called "S/Ps").

Reference numeral 111 represents an FIFO control portion for controlling enable signals for the FIFOs 107 to 109.

The FIFOs 107 to 109 respectively realize delays of 4 lines, the FIFOs 107 to 109 being constituted by M66251 (manufactured by Mitsubishi Electric Corp.). The FIFOs 107 to 109 have writing reset terminal WRES and reading reset terminal RRES which receive signals obtained by making the signal HSYNC to be negative logarithm by the inverter 110.

The FIFO control portion 111 transmits signals FE1, FE2 and FE3, the signal FE1 being supplied to a write-enable terminal WE of the FIFO 107 and to an output enable terminal of the bi-directional buffer 106. The signal FE2 is supplied to a read-enable terminal RE of the FIFO 107, while the signal FE3 is supplied to write-enable terminals WE of the FIFOs 108 and 109. It should be noted that the read-enable terminals of the FIFOs 108 and 109 are grounded so that they are always in the enable state.

Figures 12A, 12B:
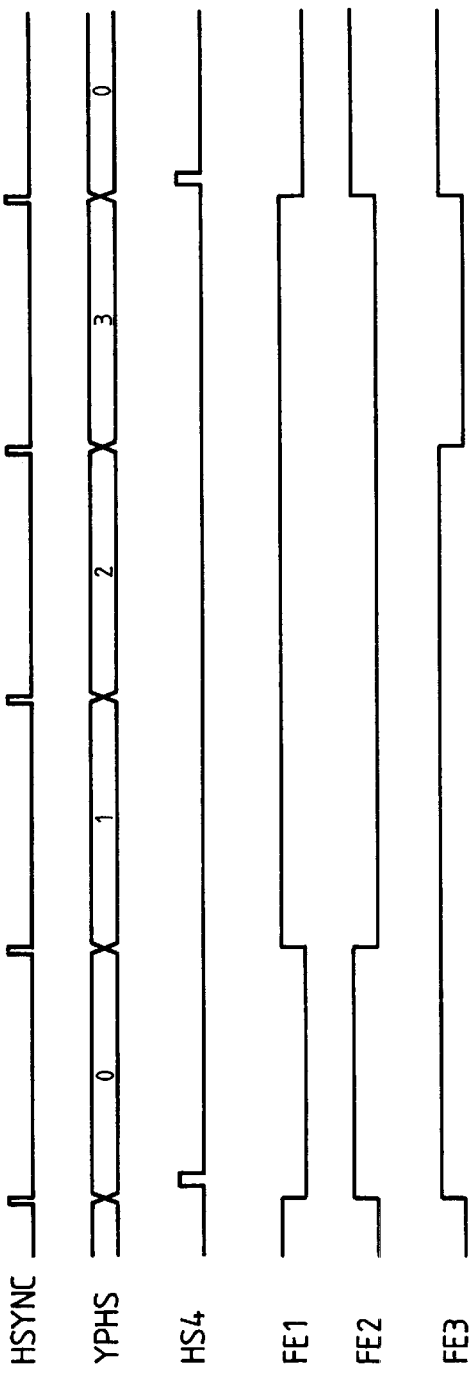
FIGS. 12A and 12B are a timing chart exemplifying the signals FE1 to FE3 which are output from an FIFO control unit and a table showing the states of FIFOs 107 to 109 and a bi-directional buffer 106.

FIG. 12A is a timing chart which illustrates an example of signals FE1 to FE3 to be transmitted from the FIFO control portion 111. FIG. 12B illustrates an example of states of the FIFOs 107 to 109 and the bi-directional buffer 106.

That is, the signal FE1 is "0" when the signal YPHS is "0", and the same is "1" when the signal YPHS is "1", "2" or "3". The signal FE2 is "1" when the signal YPHS is "0", and the same is "0" when the signal YPHS is "1", "2" or "3". The signal FE3 is "1" when the signal YPHS is "0", "1" or "2", and the same is "0" when the signal YPHS is "3".

Therefore, the enabled states of writing and reading of the FIFOs 107 to 109 and the classificaiton of the input and the output of the bi-directional buffer 106 are as shown in FIG. 12B for example.

That is, the terminals WE and RE of the FIFO 107 are enabled and disabled respectively if the signal YPHS is "0". They are made to be disable and enable respectively when the signal YPHS is "1", "2" or "3". The terminals WE of the FIFOs 108 and 109 are made to be disable if the signal YPHS is "0", "1" or "2", and the same is enabled if the signal YPHS is "3".

If the signal YPHS is "0", the signal ND transmitted from the P/S 105 is written on the FIFO 107 via the bi-directional buffer 106, the signal ND being, as signal NDA, simultaneously transmitted to the serial/parallel converter (hereinafter called a "S/P") 112. If the signal YPHS is "1", "2" or "3", the signal read from the FIFO 107 is, as the signal NDA, transmitted to the S/P 112 via the bi-directional buffer 106. As a result, the signal ND, transmitted from the P/S 105 in the case where the signal YPHS is "0", is, as the repeating signal NDA, transmitted to the S/P 112 in the case where the signal YPHS is "0", "1", "2" or "3".

On the other hand, the FIFOs 108 and 109 are brought into the write-enable state if the signal YPHS is "3", resulting in always read-enable state. As a result, output signal NDB from the FIFO 108 is delayed from the signal NDA by four lines (that is, four cycles of the signal HSYNC), followed by transmitting it to the S/P 113. Output signal NDC from the FIFO 109 is delayed from the signal NDB by four lines, followed by transmitting it to the S/P 114.

That is, data in the case where the signal YPHS is "0" is repeatedly read from the FIFO, resulting in data in the sub-scanning direction to be thinned. Therefore, data is thinned to ¼ in both main scanning direction and the sub-scanning direction in cooperation of the foregoing thinning circuit 103.

S/Ps 112 to 114

Figure 13A:
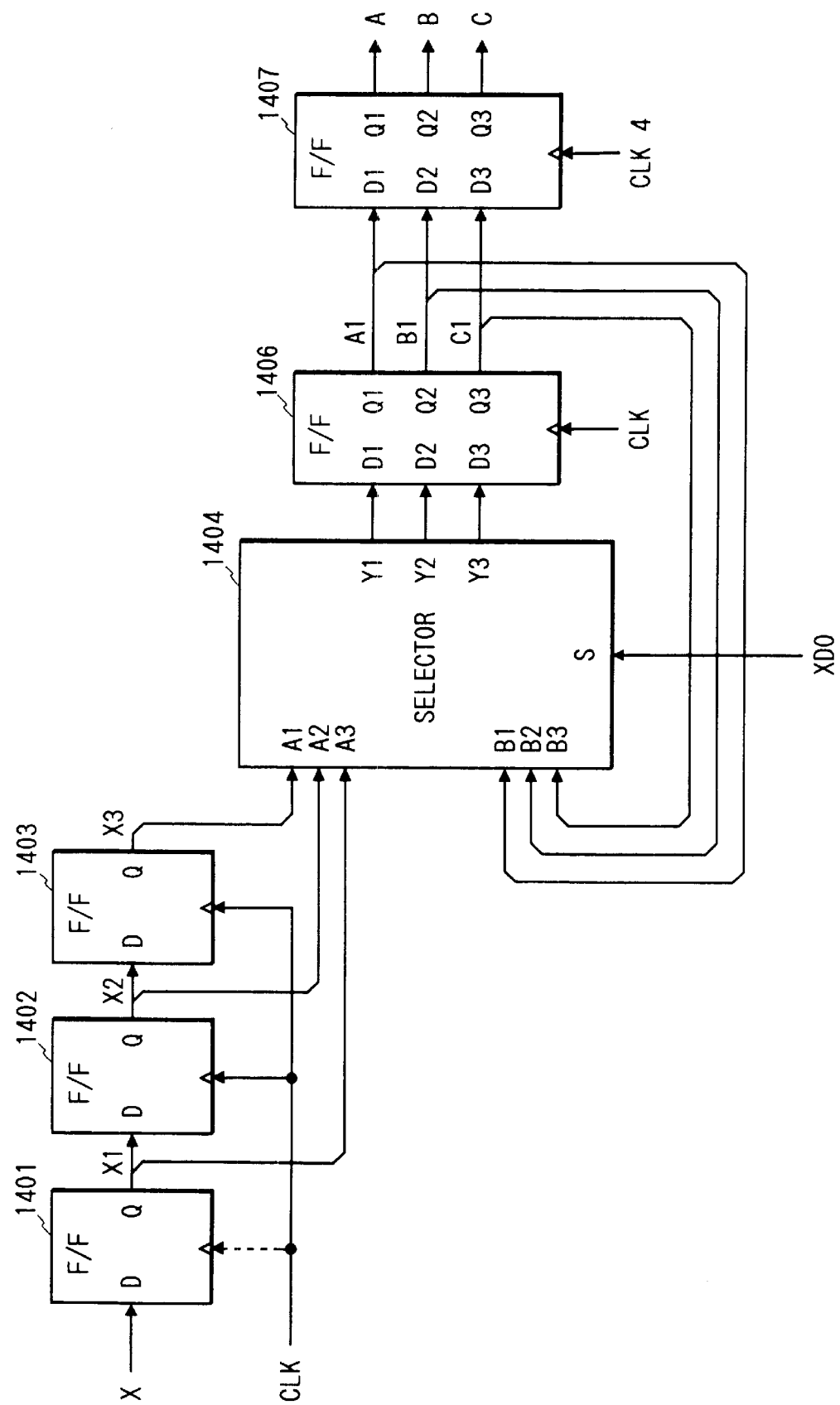
FIGS. 13A and 13B are a block diagram showing a configurational example of S/Ps 112 to 114 and a timing chart showing an operation example in this embodiment.
Figure 13B:
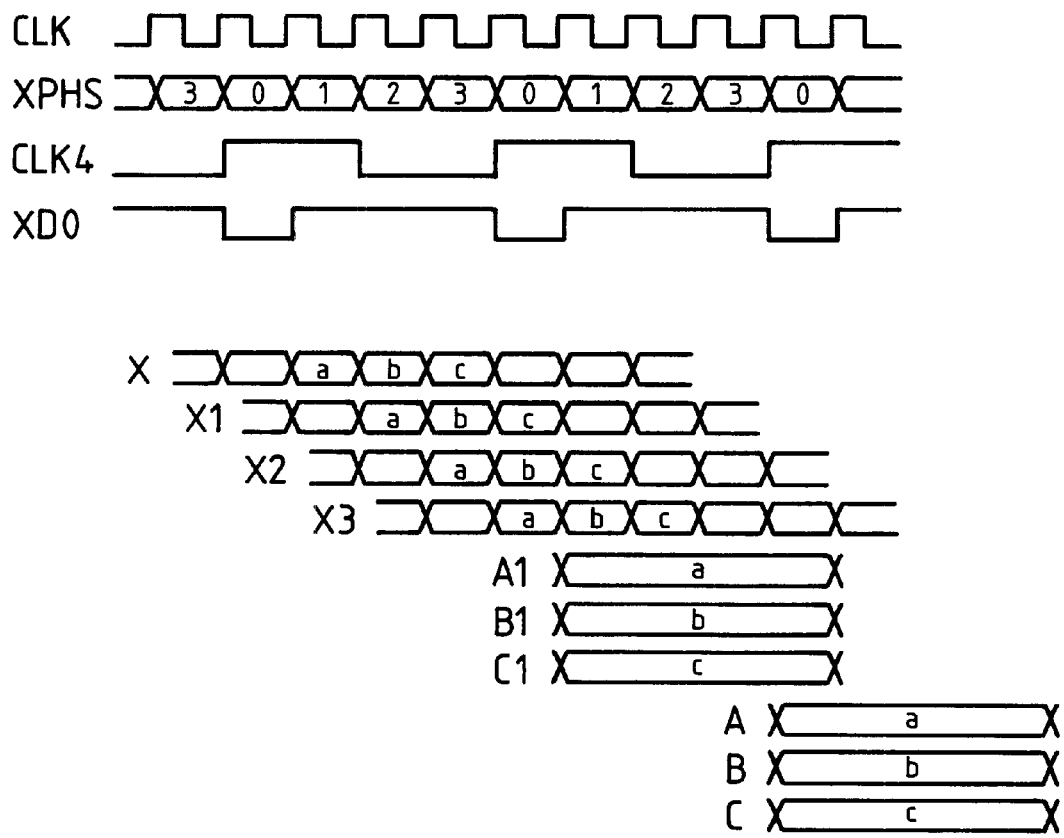

FIG. 13A is a block diagram which illustrates an example of the structure of the S/P. FIG. 13B is a timing chart which illustrates an example of the operation of the S/P.

Referring to FIG. 13A, reference numerals 1401 to 1403 represent F/Fs, 1404 represents a 2-input 1-output selector, and 1406 and 1407 represent F/Fs.

The F/Fs 1401 to 1403 sequentially delay the supplied signals by one period of the signal CLK in synchronization with the signal CLK to transmit them.

The selector 1404 selects any one of the signals supplied to terminals A1 to A3 or signals supplied to terminals B1 to B3 in response to the signal XDO supplied to the selection terminal S to transmit the selected signal. That is, the selector 1404 selects and transmits the signal supplied to the terminals A1 to A3 if the signal XPHS is "0", that is, if the signal XDO is "0". The selector 1404 selects and transmits the signal supplied to the terminals B1 to B3 if the signal XPHS is "1", "2" or "3", that is, if the signal XDO is "1".

The F/F 1406 transmits the signal supplied from the selector 1404 as signals A1, B1 and C1 in synchronization with the first transition of the signal CLK.

The F/F 1407 transmits the signal supplied from the F/F 1406 as signals A, B and C in synchronization with the first transition of the signal CLK4. As a result, the S/P converts signals, which have been sequentially supplied in serial, into parallel signals.

Referring to FIGS. 5, 6 and 7, the RGB signals converted into serial signals by the P/S 105 are again changed to parallel RGB signals by the S/Ps 112 to 114. Since the signal NDB is delayed from the signal NDA by four lines (the four periods of the signal HSYNC) and the signal NDC is delayed from the signal NDB by four lines (the four periods of the signal HSYNC), the RGB signals transmitted from the S/Ps 112 to 114 are relatively delayed by a degree corresponding to the four lines.

Line-Drawing/Flat-Portion Separation Circuit 115 The discrimination circuit 309 is arranged to discriminate a specific original document in the form of a line drawing as the foregoing specific original document to be discriminated. Therefore, the line-drawing/flat-portion separation circuit 115 detects and separates a line drawing portion and a flat portion from images supplied from the S/Ps 112 to 114.

Figure 14:
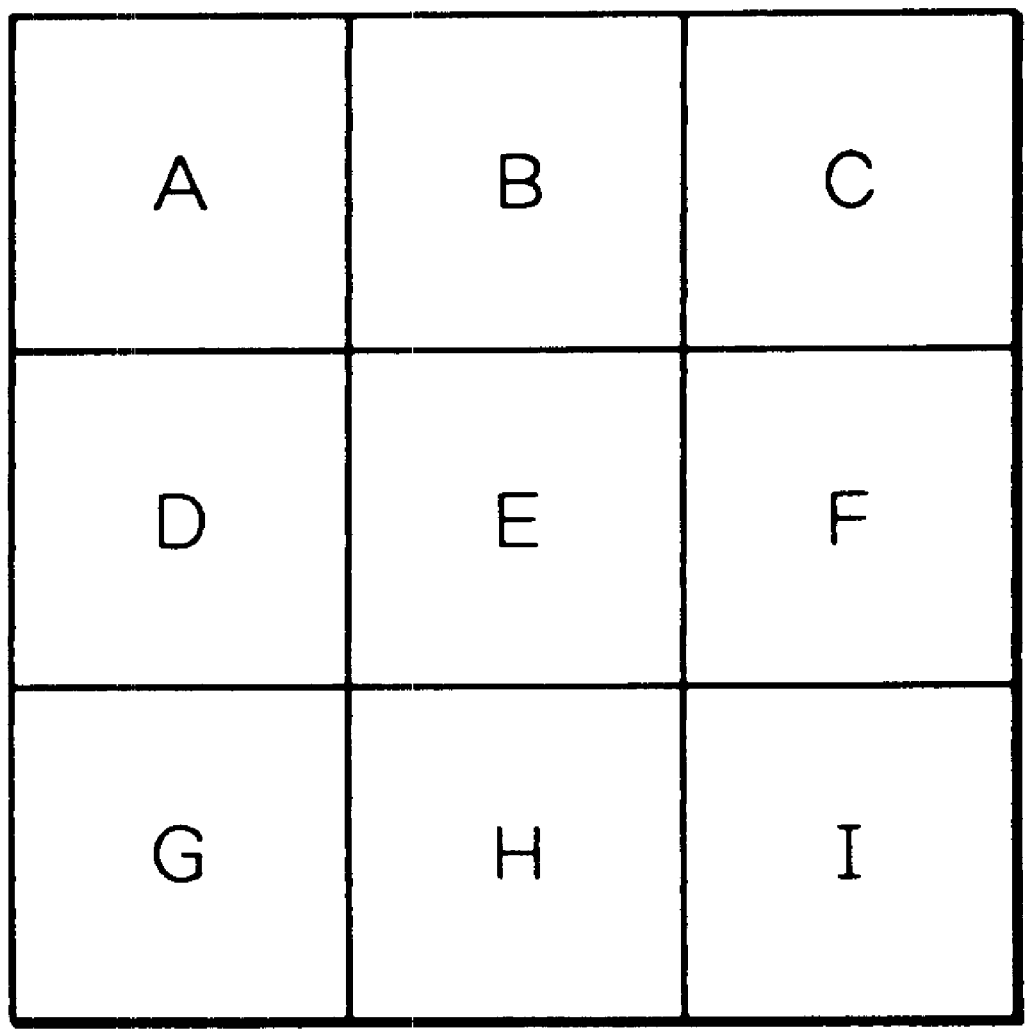
FIG. 14 is a diagram showing an example of a 3×3 pixel block around a subject pixel E in this embodiment.

For example, terminals R1, G1 and B1 of the line-drawing/flat-portion separation circuit 115 receive the RGB signals (hereinafter called signals "R1, G1 and B1") supplied from the S/P 112, terminals R2, G2 and B2 of the same receive the RGB signals (hereinafter called signals "R2, G2 and B2") supplied from the S/P 113 delayed by the four lines, and terminals R3, G3 and B3 of the same receive the RGB signals (hereinafter called signals "R3, G3 and B3") supplied from the S/P 114 delayed by the four lines. The line-drawing/flat-portion separation circuit 115 detects the line drawing with 3×3 pixels as shown in FIG. 14 for example, formed from the supplied three sets of RGB signals, and composed of peripheral pixels A to D and F to I around a subject pixel E which has been thinned.

Figure 15:
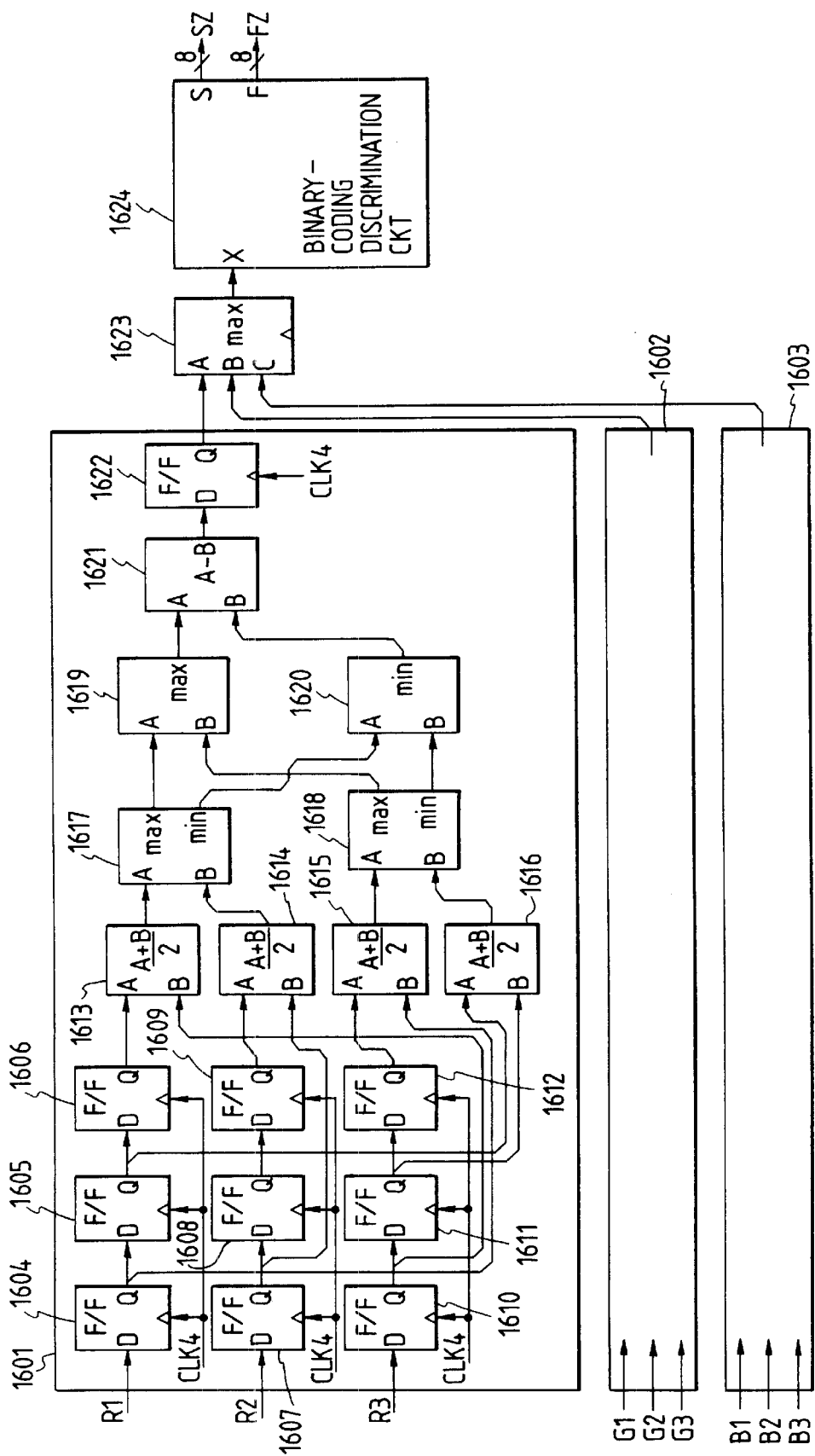
FIG. 15 is a block diagram showing a configurational example of line drawing/flat portion separation circuit in this embodiment.
Figure 16:
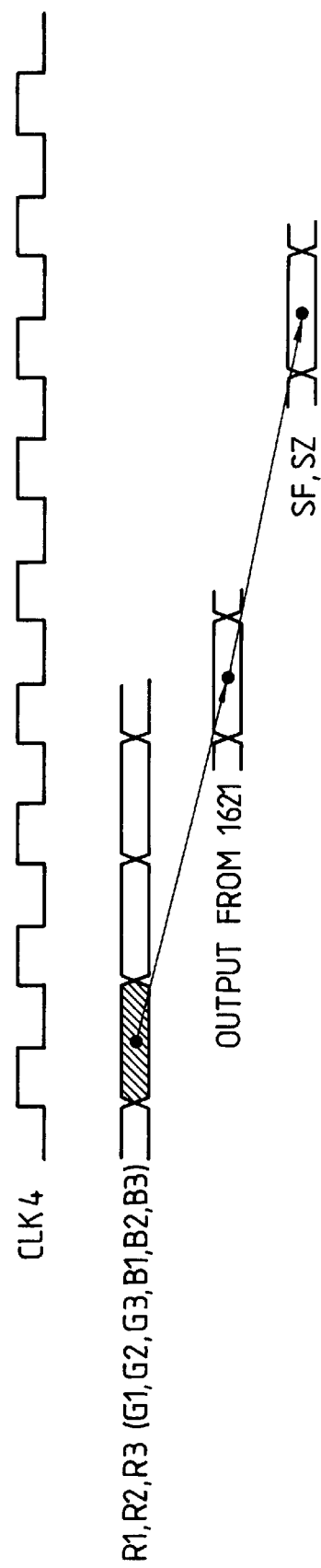
FIG. 16 is a timing chart showing an operation example of the line-drawing/flat-portion separation circuit in this embodiment.

FIG. 15 is a block diagram which illustrates an example of the structure of the line-drawing/flat-portion separation circuit 115. FIG. 16 is a timing chart which illustrates an example of the operation of the line-drawing/flat-portion separation circuit 115.

Referring to FIG. 15, reference numeral 1601 represents a line-drawing detection portion r to detect the line drawing from the signals R1, R2 and R3. Reference numeral 1602 represents a line-drawing detection portion g to detect the line drawing from the signals G1, G2 and G3. Reference numeral 1603 represents a line-drawing detection portion b to detect the line drawing from the signals B1, B2 and B3. Since the line-drawing detection portions 1601 to 1603 have the similar structure, an example of the detailed structure of the line-drawing detection portion r 1601 is shown in FIG. 15 and the residual line-drawing detection portions 1602 and 1603 are omitted from description.

Reference numerals 1604 to 1612 represent F/Fs for delaying the supplied signals R1, R2 and R3 in synchronization with the first transition of the signal CLK4 to form a 3×3 pixel block from the image signals thinned to ¼ in both main scanning direction and the sub-scanning direction.

Reference numerals 1613 to 1616 represent adders for transmitting the arithmetic mean (A+B)/2 of the signals supplied to input terminals A and B.

Reference numerals 1617 and 1618 respectively represent maximum-value/minimum-value circuits for transmitting either of the signals supplied to the input terminal A or B that has a larger value from an output terminal max, and transmitting either of the signals supplied to the input terminal A or B that has a smaller value from an output terminal min.

Reference numeral 1619 represents a maximum-value circuit for transmitting either of the signals supplied to the input terminal A or B that has a larger value.

Reference numeral 1620 represents a minimum-value circuit for transmitting either of the signals supplied to the input terminal A or B that has a smaller value.

Therefore, the maximum-value circuit 1619 transmits the maximum value among the outputs from the four adders 1613 to 1616. The maximum-value circuit 1620 transmits the minimum value among the outputs from the four adders 1613 to 1616.

Reference numeral 1621 represents a subtractor for transmitting result of a subtraction of the output from the minimum-value circuit 1620 from the output from the maximum-value circuit 1619. Although omitted from the detailed description, the output from the subtractor 1621 is large in a line drawing portion, while the same is small in a flat portion.

Reference numeral 1622 represents a F/F for latching the output from the subtractor 1621 at the first transition of the signal CLK4.

Similarly, the line drawing detection portion g1602 and the line drawing detection portion b1603 detect the line drawing from the signals G1, G2 and G3 and from the signals B1, B2 and B3.

Reference numeral 1623 represents a maximum-value circuit for transmitting the maximum value of the signals supplied from the line drawing detection portions 1601 to 1603. Although omitted from the detailed description, the output from the maximum-value circuit 1623 is relatively large in a line drawing portion, while the same is relatively small in a flat portion.

Reference numeral 1624 represents a binary discrimination circuit for binary-coding the signal supplied from the maximum-value circuit 1623 with a predetermined threshold value to discriminate that the processed pixel is included in the line drawing portion or in the flat portion to transmit discrimination signal SZ denoting the result of a discrimination whether or not the processed pixel is included in the line drawing portions of the 8 types of the specific original documents and transmit discrimination signal FZ denoting the result of a discrimination whether or not the processed pixel is included in the flat portions of the 8 types of the specific original documents.

As shown in FIG. 16, the line-drawing/flat-portion separation circuit 115 transmits the result of the subtraction from the subtractor 1621 while being delayed by three periods of the signal CLK4 from the supplied signal, and transmits the discrimination signals SZ and FZ while being delayed by the three periods of the signal CLK4.

Figure 17:
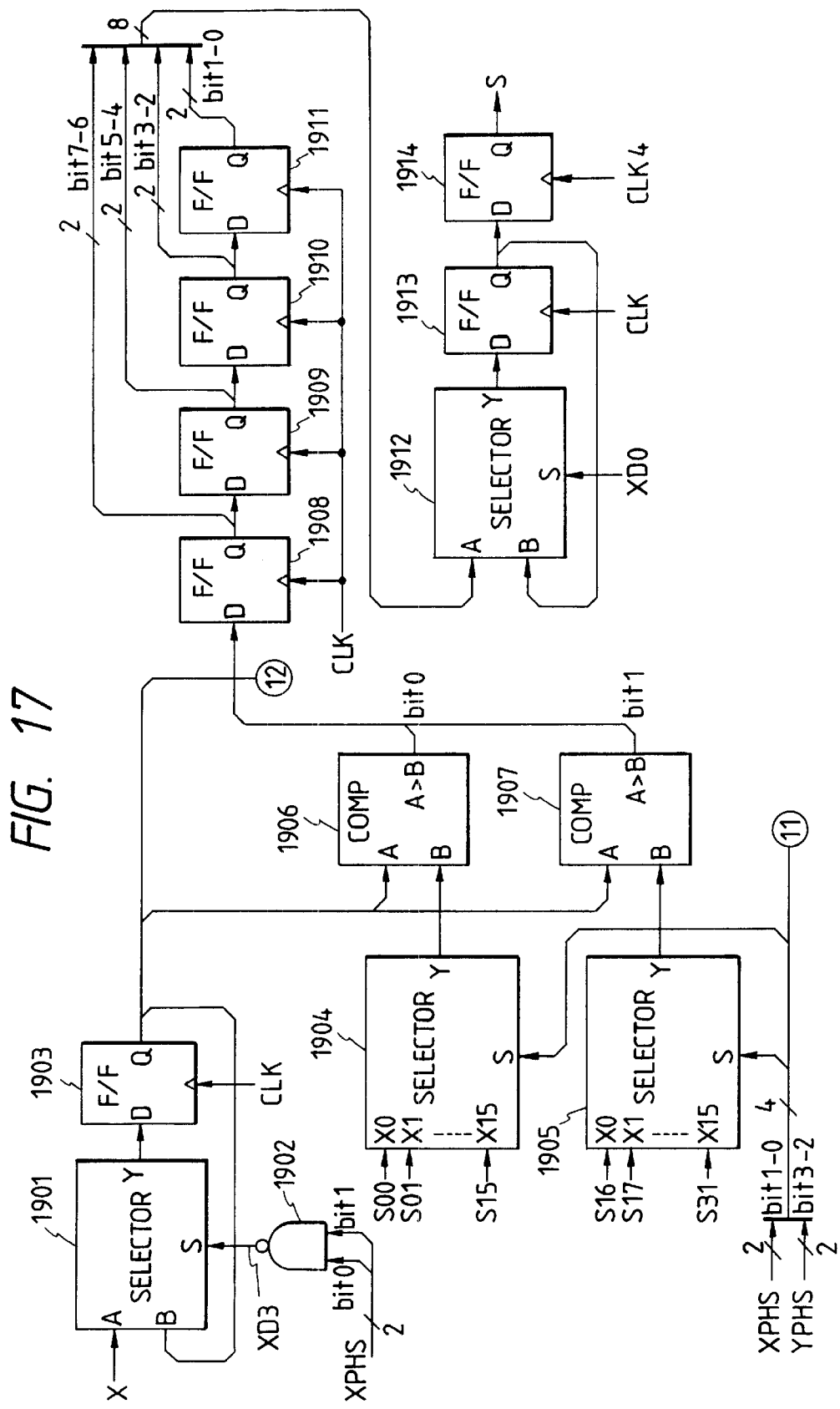
FIG. 17 is a block diagram showing a detailed configurational example of binary-coding discrimination circuit of this embodiment.
Figure 18:
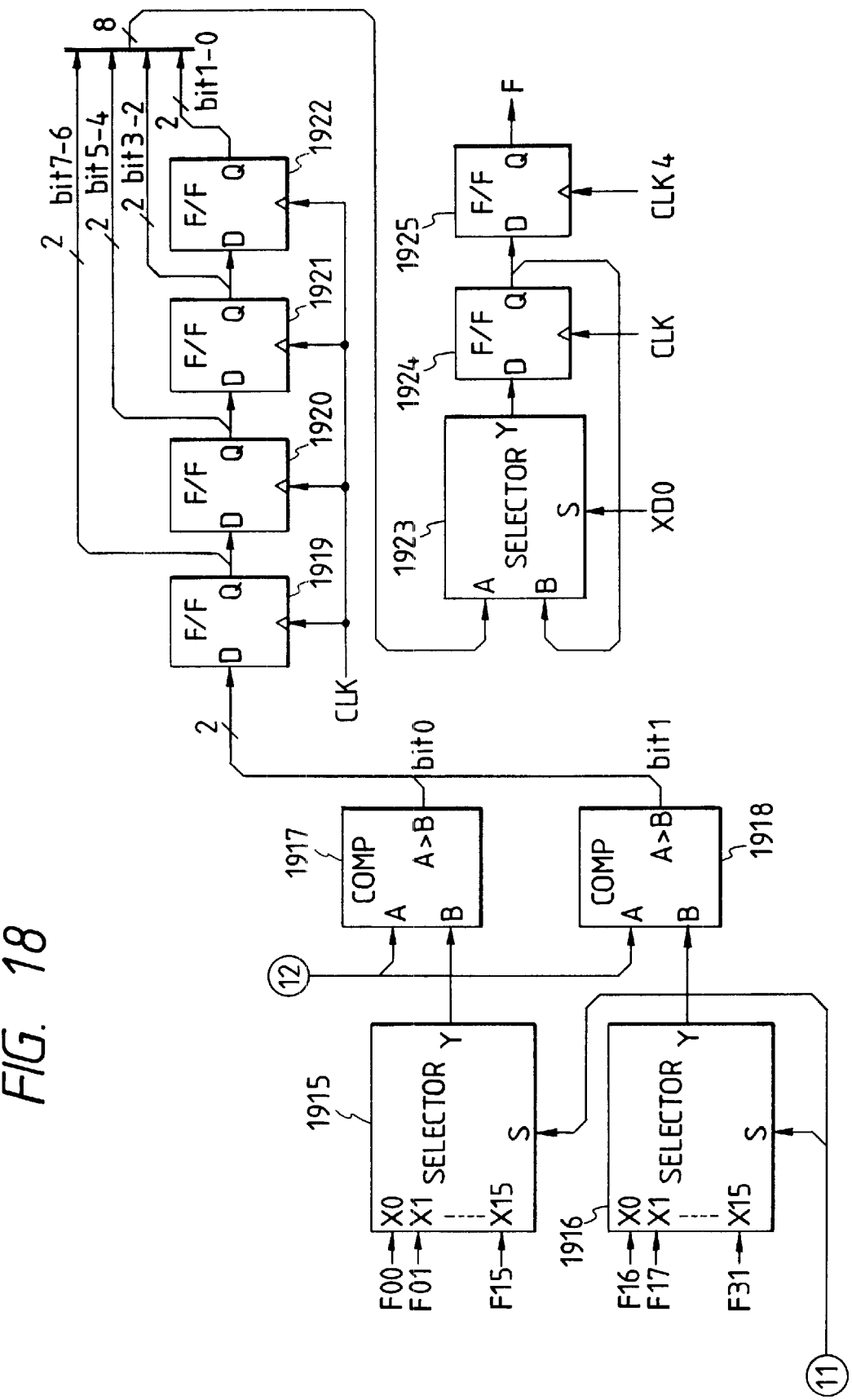
FIG. 18 is a block diagram showing another detailed configurational example of binary-coding discrimination circuit of this embodiment.
Figure 19:
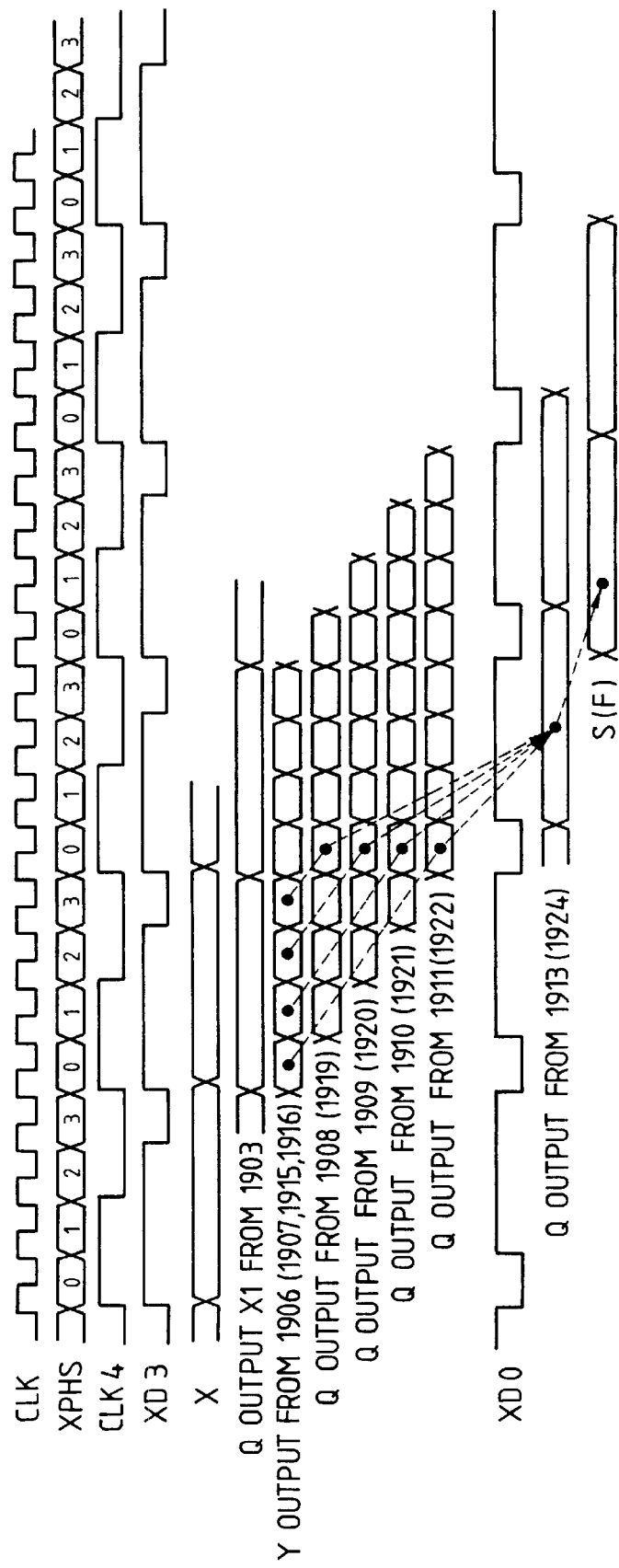
FIG. 19 is a timing chart showing an operation example of the binary-coding discrimination circuit of this embodiment.

FIGS. 17 and 18 are block diagrams which illustrate an example of the detailed structure of the binary-coding discrimination circuit 1624. FIG. 19 is a timing chart which illustrates an example of the operation of the binary-coding discrimination circuit 1624.

Referring to FIGS. 17 and 18, reference numeral 1901 represents a 2-input 1-output selector for selecting the signal supplied to the terminal A or that supplied to the terminal B in response to signal XD3 supplied from a NAND gate 1902 to the selection terminal S to transmit the selected signal. The signal XD3 is "1" if the signal XPHS is "0", "1" or "2", and is "0" if the signal XPHS is "3". The selector 1901 selects the signal supplied to the terminal A if the signal XD3 is "0", and selects the signal supplied to the terminal B if the signal XD3 is "1" to transmit the selected signal.

Reference numeral 1903 represents a F/F for latching the output from the selector 1901 at the first transition of the signal CLK to transmit the latched output as signal X1.

Reference numerals 1904, 1905, 1915 and 1916 represent 16-input 1-output selectors for selecting any one of the signals supplied to terminal X0 to X15 in response to a signal supplied to the selection terminal S and composed of the signal YPHS as the upper 2 bits and of the signal XPHS as the lower 2 bits to transmit the selected signal. The selector selects the signal supplied to the terminal X0 if the selection signal is "0" ("0000"), selects the signal supplied to the terminal X1 if the selection signal is "1" ("0001"), and selects the signal supplied to the terminal X15 if the selection signal is "15" ("1111") to transmit the selected signal.

Signals S00 to S31 to be supplied to the selectors 1904 and 1905 denote the fixed values stored by the foregoing coefficient register 148, the fixed values being threshold values for discriminating whether or not the subject pixel is the line drawing portion. Signals F00 to F31 to be supplied to the selectors 1915 and 1916 denote the fixed values stored by the coefficient register 148, the fixed values being threshold values for discriminating whether or not the subject pixel is the flat portion.

Reference numerals 1906, 1907, 1917 and 1918 represent comparators for subjecting the signals supplied to the terminals A and B, resulting in transmitting "1" if A>B and transmitting "0" if A≦B.

Reference numerals 1908 to 1911, 1913, 1919 to 1922 and 1924 represent F/Fs for latching the supplied signal in synchronization with the first transition of the signal CLK.

Reference numerals 1912 and 1923 represent 2-input 1-output selectors for selecting the signal supplied to the terminal A if the signal XDO supplied to the selection terminal S is "0", and selecting the signal supplied to the terminal B if the signal XDO is "1".

Reference numerals 1914 and 1925 represent F/Fs for latching the supplied signal in synchronization with the first transition of the signal CLK4.

As shown in FIG. 19, the comparator 1906 subjects the signal X1 supplied from the F/F 1903 and any one of the signals S00 to S15 supplied from the selector 1904 to a comparison. The comparator 1907 subjects the signal X1 supplied from the F/F 1903 and any one of the signals S16 to S31 supplied from the selector 1905 to a comparison.

The F/F 1908 receives the output from the comparator 1906 as bit 0 and the output from the comparator 1907 as bit 0 to delay the outputs by one period of the signal CLK. The F/F 1909 delays the output from the F/F 1908 by one period of the signal CLK. The F/F 1910 delays the output from the F/F 1909 by one period of the signal CLK. The F/F 1911 delays the output from the F/F 1910 by one period of the signal CLK.

The outputs from the F/F 1908 to 1911 are collected to an 8-bit signal in such a manner that the output from the F/F 1908 is made to be bits 7 and 6, the output from the F/F 1909 is made to be bits 5 and 4, the output from the F/F 1910 is made to be bits 3 and 2 and the output from the F/F 1911 is made to be bits 1 and 0 to be supplied to the terminal A of the selector 1912.

The output from the selector 1912 is supplied to the F/F 1913, followed by delaying it by one period of the signal CLK. Then, the delayed output is supplied to the F/F 1914 and the terminal B of the selector 1912.

The F/F 1914 transmits the signal supplied from the F/F 1913 as 8-bit discrimination signal SZ in synchronization with the first transition of the signal CLK4.

The discrimination signal SZ denotes the possibility that the image signal supplied to the discrimination circuit 309 is, for example, included in the line drawing portion of, for example, the 8 types of the specific original documents. The discrimination circuit 309 supplies the signal YPHS to the control terminal S of each of the selectors 1904 and 1905 to change the type of the specific original document to be discriminated in accordance with the value of the signal YPHS.

The comparator 1917 subjects the signal X1 supplied from the F/F 1903 and any one of the signals F00 to F15 supplied from the selector 1915 to a comparison. The comparator 1918 subjects the signal X1 supplied from the F/F 1903 and any one of the signals F16 to F31 supplied from the selector 1916 to a comparison.

Although the description about the line drawing discrimination performed by the F/F 1925 is omitted because it is substantially the same as the foregoing discrimination, the F/F 1925 transmits the signal supplied from the F/F 1924 as an 8-bit discrimination signal FZ in synchronization with the first transition of the signal CLK4.

The discrimination signal FZ denotes the possibility that the image signal supplied to the discrimination circuit 309 is, for example, included in the flat portion of, for example, the 8 types of the specific original documents. The discrimination circuit 309 supplies the signal YPHS to the control terminal S of each of the selectors 1915 and 1916 to change the type of the specific original document to be discriminated in accordance with the value of the signal YPHS.

ROMb 121

The ROMb 121 discriminates whether or not the color tone of the supplied signal approximates the color tone of the specific original document. The ROMb 121 comprises a 256k×16-bit ROM, for example, M5M27C402K (manufactured by Mitsubishi Electric Corp.).

Figure 20A:
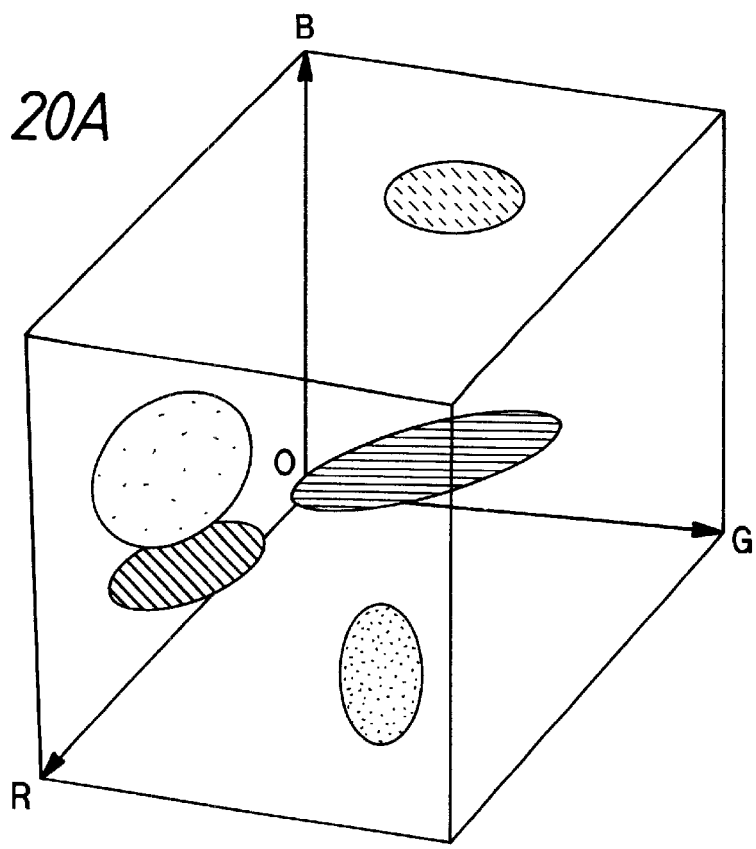
FIGS. 20A and 20B are views showing examples of the color tint distribution of normal specific original on RGB space.
Figure 20B:
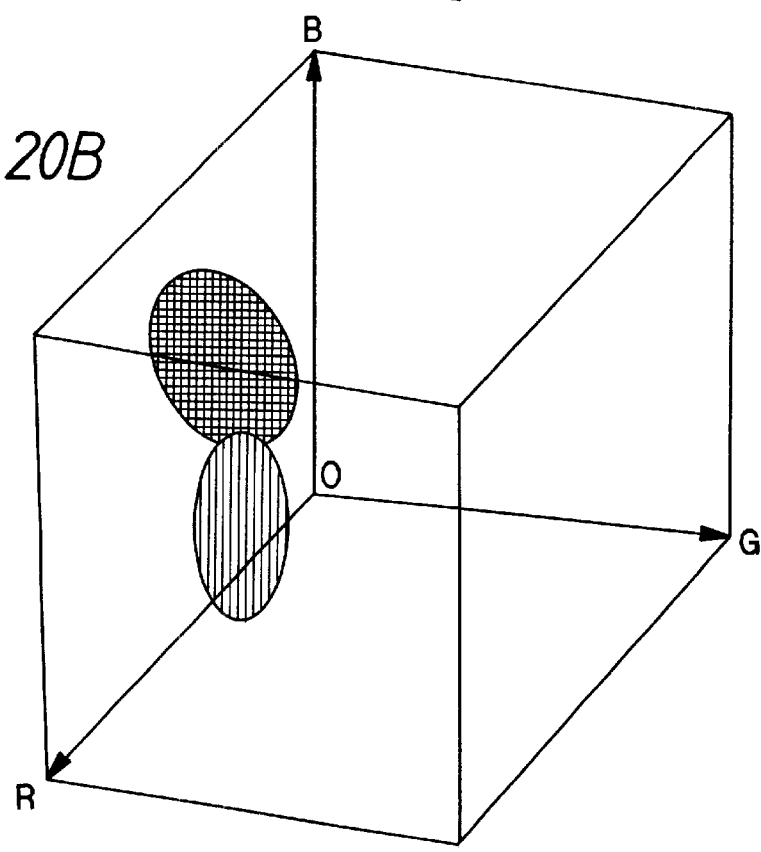

FIGS. 20A and 20B illustrate an example of the color tone distribution in an RGB space of a certain specific original document. FIG. 20A illustrates the color tone distribution in a line drawing portion, while FIG. 20B illustrates the color tone distribution in a flat portion.

A specific original document has specific color tone distributions as shown in FIGS. 20A and 20B. ROMb 121 previously stores color tone information about the line drawing portion and flat portion of, for example, 32 types of specific original documents. That is, the ROMb 121 subjects the color tone distribution of the specific original document and the color tone distribution of the supplied image to a comparison.

For example, 5 upper bits (totalling 15 bits) of the RGB signals transmitted from the S/P 113 pass through a selector 117 and a 3-state gate 119 to be described later, followed by supplying them to address terminals A0 to A14 of the ROMb 121. The ROMb 121 uses the lower 8 bits D0 to D7 of the data terminal thereof to transmit discrimination signal FC denoting whether or not the color tone distribution of the flat portion of 8 types of certain specific original documents and the color tone distribution of the supplied image coincide with each other. The ROMb 121 uses the upper 8 bits D8 to D15 of the data terminal thereof to transmit discrimination signal SC denoting whether or not the color tone distribution of the line drawing portion of 8 types of certain specific original documents and the color tone distribution of the supplied image coincide with each other.

The selector 117 is a 2-input 1-output selector for selecting a signal supplied from a counter a116 to be described later if signal CCL to be described later and supplied to the selection terminal S is "0", and selects a signal supplied from the S/P 113 if the signal CCL is "1" to transmit the selected signal. In a usual discrimination operation, the control signal CCL to be supplied to the selection terminal S is "1". The case where the counter a116 and the signal CCL are made to be "0" will be described later in the description about "RAM Clear Control".

In the usual discrimination operation, control signal RID of the 3-state gate 119 is "0". The case where the signal RID is made to be "1" will be described later in the description about "ID Reading Mode".

Reference numeral 118 represents a bank switch portion for transmitting a 3-bit signal PSEL to be supplied to the upper address of the ROMb 121 when the 15-bit RGB signals transmitted from the selector 117 are supplied to the lower address of the ROMb 121.

Figure 21A:
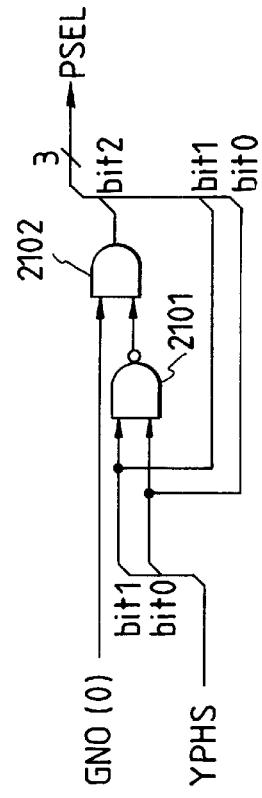
FIGS. 21A and 21B are a block diagram showing a configuration example of a bank switch portion and a timing chart showing an operation example in this embodiment.
Figure 21B:
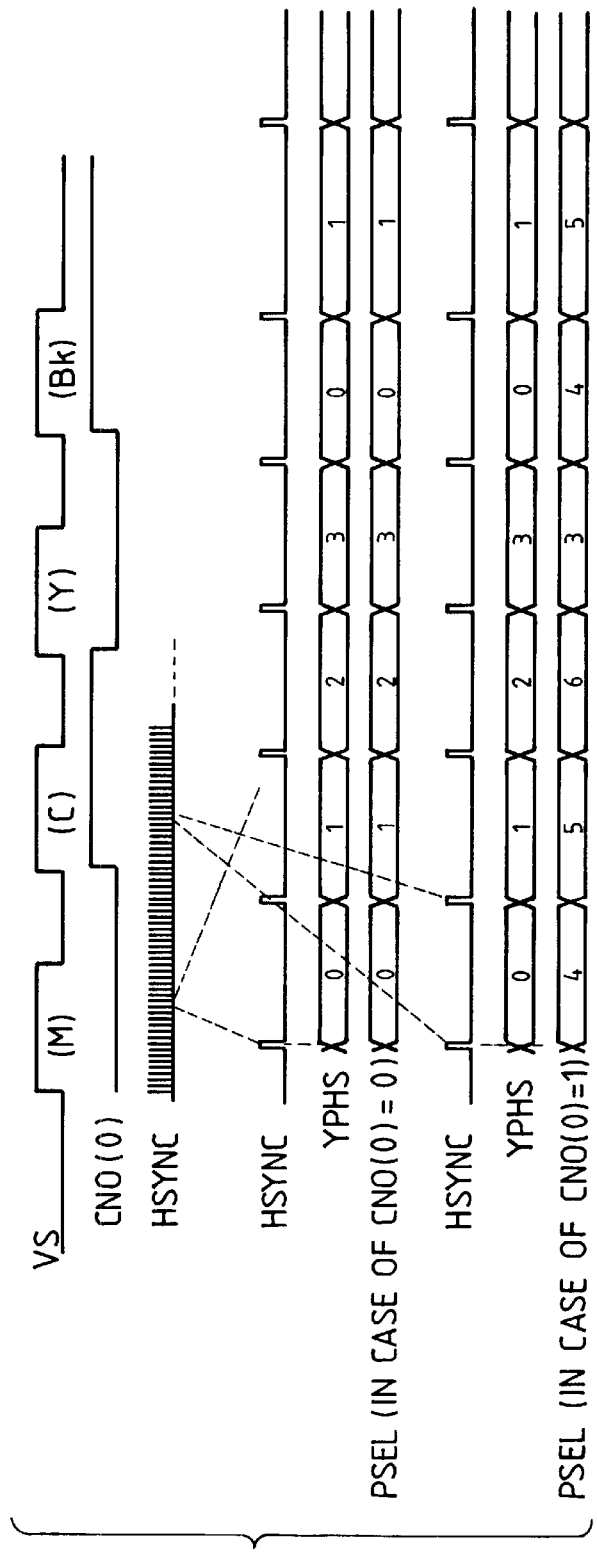

FIG. 21A is a block diagram which illustrates an example of the structure of the bank switch portion 118. FIG. 21B is a timing chart which illustrates an example of the operation of the bank switch portion 118. FIG. 22 illustrates an example of information that is stored by the ROMb 121.

Referring to FIG. 21A, reference numeral 2101 represents a NAND gate, and 2102 represents an AND gate.

The NAND gate 2101 receives 2-bit signal YPHS to transmit the NAND of the both bits.

The AND gate 2102 receives the output from the NAND gate 2101 and the lower bit CNO (0) of the plane sequential signal CNO to transmit the AND of them.

The bank switch portion 118 transmits the signal PSEL in which bit 0 and bit 1 are made to be 2 bits of the signal YPHS and bit 2 is made to be the output from the AND gate 2102. Therefore, the signal PSEL repeats 0 to 3 in synchronization with the first transition of the signal HSYNC if the signal CNO (0) is "0". The signal PSEL repeats 4 to 6 in synchronization with the first transition of the signal HSYNC if the signal CNO (0) is "1".

Referring to FIG. 21B, the signal CNO (0) is "0", "1", "0" and "1" with respect to each of developed colors M, C, Y and K. Therefore, if the developed color is M and Y, the signal PSEL repeats 0 to 3 in synchronization with the first transition of the signal HSYNC. If the developed color is C and K, the signal PSEL repeats 4 to 6 and 3 in synchronization with the first transition of the signal HSYNC.

That is, the image processing mode of this embodiment has the arrangement that address "00000" to address "37FFF" of the ROMb 121 shown in FIG. 22 are accessed in such a manner that the address "00000" to "1FFFF" are accessed if the developed color is M and Y. If the developed color is C and K, the address "18000" to "37FFF" are accessed.

In this embodiment, in the usual image processing mode, for example, 8 types of specific original documents are discriminated simultaneously. Furthermore, the type of the specific original document is changed over in accordance with each value of the signal PSEL. Therefore, this embodiment has an arrangement that the specific original document is sequentially changed over in units of, for example, four main scanning lines. Hence, for example, 32 types of specific original documents are discriminated.

In this embodiment, the signal PSEL is changed over also in accordance with the developed color. Therefore, for example, 56 types of specific original documents can be discriminated although a partial overlap (from address "18000" to address "1FFFF") occurs.

The "Image Processing Mode", the "ID Reading Mode" and the signal RID shown in FIG. 22 will be described later.

Then, the type of the specific original document and the address assignment in the ROMb 121 will be described. In this embodiment, the assignment in the ROMb 121 is changed in accordance with the degree of importance of the specific original document (the specific original document that must be first inhibited from copying).

Since, for example, 8 types of specific original documents stored in the address "18000" to the address "1FFFF" are discriminated at the time of forming each of the images of M, C, Y and K in contrast with the other specific original documents, the most reliable result of the discrimination can be obtained.

For example, 24 types of specific original documents stored in the address "00000" to address "17FFF" are discriminated at the time of forming the M image at the first scanning and at the time of forming the Y image at the third scanning. If the presence of the specific original documents is detected at the time of forming the M or the Y image, the output image is painted over with black at the time of forming the K image so that copying of the specific original documents can be prevented.

For example, 24 types of specific original documents stored in the address "20000" to addrss "37FFF" are discriminated at the time of forming the C image at the second scanning and at the time of forming the K image at the fourth scanning. If the presence of the specific original documents is detected at the time of forming the K image, the output image is painted over with the black at the time of forming the K image so that copying of the specific original documents can be prevented.

That is, the specific original document stored in the address "00000" to the address "17FFF" can be further reliably inhibited from copying than the specific original document stored in the address "20000" to the address " 37FFF".

Hence, the most important specific original document is assigned to the address "18000" to the address "1FFFF", and second important specific original document is assigned to the address "00000" to the address "17FFF", and the residual specific original documents are assigned to the address "20000" to the address "37FFF".

Integrating Circuit a122

An integrating circuit a122 receives the signal FC transmitted from the ROMb 121 and the signal FZ transmitted from the line-drawing/flat-portion separation circuit 115 to remove noise of the signal FC by a 2-D (in directions X and Y) IIR digital filter. As described above, the signal FC is the discrimination signal denoting whether or not the color tone distribution of the image supplied to the discrimination circuit 309 coincides with the color tone distribution of the flat portion of certain 8-types specific original documents. The signal FZ is a discrimination signal denoting the possibility that the foregoing image is the flat portion of, for example, the 8 types of the specific original documents.

The integrating circuit a122 transmits a 16-bit signal FOA to the FIFOs 140 and 141, and receives a 16-bit signal FIA supplied from the FIFOs 140 and 141.

Figure 23:
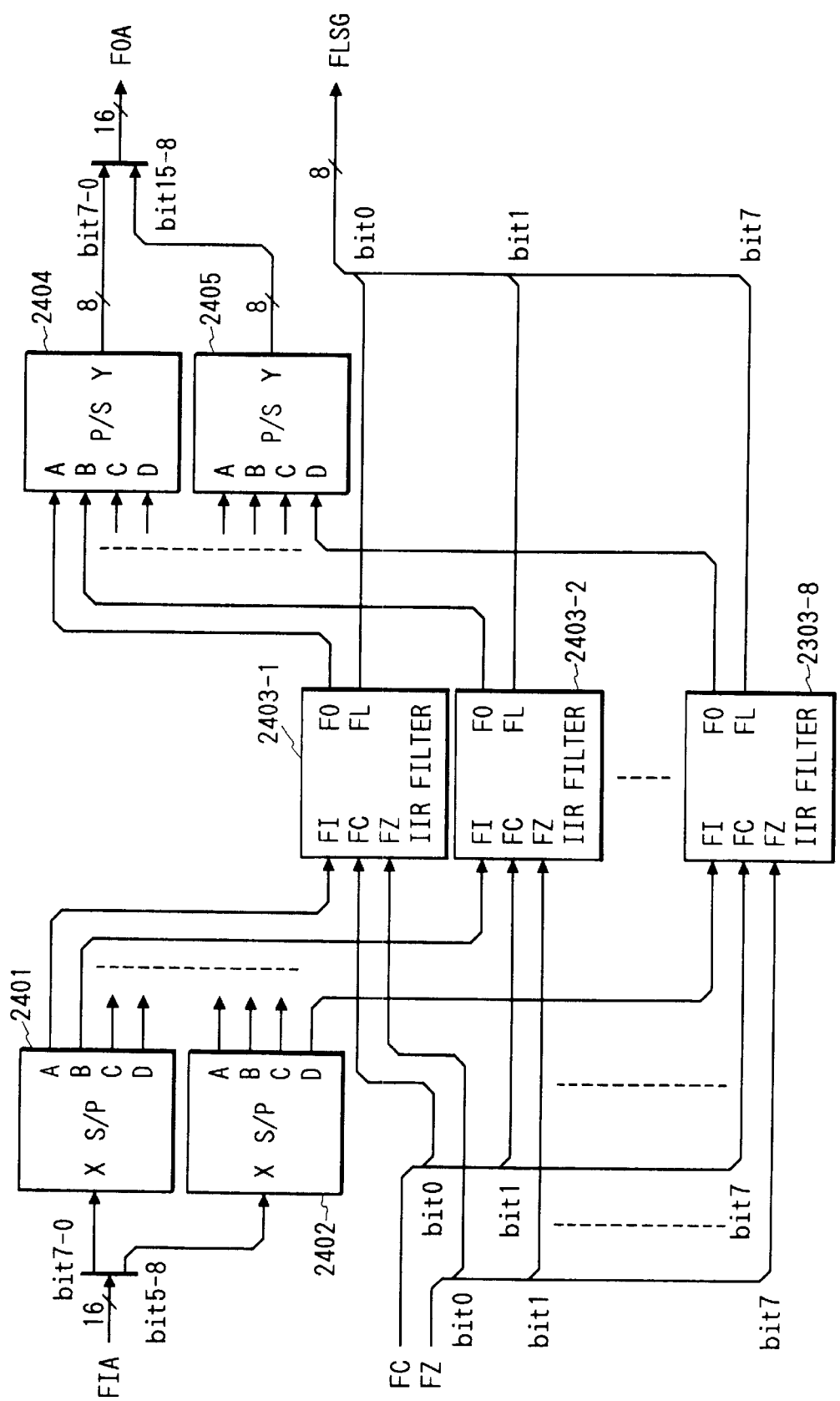
FIG. 23 is a block diagram showing a configurational example of an integrating circuit a of this embodiment.

FIG. 23 is a block diagram which illustrates an example of the structure of the integrating circuit a122.

Referring to FIG. 23, reference numerals 2401 and 2402 represent S/Ps, 2403-1 to 2403-8 represent IIR filters that are integrators, and 2404 and 2405 represent P/Ss.

The S/Ps 2401 and 2402 serial/parallel converts signal FIA supplied from the FIFOs 140 and 141.

Figures 24A, 24B:
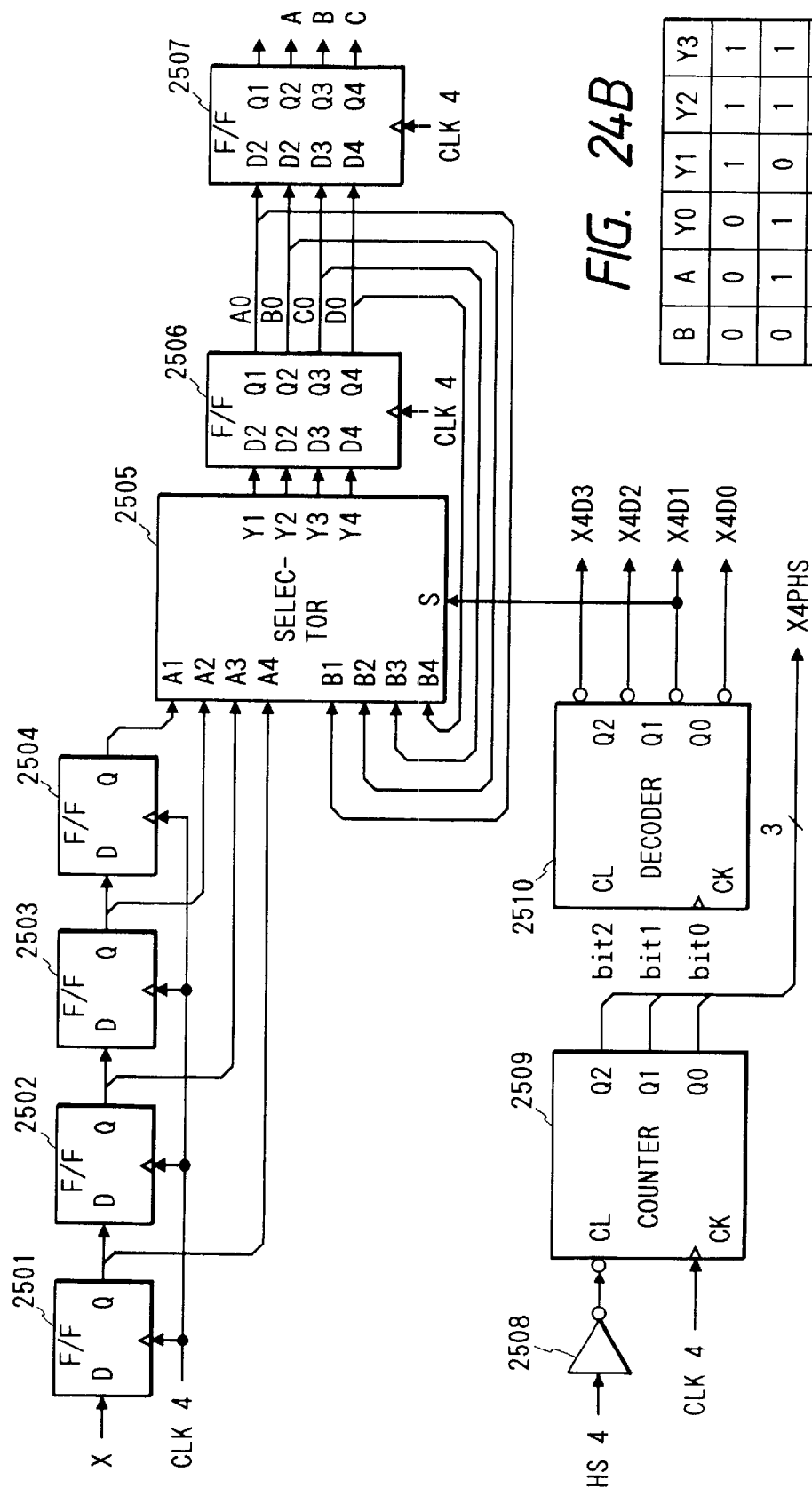
FIGS. 24A and 24B are block diagrams showing the configurational example of S/P as shown in FIG. 23.
Figure 25:
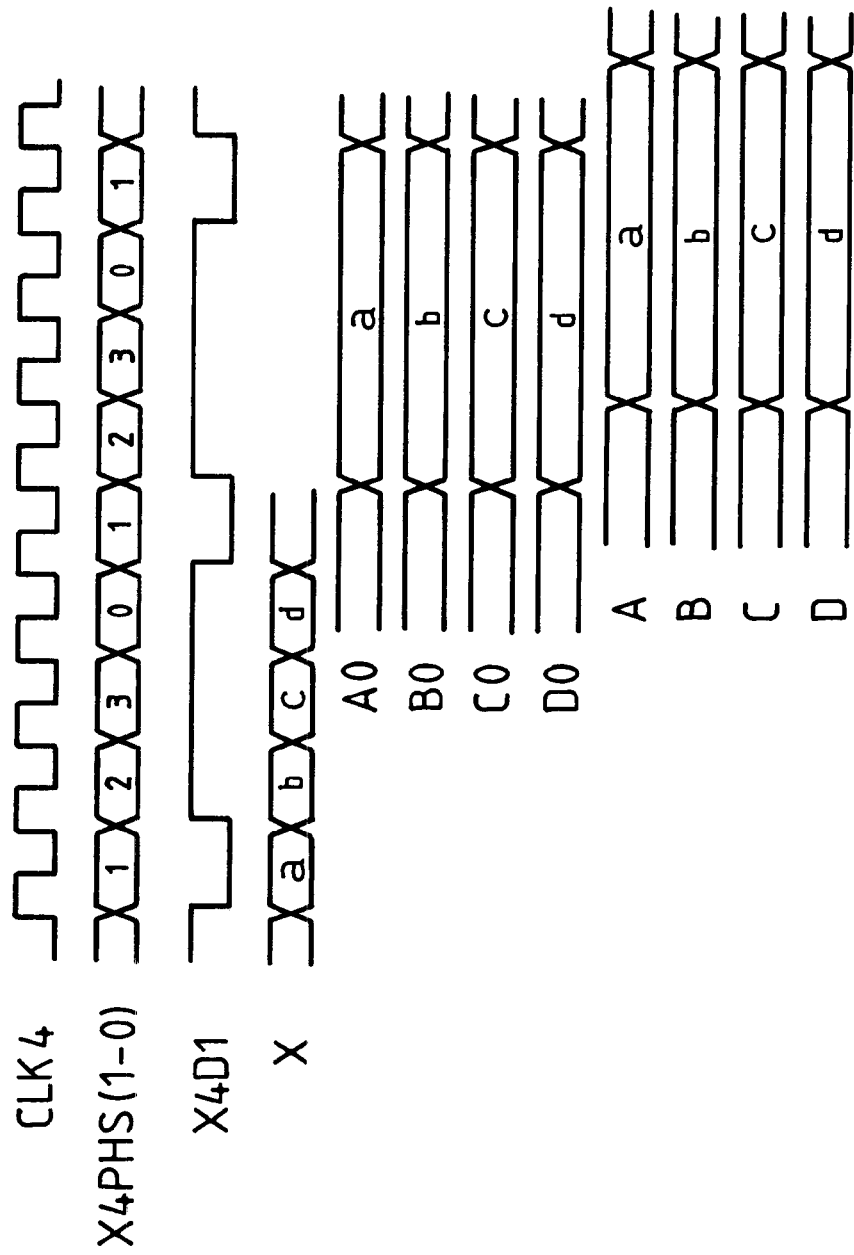
FIG. 25 is a flowchart showing an operation example of S/P as shown in FIG. 23.

FIGS. 24A and 24B are block diagrams which illustrate an example of the structure of the S/P 2401 (2402). FIG. 25 is a flow chart which illustrates an example of the operation of the S/P 2401 (2402).

Referring to FIGS. 24A and 24B, reference numerals 2501 to 2504 represent F/Fs that latch the supplied signals at the first transition of the signal CLK4.

Reference numerals 2505 represents a 2-input 1-output selector that selects the input A or B in accordance with signal X4D1 to be described later and supplied to the selection terminal S to transmit the selected signal.

Reference numerals 2506 and 2507 represent F/Fs for latching the supplied signal at the first transition of the signal CLK4.

Reference numeral 2508 represents an inverter, 2509 represents a 3-bit counter, and 2510 represents a 2-input 4-output decoder, the operation logic of which is as shown in FIG. 24B.

The S/P 2401 (2402) receives signal X in synchronization with the first transition of the signal CLK4. The signal X is sequentially delayed by the F/Fs 2501 to 2504, and is supplied to the input A of the selector 2505.

Signal X4PHS to be transmitted from the counter 2509 repeats values 0 to 7 in synchronization with the first transition of the signal CLK4, while its two lower bits X4PHS (1-0) repeat values 0 to 3.

Signal X4D1 to be transmitted from the decoder 2510 is "0" only when the signal X4PHS (1-0) is "1" ("01"), while the same is "1" in the other cases. Therefore, the selector 2505 selects the input A to which the signal X is connected at one time during four periods of the signal CLK4. It selects the input B to which the output from the F/F 2506 is connected at the residual three times. That is, as shown in FIG. 25, values a, b, c and d sequentially supplied as the signal X are transmitted in parallel from the F/F 2506 as signals A0, B0, C0 and D0. Then, the signals are delayed by the F/F 2507 by one period of the signal CLK4 to be transmitted as signals A, B, C and D.

Referring back to FIG. 23, the IIR filter 2403 performs the process corresponding to the different specific original documents.

Figure 26:
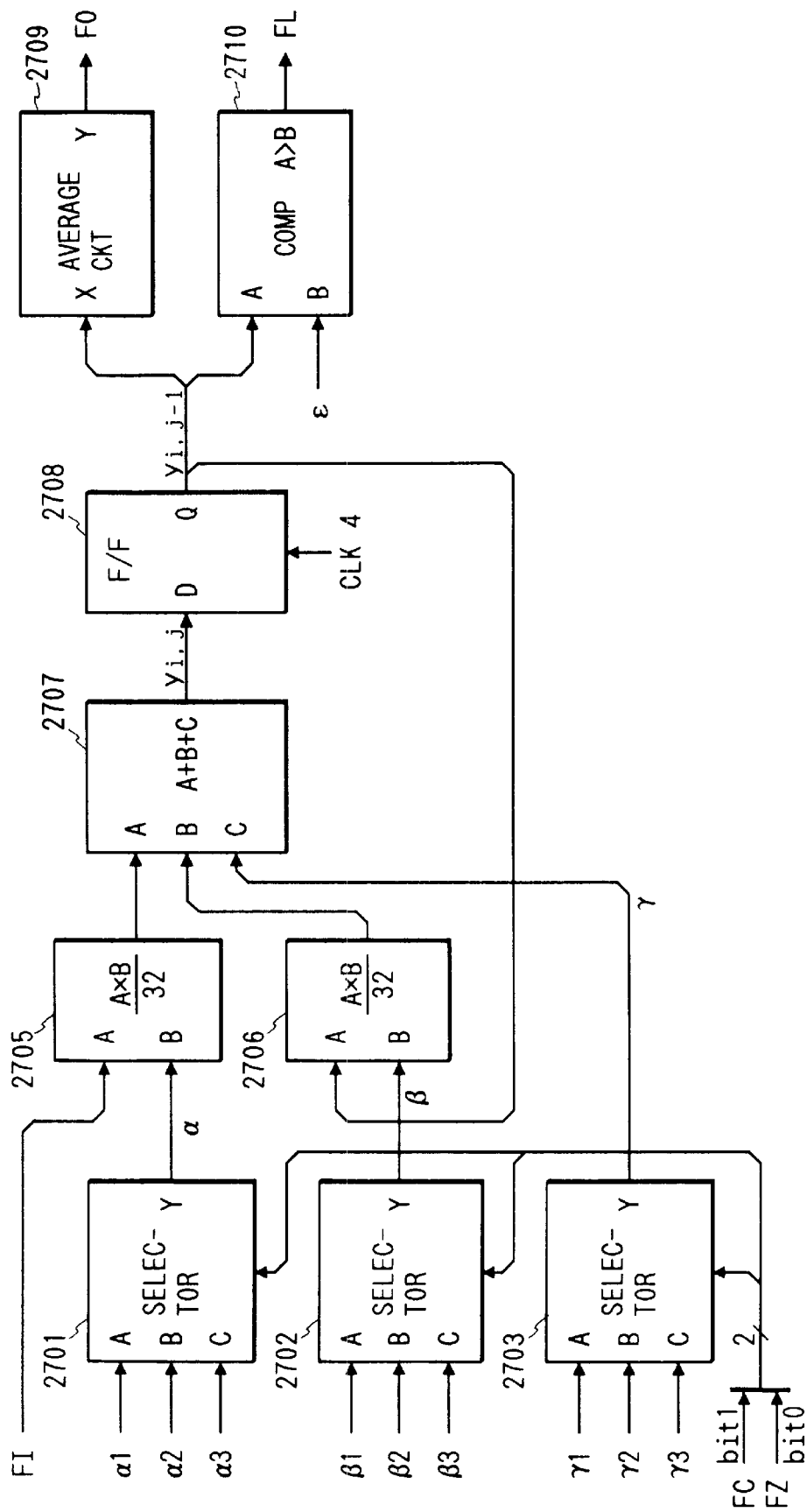
FIG. 26 is a block diagram showing a configurational example of IIR filter as shown in FIG. 23.

FIG. 26 is a block diagram which illustrates an example of the structure of the IIR filter 2403.

Referring to FIG. 26, reference numerals 2701 to 2703 represent 3-input 1-output selectors for selecting any one of signals supplied to terminals A to C in response to a 2-bit signal supplied to the selection terminal S to transmit the selected signal. The signal to be supplied to the selection terminal S is formed by combining the same bit of the discrimination signal FC and the discrimination signal FZ, the combined signal being arranged in such a manner that the foregoing bit of the discrimination signal FC is bit 1 and the foregoing bit of the discrimination signal FZ is bit 0. The selectors 2701 to 2703 select the input terminal A if the signal supplied to the selection terminal S is "00" or "0", select the input terminal B if the signal is "10", and select the input terminal C if the signal is "11".

Signals α1, α2 and α3 to be supplied to the selector 2701, signals β1, β2 and β3 to be supplied to the selector 2702 and signals γ1, γ2 and γ3 to be supplied to the selector 2703 are values previously determined by the foregoing coefficient register 148. By properly setting the foregoing values, the signal FC can be integrated to eliminate the noise.

Reference numerals 2705 and 2706 represent multipliers for transmitting the product (A×B)/32 of the inputs A and B.

Reference numeral 2707 represents an adder for transmitting the sum A+B+C of inputs A, B and C.

Reference numeral 2708 represents a F/F for latching a supplied signal at the first transition of the signal CLK4.

Assuming that symbol i denotes the sub-scanning position after thinning has been performed and j denotes the main scanning position after thinning has been performed, the output from the adder 2707 is $y_{(i,j)}$, and the output from the F/F 2708 is $Y_{(i,j-1)}$. Signal FI to be supplied to the integrator 2705 via the selectors 2401 and 2402 shown in FIG. 23 is delayed in the sub-scanning direction by making use of the FIFO, the signal FI being expressed as $Y_{(i-1,j)}$ which is expressed as follows:

$$Y_{(i,j)}=(\alpha/32)y_{(i-1,j)}+(\beta/32)y_{(i,j-1)}+\gamma \quad (1)$$

FIGS. 27A to 27C illustrate an example of a result of the process performed by the integrating circuit a122. FIG. 27A illustrates an example of the signal FC ("1" denotes coincidence and "0" denotes non-coincidence). FIG. 27B illustrates an example of the signal FZ (where "1" denotes a flat portion and "0" denotes a non-flat portion). By making α1, α2, α3, β1, β2, β3, γ1, γ2 and γ3 to be proper values, output $y_{(i,j)}$ from the adder 2702 as shown in FIG. 27C can be obtained. That is, $y_{(i,j)}$ having waveform formed by smoothing noises 3201 and 3202 can be obtained. By binary-coding with threshold ∈, noise components 3203 and 3204 can be removed completely.

Referring back to FIG. 26, reference numeral 2710 represents a comparator for transmitting, as the signal FL, the result of a comparison made between the output from the F/F 2708 and the threshold ∈. The signal FL is a signal denoting the similarity between the specific original document and the flat portion.

Reference numeral 2709 represents an average circuit for transmitting the average value of four values sequentially supplied from the F/F 2708.

Figure 28A:
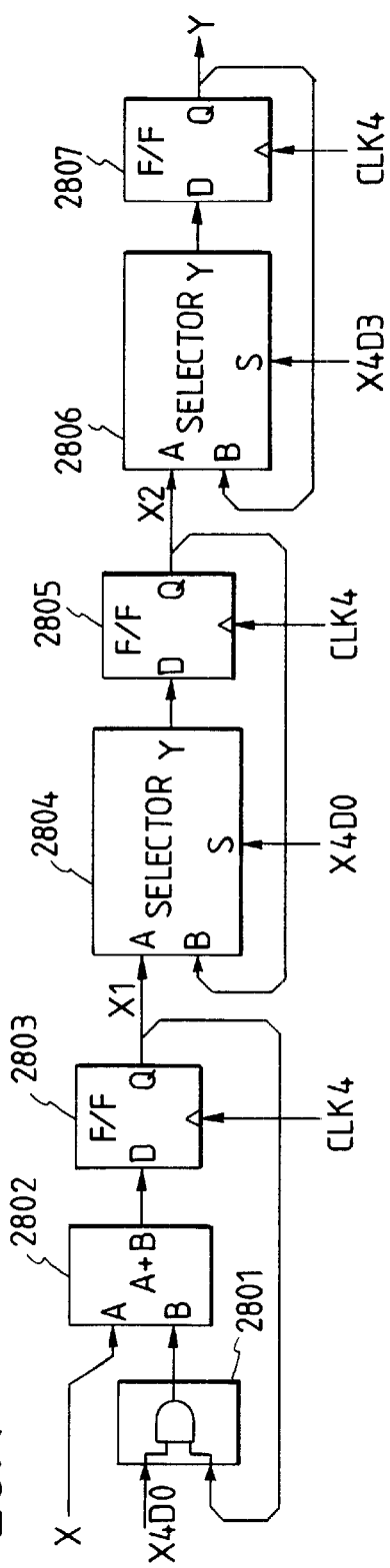
FIGS. 28A and 28B are a block diagram showing a configurational example of average circuit and a timing chart showing an operation example in this embodiment.
Figure 28B:
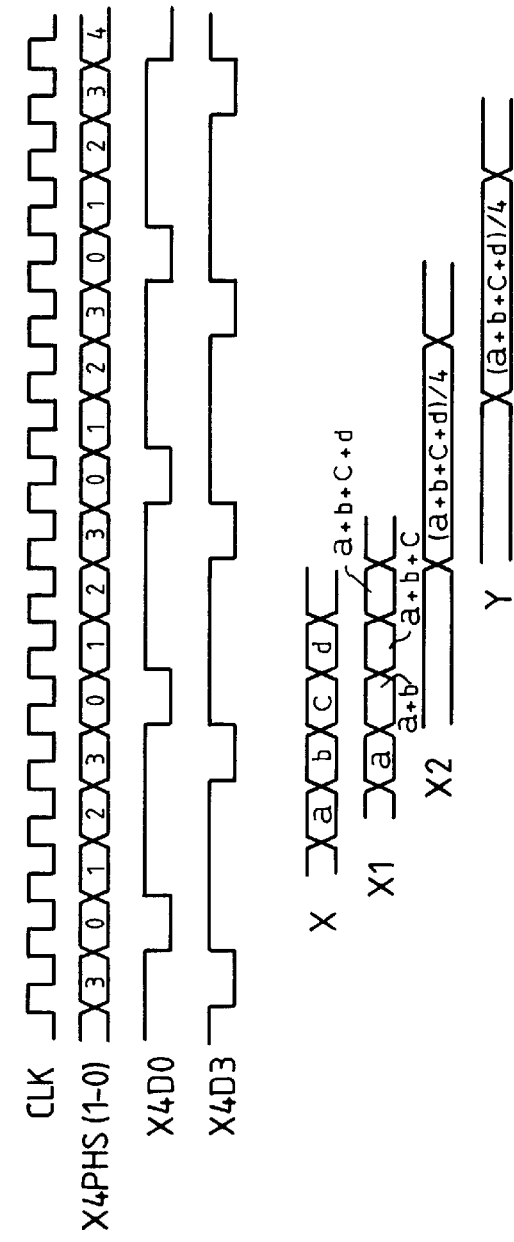

FIG. 28A is a block diagram which illustrates an example of the structure of the average circuit 2709. FIG. 28B is a timing chart which illustrates an example of the operation of the average circuit 2709.

Referring to FIG. 28A, reference numeral 2801 represents an AND gate, and 2802 represents an adder.

Reference numerals 2803, 2805 and 2807 represent F/Fs for latching the signal supplied in synchronization with the signal CLK4.

Reference numerals 2804 and 2806 represent 2-input 1-output selectors for selecting the signal supplied to the terminal A if the values of signals X4D0 and X4D3 supplied to the selection terminal S are "0", and selecting the signal supplied to the terminal B if the values is "1" to transmit the selected signal. The signals X4D0 and X4D3 are signals to be transmitted from the foregoing decoder 2510, the signal X4D0 being "0" only when signal X4PHS (1-0) is "0", and being "1" in the other cases. The signal X4D3 is "0" only when signal X4PHS (1-0) is "3", and is "1" in the other cases.

Therefore, if the input signal X sequentially has values a, b, c and d to correspond to the change of the signal X4PHS (1-0) from 0 to 3 as shown in FIG. 28B, the average circuit 2709 transmits the average (a+b+c+d)/4 of the four continuous values.

The output from the integrating circuit a122 is fed back via the FIFOs 140 and 141, the average of the four continuous values being stored in the FIFOs 140 and 141, resulting in the memory capacity of the FIFOs 140 and 141 to be reduced to ¼.

As shown in FIG. 27C, the output from the integrating circuit a122 does not contain high frequency components, resulting in significant reduction of the influence of the substitution of the four continuous values by their average.

Referring back to FIG. 23, the signal FO transmitted from the IIR 2403-1 to 2403-8 passes through the P/Ss 2404 and 2405, followed by transmitting the signal FO to the FIFOs 140 and 141 as the signal FOA. Then, it again passes through the S/Ps 2401 and 2402 as the signal FIA, followed by feeding back to the IIR 2403-1 to 2403-8.

Figure 29A:
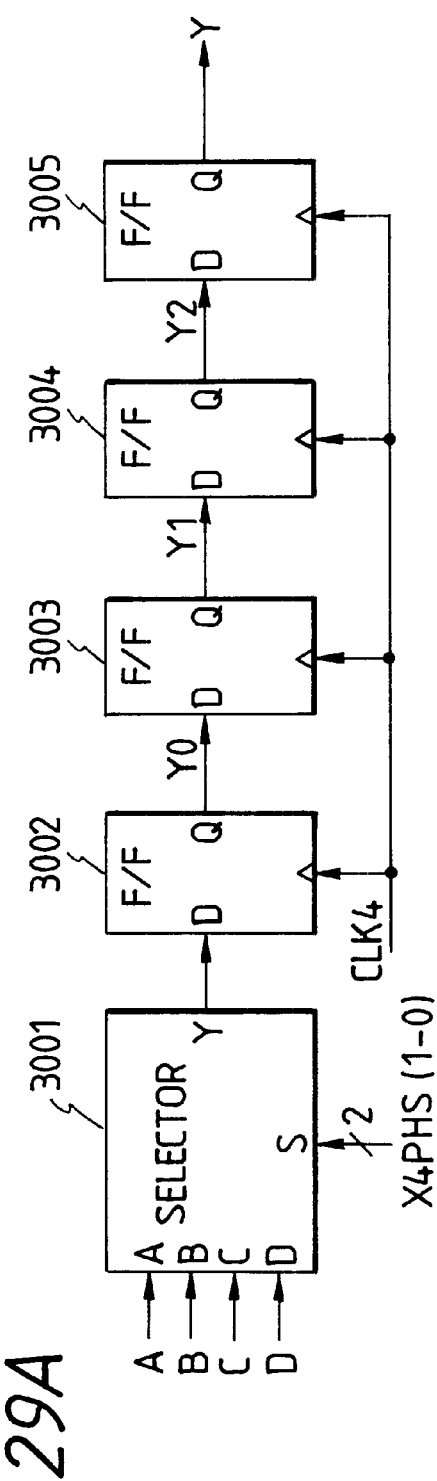
FIGS. 29A and 29B are a block diagram showing a configurational example of P/S as shown in FIG. 23 and a timing chart showing an operation example.
Figure 29B:
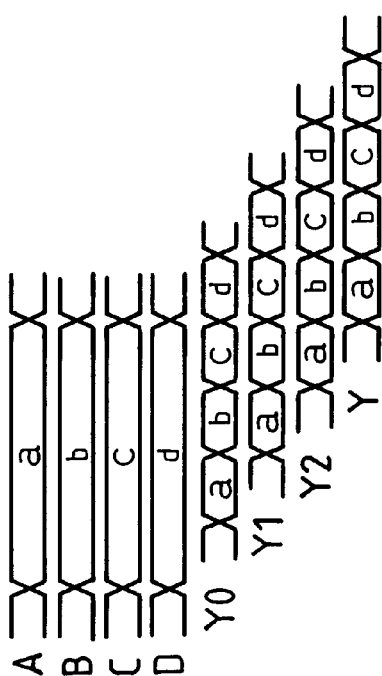

FIG. 29A is a block diagram which illustrates an example of the structures of the P/Ss 2404 and 2405. FIG. 29B is a timing chart which illustrates an example of the operation of the P/Ss 2404 and 2405.

Referring to FIG. 29A, reference numeral 3001 represents a 4-input 1-output selector for selecting the signal supplied to the terminal A if the value of the 2-bit signal X4PHS (1-0) supplied to the selection terminal S is "0", selecting the signal supplied to the terminal B if the value is "1", selecting the signal supplied to the terminal C if the value is "2", and selecting the signal supplied to the terminal D if the value is "3" to transmit the selected value.

Reference numerals 3002 to 3005 represent F/Fs for latching the supplied signal in synchronization with the signal CLK4.

Therefore, the P/Ss 2404 and 2405 sequentially serially transmit the values a, b, c and d supplied in parallel to the terminals A, B, C and D of the selector 3001 as shown in FIG. 29B.

That is, the integrating circuit a122 according to this embodiment serially transmits the signal FOA to the FIFOs 140 and 141 by the P/Ss 2404 and 2405, and in parallel converts the signal FIA supplied from the FIFOs 140 and 141. As a result, the number of the FIFOs and the input/output pins required in the LSI structure can be decreased, causing the cost to be reduced and the reliability of the circuit including the LSI to be improved.

Referring back to FIG. 23, the signal FL transmitted from the IIR 2403-1 to 2403-8 is, as an 8-bit signal FLSG, supplied to an integrating circuit b123 to be described later. The signal FL is a signal denoting the similarity between the image supplied to the discrimination circuit 309 and the flat portion of the specific original document.

Write control signal FWE and read control signal FRE of the FIFOs 140 and 141 are generated by the FIFO control circuit 111 to make the integrating circuit a122 satisfy the foregoing equation (1) by considering the delay of the integrating circuit a122.

Integrating Circuit b123

The integrating circuit b123 receives the signal SC transmitted from the ROMb 121, the signal SZ transmitted from the line-drawing/flat-portion separation circuit 115, and the signal FLSG transmitted from the integrating circuit a122 to remove the noise from the signal SC by the 2-D IIR digital filter similarly to the foregoing integrating circuit a122. The signal SC is a discrimination signal denoting whether or not the color tone distribution of the image supplied to the discrimination circuit 309 coincides with the color tone distribution of the line drawing portion of certain 8 types of the specific original documents. The signal SZ is a discrimination signal denoting the possibility that the foregoing image is the line drawing portion of, for example, the 8 types of the specific original document.

The integrating circuit b123 transmits 16-bit signal FOB to the FIFOs 142 and 143 similarly to the integrating circuit a122. It receives 16-bit signal FIB supplied from the FIFOs 142 and 143.

Figure 30:
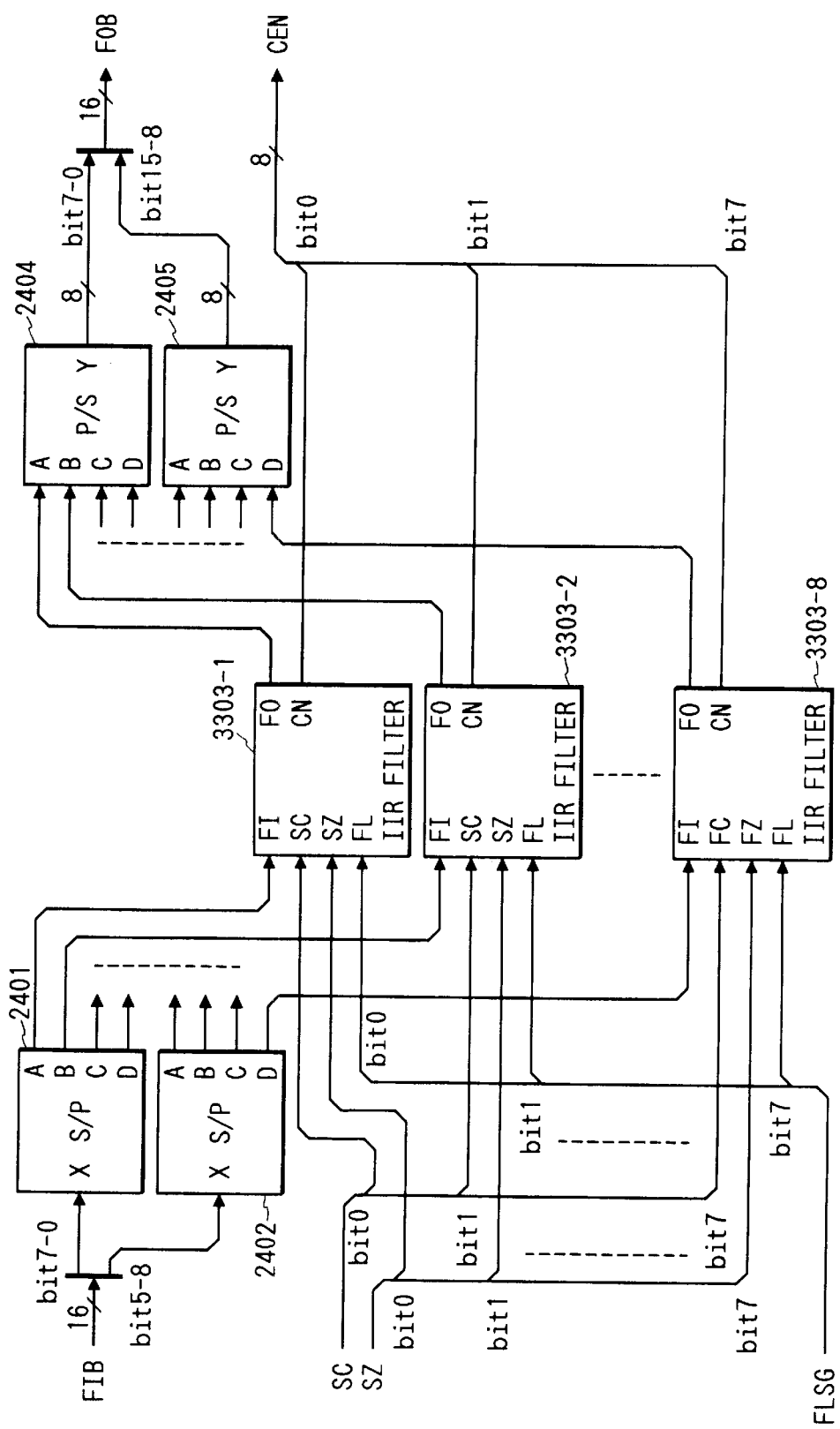
FIG. 30 is a block diagram showing a configuration example of an integrating circuit b of this embodiment.

FIG. 30 is a block diagram which illustrates an example of the structure of the integrating circuit b123. The structures of the integrating circuit b123 that are the same as those of the integrating circuit a122 shown in FIG. 23 are given the same reference numerals, and their descriptions are omitted here.

Referring to FIG. 30, reference numerals 3303-1 to 3301-8 represent IIR filters that are integrators.

Figure 31:
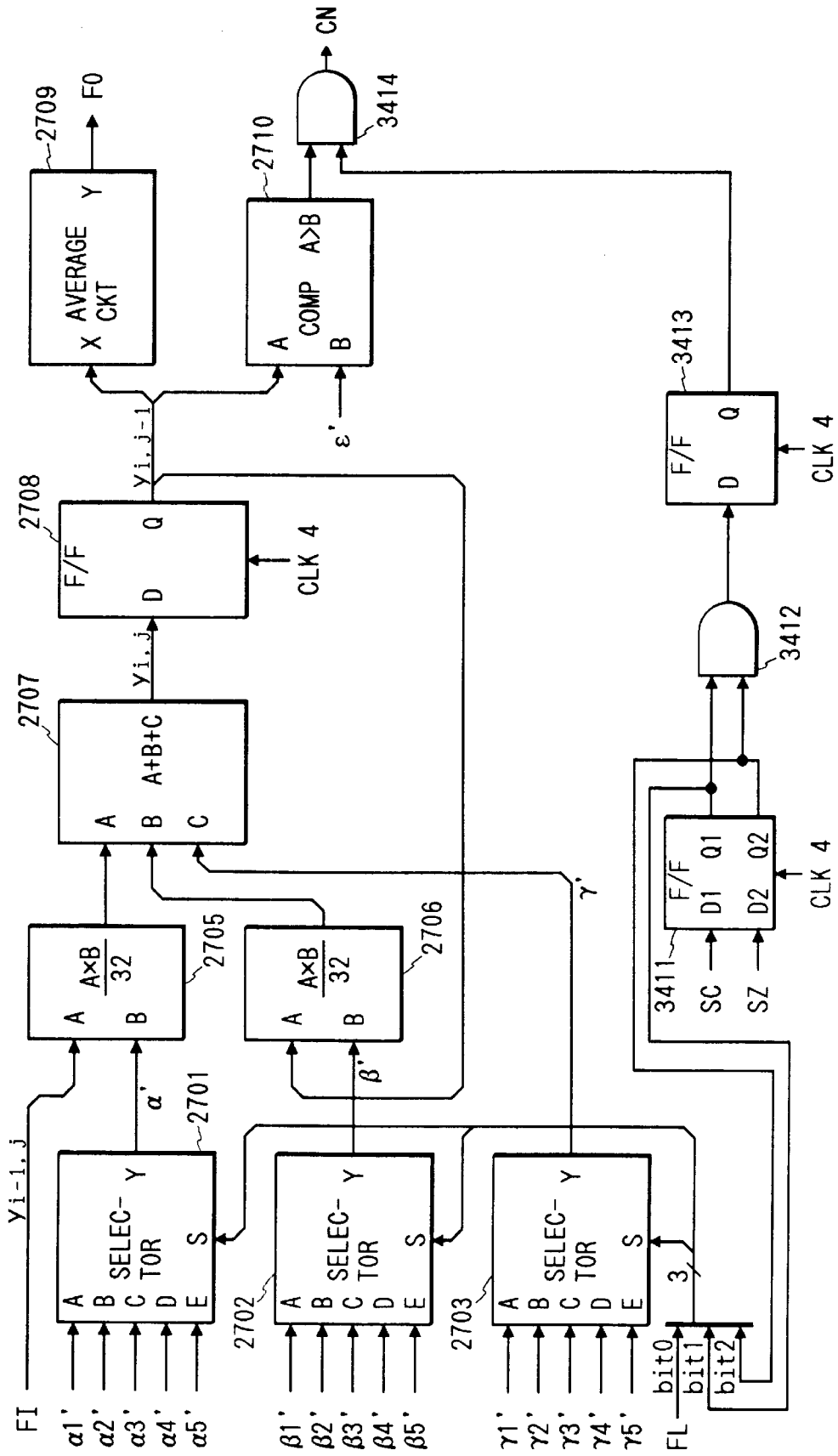
FIG. 31 is a block diagram showing a configuration example of IIR filter as shown in FIG. 30.

FIG. 31 is a block diagram which illustrates an example of the structure of the IIR filter 3303.

Referring to FIG. 31, reference numerals 3401 to 3403 represent 5-input 1-output selectors for selecting the signal supplied to the terminal A if the 3-bit value supplied to the selection terminal S is 0 to 3, selecting the signal supplied to the terminal B if the 3-bit value is 4, selecting the signal supplied to the terminal C if the 3-bit value is 5, selecting the signal supplied to the terminal D if the 3-bit value is 6, and selecting the signal supplied to the terminal E if the 3-bit value is 7 to transmit the selected signal. The signal to be supplied to the selection terminal S is arranged in such a manner that its bit 0 is one bit of the signal FLSG, its bit 1 is formed by delaying one bit of the signal SC by one period of the signal CLK4 by the F/F 3411, and its bit 2 is formed by delaying one bit of the signal SZ by one period of the signal CLK4 by the F/F 3411;

Assuming that output from the adder 2707 is $y'_{(i,j)}$, the output from the F/F 2708 is $y'_{(i,j-1)}$. The signal FI supplied to the integrator 2705 via the selectors 2401 and 2402 shown in FIG. 30 is obtained by delaying $y'_{(i,j)}$ in the sub-scanning direction by making use of the FIFO, the signal FI being expressed as $y'_{(i-1,j)}$ which is expressed as follows:

$$y'_{(i,j)} = (\alpha'/32)y'_{(i-1,j)} + (\beta'/32)y'_{(i,j-1)} + \gamma' \quad (2)$$

FIGS. 32A to 32D illustrate an example of a result of the process performed by the integrating circuit b123. FIG. 32A illustrates an example of the signal SC ("1" denotes coincidence and "0" denotes non-coincidence). FIG. 32B illustrates an example of the signal SZ (where "1" denotes a flat portion and "0" denotes a non-flat portion). FIG. 32C illustrates an example of the signal FLSG (where "1" denotes a line drawing portion and "0" denotes a non-line-drawing portion). By making α1' to α5', β1' to β5', and γ1' to γ5' to be proper values, output $Y'_{(i,j)}$ from the adder 2702 as shown in FIG. 32D can be obtained. That is $Y'_{(i,j)}$ having waveform obtained by smoothing noises 3501 and 3502 can be obtained. By binary-coding with threshold ∈, noise components 3503 and 3504 can be removed completely.

Reference numerals 3411 and 3413 represent F/Fs, and 3412 and 3414 represent AND gates. The AND of the output from the comparator 2710, the signal SC and the signal SZ is obtained by the AND gate 3414 to be transmitted as the signal CN. The signal CN is "1" if the image supplied to the discrimination circuit 309 has a good possibility that it is a portion of the line drawing portion of the specific original document.

Referring to FIG. 30, the signals CN transmitted from the IIR circuits 3303-1 to 3303-8 are, as 8-bit signals CEN, collectively supplied to a volume ratio discrimination circuit 128 to be described later.

The structures and operations of the integrating circuit b123 that are substantially the same as those of the integrating circuit a122 are omitted from description.

Volume Ratio Discrimination and Final Discrimination

The volume ratio discrimination circuit 128 receives the signal CEN transmitted from the integrating circuit b123 to obtain the volume ratio and the number of hit pixels to finally discriminate whether or not the specific original document is present. The "volume ratio" is the ratio of the share of pixel groups, in which each bit of the signal CEN is "1", among the color tone distribution volume as shown in FIG. 20A. The "number of hit pixels" is the number of the pixels, in which each bit of the signal CEN is "1", under the condition that the volume ratio is higher than a predetermined value.

Data buses of static RAMs (hereinafter called "SRAMs") 136 to 139 are connected to the volume ratio discriminating circuit 128 via a bi-directional buffer 130.

Reference numeral 124 represents a delay circuit for synchronizing the 17 lower bits of the address signal of the ROMb 121 with the degree of the delay of the integrating circuit a122 and that of the integrating circuit b123. The address signal transmitted from the delay circuit 124 passes through a 3-state gate 125, followed by separating the address signal into 15 lower bits (that is, each 5 bits of RGB) and 2 upper bits (that is, the signal YPHS). Signal SRA denoting the 15 lower bits is supplied to each address terminal of the SRAMs 136 to 139, while signal YPHS denoting the 2 upper bits is supplied to a decoder 131. The logic of the operation of the decoder 131 is shown in Table 2.

TABLE 2

| Input | Output | | | |
|---|---|---|---|---|
| X | Y0 | Y1 | Y2 | Y3 |
| 00 | 0 | 1 | 1 | 1 |
| 01 | 1 | 0 | 1 | 1 |
| 10 | 1 | 1 | 0 | 1 |
| 11 | 1 | 1 | 1 | 0 |

The AND of four outputs Y0 to Y3 from the decoder 131 and the signal CCL is obtained by AND gates 132 to 135, followed by supplying the AND to a chip select terminal CS of the SRAMs 136 to 139. Therefore, the SRAM 136 is accessed if the signal YPHS is "0", the SRAM 137 is accessed if the signal YPHS is "1", the SRAM 138 is accessed if the signal YPHS is "2", and the SRAM 139 is accessed if the signal YPHS is "3".

After the SRAMs 136 to 139 have been initialized (cleared to zero), each address receives each 5 bits of the RGB signals that have accessed the ROMb 121. When any bit of the signal CEN is "1", "1" is written to the address showing the value of the corresponding RGB signals. The initialization of the SRAMs 136 to 139 will be described later.

Reference numeral 129 represents an SRAM control circuit for generating write control signal RWE and output control signal ROE for the SRAMs 136 to 139 and generating control signal RID for the bi-directional buffer 130.

Reference numeral 126 represents an inverter, and 127 represents a 3-state gate. Either of the two 3-state gates 125 and 127 is activated in response to the control signal CCL. However, since the signal CCL is "1" in the usual operation, the 3-state gate 125 is activated.

Figure 33:
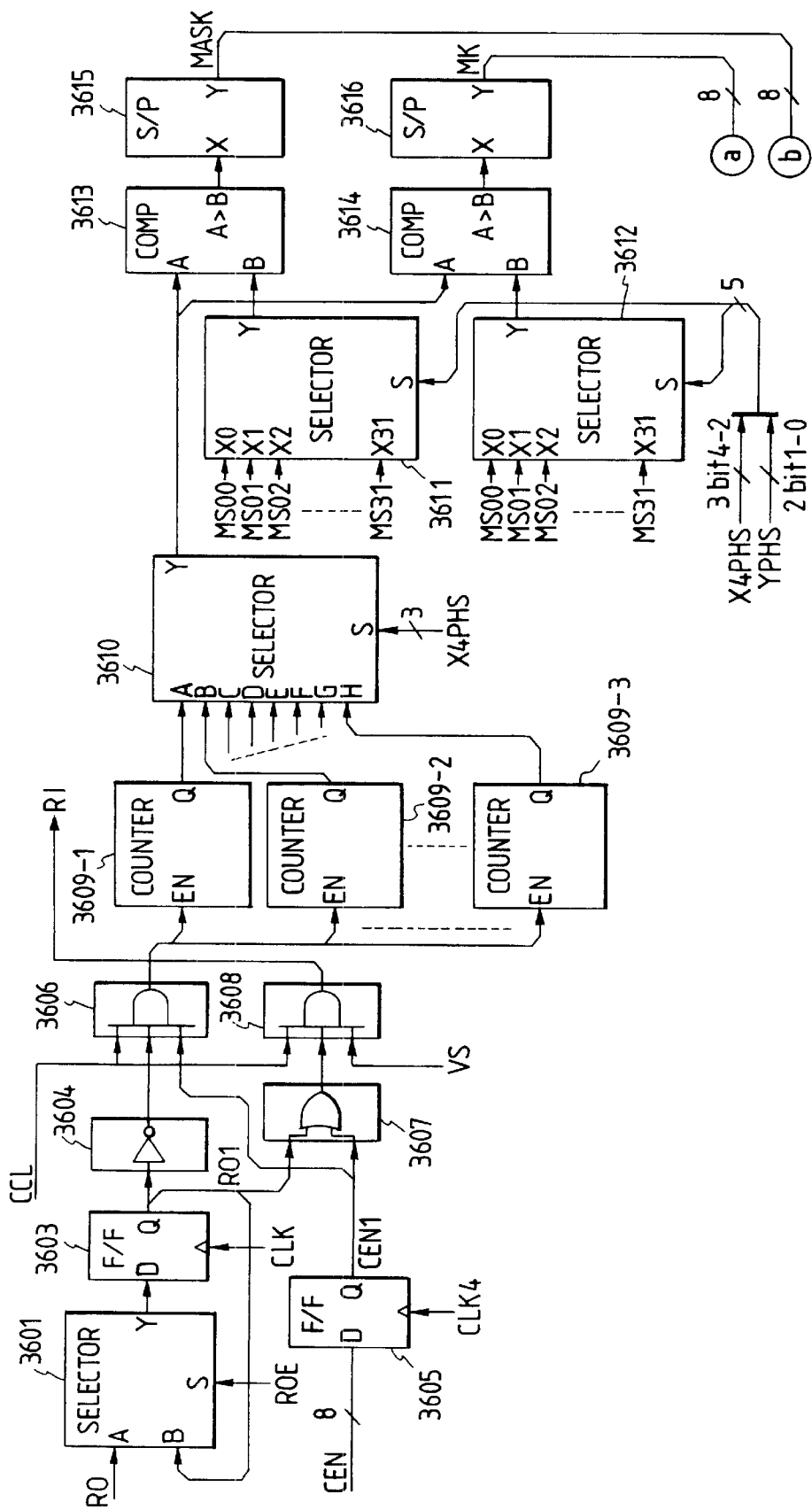
FIG. 33 is a block diagram showing a configurational example of volume ratio discrimination circuit of this embodiment.
Figure 34:
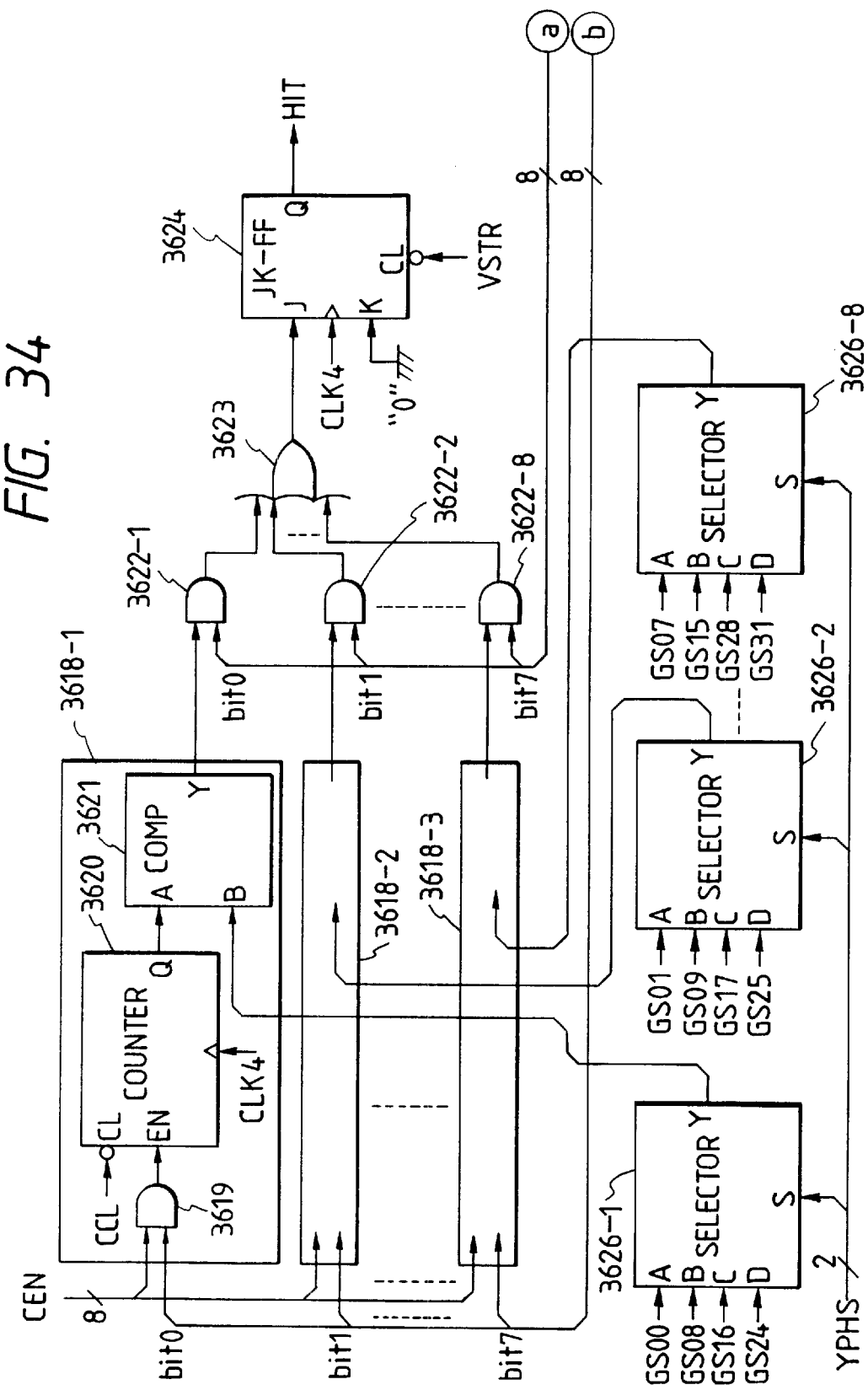
FIG. 34 is a block diagram showing another configurational example of volume ratio discrimination circuit of this embodiment.
Figure 35:
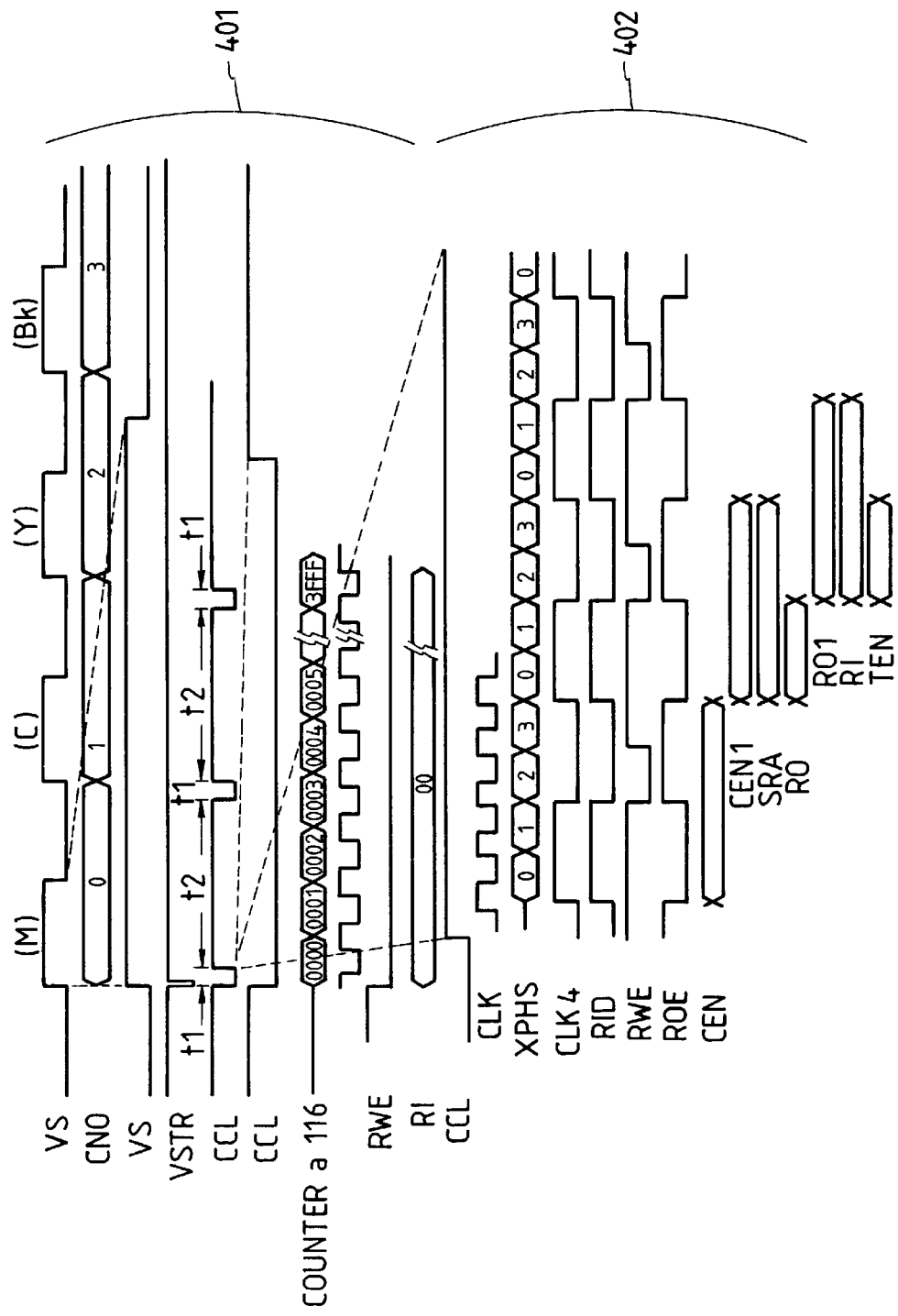
FIG. 35 is a diagram showing an operation example of the volume ratio discrimination circuit of this embodiment.

FIGS. 33 and 34 are block diagrams which illustrate an example of the structure of the volume ratio discrimination circuit 128. FIGS. 35 and 36 illustrate an example of the operation of the volume ratio discrimination circuit 128.

Referring to FIG. 35, the signal RID is a signal for controlling the transmission direction of the bi-directional buffer 130, the signal RWE is a write control signal for the SRAMs 136 to 139, and the signal ROE is an output control signal for the SRAMs 136 to 139, the foregoing signals being generated by the SRAM control circuit 129.

As shown with reference numeral 402 of FIGS. 35 and 36, when the signal XPHS is "0" or "1", the signal RID is "1". Therefore, the transmission direction of the bi-directional buffer 130 is (SRAM)→(Volume Ratio Discrimination Circuit). Furthermore, the signal RWE is "1" and the signal ROE is "0", causing the SRAMs 136 to 139 to be brought to the read-enable state.

When the signal XPHS is "2", the signal RID is "0". Therefore, the transmission direction of the bi-directional buffer 130 is (Volume Ratio Discrimination Circuit)→(SRAM). Furthermore, the signal RWE is "0" and the signal ROE is "1", causing the SRAMs 136 to 139 to be brought to the write-enable state.

When the signal XPHS is "3", the signal RID is "0". Therefore, the transmission direction of the bi-directional buffer 130 is (Volume Ratio Discrimination Circuit)→

(SRAM). Furthermore, the signal RWE is "1" and the signal ROE is "1", causing the SRAMs 136 to 139 to be brought to non-read-enable and non-write-enable states.

Since the address signal SRA of the SRAMs 136 to 139 is changed in synchronization with the first transition of the signal CLK4 and is not changed in one period (0 to 3) of the signal XPHS, the operation of the SRAMs 136 to 139 is a so-called "read/modify/write" operation.

Referring to FIGS. 33 and 34, reference numeral 3601 represents a 2-input 1-output selector for selecting signal RO supplied to the terminal A if the signal ROE supplied to the selection terminal S is "0", and selecting signal RO1 supplied to the terminal B if the signal is "1" to transmit the selected signal. The signal R1 is, for example, an 8-bit signal read from the SRAMs 136 to 139.

Reference numeral 3603 represents a F/F for latching the signal supplied from the selector 3601 in synchronization with the first transition of the signal CLK to transmit it as the signal RO1.

Reference numeral 3605 represents a F/F for latching the signal CEN in synchronization with the first transition of the signal CLK4 to transmit it as the signal CEN.

Reference numeral 3606 represents an AND gate for receiving signals RO1, CEN1 and CCL via an inverter 3604 to transmit their AND as signal TEN. Each bit of the signal TEN is "1" only when the corresponding bit of the signal RO1 is "0" and the signal CEN is "1" because the signal CCL is usually "1".

Reference numeral 3608 represents an AND gate for receiving an AND signal of the signal RO1 and the signal CEN1, and receiving the signal CCL and the signal VS from an OR gate 3607 to transmit their AND as the signal RI. The signal RI is the OR of each bit of the signal RO1 and the corresponding bit of the signal CEN because the signal CCL and the signal VS are "1" at the time of reading an image.

Reference numerals 3609-1 to 3609-8 represent counters for increasing the count value when the corresponding bit of the 8-bit signal TEN is "1".

Therefore, after the SRAMs 136 to 139 have been initialized, the AND of the signal CEN and data stored in the address corresponding to the RGB signals in the SRAMs 136 to 139 at the subject point is written on the foregoing address of the SRAMs 136 to 139.

If any one of the bit of each data in the SRAMs 136 to 139 has been transited from "0" to "1", the corresponding bit of the signal TEN is "1". By counting the number of times, at which each bit of the signal TEN is "1", by the counter 3609, the "volume ratio" can therefore be obtained.

Figure 37:
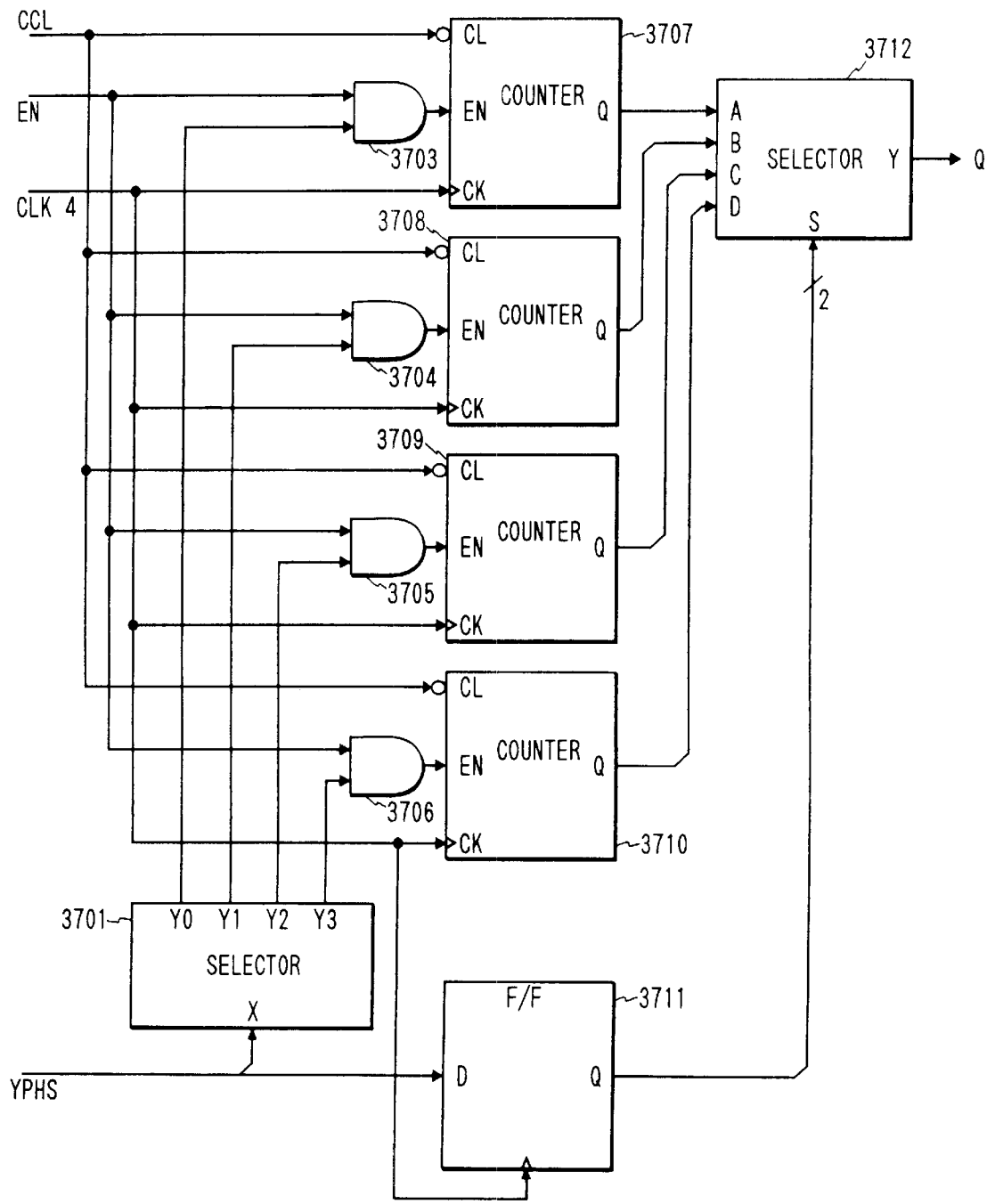
FIG. 37 is a block diagram showing a configurational example of a counter as shown in FIG. 34.

FIG. 37 is a block diagram which illustrates an example of the structure of the counter 3609.

Referring to FIG. 37, reference numeral 3701 represents a 2-input 4-output decoder for transmitting signals shown in Table 3 in response to the supplied signal YPHS.

TABLE 3

| Input | Output | | | |
|---|---|---|---|---|
| YPHS | Y0 | Y1 | Y2 | Y3 |
| 00 | 1 | 0 | 0 | 0 |
| 01 | 0 | 1 | 0 | 0 |
| 10 | 0 | 0 | 1 | 0 |
| 11 | 0 | 0 | 0 | 1 |

Reference numerals 3703 to 3706 represent AND gates for calculating the AND of the output from the corresponding decoder 3701 and the signal EN.

Reference numerals 3707 to 3710 represent counters which are cleared in response to the signal CCL and which count the signal CLK4 if the corresponding AND signal of the AND gates 3703 to 3706 is "1".

Reference numeral 3712 represents a 4-input 1-output selector for transmitting the output from the counter 3707 supplied to the terminal A if the signal supplied from the F/F 3711 to the selection terminal S is "0", transmitting the output from the counter 3708 supplied to the terminal B if the signal is "1", transmitting the output from the counter 3709 supplied to the terminal C if the signal is "2", transmitting the output from the counter 3710 supplied to the terminal D if the signal is "3" to transmit the selected output as signal Q. The F/F 3711 transmits the signal YPHS latched at the first transition of the signal CLK4.

If the signal YPHS is "0", the counter 3707 counts the signal. If the signal YPHS is "1", the counter 3708 counts the signal. If the signal YPHS is "2", the counter 3709 counts the signal. If the signal YPHS is "3", the counter 3710 counts the signal. Then, the counted value is transmitted as the signal Q.

That is, the volume ratio discrimination circuit 128 performs the time-division process in response to the signal YPHS to discriminate as to whether or not the subject is included by to, for example, 8 types of the specific original document.

Referring to FIGS. 33 and 34, reference numeral 3610 represents an 8-input 1-output selector for selecting the counted value of the counter 3609-1 supplied to the terminal A if a 3-bit signal X4PHS supplied to the selection terminal S is "0", selecting the counted value of the counter 3609-2 supplied to the terminal B if the signal is "1", and selecting the counted value of the counter 3609-8 supplied to the terminal H if the signal is "7" to transmit the selected counted value.

Reference numerals 3611 and 3612 represent 16-input 1-output selectors for selecting the values corresponding to, for example, 32 types of specific original documents supplied from the coefficient register 148 in response to totalling 5-bit signal composed of the 3 upper bits are the signal X4PHS and the 2 lower bits are the signal YPHS to transmit the selected value.

The selector 3611 receives predetermined insensitive band values MS00 to MS31 of the count of the hit pixel number to be described later. The selector 3611 selects the predetermined insensitive band value MS00 if the 5-bit signal supplied to the selection terminal S is "0", selects the predetermined insensitive band value MS01 if it is "1", . . . , selects the predetermined insensitive band value MS31 if it is 31 to transmit the selected value.

The selector 3612 receives mask signal M00 to M31 denoting the result of counting of the number of hit pixels to be described later. The selector 3612 selects the mask signal M00 if a 5-bit signal supplied to the selection terminal S is "0", selects the mask signal M01 if the signal is "1", . . . , and selects the mask signal M31 if the signal is "31" to transmit the selected signal.

Reference numeral 3613 represents a comparator for subjecting counted value Q transmitted from the selector 3610 and the predetermined insensitive band value MS transmitted from the selector 3611 to a comparison. If Q>MS, the comparator 3613 transmits "1". If Q≦MS, if transmits "0".

Reference numeral 3614 represents a comparator for subjecting counted value Q transmitted from the selector 3610 and the mask signal M transmitted from the selector 3612 to a comparison. If Q>M, the comparator 3614 transmits "1". If Q≦M, it transmits "0".

That is, the comparators 3613 and 3614 perform the process in a time division manner in response to the signal X4PHS. The result of the comparison is transmitted to the S/Ps 3615 and 3616, respectively.

Figure 38:
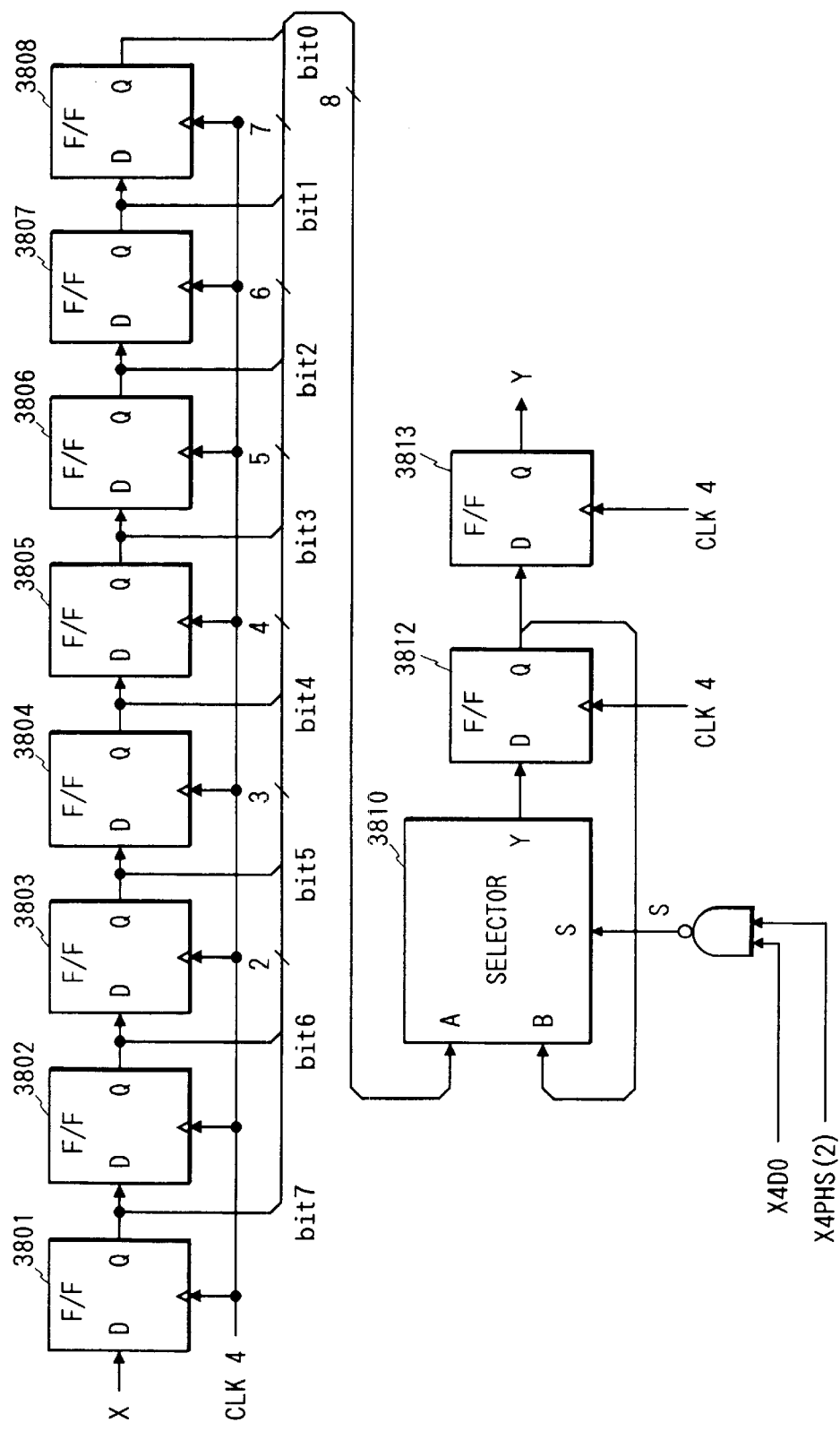
FIG. 38 is a block diagram showing a configurational example of S/P as shown in FIG. 33.
Figure 39:
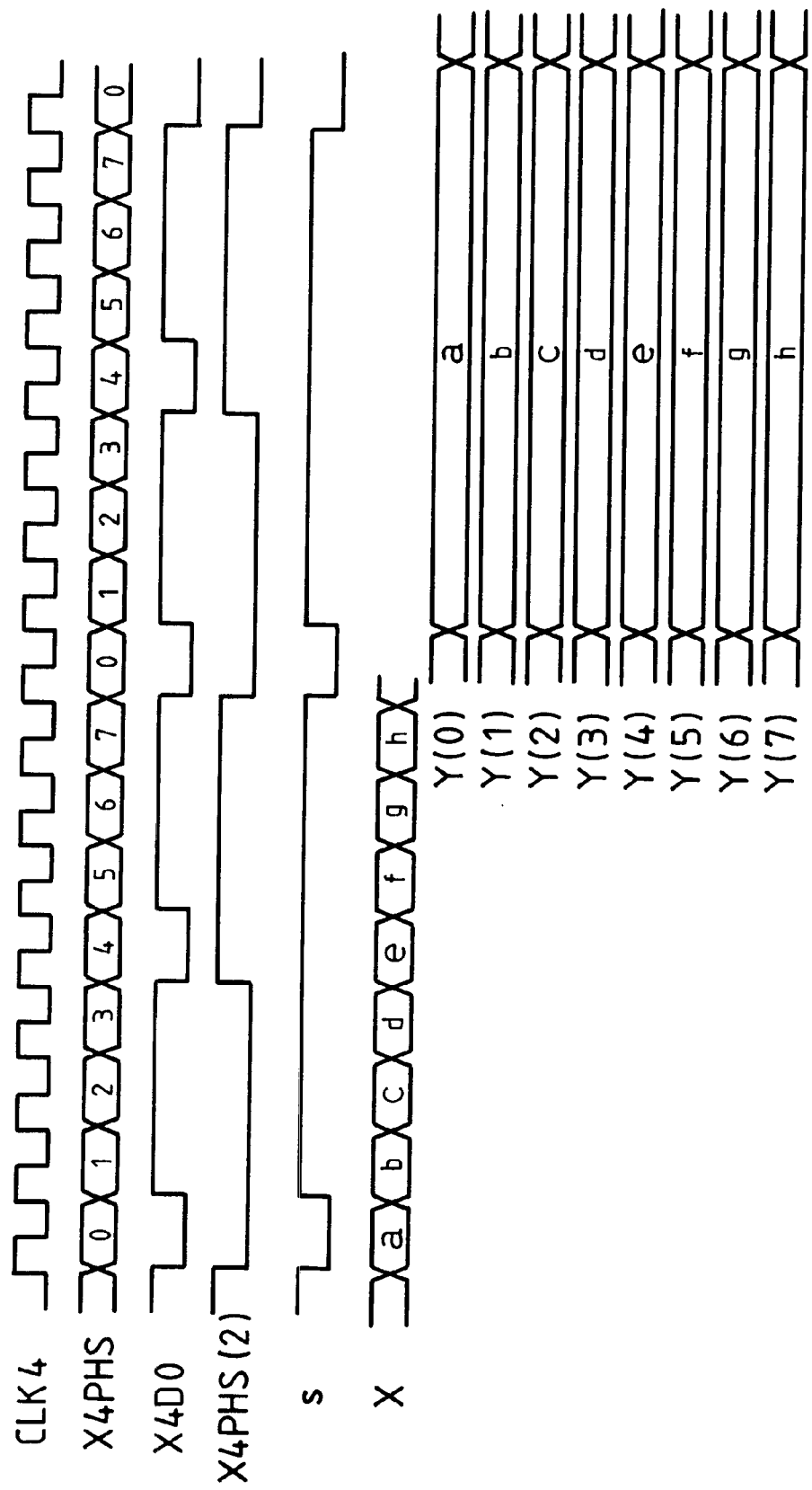
FIG. 39 is a timing chart showing an operation example of S/P as shown in FIG. 33.

FIG. 38 is a block diagram which illustrates an example of the structure of the S/Ps 3615 and 3616. FIG. 39 is a timing chart which illustrates an example of the operation of the S/Ps 3615 and 3616.

Referring to FIG. 38, reference numeral 3801 to 3808 represent F/Fs for latching the signal supplied serially in synchronization with the first transition of the signal CLK4.

Reference numeral 3810 represents a selector for selecting the signal supplied from the F/Fs 3801 to 3808 to the terminal A if the bit-2 OR signal of the signal X4D0 and the signal X4PHS supplied from the OR gate to the selection terminal S is "0", and selects the signal supplied to the terminal B if the OR signal is "1".

Reference numerals 3812 and 3813 represent F/Fs for respectively latching the signal supplied from the selector 3810 and the signal supplied from the F/F 3813 in synchronization with the first transition of the signal CLK4.

Therefore, the signal MASK transmitted from the S/P 3615 and the signal MK transmitted from the S/P 3616 are used to substantially simultaneously transmit the result of the process about, for example, 8 types of specific original documents in spite of occurring a somewhat delay.

Referring to FIGS. 33 and 34, reference numerals 3618-1 to 3618-8 represent hit-pixel number counters comprising an AND gate 3619 for obtaining the AND of each bit of the signal CEN and the signal MASK, a counter 3620 which is cleared in response to the signal CCL and which counts the signal CLK4 if the output from the AND gate 3619 is "1", and a comparator 3621 for subjecting the counted value of the counter 3620 and a signal supplied from a selector 3626 to be described later to a comparison.

Reference numerals 3626-1 to 3626-8 represent 4-input 1-output selectors for selecting either of values GS supplied from the coefficient register 148 in response to the signal YPHS supplied to the selection terminal S. That is, the selector 3626-1 selects value GS00 if the signal YPHS is "0", selects value GS08 if the signal YPHS is "1", selects value GS16 if the signal YPHS is "2", and selects value GS24 if the signal YPHS is "3" to transmit the selected value. Similarly, the selector 3626-2 selects and transmits any one of values GS01, GS09, GS17 or GS25, the selector 3626-3 selects and transmits any one of values GS202, GS10, GS18 or GS26, . . . , and the selector 3626-8 selects and transmits any one of values GS07, GS15, GS23 or GS31.

That is, the bit of the volume ratio discrimination circuit 128, to which the signal MASK corresponds, is "1" if the result of counting the number of times at which each bit of the signal TEN is "1" by the counter 3609, that is, if the volume ratio is larger than the values MS00 to MS07 in the case where the signal YPHS is "0", if the volume ratio is larger than the values MS08 to MS15 in the case where the signal YPHS is "1", if the volume ratio is larger than the values MS16 to MS23 in the case where the signal YPHS is "2", and if the volume ratio is larger than the values MS24 to MS31 in the case where the signal YPHS is "3". The counter 3620 starts counting the number of times at which the bit, to which the signal CEN corresponds, is "1".

The AND gate 3622-1 to 3622-8 transmit "1" only when the result of counting performed by the counter 3620 is larger than values GS00 to GS07 in the case where the signal YPHS is "0", when the result of counting is larger than values GS08 to GS15 in the case where the signal YPHS is "1", when the result of counting is larger than values GS16 to GS23 in the case where the signal YPHS is "2", and when the result of counting is larger than values GS24 to GS31 in the case where the signal YPHS is "3", and only when the volume ratio is larger than the values M00 to M07 in the case where the signal YPHS is "0", when the volume ratio is larger than the values M08 to M15 in the case where the signal YPHS is "1", when the volume ratio is larger than the values M16 to M23 in the case where the signal YPHS is "2", and when the volume ratio is larger than the values M24 to M31 in the case where the signal YPHS is "3".

Reference numeral 3623 represents an OR gate for obtaining the OR of the outputs from the AND gates 3622-1 to 3622-8. That is, if the output from the OR gate 3623 is "1", it means a fact that a discrimination has been made that at least one type of a specific original document image is included in the image supplied to the discrimination circuit 309.

Reference numeral 3624 represents a JK-F/F which is cleared in response to signal VSTR generated at the first transition of the signal VS and which alternately transmits the output from the OR gate 3623 and "0" as signal HIT in synchronization with the signal CLK4.

Process to be Performed in Case Where Specific Original Document is Present

If the foregoing process has determined that at least one type of the specific original document image is included in the image supplied to the discrimination circuit 309, the signal HIT transmitted from the volume ratio discrimination circuit 128 is "1".

Referring to FIG. 2, the CPU 311, which has received the signal HIT="1", makes the signal INHIBIT to be "1", while the selector 310 transmits, for example, "80" (HEX) regardless of the image signal V supplied from the density conversion circuit 308. Therefore, a "solid image" is formed.

Figure 46:
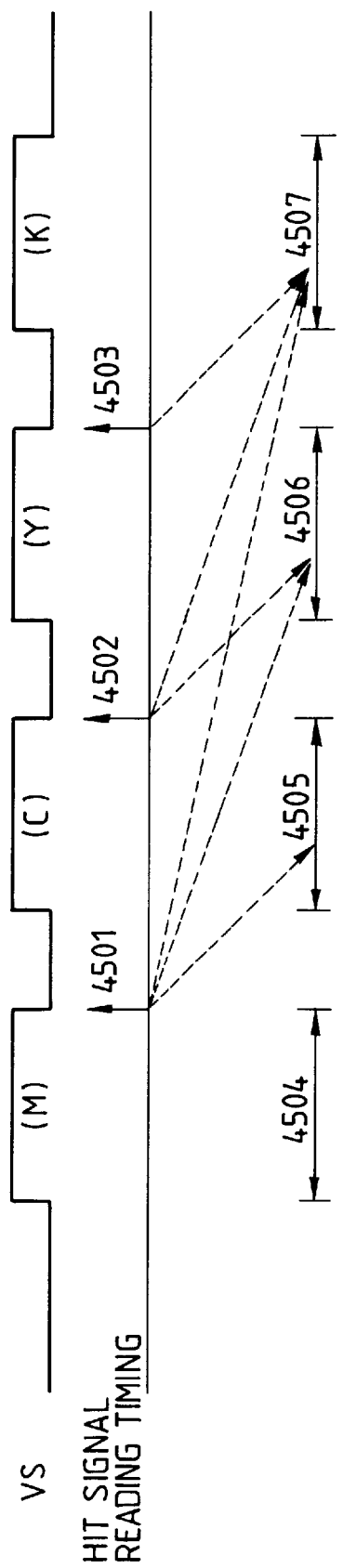
FIG. 46 is a timing chart showing the read timing of signal HIT in the first embodiment.

FIG. 46 is a timing chart which illustrates an example of the timing relationship between reading of the signal HIT and copy inhibition.

As shown in FIG. 46, the CPU 311 reads the signal HIT at the last transition of the signal VS, that is, at the timing at which the effective region of the sub-scanning for image reading is completed.

Referring to FIG. 46, this embodiment has an arrangement that M image is formed in a region 4504, and C image is ordinarily formed if the signal HIT of the timing 4501 is "0" in a region 4505, and C image is formed with the fixed value "80" (HEX) if the signal HIT of the timing 4501 is "1".

This embodiment has an arrangement that Y image is ordinarily formed if the signal HIT of the timing 4501 and that of the timing 4502 are "0" in a region 4506. IF the signal HIT of the timing 4501 or the timing 4502 is "1", the Y image is formed with the fixed value of "80" (HEX).

This embodiment has an arrangement that, if the signal HIT in each of the timing 4501 to timing 4503 is "0" in a region 4507, K image is ordinarily formed. If at least one signal HIT at the timing 4501 to timing 4503 is "1", the K image is formed with the fixed value (HEX).

Figure 47:
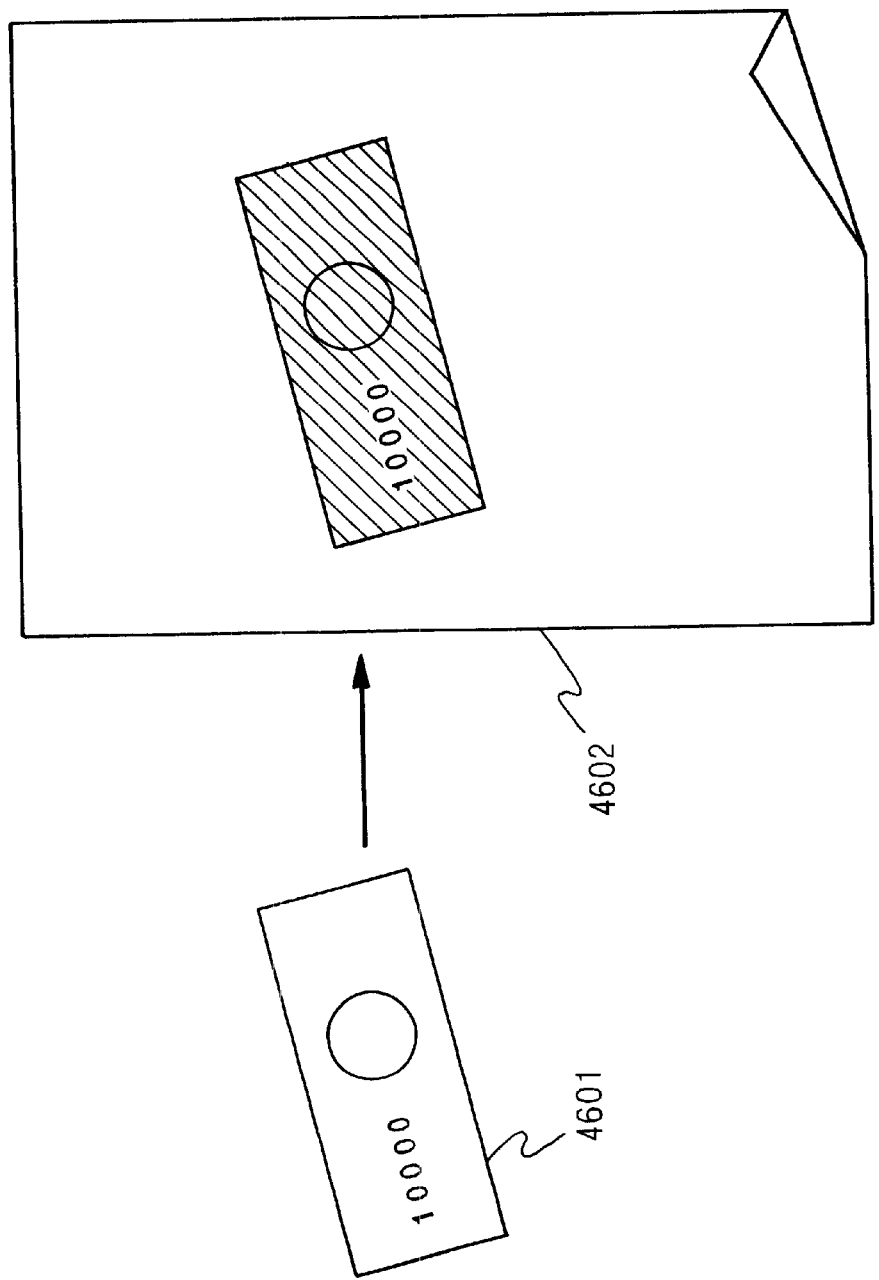
FIG. 47 is a view showing a copied example in the first embodiment.

FIG. 47 illustrates an example of an output obtained when a specific original document is copied.

Referring to FIG. 47, if a specific original document example 4601 is copied in this embodiment, the signal HIT is "1" at the timing 4501 shown in FIG. 46, resulting in that the M image is ordinarily performed. However, the C, Y and K images are formed with, for example, the fixed value of "80" (HEX).

If the printer 202 according to this embodiment has a gradation expressing performance of, for example, 8 bits, the M image first formed can be visually recognized in the case where the density is about "80" (HEX) in comparison to the highest density "FF". As a result, the obtained output cannot be used as the forgery of the specific original document, and the subject of copying can be recognized.

According to this embodiment, if the copying operation has not been performed ordinarily, whether the erroneous operation of the apparatus has taken place or a specific original document has been intended to be copied can be judged from the output.

Initialization of SRAM and Each Counter

Reference numeral 149 represents a CCL generation circuit for receiving the signal VS to generate the signals CCL and VSTR. The signal CCL initializes (zero-clears) the SRAMs 136 to 139 for counting the volume ratio and the number of the hit pixels and each of the counters 3707 to 3710 and 3620. The signal VSTR initializes the signal HIT denoting the result of the final discrimination.

An example of the timing 401 of the signal CCL and the signal VSTR is shown in FIG. 35.

Referring to FIG. 35, the signal VS is a signal which is "1" in the image forming region, while the signal VSTR is "0" at the first transition (the start of the image forming region) of the signal VS to initialize the signal HIT, and it is "1" in the other cases.

The signal CCL repeats "0" (period t1) and "1" (period t2.) from the first transition of the signal VS.

In the region in which the signal CCL is "0", the counter a116 counts from "0000" to "3FFF", the result of counting performed by the counter a116 passing through the selector 117 and the 3-state gate 127, followed by supplying the result to the address terminals of the SRAMs 136 to 139.

In the region in which the signal CCL is "0", the outputs from the AND gates 132 to 135 are "0", and all of the terminals CS of the SRAMs 136 to 139 are "0", resulting in that the foregoing SRAMs are accessed.

In the region in which the signal CCL is "0", the output from the AND gate shown in FIGS. 33 and 34 is "0", and all of the signals RI to be supplied to the SRAMs 136 to 139 are "0".

Since the SRAM control circuit 129 generates the signals RWE at the timing 401 shown in FIG. 35, "0" is written on each address of the SRAMs 136 and 139, causing the foregoing SRAM to be initialized.

After the initialization of the SRAMs 136 to 139 has been completed, the signal CCL is "1", followed by shifting to the foregoing ordinary discriminating operation. After region t2 has been passed, the operation, in which the foregoing SRAM is again initialized, is repeated.

Image Processing Mode and ID Reading Mode

This embodiment has two modes, an image processing mode and an ID reading mode.

In the image processing mode, ordinary image processing is performed, and the ROMa 147 and the ROMb 121 are used as tables for discriminating the presence of the specific original document.

In the ID reading mode, the ID previously stored in the uppermost address of each of the ROMa 147 and ROMb 121 is read out.

The ROMa 147 and ROMb 121 are controlled in each mode by the signals RID and PSEL.

In the image processing mode, the signal RID is set to "0" by the CPU 311. The signal PSEL supplied from the bank switch portion 118 is set to the two upper bits of the address signal of the ROMb 121, and outputs "R", "G" and "B" from the S/Ps 112 to 114 are set to the 15 lower bits of the address signal.

In the ID reading mode, the signal RID is set to "1" by the CPU 311. In this case, the outputs from the 3-state gates 119 and 145 are brought to high impedance. Pull-up resistors 120 and 146 cause all of the address terminals of the ROMb 121 and ROMa 147 to be "1". At this time, the ROMb 121 transmits data stored in address "3FFFF" that is the uppermost address. The uppermost address of the ROMb 121 previously stores data, the 8 lower bits of which are the ID for the foregoing ROM, as shown in FIG. 22. The CPU 311 reads the foregoing data as ROM2-ID.

The ROMa 147 transmits data stored in address "FF" that is the uppermost address. The uppermost address of the ROMa 147 previously stores 8-bit data, which is the ID for the foregoing ROM. The CPU 311 reads the data as ROM1-ID.

Although the ID is an 8-bit code, it is stored at the address except for "00" and "FF". The reason for this is that, if the ROMa 147 or the ROMb 121 is intentionally removed, or intentionally exchanged or it is out of order, there is a good possibility that the address is "00" in which all of the 8 bits are "0" or "FF" in which all of the 8 bits are "1". The arrangement is characterized in that the address "00000" to address "37FFF" of the ROMb 121 are accessed in the image processing mode, and the address. "3FFFF" is accessed in the ID reading mode to perform control while preventing an overlap.

ID Reading Operation

Figure 40:
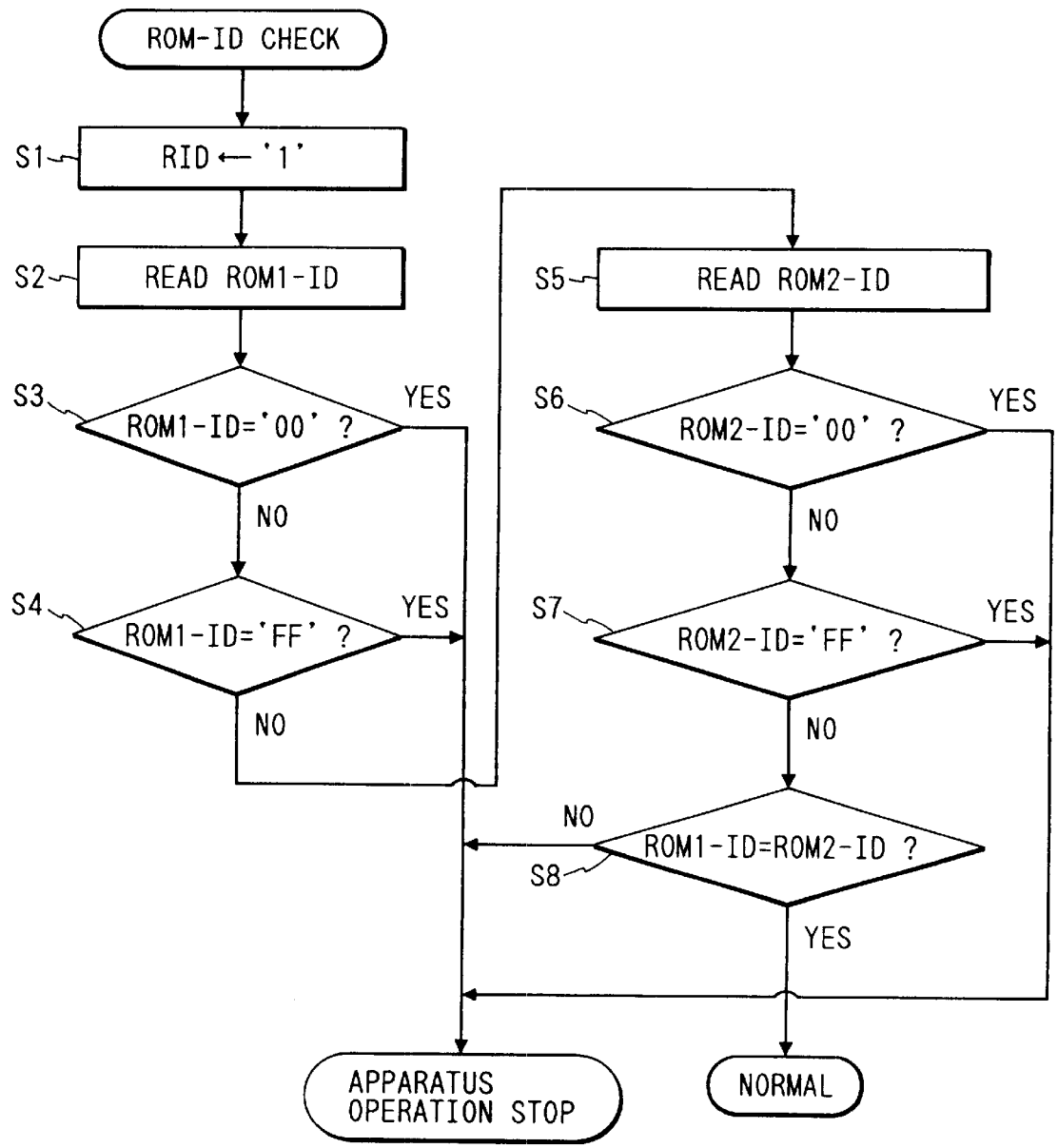
FIG. 40 is a flow chart showing an operation example in an ID reading mode of this embodiment.

FIG. 40 is a flow chart which illustrates an example of the operation of the ID reading mode.

Referring to FIG. 40, the CPU 311 sets the signal RID to "1" in step S1. As a result, the address of each of the ROMa 147 and ROMb 121 is set to the uppermost address so that the ID previously stored in the foregoing address is read out.

Then, the CPU 311 reads the ROM1-ID in step S2, and it discriminates the ROM1-ID in step S3. If ROM1-ID≠"00", the flow proceeds to step S4. If ROM1-ID="00", the CPU 311 discriminates that the ROMa 147 or its peripheral circuit is out of order, resulting in stoppage of the operation of the apparatus.

If ROM1-ID≠"00", the CPU 311 again discriminates the ROM1-ID in step S4. If ROM1-ID≠"FF", the flow proceeds to step S5. If ROM1-ID="FF", the CPU 311 discriminates that the ROMa 147 or its peripheral circuit is out of order, resulting in stoppage of the operation of the apparatus.

If ROM1-ID≠"FF", the CPU 311 reads ROM2-ID in step S5, and then the ROM2-ID is discriminated in step S6. If ROM2-ID≠"00", the flow proceeds to step S7. If ROM2-ID="00", the CPU 311 discriminates that the ROMb 121 or its peripheral circuit is out of order, resulting in stoppage of the operation of the apparatus.

If ROM2-ID≠"00", the CPU 311 again discriminates the ROM2-ID in step S7. If ROM2-CD≠"FF", the flow proceeds to step S8. If ROM2-CD="FF", the CPU 311 discriminates that the ROMb 121 or its peripheral circuit is out of order, resulting in toppage of the operation of the apparatus.

If ROM2-ID≠"FF", the CPU 311 subjects the two IDs to a comparison in step S8. If ROM1-ID=ROM2-ID, the CPU 311 discriminates that the state is normal. If ROM1-ID≠ROM2-ID, the CPU 311 discriminates that the ROMa 147 or ROMb 121 or its peripheral circuit is out of order, resulting in stoppage of the operation of the apparatus.

Although the foregoing description and FIG. 40 shows the discrimination is made whether or not the proper ROMs are combined in accordance with whether or not the ROM1-ID and the ROM2-ID are the same, this embodiment is not limited to this. For example, arbitrary ROMs which have been previously registered may be combined. Furthermore, the number of the ROMs for discriminating the ID is not limited to the two, and therefore, an arbitrary number of ROMs may be employed if a plurality of ROMs are used.

As described above, according to this embodiment, the read original document image is examined. Furthermore, if the specific original document image is detected in the image, copying is inhibited.

According to this embodiment, assignment to the ROMb 121 is performed as follows: the most important original document is assigned to the address "18000" to "1FFFF", the secondary important original document is assigned to the address "00000" to "17FFF", and the residual original documents are assigned to the address "20000" to "37FFF". Therefore, for example, 8 types of specific original documents assigned to the address "18000" to the address "1FFFF" are discriminated at the time of forming each of the images of M, C, Y and K. Hence, the most reliable result of the discrimination can be obtained. As a result, copying of the specific original document can be prevented reliably. For example, 24 types of specific original documents assigned to the address "00000" to address "17FFF" are discriminated at the time of forming the M image at the first scanning and at the time of forming the Y image at the third scanning. If the presence of the specific original documents is detected at the time of forming the M or the Y image, the output image is painted over with black at the time of forming the K image so that copying of the specific original documents can be prevented. For example, 24 types of specific original documents stored in the address "20000" to address "37FFF" are discriminated at the time of forming the C image at the second scanning and at the time of forming the K image at the fourth scanning. If the presence of the specific original documents is detected at the time of forming the K image, the output image is painted over with black at the time of forming the K image so that copying of the specific original documents can be prevented.

Second Embodiment

A second embodiment of the present invention will now be described. In the second embodiment, substantially the same structures as those according to the first embodiment are given the same reference numerals and their descriptions are omitted here.

Figure 41:
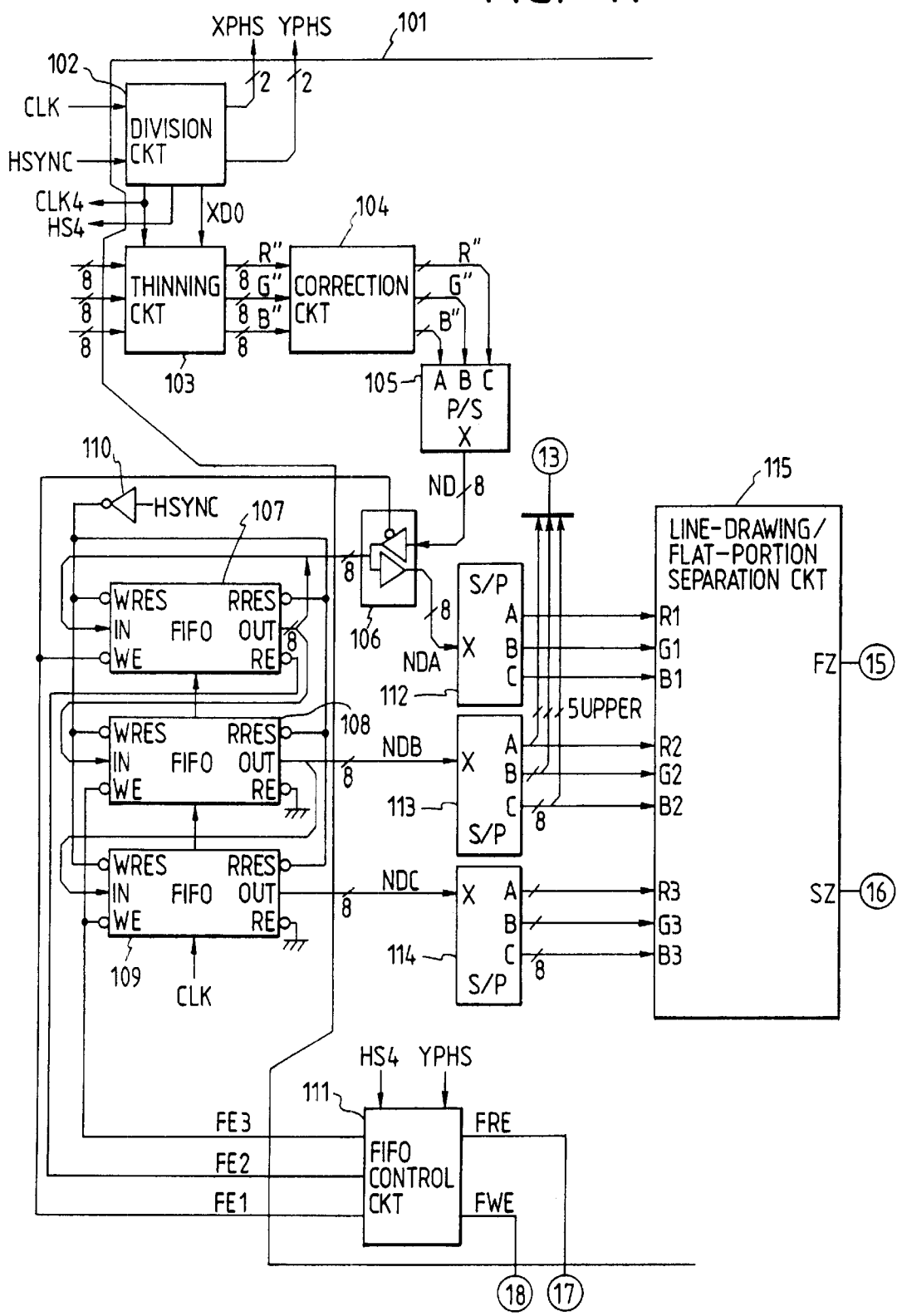
FIG. 41 is a block diagram showing a configurational example of discrimination circuit according to the second embodiment of the present invention.
Figure 42:
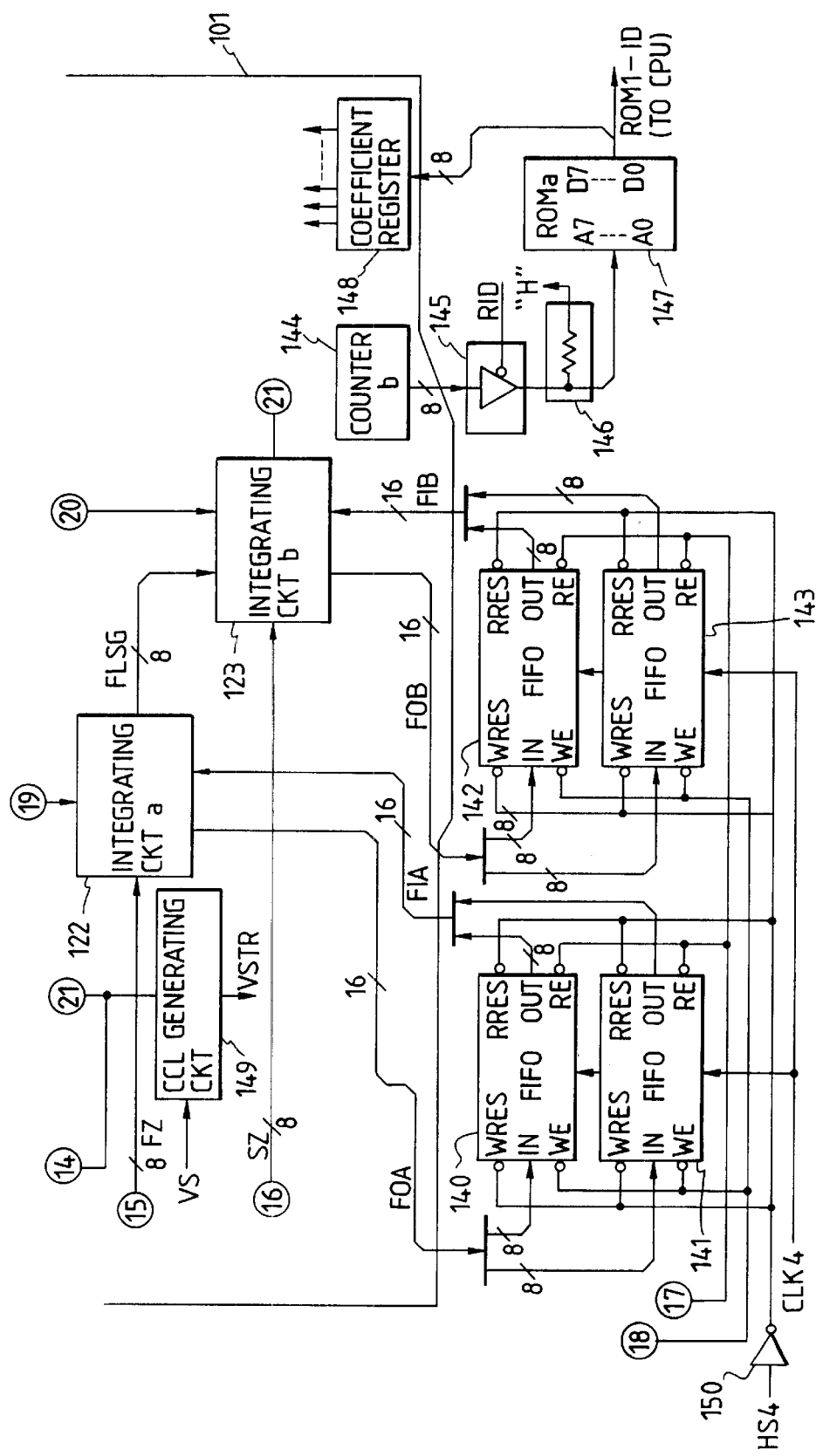
FIG. 42 is a block diagram showing another configurational example of discrimination circuit in the second embodiment.
Figure 43:
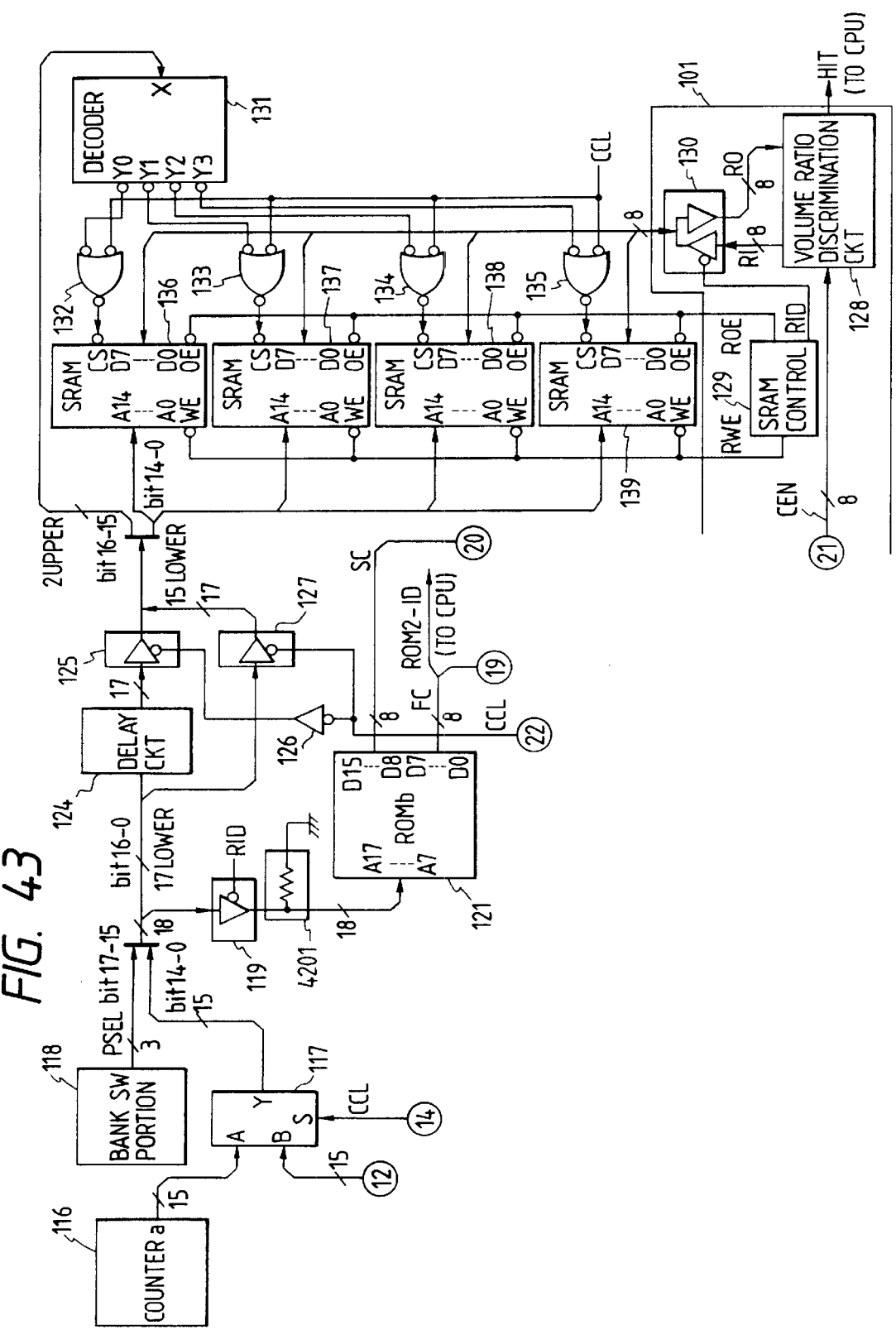
FIG. 43 is a block diagram showing another configurational example of discrimination circuit in the second embodiment.

FIGS. 41, 42 and 43 are block diagrams which illustrate an example of the structure of the discrimination circuit 309 according to this embodiment. FIG. 44 illustrates an example of information stored by the ROMb 121.

In the image processing mode, the signal RID is set to "0" by the CPU 311. The signal PSEL supplied from a bank switch portion 4202 is set to the two upper bits of the address signal of the ROMb 121, and outputs "R", "G" and "B" from the S/Ps 112 to 114 are set to the 15 lower bits of the address signal.

FIG. 45A is a block diagram which illustrates an example of the structure of the bank switch portion 4202. FIG. 45B is a timing chart which illustrates an example of the operation of the bank switch portion 4202.

Referring to FIG. 45A, reference numeral 4301 represents a NOR gate, and 4302 represents an OR gate.

The NOR gate 4301 receives a 2-bit signal YPHS to transmit the NOR of the both bits.

The OR gate 4302 receives the output from the NOR gate 4301 and the lower bit CNO (0) of the plane sequential signal CNO to transmit the their OR.

The bank switch portion 4202 transmits the signal PSEL in which bit 0 and bit 1 are made to be 2 bits of the signal YPHS and bit 2 made to be output from the AND gate 2102. Therefore, the signal PSEL repeats 4 and 1 to 3 in synchronization with the first transition of the signal HSYNC if the signal CNO (0) is "0". The signal PSEL repeats 4 to 7 in synchronization with the first transition of the signal HSYNC if the signal CNO (0) is "1".

Referring to FIG. 45B, the signal CNO (0) is "0", "1", "0" and "1" with respect to each of developed colors M, C, Y and K. Therefore, if the developed color is M and Y, the signal PSEL repeats 4 and 1 to 3 in synchronization with the first transition of the signal HSYNC. If the developed color is C and K, the signal PSEL repeats 4 to 7 in synchronization with the first transition of the signal HSYNC.

That is, the image processing mode of this embodiment has the arrangement that address "08000" to address "3FFFF" of the ROMb 121 shown in FIG. 44 are accessed in such a manner that address "08000" to address "27FFF" are accessed if the developed color is M and Y. If the developed color is C and K, address "20000" to address "37FFF" are accessed.

In this embodiment, for example, 8 types of specific original documents are discriminated simultaneously in the usual image processing mode. Furthermore, the type of the specific original document is changed over in accordance with each value of the signal PSEL. Therefore, this embodiment has an arrangement that the specific original document is sequentially changed over in units of, for example, four main scanning lines. Hence, for example, 32 types of specific original documents can be discriminated.

In this embodiment, the signal PSEL is changed over also in accordance with the developed color. Therefore, for example, 56 types of specific original documents can be discriminated although a partial overlap (from address "20000" to address "27FFF") occurs.

In the ID reading mode, the signal RID is set to "1" by the CPU 311. In this case, the output from the 3-state gate 119 is brought to high impedance. A pull-up resistor 4201 causes all of the address signals of the ROMb 121 to be "0". At this time, the ROMb 121 transmits data stored in address "00000" that is the lowermost address. The uppermost address of the ROMb 121 previously stores data, the 8 lower bits of which are the ID for the foregoing ROM, as shown in FIG. 44. The CPU 311 reads the foregoing data as ROM2-ID.

The ID for the ROM may be stored in any predetermined specific address even if it is not the uppermost or the lowermost address.

As described above, according to this embodiment, a substantially similar effect to that obtainable from the first embodiment can be obtained. The read original document image is examined, and copying is inhibited if the specific original document image is detected in the read image.

According to this embodiment, assignment to the ROMb 121 is performed as follows: the most important original document is assigned to the address "20000" to "27FFF", the secondary important original document is assigned to the address "08000" to "1FFFF", and the residual original documents are assigned to the address "28000" to "3FFFF". Therefore, for example, 8 types of specific original documents assigned to the address "20000" to the address "27FFF" are discriminated at the time of forming each of the images of M, C, Y and K. Hence, the most reliable result of the discrimination can be obtained. As a result, copying of the specific original document can be prevented reliably. For example, 24 types of specific original documents assigned to the address "08000" to address "1FFFF" are discriminated at the time of forming the M image at the first scanning and at the time of forming the Y image at the third scanning. If the presence of the specific original documents is detected at the time of forming the M or the Y image, the output image is painted over with black at the time of forming the K image so that copying of the specific original documents can be prevented. For example, 24 types of specific original documents stored in the address "28000" to address "3FFFF" are discriminated at the time of forming the C image at the second scanning and at the time of forming the K image at the fourth scanning. If the presence of the specific original documents is detected at the time of forming the K image, the output image is painted over with black at the time of forming the K image so that copying of the specific original documents can be prevented.

As described above, according to this embodiment of the present invention, there is provided an image forming apparatus for discriminating the similarity in accordance with the degree of significance of the specific original.

Third Embodiment

The schematic view of apparatus in this embodiment is the same as that of FIG. 1.

[Image Scanner Unit]

Figure 54:
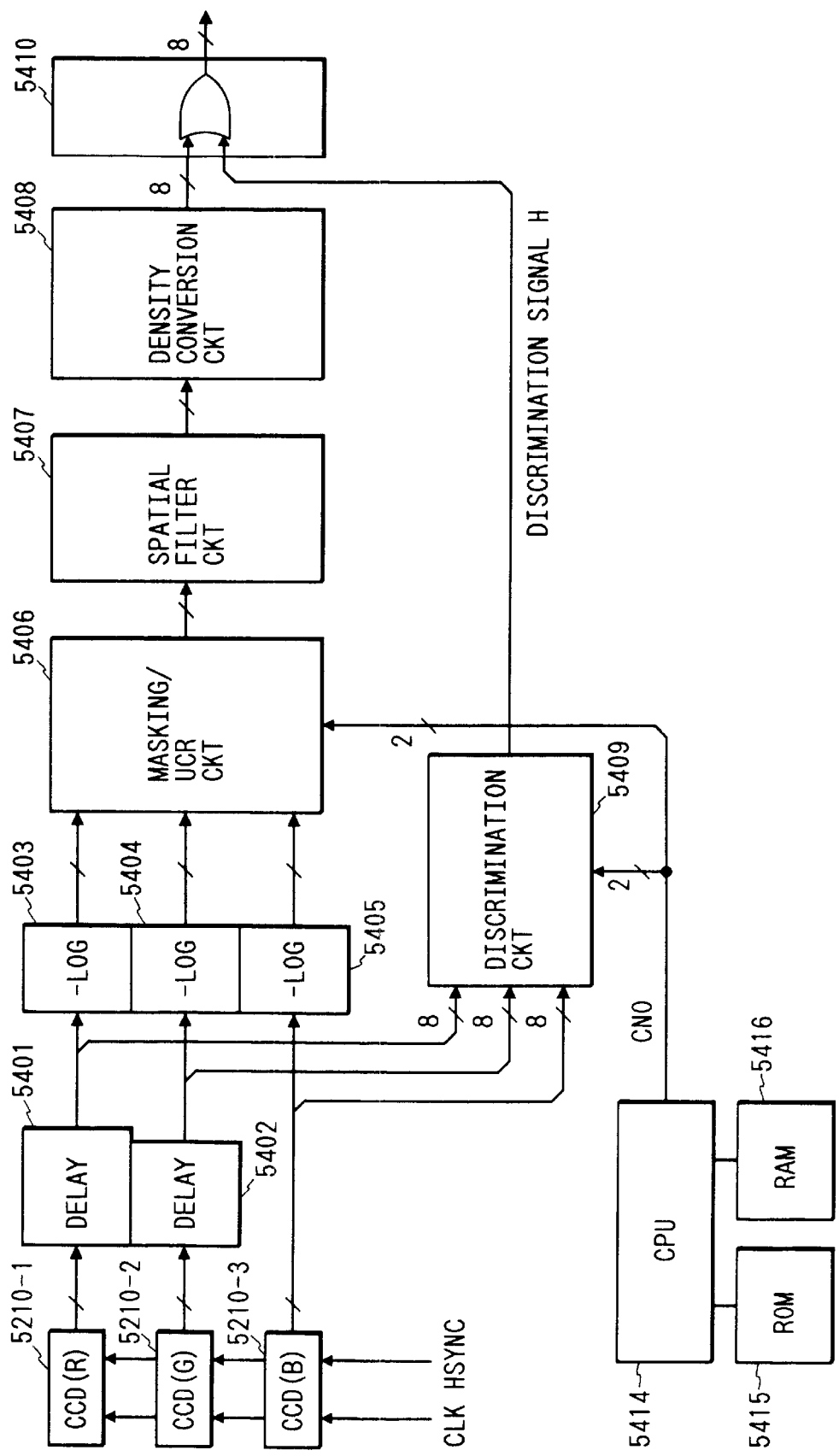
FIG. 54 is a block diagram showing the configuration of an image scanner unit 5201 in the third embodiment.

FIG. 54 is a block diagram which illustrates the configuration of an image scanner unit 5201 according to the third embodiment. In the same figure, reference numerals 5210-1, 5210-2 and 5210-3 represent CCD (solid state image pick-up devices) sensors having spectral sensitivity characteristics of red (R), green (G) and blue (B), respectively, each transmitting 8-bit signal of 0 to 255 after the A/D conversion.

Since the CCD sensors 5210-1, 5210-2 and 5210-3 according to this embodiment are disposed at predetermined intervals, delay elements 5401 and 5402 are arranged to correct for their spatial deviations.

Reference numerals 5403, 5404 and 5405 represent logarithmic converters formed into look-up tables of ROM or RAM for the conversion from brightness signal into density signal. Reference numeral 5406 represents a known masking/UCR (Under Color Removal) circuit. Although the detail description about it is omitted here, the masking/UCR circuit 5406 transmits magenta (M), cyan (C), yellow (Y) and black (Bk) signals in response to the supplied three signals at each reading operation, the M, C, Y and Bk signals being transmitted in a plane sequential manner while having a predetermined bit length, for example, 8 bits.

Reference numeral 5407 represents a known spatial filter circuit for correcting the spacial frequency of the output signal. Reference numeral 5408 represents a density conversion circuit for correcting the density characteristic of the printer 5202, the density conversion circuit 5408 being formed into a look-up table comprising a ROM or RAM, like the logarithmic converters 5403 to 5405.

Reference numeral 5414 represents a microcomputer for controlling this apparatus (hereinafter referred to as "CPU"), reference numeral 5415 represents a ROM for storing programs for operating the CPU 5414, and reference numeral 5416 represents a RAM for use as the work area for executing a variety of programs.

Figure 51:
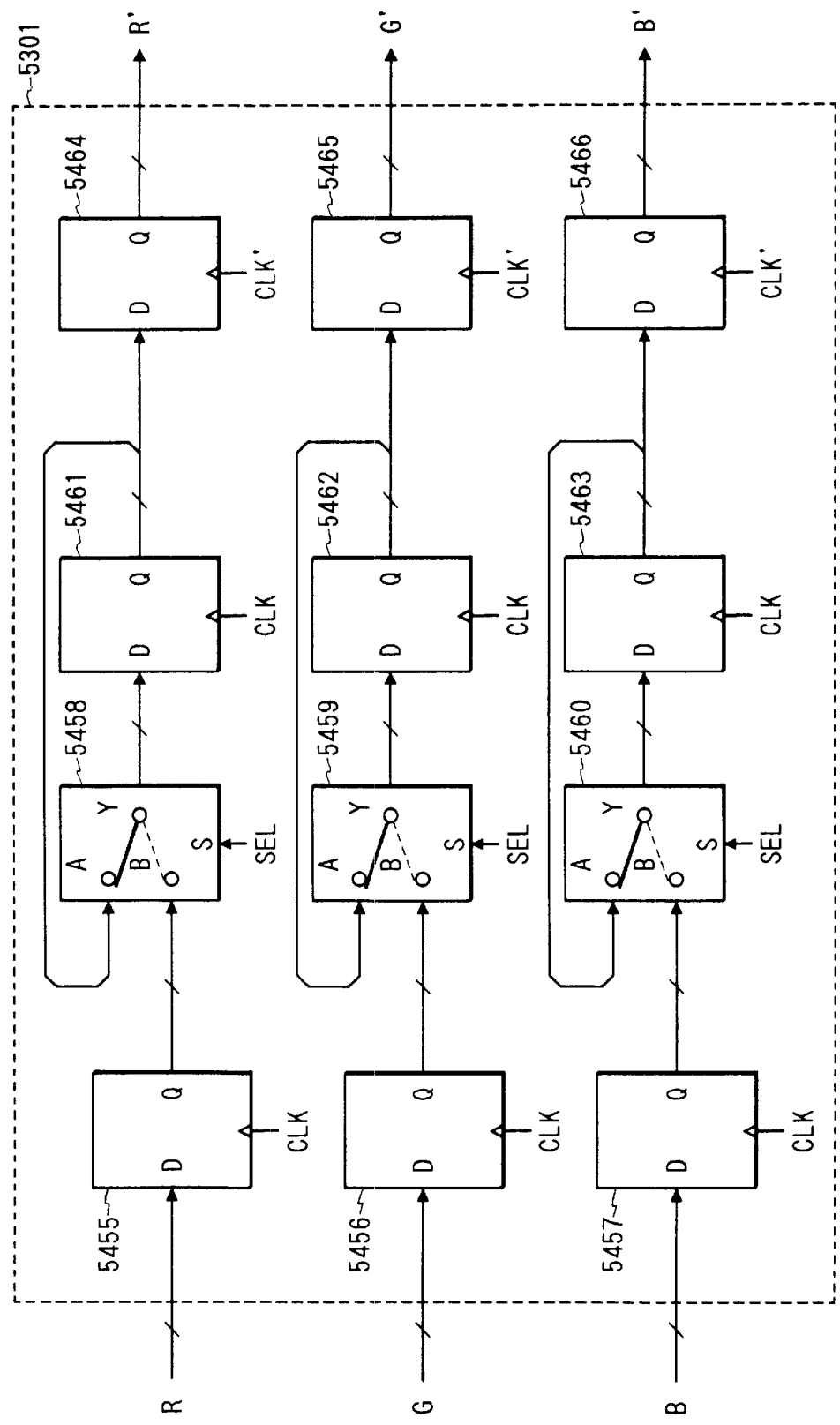
FIG. 51 is a circuit diagram showing the configuration of a thinning circuit in the third embodiment.
Figure 52:
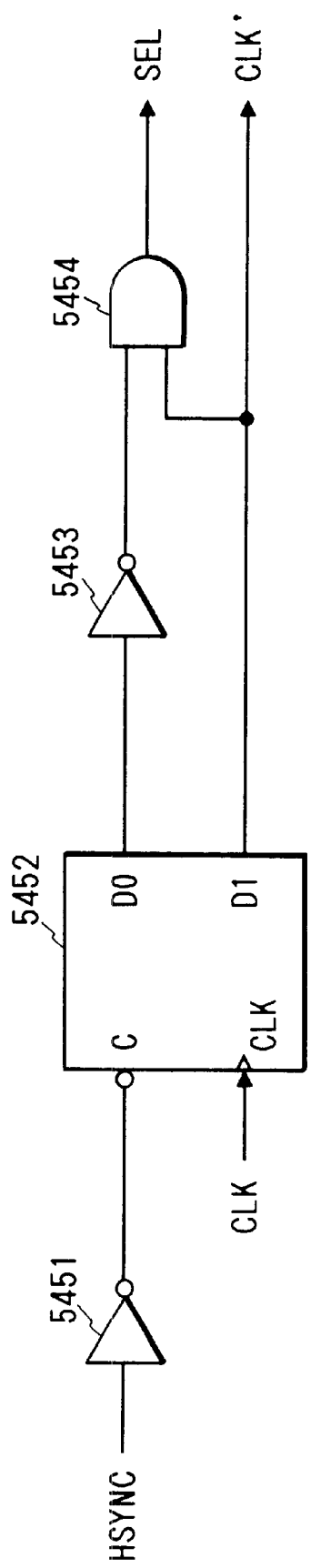
FIG. 52 is a circuit diagram showing the configuration of a division circuit 5310 in the third embodiment.

Reference numeral 5409 represents a discrimination circuit for discriminating a specific original document image by making a discrimination as to whether or not at least one of a plurality of different specific originals prepared within the same circuit is being read, so that the discrimination signal H is output which is equal to "0" or "1". That is, if at least one of a plurality of different specific originals is being read, H="1" is output, or otherwise H="0" is output. Also, the discrimination circuit 409, as will be described later, comprises a thinning circuit 5301 and a division circuit 5410 as shown in FIGS. 51 and 52, for effecting a thinning process of input R, G, B signals.

Figure 59:
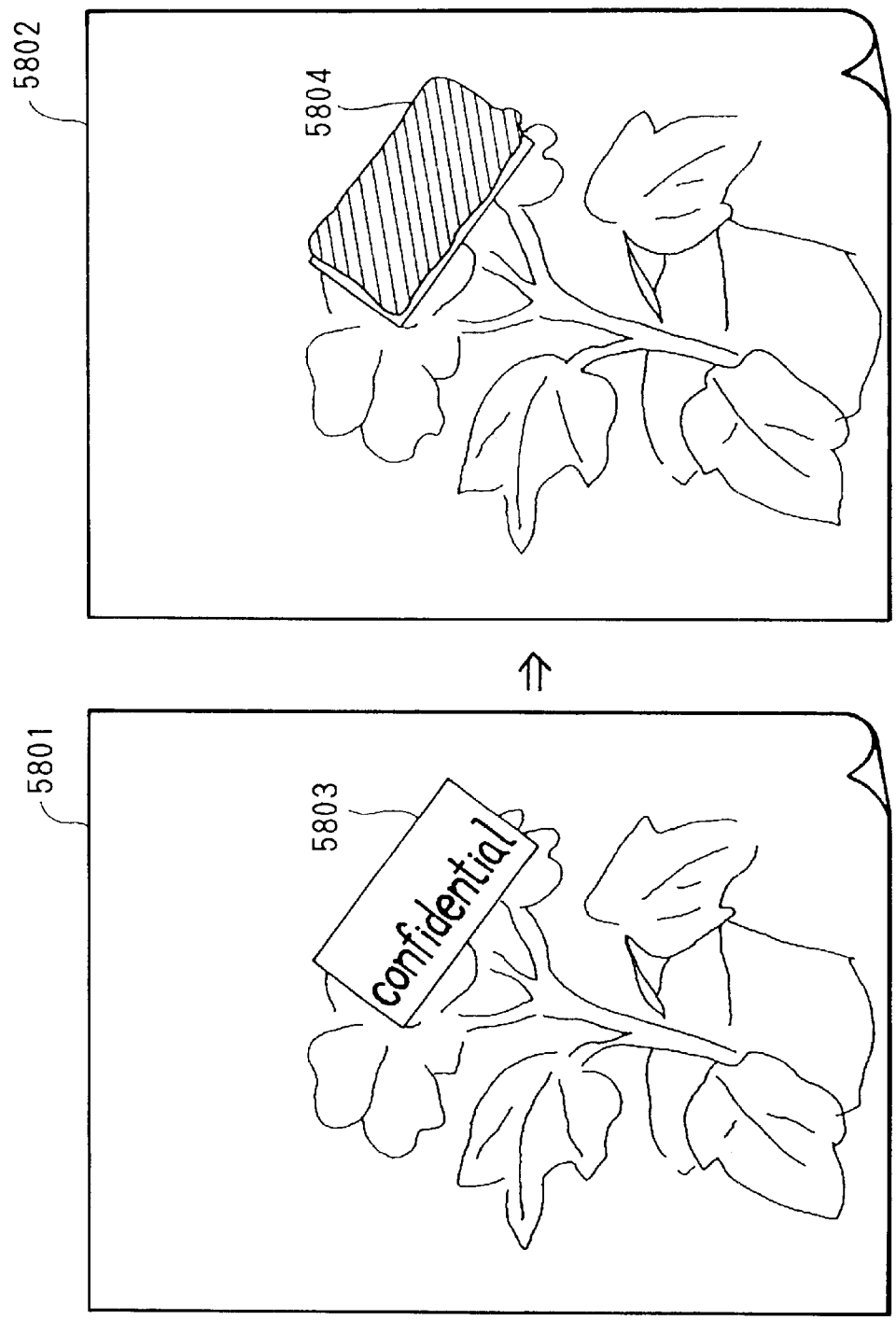
FIG. 59 is a view exemplifying copied results in the third embodiment.

Herein, CNO signal is a two-bit plane sequential signal, i.e., a control signal for controlling the sequential order of the four reading operations to effect the print with M, C, Y, Bk. In FIG. 59, the relation between the CNO signal and the print output in the third embodiment is shown.

The CNO signal is generated by the CPU 5414 to be input into a masking/UCR circuit 5406 to be used as the signal to switch the operation conditions of the same circuit 5406.

Further, the CNO signal is also input into the discrimination circuit 5409 for discriminating a different specific original document image by changing over the discriminating reference every time any of four reading operations as above described is performed.

Reference numeral 5410 represents an OR gate circuit for taking a logical OR between the 8-bit output V of density conversion circuit 5408 and the discrimination signal H which is an output from discrimination circuit 5409 to transmit V'.

As a result, when the discrimination signal H is equal to "1", that is, the specific original is determined to be being read, the output becomes V'=FF/Hex(255), irrespective of the value of input signal V, while when the discrimination signal H is equal to "0", that is, the specific original is determined not to be being read, the value of input signal V is directly output as the output signal V'.

[Timing Chart]

Figure 55:
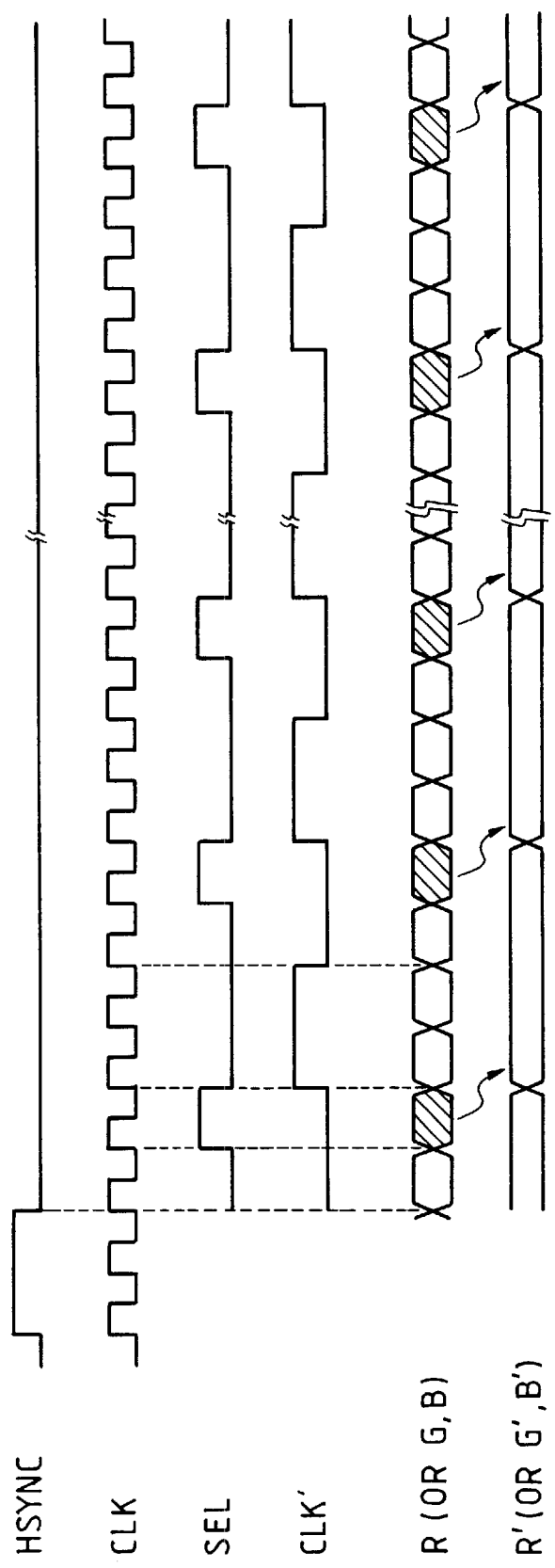
FIG. 55 is a timing chart of main scanning in the normal control mode of the third embodiment.

FIG. 51 is a circuit diagram showing the configuration of a thinning circuit according to the third embodiment, and FIG. 54 is a circuit diagram showing the configuration of a division circuit 5410 according to the third embodiment. FIG. 55 is a timing chart of the main scanning in the normal control mode of the third embodiment.

In FIG. 55, signal HSYNC is a main-scanning synchronizing signal so that the start of the main scanning is synchronized in this embodiment. Signal CLK is a transfer clock signal of image which is a basic clock for various image processings in this embodiment.

On the other hand, signal CLK' is a clock signal obtained by dividing the signal CLK into four sections, which serves as the basic clock in discrimination circuit 5409 as will be described later. SEL signal is a timing signal for use in thinning circuit 5301 as will be described later, which is generated in the division circuit 5410 as shown in FIG. 52. The division circuit 5410 is comprised of an inverter 5451, a two-bit counter 5452, an inverter 5453 and an AND gate 5454. The two-bit counter 5452, after being cleared (initialized) by the HSYNC signal which is a main scanning synchronizing signal, counts the CLK signal to transmit a count value of two bits (D0, D1). The upper bit D1 of the count value (D0, D1) is output as the CLK' signal, the logical sum between the inversion of the lower bit D0 and the upper bit D1 being output as the SEL signal.

The thinning circuit 5301 as shown in FIG. 51 is comprised of flip-flops 5455, 5456, 5457 and 5461, 5462, 5463 for holding data with the CLK signal, selectors 5458, 5459, 5460, and flip-flops 5464, 5465, 5466 for holding data with the CLK' signal.

Accordingly, the thinning circuit 5301 allows R (or G, B) transferred with the CLK signal to be thinned at a rate of ¼, and synchronized by the CLK' signal to provide R' (or G', B') signal, as shown in FIG. 55.

[Discrimination circuit]

Figure 48:
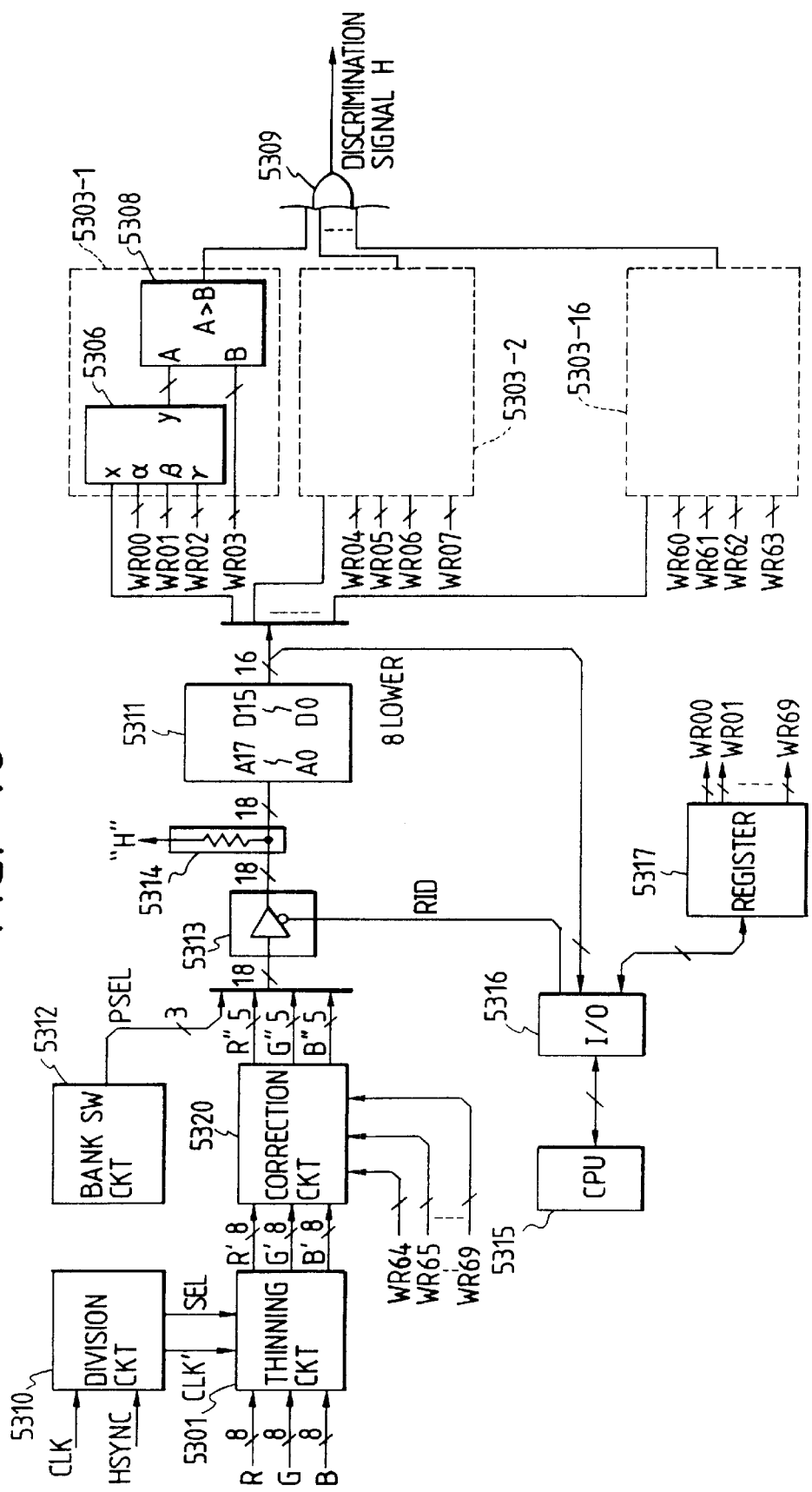
FIG. 48 is a block diagram showing the configuration of a discrimination circuit 5409 according to the third embodiment of the invention.

FIG. 48 is a block diagram showing the configuration of a discrimination circuit 5409 according to the third embodiment.

In the same figure, reference numeral 5301 represents a thinning circuit as shown in FIG. 51 for thinning out data to reduce the load of a processing circuit with the discrimination circuit 5409 to provide R', G', B' signals as thinned out from R, G, B signals. Reference numeral 5410 represents a division circuit for generating the CLK' signal and the SEL signal required for the thinning circuit 5301.

Reference numeral 5420 represents a correction circuit for image data, for correcting the gain/offset of input image composed of R', G', B' signals of each 8 bits to provide R", G", B" signals of each 5 bits having the characteristic corrected. Herein, WR64, WR65, ..., WR69 indicate constant set values in characteristic correction conditions.

Figure 49:
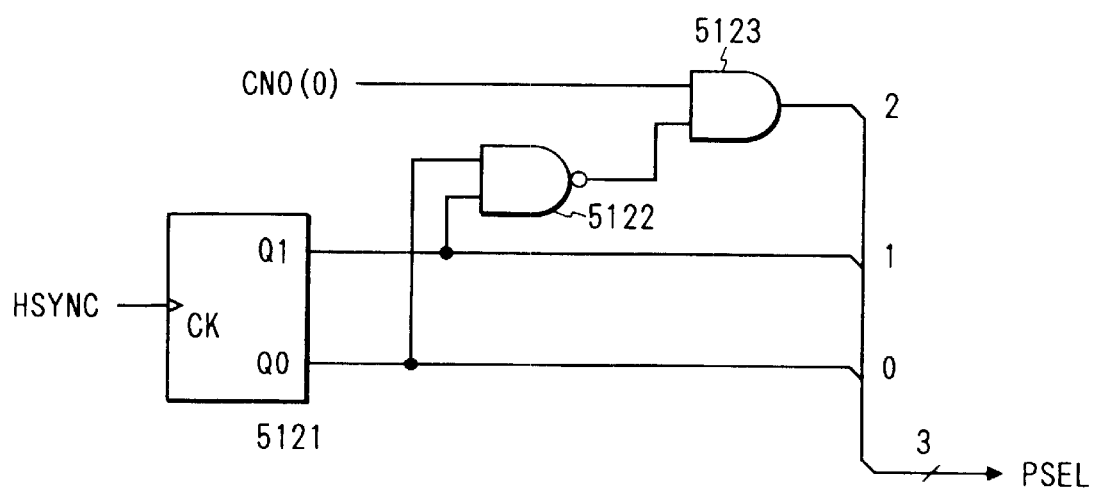
FIG. 49 is a block diagram showing the configuration of a bank switch circuit 5412 in the third embodiment.

Reference numeral 5311 represents a color tint matching ROM (e.g., M5M27C402K made by Mitsubishi Electric) for storing a discrimination result of the color tint of a subject pixel obtained by its comparison with the color tint distribution pre-examined for a plurality of kinds of specific original. Further, reference numeral 5312 represents a bank switch circuit as shown in FIG. 49 for controlling the upper address of ROM 5311.

Reference numeral 5313 represents a tri-state gate, with its output being pulled up to high level "H" by a pull-up resistor 5314. It is controlled by a control signal RID signal.

That is, if the RID signal is "0", the ROM 5311 has R" signal, G" signal and B" signal composed of each 5 bits at the lower 15 bits of the address, and a bank switch signal PSEL at the upper 3 bits of the address, while if the RID signal is "1", all the address of ROM 311 is "1".

Reference numerals 5303-1, 5303-2, ..., 5303-32 represent sixteen color tint discrimination circuits each comprised of the same hardware, including an integrator 5306 and a comparator 5308, for making a discrimination as to whether or not any specific original resides within the original. WR00 to WR63 are constants α, β, γ of each integrator 5306 within the color tint discrimination circuits 5303-1 to 5303-16 and set values of the comparator 5308.

Reference numeral 5309 represents a logical OR circuit, wherein if the presence of specific original is discriminated in at least one or more outputs from the color tint discrimination circuits 5303-1, 5303-2, ..., 5303-32, the value "1" is output as the discrimination signal H.

On the other hand, reference numeral 5315 represents a CPU for controlling this discrimination circuit 5409, and reference numeral 5316 represents an I/O circuit which is controlled by the CPU 5315, wherein the RID signal for the control of tri-state gate 5313, the constants WR00 to WR63 of the color tint discrimination circuits 5303-1 to 5303-16, and the constants WR64 to WR69 of the correction circuit 5420 are set to respective desired values by the CPU 5315.

Note that reference numeral 5317 represents a register for carrying the value of constant WR00 to WR69 which are set via the I/O circuit 5316 by the CPU 5316.

[Image Processing Mode and ID Reading Mode]

The third embodiment is provided with two modes of image processing mode and ID reading mode. In the former image processing mode, this apparatus performs the normal image processing, and ROM 5311 is used as a table for discriminating the presence of specific original. In the latter ID reading mode, the ROM ID which is preheld at the uppermost address of the ROM 5311 is read out. The control of the ROM in each mode is performed by the RID signal and the PSEL signal.

FIG. 66 illustrates the holding content held at each address of the ROM 5311 and its access condition.

First, in the image processing mode, the RID signal from the I/O circuit 5316 is set to "0" by the CPU 5315, with a PSEL signal supplied from the bank switch circuit 5312 input into the upper two bits of the address of ROM 5311, and the outputs R", G" and B" from the correction circuit input into the lower 15 bits of the address.

FIG. 49 is a block diagram showing the configuration of bank switch circuit 5312 according to the third embodiment. In the same figure, 5121 is a 2-bit counter which counts up at the timing of the first transition of the HSYNC signal, resulting in its output being the lower two bits of PSEL signal. 5122 is a NAND gate, to which the two-bit output from the counter 5121 is input. 5123 is an AND gate to which the lower 1 bit CNO (0) of two-bit plane sequential signal CNO as previously described and the output of the NAND gate 5122 are input, resulting in its output being the upper one bit of the PSEL signal.

Therefore, the signal PSEL repeats "0", "1", "2" and "3" in synchronization with the first transition of the signal HSYNC if the signal CNO (0) is "0", while the signal PSEL repeats "4", "5", "6" and "3" in synchronization with the first transition of the signal HSYNC if the signal CNO (0) is "1".

Figure 56:
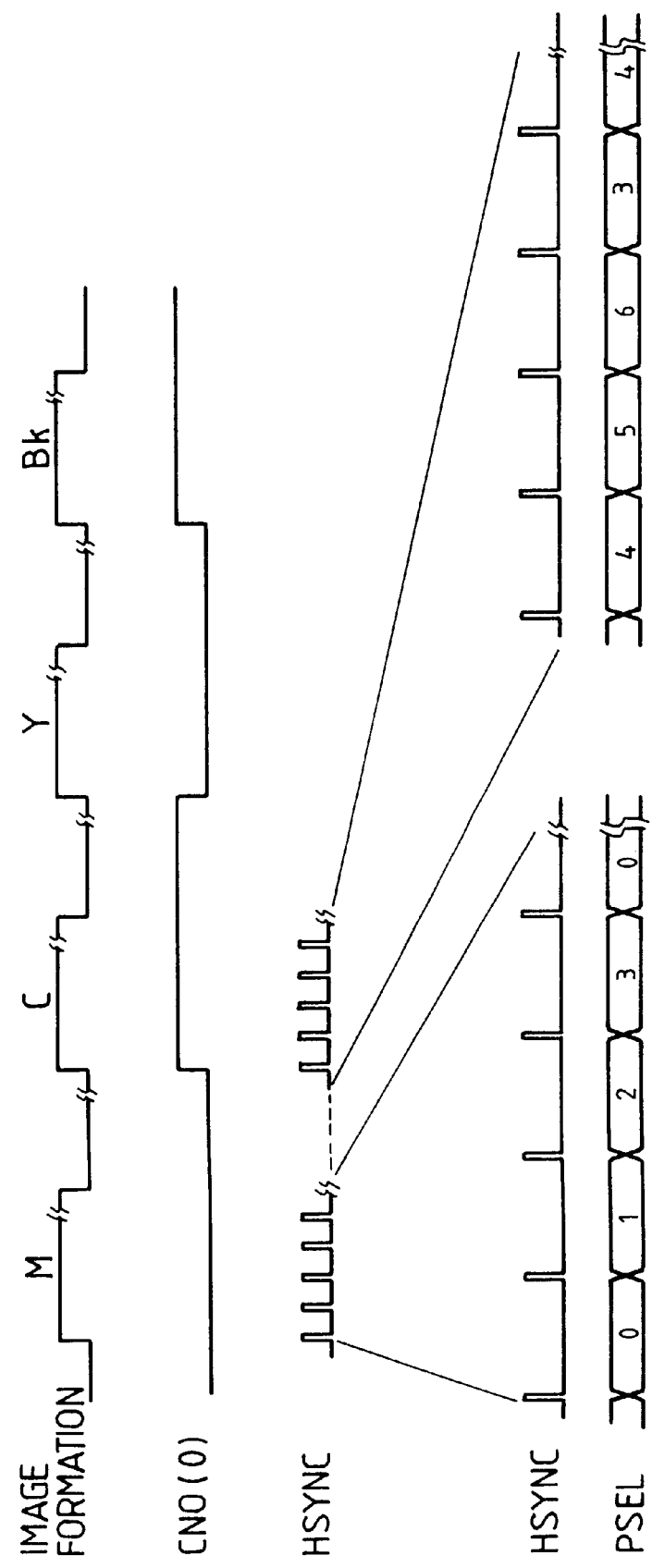
FIG. 56 is a timing chart for the bank switch circuit 5312 in the third embodiment.

FIG. 56 is a timing chart in the bank switch circuit 5312 according to the third embodiment.

First, the signal CNO (0) is "0", "1", "0" and "1" with respect to each of developed colors M, C, Y and Bk. Therefore, if the developed color is M and Y, the signal PSEL repeats "0", "1", "2" and "3" in synchronization with the first transition of the signal HSYNC. If the developed color is C and Bk, the signal PSEL repeats "4", "5", "6" and "3" in synchronization with the first transition of the signal HSYNC.

That is, the image processing mode has the arrangement that address "00000" to address "37FFF" of the ROM 5311 as shown in FIG. 66 are accessed in such a manner that address "00000" to address "1FFFF" are accessed if the developed color is M and Y. If the developed color is C and Bk, address "18000" to address "37FFF" are accessed.

Note that in the image processing mode, 16 types of different specific original documents are discriminated simultaneously, and the type of the specific original document used for the discrimination is changed over in accordance with each value of the signal PSEL. Further, the PSEL signal is changed over also in accordance with the developed color, and 112 types of specific original documents in total can be discriminated, even though a partial overlap (address "18000" to address "1FFFF") occurs.

On the other hand, in the ID reading mode, the signal RID is set to "1" via the I/O circuit 5316 by the CPU 5315 in FIG. 3. In this case, the output from the tri-state gate 5313 is brought to high impedance. A pull-up resistor 5314 causes all of the address signals of the ROM 5311 to be "0", resulting in the data output from the ROM 5311 being the content held at the uppermost address "3FFFF". The uppermost address of the ROM 5311 previously stores data, the 8 lower bits, of which are the ID for the ROM, and read via the I/O circuit 5316 into the CPU 5315.

Although the ID is an 8-bit code, it is stored at the address except for "00/HEX" and "FF/HEX". The reason for this is that, if the ROM 5311 is intentionally removed, or out of order, or exchanged to inappropriate ROM, there is a good possibility that the address is "00/HEX" in which all of the 8 bits are "0" or "FF/HEX" in which all of the 8 bits are "1".

The arrangement is characterized in that the address "00000" to address "37FFF" of the ROM 5311 are accessed in the image processing mode, and the address "37FFF" is accessed in the ID reading mode to perform control while preventing an overlap.

[ID Reading Operation]

Figure 60:
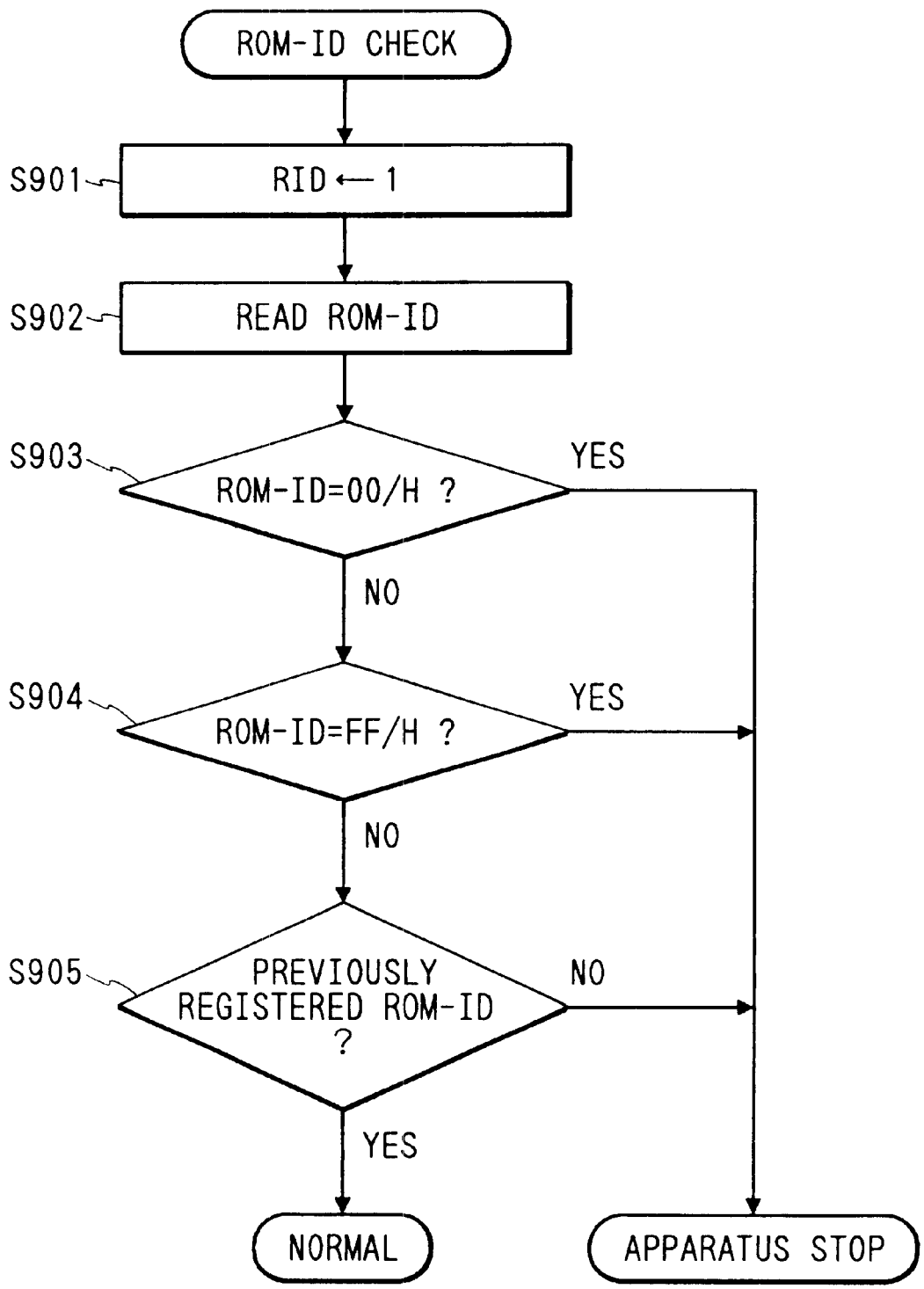
FIG. 60 is a flow chart of ID reading mode in the third embodiment.

FIG. 60 is a flowchart in the ID reading mode according to the third embodiment.

First, at step S901, the signal RID is set to "1". Then, the address of the ROM 311 is set at the uppermost address "37FFF", as previously described, and at step S902, the ID (hereinafter referred to as "ROM-ID") prestored at the address is read.

At step S903, if the ROM-ID is "00/H", it is determined that the ROM 311 or its peripheral circuit is unmounted or out of order, or has been maliciously modified, and the operation of the apparatus is stopped. Likewise, if the ROM-ID is "FF/R" at step S904, and further if the ROM-ID is not preregistered at step S905, it is determined that the ROM 5311 or its peripheral circuit is unmounted or not of order, or has been maliciously modified, the operation of the apparatus is stopped.

[Image Data Correction Circuit]

FIG. 50 is a block diagram illustrating the configuration of an image data correction circuit 5420 according to the third embodiment.

The typical image reading apparatus has the value of white/black level of image signal determined intrinsic to the apparatus, but the image data correction circuit 5420 corrects its intrinsic characteristic to obtain the same characteristic by subjecting the input image signal R', G', B' to the gain/offset correction with the linear calculation to output R", G", B" signal.

Reference numeral 5321 represents a multiplier for gain correction to transmit A×B/32 for the inputs A, B, and reference numeral 5323 represents an adder for offset correction to transmit A+B for the inputs A, B, WR64 being input as the gain correction value Gr, and WR65 being as the offset correction value Or. The adder 323 transmits a result of addition R'x Gr/32+Or. It should be noted that Gr is preset to a desired value ranging from 0 to 63, and Or is preset to a desired value ranging from −32 to +31.

Reference numeral 5325 represents a limiter circuit for controlling the input having the corrected result of gain and offset that is larger than 255, to be 255 an d controls the input having the corrected result of gain and offset that is negative, to be 0.

Further, the limiter circuit 5325 limits the output of 8 bits to the upper 5 bits to be output as the R" signal.

Likewise, reference numeral 5326 represents a multiplier for gain correction to transmit a result of multiplication of A×B/32 for the inputs A, B, and reference numeral 5328 represents an adder for offset correction to transmit A+B for the inputs A, B, WR66 being input as the gain correction value Gg, and WR67 being input as the offset correction value Og. The adder 5328 transmits a result of addition G'×Gg/32 +Og. It should be noted that Gg is preset to a desired value ranging from 0 to 63, and Og is preset to a desired value ranging from −32 to +31.

Reference numeral 5330 represents a limiter circuit for controlling the input having the corrected result of gain and offset that is larger than 255, to be 255 and controls the input having the corrected result of gain and offset that is negative, to be 0.

Further, the limiter circuit 5330 limits the output of 8 bits to the upper 5 bits to be output as the G" signal.

Likewise, reference numeral 5331 represents a multiplier for gain correction to transmit a result of multiplication of A×B/32 for the inputs A, B, and reference numeral 5333 represents an adder for offset correction to transmit A+B for the inputs A, B, WR68 being input as the gain correction value Gb, and WR69 being input as the offset correction value Ob. The adder 5333 transmits a result of addition B'×Gb/32 +Ob. It should be noted that Gb is preset to a desired value ranging from 0 to 63, and Ob is preset to a desired value ranging from −32 to +31.

Reference numeral 5335 represents a limiter circuit for controlling the input having the corrected result of gain and offset that is larger than 255, to be 255 and controls the input having the corrected result of gain and offset that is negative, to be 0.

Further, the limiter circuit 5335 limits the output of 8 bits to the upper 5 bits to be output as the B" signal.

[Integrator]

Figure 53:
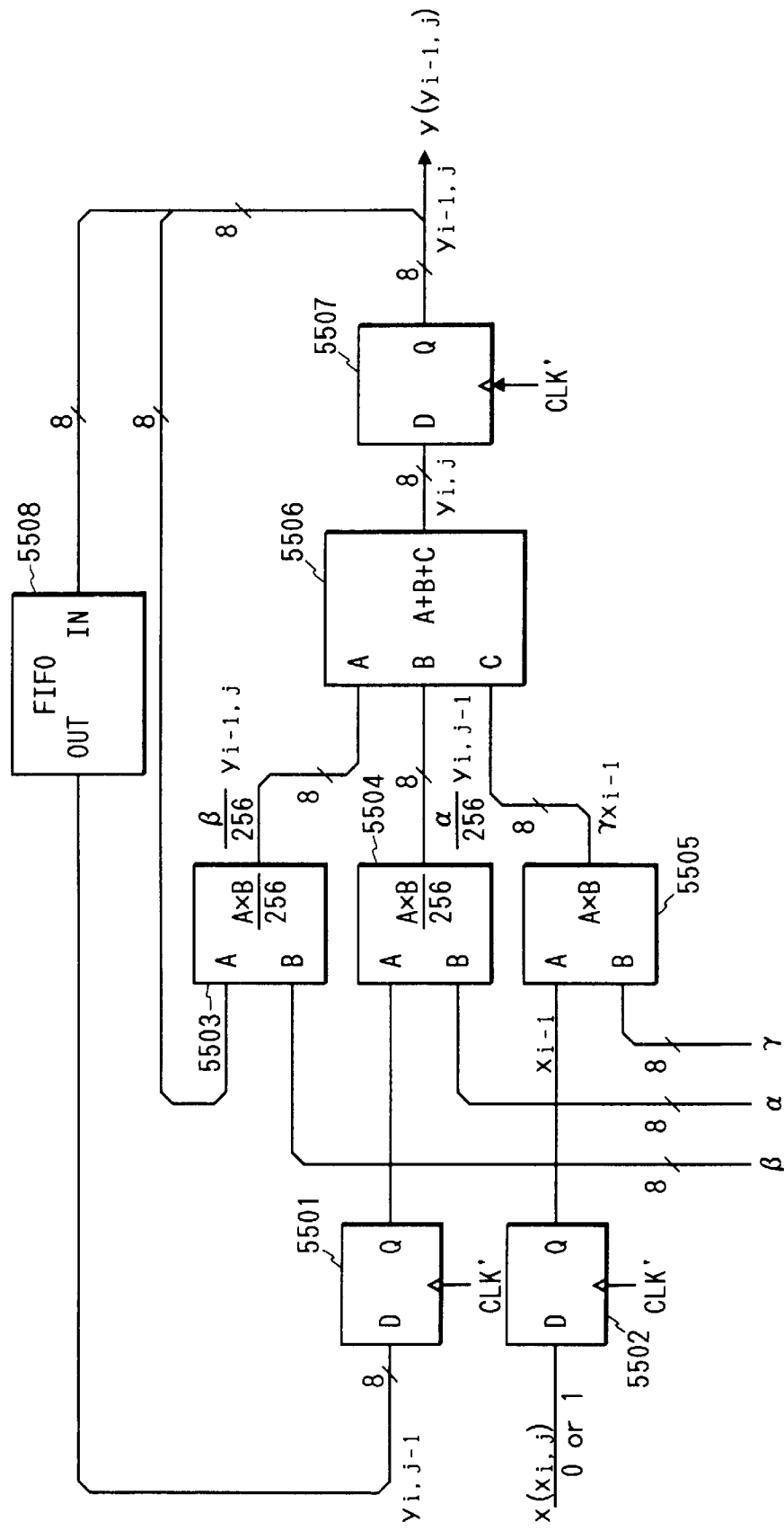
FIG. 53 is a block diagram showing the configuration of an integrator 5306 in the third embodiment.

FIG. 53 is a block diagram illustrating the configuration of an integrator 5306 according to the third embodiment. The integrator 5306 integrates discrimination results $x(x_{i,j})$ (i denotes the main scanning position after thinning to ¼ has been performed, and j denotes the sub-scanning position in units of four lines) of the discrimination circuit 5410 in two-dimension to remove the noise contained in the discrimination results to transmit $y(y_{i,j})$.

Reference numerals 5501, 5502 and 5507 represent flip-flops for holding data at the timing of the first transition of the CLK' signal. Reference numerals 5503, 5504 represent multipliers for transmitting the product (A×B/256) of 8 bits for the input of two signals (A, B) of 8 bits. Also, reference numeral 5505 represents a multiplier for transmitting the product of (A×B) of 8 bits for the input of one-bit signal (A) and 8-bit signal (B).

Reference numeral 5506 represents an adder for transmitting the sum (A+B) of 8 bits for the input of two signals (A, B) of 8 bits. Reference numeral 5508 represents an FIFO (First in First Output) memory, for example, M66251 manufactured by Mitsubishi Electric Co., for delaying the signal by 4n−1 pixels when the effective number of pixels in one line is n pixels, and transmitting $y_{i,j-1}$ when $y_{i-1,j}$ is input.

As a result, in this integrator, the 8-bit output signal $y_{i,j-1}$ for the two-valued input signal $X_{i,j}$ is expressed by the following expression (1) to operate as the two-dimensional IIR (Infinite Impulse Response) filter.

$$Y_{i,j}=(\alpha/256)y_{i-1,j}+(\beta/256)y_{i,j-1}+\gamma x_{i-1,j} \tag{3}$$

Where α, β and γ are preset constants, which determine various characteristics of the integrator.

Figure 57:
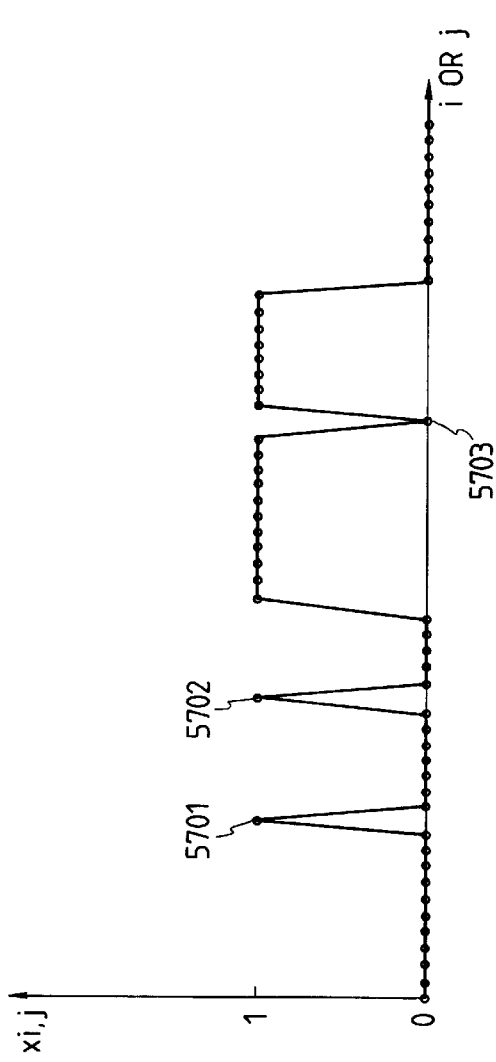
FIG. 57 is a chart showing an example of the input/output of the integrator in the third embodiment.
Figure 58:
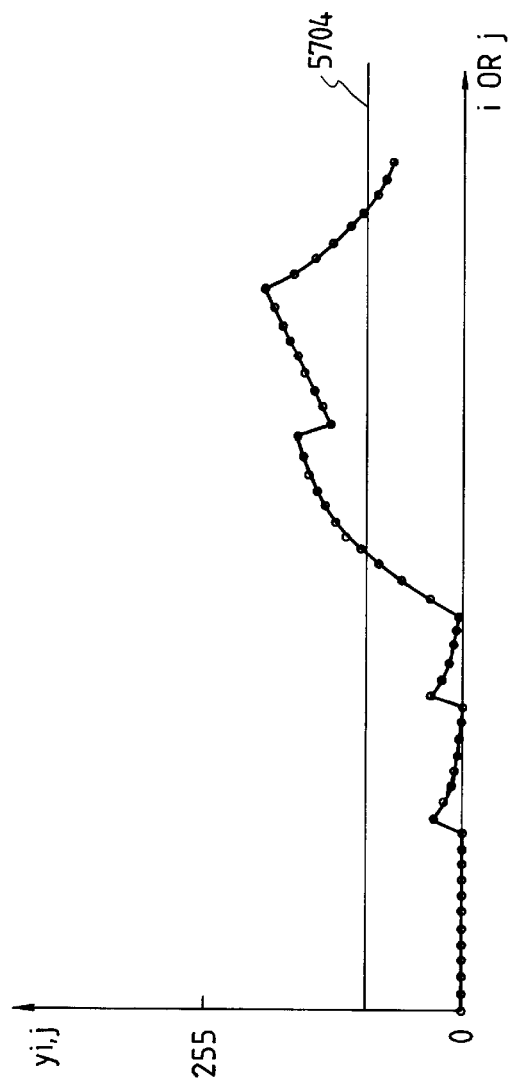
FIG. 58 is a chart showing another example of the input/output of the integrator in the third embodiment.

For example, in the case of α=124, β=124 and γ=8, an example of the input/output of this integrator is illustrated in FIGS. 57 and 58. That is, for the input $x_{i,j}$ as illustrated in FIG. 57, the output $y_{i,j}$ as illustrated in FIG. 58 is transmitted. Herein, the transverse line is i (main scanning position) or j (sub-scanning position), wherein the same characteristic is indicated in either cross section in the main scanning or sub-scanning direction.

Herein, the input of "1" surrounded by substantial "0" such as points indicated by 5701, 5702, and the input of "0" surrounded by substantial "1" such as a point indicated by 5703 are considered as the noise.

The noise can be removed in such a manner as to process the noise with the integrator, set an appropriate threshold indicated by 5704 to a register 5317 of FIG. 48, and binary-coding the output $y_i$ from the integrator with the threshold.

[Copied Result]

FIG. 59 is a view illustrating an example of the copied result according to the third embodiment. In the same figure, 5801 is an original having a specific original 5803 to be discriminated on this apparatus in a part of the image. The output result of the original when copied by this apparatus is represented by 5802. The portion corresponding to the specific original 5803 is painted over as indicated by 5804, so that the portion of the specific original 5803 can not be copied normally.

Fourth Embodiment

The fourth embodiment will be described below. In the fourth embodiment, substantially the same whole configuration as that of the first embodiment is given, and different portions from those of the third embodiment are only described.

Figure 61:
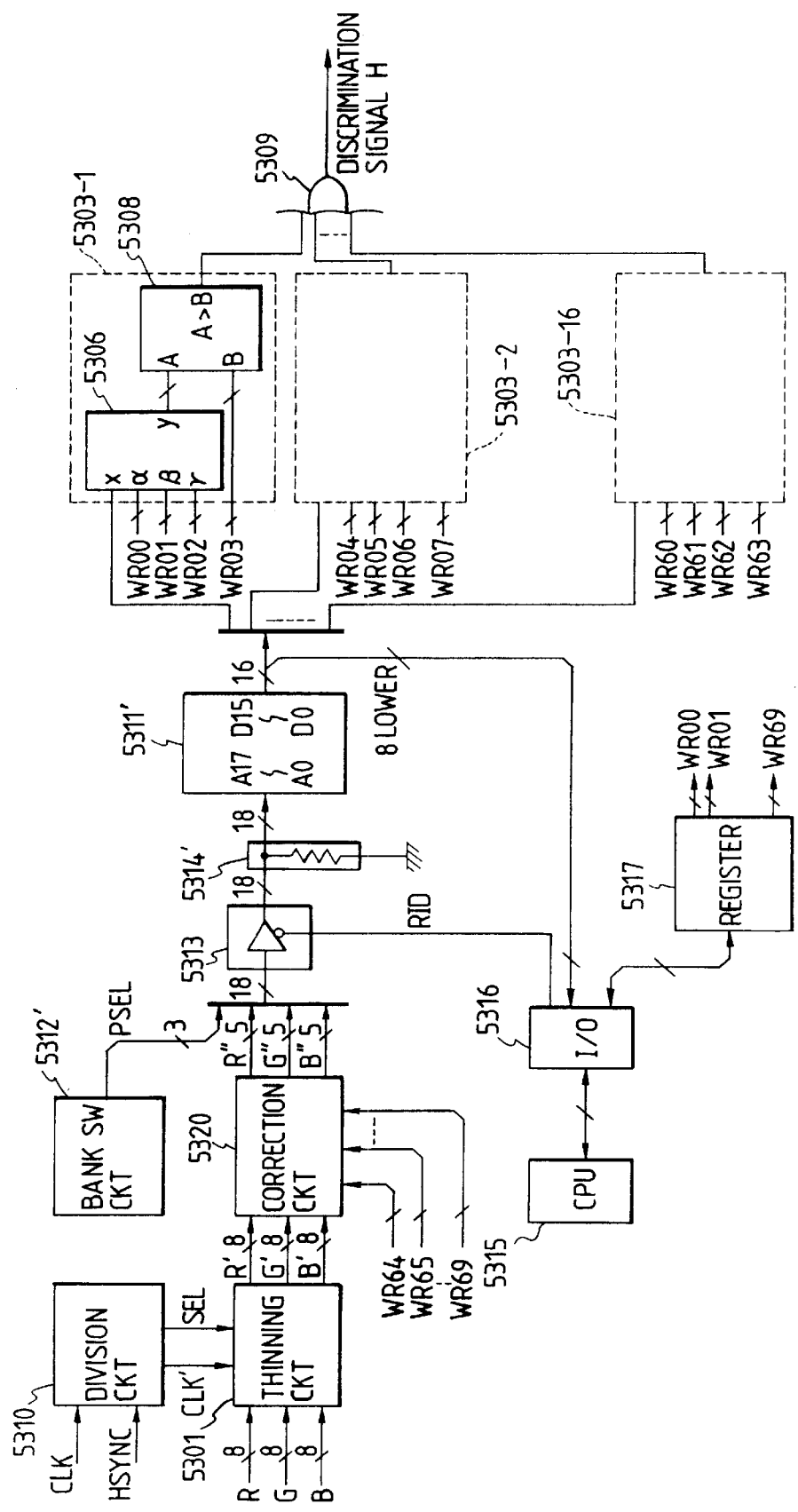
FIG. 61 is a block diagram showing the configuration of a discrimination circuit according to the fourth embodiment of the present invention.

FIG. 61 is a block diagram illustrating the configuration of a discrimination circuit according to the fourth embodiment of the present invention.

The portions common to those of FIG. 48 are given the same reference numerals and their description is omitted here.

FIG. 67 illustrates the holding content held at each address of the ROM 5311' corresponding to the ROM 5311 of the fourth embodiment, as well as its access condition.

First, in the image processing mode, the RID signal from the I/O circuit 5316 is set to "0" by the CPU 5315, with a PSEL signal supplied from the bank switch circuit 5312', corresponding to the bank switch circuit 5312 according to the third embodiment, input into two bits at the uppermost address of ROM 5311, and the outputs R", G" and B" from the correction circuit input into 15 bits at the lowermost address.

Figure 62:
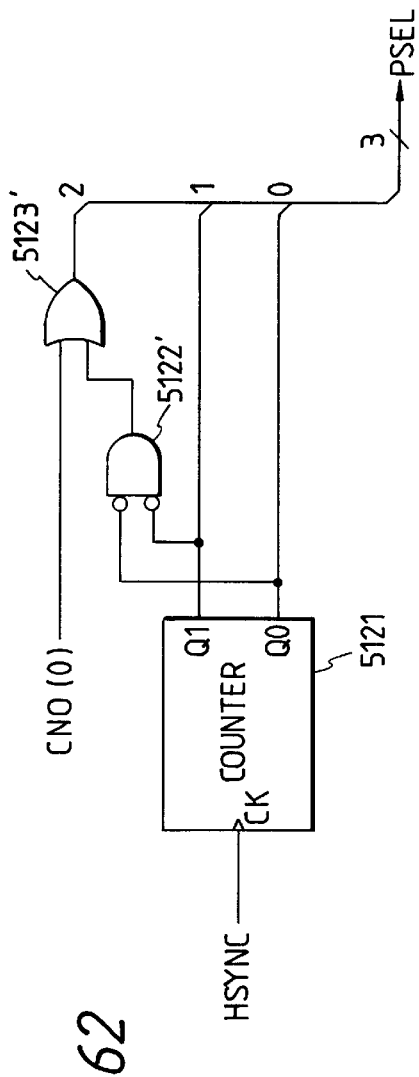
FIG. 62 is a block diagram showing the configuration of a bank switch circuit 5312' in the fourth embodiment.

FIG. 62 is a block diagram illustrating the configuration of the bank switch circuit 5312' according to the fourth embodiment. In the same figure, 5121 is a 2-bit counter which counts up at the timing of the first transition of the HSYNC signal, resulting in its output being two bits at the lowermost address of the PSEL signal. 5122' is a NOR gate, to which the two-bit output from the counter 5121 is input. 5123' is an OR gate to which the 1-bit CNO (0) at the lower address of the two-bit plane sequential signal CNO and the output of the NOR gate 5122' are input, resulting in its output being one bit at the uppermost address of the PSEL signal.

Therefore, the signal PSEL repeats "4", "1", "2" and "3" in synchronization with the first transition of the signal HSYNC if the signal CNO (0) is "0", while the signal PSEL repeats "4", "5", "6" and "7" in synchronization with the first transition of the signal HSYNC if the signal CNO (0) is "1".

Figure 63:
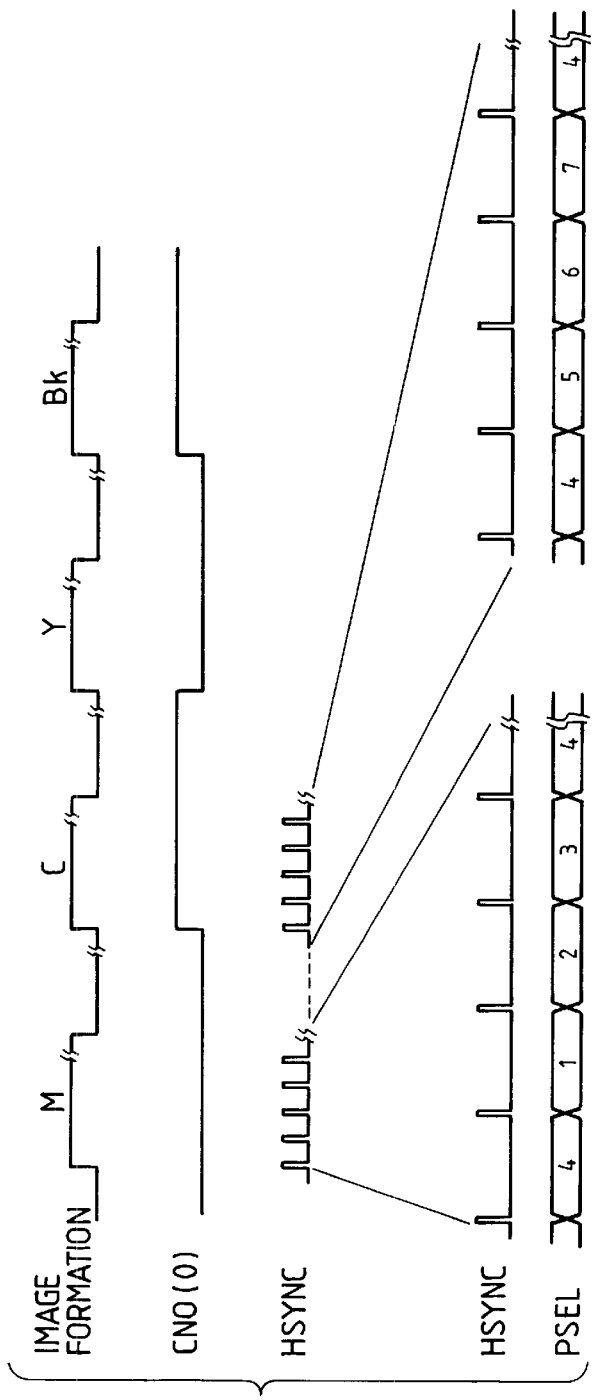
FIG. 63 is a timing chart of the bank switch circuit 5312' in the fourth embodiment.

FIG. 63 is a timing chart in the bank switch circuit 5312' according to the fourth embodiment.

First, the signal CNO (0) is "0", "1", "0" and "1" with respect to each of developed colors M, C, Y and Bk. Therefore, if the developed color is M and Y, the signal PSEL repeats "4", "1", "2" and "3" in synchronization with the first transition of the signal HSYNC. If the developed color is C and Bk, the signal PSEL repeats "4", "15", "6" and "7" in synchronization with the first transition of the signal HSYNC.

That is, the image processing mode has the arrangement that address "08000" to address "3FFFF" of the ROM 5311' as shown in FIG. 67 are accessed in such a manner that address "08000" to address "27FFF" are accessed if the developed color is M and Y. If the developed color is C and Bk, address "20000" to address "3FFFF" are accessed.

Note that in the image processing mode, 16 types of different specific original documents are discriminated simultaneously, and the type of the specific original document used for the discrimination is changed over in accordance with each value of the signal PSEL. Further, it is changed over sequentially in units of the four main scanning lines, and 64 types of specific original documents in total can be discriminated. Further, the PSEL signal is changed over also in accordance with the developed color, and 112 types of specific originals in total can be discriminated, even though a partial overlap (address "20000" to address "27FFF") occurs.

On the other hand, in the ID reading mode, the signal RID is set to "1" via the I/O circuit 5316 by the CPU 5315 in FIG. 61. In this case, the output from the tri-state gate 5313 is brought to high impedance. A pull-down resistor 5314' causes all of the address signals of the ROM 5311' to be "0", resulting in the data output from the ROM 5311' being the content held at the lowermost address "00000". The lowermost address of the ROM 5311 previously stores data, the 8 lower bits of which are the ID for the ROM, and read via the I/O circuit 5316 into the CPU 5315.

Note that the ROM ID may be stored at any of the addresses, without regard to the uppermost address or the lowermost address.

Fifth Embodiment

The fifth embodiment will be described below. In the fifth embodiment, substantially the same whole configuration as that of the first embodiment is given, and different portions from those of the third embodiment are only described.

Figure 64:
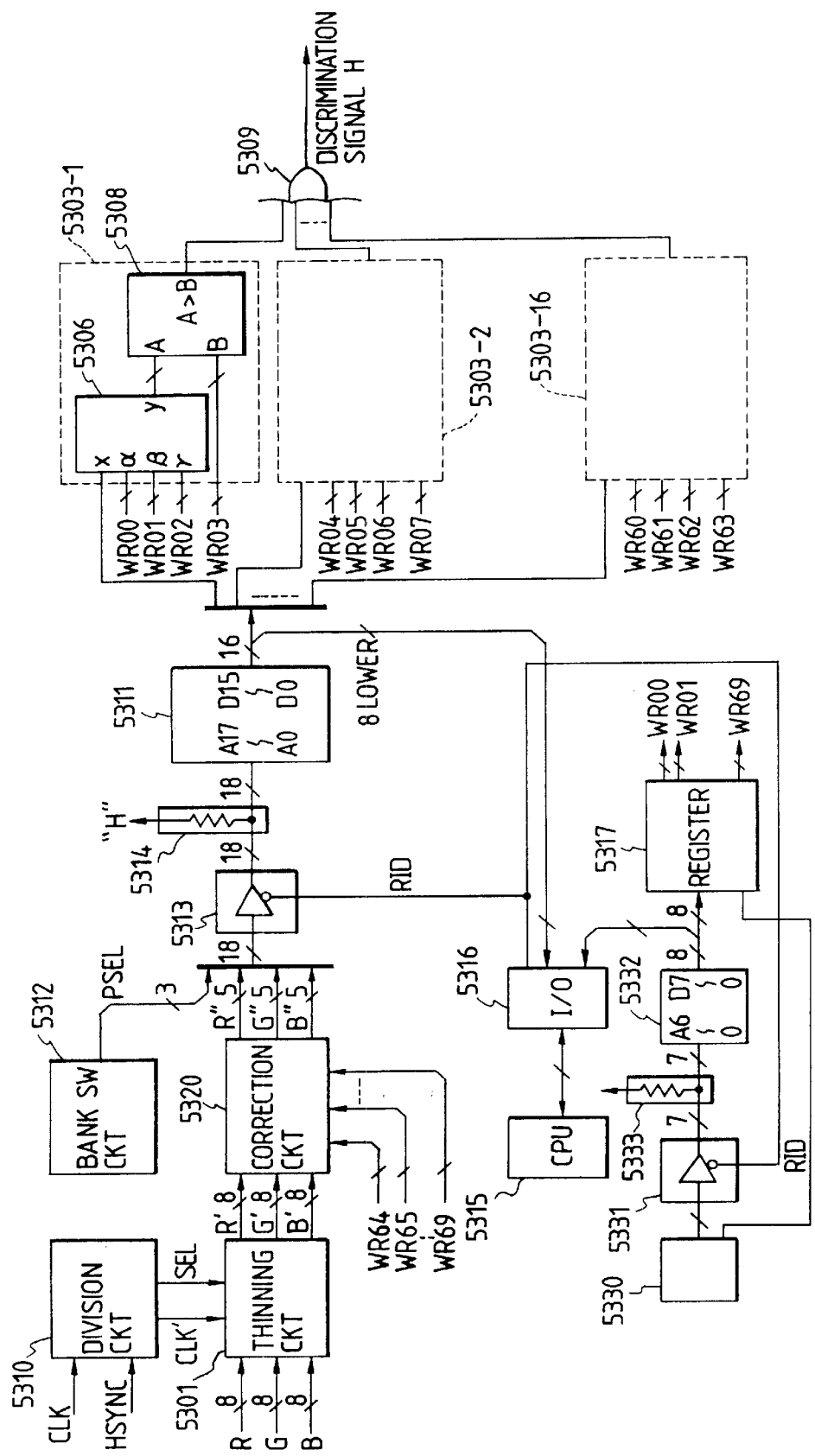
FIG. 64 is a block diagram showing the configuration of a discrimination circuit according to the fifth embodiment of the present invention.

FIG. 64 is a block diagram illustrating the configuration of a discrimination circuit according to the fifth embodiment of the present invention. The same portions as those of FIG. 48, as previously described, are given the same reference numerals and their description is omitted here.

In the third embodiment, the register 5317 has a desired value set by the CPU 5316, but in this embodiment, it has set a value prestored in the ROM 5332.

In FIG. 64, reference numeral 5330 represents a control circuit for setting the address of the ROM 5332 via the tri-state gate 5331, as well as setting a holding content of the ROM 5332 to the register 5317 by generating a write control signal to the register.

As in the third embodiment, in the ID reading mode of the ROM, the signal RID is set to "1" by the CPU 5315. In this case, the output from the tri-state gate 5331 is brought to high impedance. A pull-up resistor 5333 causes the address of the ROM 5332 to be the uppermost address "7F/H", so that the CPU 5315 can read the "ID" of the ROM 5332 preheld at the uppermost address "7F/H" of the ROM 5332. Also, at the same time, the "ID" of the ROM 5311 can be read as in the third embodiment.

As described above, according to the above-described embodiments 3 to 5, the specific original can be inhibited from being copied falsely, even if the memory having discrimination information for the specific original stored or its peripheral circuit may be out of order, or unmounted.

Sixth Embodiment

[Image Scanner]

Figure 69:
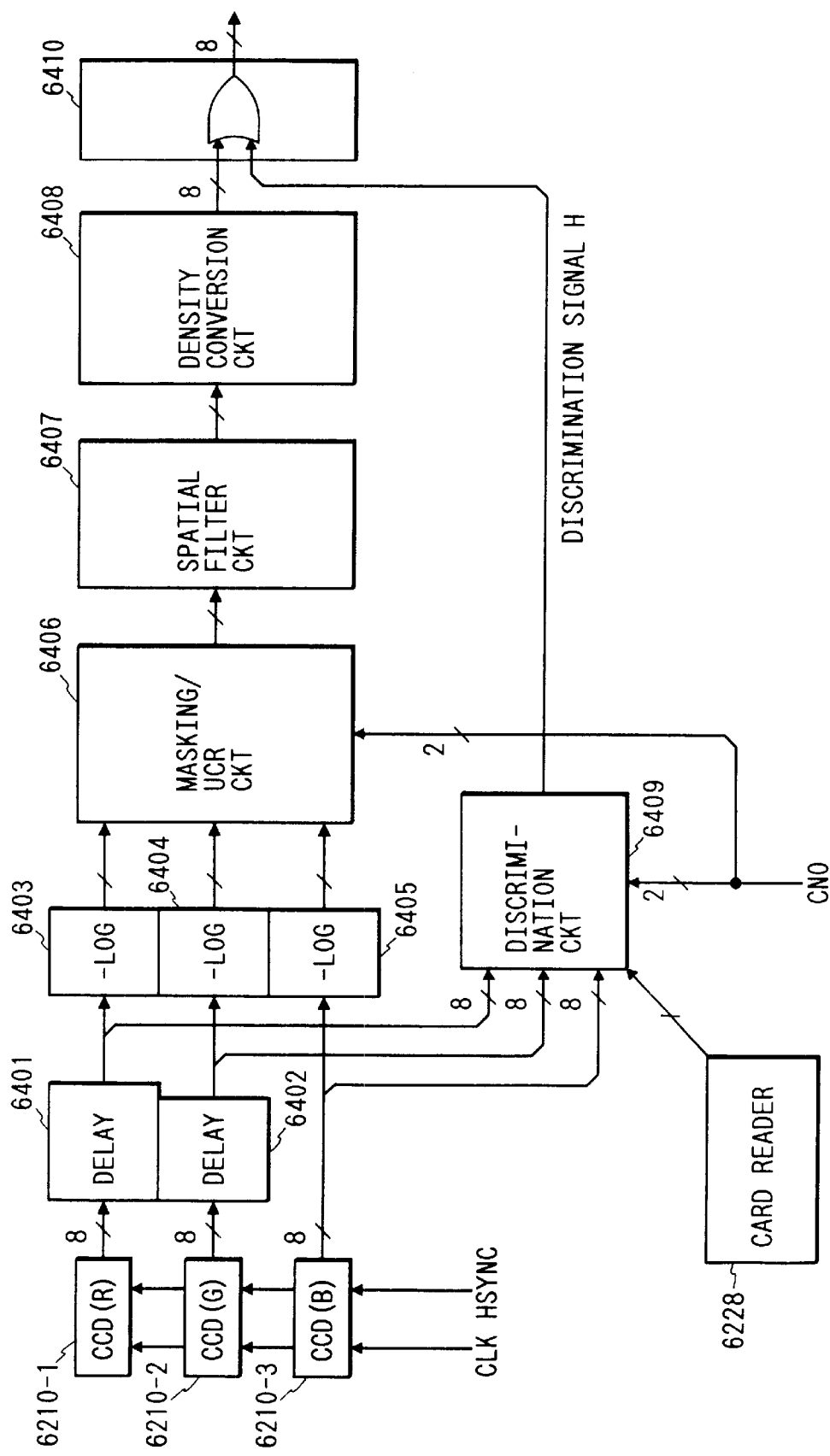
FIG. 69 is a block diagram showing the configuration of an image scanner unit 6201 in the sixth embodiment.

FIG. 69 is a block diagram which illustrates the configuration of an image scanner unit 6201 according to the sixth embodiment. In the same figure, reference numerals 6210-1, 6210-2 and 6210-3 represent CCD (solid state image pickup devices) line sensors having a spectral sensitivity characteristics of red (R), green (G) and blue (B), respectively, each transmitting 8-bit signal of 0 to 255 after the A/D conversion.

Since the CCD line sensors 6210-1, 6210-2 and 6210-3 for use in this embodiment are disposed at predetermined intervals, delay elements 6401 and 6402 are arranged to correct for their spatial deviations.

Reference numerals 6403, 6404 and 6405 represent logarithmic converters formed into lock-up tables of ROM or RAM for the conversion from brightness signal to density signal. Reference numeral 6406 represents a known masking/UCR (Under Color Removal) circuit. Although the detail description about it is omitted here, the masking/UCR circuit 6406 transmits magenta (M), cyan (C), yellow (Y) and black (Bk) signals in response to the supplied three signals at each reading operation, the M, C, Y and Bk signals being transmitted in a plane sequential manner while having a predetermined bit length, for example, 8 bits.

The CNO signal is a 2-bit plane sequential signal, and controls the sequential order of the four reading operations (scanning operations) to switch the print operation conditions for each color image of Y, M, C and Bk. In accordance with the relation of Table 4, the operation conditions of the masking/UCR circuit 6406 can be switched.

TABLE 4

| CNO signal | Print output |
| --- | --- |
| 0 | Magenta (M) |
| 1 | Cyan (C) |
| 2 | Yellow (Y) |
| 3 | Black (Bk) |

Reference numeral 6407 represents a known spatial filter circuit for correcting the spacial frequency characteristic (MTF) of the output signal. Reference numeral 6408 represents a density converion circuit for correcting the density characteristic of the printer 6202, comprised of a ROM or RAM, like the logarithmic converters 6403 to 6405.

Reference numeral 6409 represents a discrimination circuit for discriminating the specific original document image. A discrimination is made as to whether or not at least one of a plurality of the specific original document images is read, resulting in transmission of a discrimination signal H being one bit of "0" or "1" That is, if at least one of a plurality of the specific original document images is being read, H="1" is transmitted, or otherwise H="0" is transmitted.

Further, the CNO signal as above described is also input into the discrimination circuit 6409, a discrimination for the specific original can be made by switching the discrimination criteria for each of the four reading operations.

Reference numeral 6410 represents an OR gate circuit for taking a logical OR between the 8-bit output V of density conversion circuit 6408 and the discrimination signal H which is an output from discrimination circuit 6409 to transmit V'.

As a result, when the discrimination signal H is equal to "1", that is, the specific original is determined to be being read, the output becomes V'=FF/Hex(255), irrespective of the value of input signal V, while when the discrimination signal H is equal to "0", that is, the specific original is determined not to be being read, the value of input signal V is directly output as the output signal V'.

Note that the discrimination conditions of the discrimination circuit 6409 can be changed in accordance with the information from the card reader 6228. The way of changing the discrimination conditions will be described later.

[Discrimination Circuit]

Figure 68:
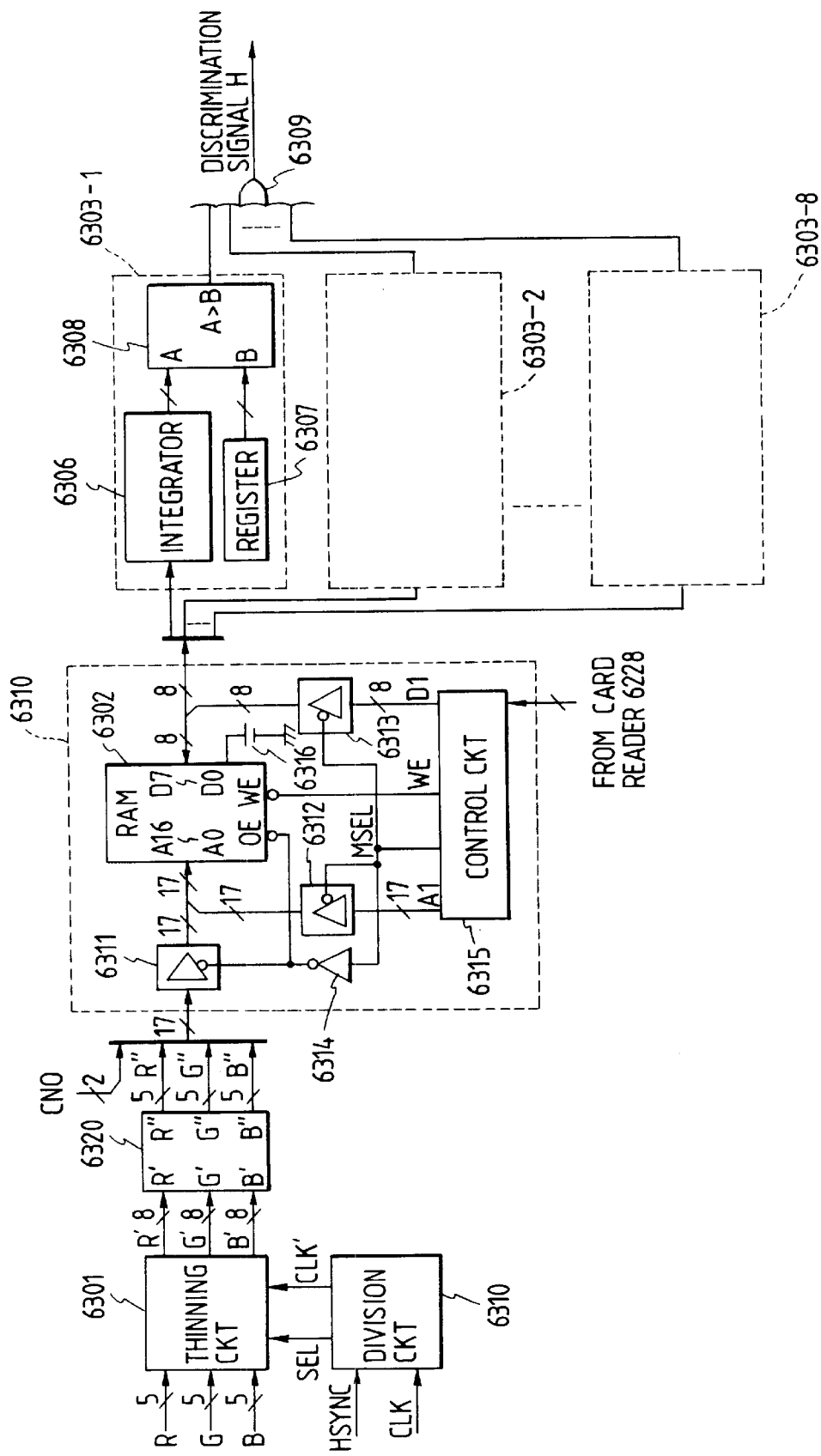
FIG. 68 is a block diagram showing the configuration of a discrimination circuit 6409 according to the sixth embodiment.

FIG. 68 is a block diagram illustrating the configuration of a discrimination circuit 6409 according to the sixth embodiment. In the same figure, reference numeral 6301 represents a thinning circuit as shown in FIG. 4 for thinning out data to reduce the load of a processing circuit with the discrimination circuit 6409, providing R", G", B" signals which are corrected from R', G', B' signals as thinned out from R, G, B signals.

Reference numeral 6310 represents a color tint matching circuit comprised of a color tint matching look-up table RAM (hereinafter referred to "LUT") 6302, tri-state gates 6311, 6312, 6313, an inverter 6314, a control circuit 6315, and a battery for holding the stored content of a RAM 6302 irrespective of the on/off state of the power source in the apparatus itself.

The LUT 6302 has a result of discrimination as to whether or not the color tint of a subject pixel is coincident with that of the specific original, in which the color tint distributions are investigated beforehand for 32 types of specific original to enable the matching of color tint with a plurality of kinds of specific original, and it can hold its content even when the apparatus itself is disconnected from the power source of battery 6316. Herein, the 32 types of specific original involve 8 types of specific original each of which is assigned to four scanning operations for forming the image of M, C, Y, Bk.

The control circuit 6315 controls the reading and writing operation of the LUT 6302 and the tri-state gates 6311, 6312, 6313 by transmitting an MSEL signal and a WE signal as the control signal. The control circuit 6315 includes two control modes of:

(1) Normal control mode in which the LUT 6302 operates as the loo-up table.

(2) RAM rewrite control mode in which the LUT 6302 is rewritten.

In the normal control mode, the control circuit 6315 places the tri-state gate 6311 in the enable state and the tri-state gates 6312 and 6313 in the disenable state, and sets an OE (Output Enable) terminal of the LUT 6302 to '0' by fixing the MSEL signal to '1'. Further, it places the data output from the LUT 6302 in the enable state by fixing a WE (Wright Enable) signal to '0', resulting in the LUT 6302 serving as the look-up table.

That is, the LUT 6302 has the CNO signal which is a plane sequential signal input at the upper two bits of the address, and the upper 5 bits of the image signal for each color of RGB thinned out input at the lower 15 bits of the address. At the value 0 to 3 of each plane sequential signal CNO, an indication of whether or not the color tint of the pixel is coincident with that of any of 8 types of specific original is transmitted, along with 8-bit data, and 32 types of specific original in total are discriminated in four reading scanning operations.

Reference numerals 6303-1, 6303-2, . . . , 6303-8 represent color tint discrimination circuits each comprised of the same hardware, including an integrator 6306, a register 6307 and a comparator 6308, for making a discrimination as to whether or not any specific original resides within the original.

Reference numeral 6309 represents a logical OR circuit, wherein if the presence of subject specific original is discriminated in at least one or more outputs from the color tint discrimination circuits 6303-1, 6303-2, . . . , 6303-8, the value "1" is output as the discrimination signal H.

Figure 70:
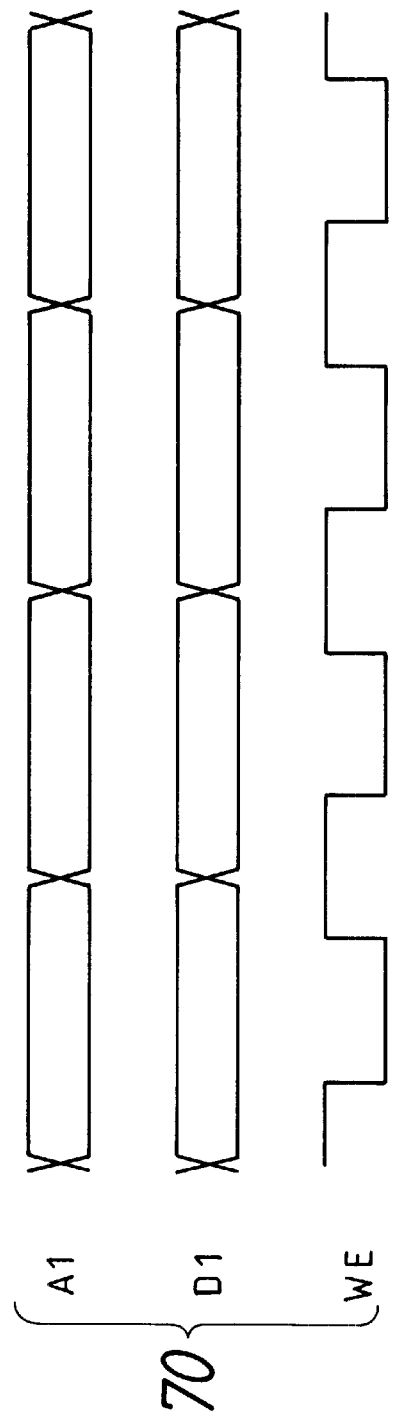
FIG. 70 is a timing chart between A1, D1 and WE.

On the other hand, in the RAM rewrite control mode, the control circuit 6315 rewrites the LUT 6302, based on the data transferred from the card reader 6228. That is, the control circuit 6315 places the tri-state gate 6311 in the disenable state and the tri-state gates 6312 and 6313 in the enable state by fixing the MSEL signal to '0'. Further, it can rewrite the holding content of the LUT 6302 by generating an A1 signal as the address of the LUT 6302, a D1 signal as the data, and a Wg signal into the WE terminal of the LUT 6302, at the timing as shown in FIG. 70. FIG. 70 illustrates a timing chart between A1, D1 and WE.

Further, the content of the LUT 6302 once updated is held independently of the power source of the apparatus itself by virtue of the battery 6316, and held until next updated, even if the power source of the apparatus is turned off. Reference numeral 6320 represents an image data correction circuit.

[Image Data Correction Circuit]

The configuration of the image data correction circuit 6320 according to the sixth embodiment is the same as illustrated in the block diagram of FIG. 50. Also, the configuration of thinning circuit 6301 and division circuit 6310 is the same as illustrated in FIGS. 51 to 53, and its description is omitted.

[RAM Data Update Procedure]

The data of the LUT 6302 should not be readily updated from its nature. That is, if it can be readily updated, there is a risk that it may be intentionally altered or used for evil purpose. Therefore, this embodiment avoids the risk by not only providing the insertion of the IC card, but also the input of a secret number not publicly opened through an operation unit 6250 to be described later.

Figure 71:
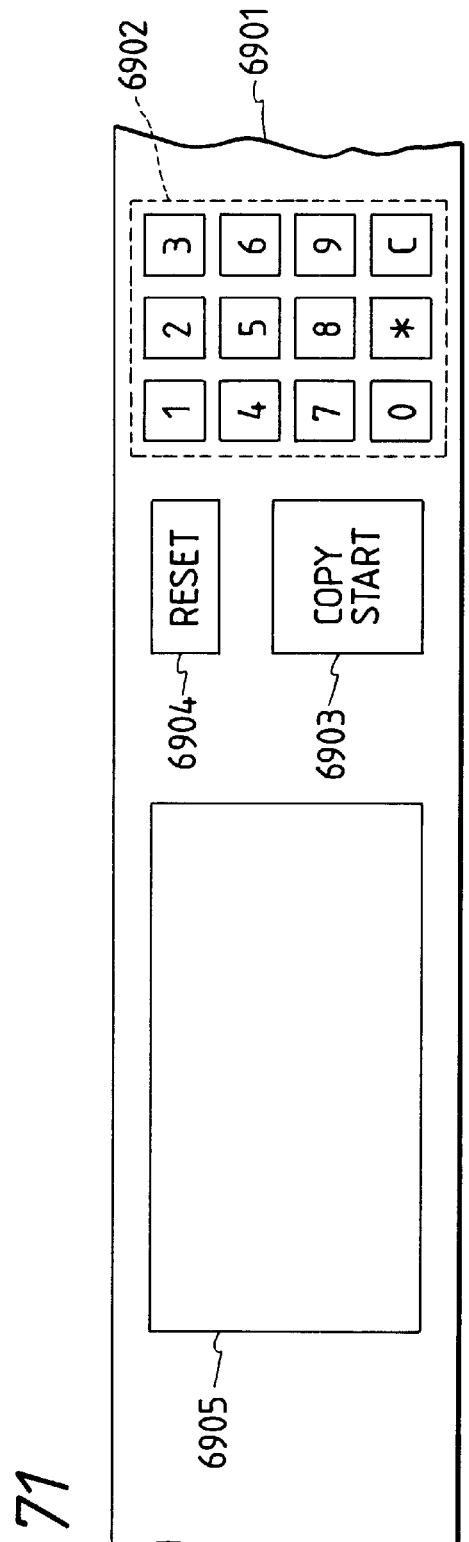
FIG. 71 is an upper view showing an operation plane of an operation unit 6250 in the sixth embodiment.

FIG. 71 is an upper view illustrating an operation panel of the operation unit 6250 according to the sixth embodiment. In the same figure, reference numeral 6901 represents the operation unit arranged on the entire face of the apparatus, reference numeral 6902 represents a ten key, reference numeral 6903 represents a copy start key for starting the copying operation, reference numeral 6904 represents a reset key for resetting the set mode, and reference numeral 6905 represents a liquid crystal display with a touch panel for setting various modes.

The input of secret number is performed by the use of the ten key 6902. That is, the secret number preset is input in the order of, for example, *, 2, 0, 4, 2, 9, C, and *.

Figure 72:
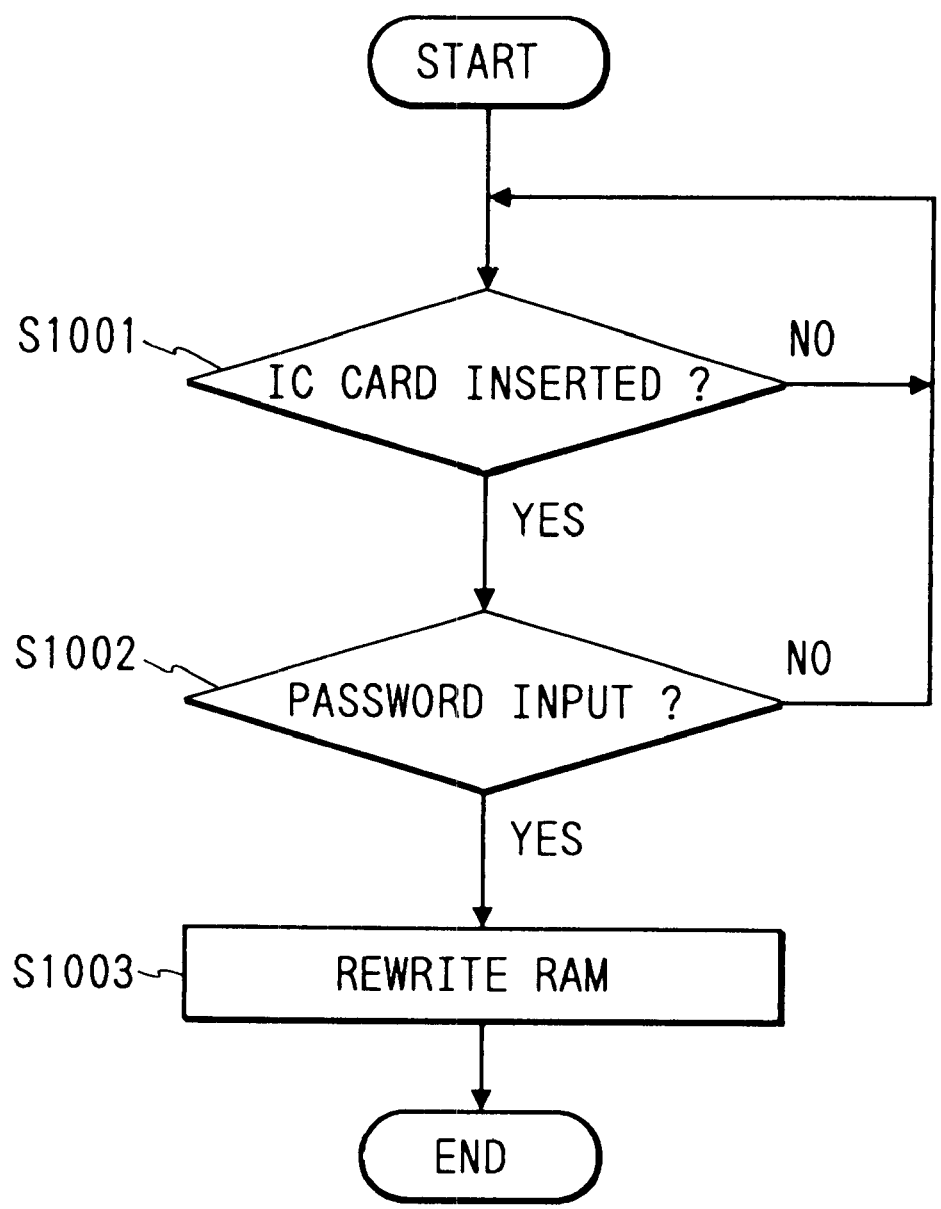
FIG. 72 is a flow chart for describing the rewrite procedure of an LUT 6302 in the sixth embodiment.

FIG. 72 is a flowchart for illustrating the rewrite procedure of the LUT 6302 according to the sixth embodiment.

At step S1001, a discrimination is made as to whether or not a predetermined IC card is inserted. If the predetermined IC card is inserted, the procedure proceeds to the next step S1002. At step S1002, a discrimination is made as to whether or not the secret number is input. If the secret number is not correctly input, the procedure returns to the first step S1001, while if it is correctly input, the content of the LUT 6302 is updated at step S1003.

As described above, in the sixth embodiment, there is provided a function of correcting the characteristic of the input image signal so that the image signal is corrected to have the same characteristic by correcting the characteristic of the image signals with a variety of characteristics, whereby the specific original can be discriminated by the same characteristic data of the specific original even if the image is input from a different input apparatus.

Seventh Embodiment

Now, the overall configuration of a color copying machine according to the seventh embodiment is the same as in the sixth embodiment, and its description is omitted, except for different structures and functions detailed.

[Correction with LUT]

While in the sixth embodiment, the correction for gain/offset was performed by the linear calculation circuit for the input image signal, the present invention is not limited thereto, and provides for the seventh embodiment as will be described below.

FIG. 73 is a block diagram illustrating the configuration of an image data correction circuit according to the seventh embodiment. In the same figure, reference numeral represents a RAM (rewritable memory) having prewritten a correction table by the CPU, not shown, so that the R' signal before correction may be input into the address A7 to A0 and its corrected result be output.

Likewise, reference numerals 6102 and 6103 represent a RAM for correcting the G' signal/B' signal before correction and providing the G" signal/B" signal.

In this way, the correction for the look-up tables of RAMs 6101 to 6103 allows any of the corrections to be made, including the non-linear correction which is typically difficult to perform by calculation, resulting in the advantage that the application can be extended.

Eighth Embodiment

Now, the overall configuration of a color copying machine according to the eighth embodiment is the same as in the sixth embodiment, and its description is omitted, except for the different structures and functions detailed.

[Correction for Color Space]

Figure 74:
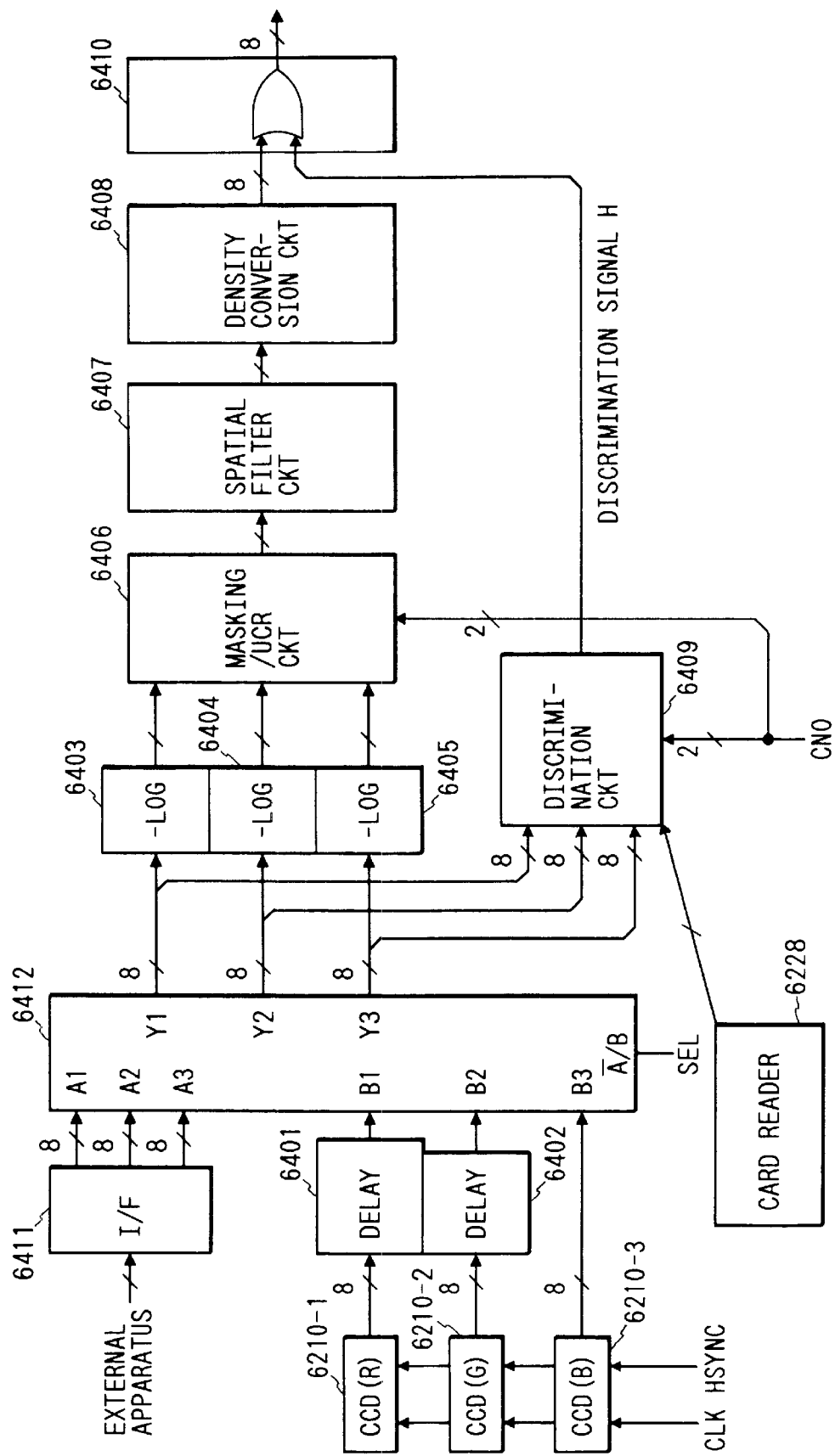
FIG. 74 is a block diagram showing the configuration of an image scanner unit 201 according to the eighth embodiment.

FIG. 74 is a block diagram illustrating the configuration of an image scanner unit 6201 according to the eighth embodiment. In FIG. 74, like circuit components are given the same reference numerals as in FIG. 69. In FIG. 74, reference numeral 6411 represents an external interface unit serving for the input of an image signal from the still video, film scanner, other image scanners, and computer graphics, and reference numeral 6412 represents a selector for switching between the image signal from the external equipment and the read signal with the CCD line sensors 6210-1 to 6210-3 by a control signal SEL from the CPU, not shown. For these various image signals, the color spaces for defining the color image signals are different, for which the appropriate correction is required.

Figure 75:
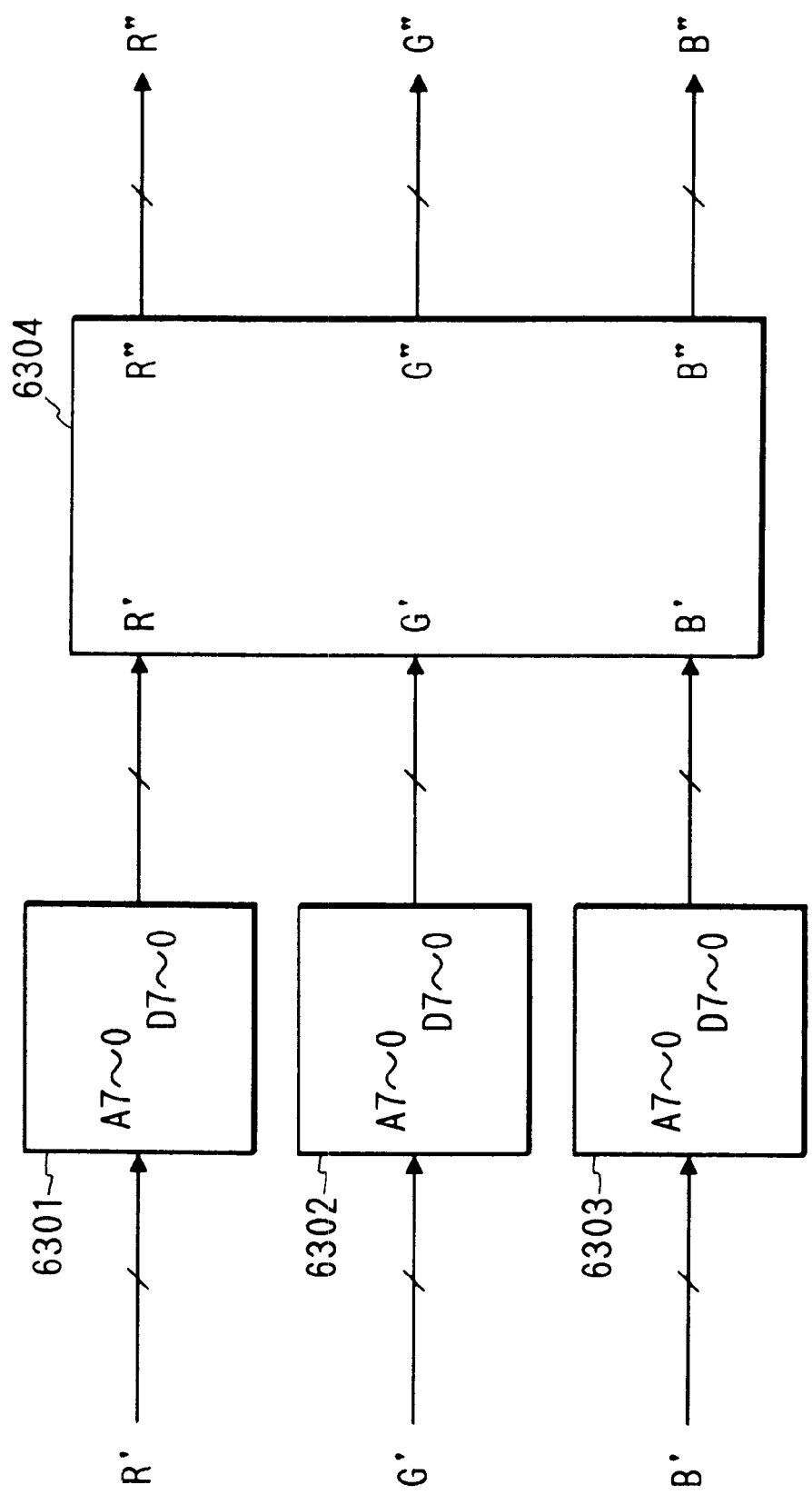
FIG. 75 is a block diagram showing the configuration of a correction circuit according to the first embodiment.

FIG. 75 is a block diagram illustrating the configuration of a correction circuit according to the sixth embodiment. The correction circuit as illustrated in FIG. 75 corrects the R', G', B' signals before correction to produce the R", G", B" signals. Reference numerals 6301, 6302, 6303 represent the look-up table RAMS, similar to those indicated by reference numerals 6101, 6102, 6103 of FIG. 73, for allowing the non-linear correction of R', G', B' signals. Also, reference numeral 6304 represents a masking calculation circuit, which performs a linear masking calculation of 3×3 as expressed by the following expression. That is, $$\begin{bmatrix} R'' \\ G'' \\ B'' \end{bmatrix} = \begin{bmatrix} a_{11} & a_{12} & a_{13} \\ a_{21} & a_{22} & a_{23} \\ a_{31} & a_{32} & a_{33} \end{bmatrix} \begin{bmatrix} R' \\ G' \\ B' \end{bmatrix}$$

Also, reference numerals 6301', 6302', 6303' and 6304' perform the same correction with the characteristic different from that of reference numerals 6301, 6302, 6303 and 6304.

These look-up tables and the masking calculation allow the discrimination of whether or not any specific original is present, with the same characteristic data, for various types of image signal.

The circuit of FIG. 75 is provided within a selector 6412, having the correction characteristics set to enable different corrections for the input from the external interface unit 6411 and the input from the image scanner unit 6201. Eventually, either one of the outputs R", G", B" is selected.

As described above, according to the present invention, the discrimination of the specific original can be made with the same characteristic data of the specific original even if the image input takes place from different input equipment.

The ninth and tenth embodiments of the present invention, as will be described below, allow the correct discrimination while preventing any detection error, as above described, by dividing the color distribution of one specific original into a plurality of color distribution scopes, and discriminating the similarity with the specific original based on the correlation between respective color distribution scope and the input image data.

Figure 90:
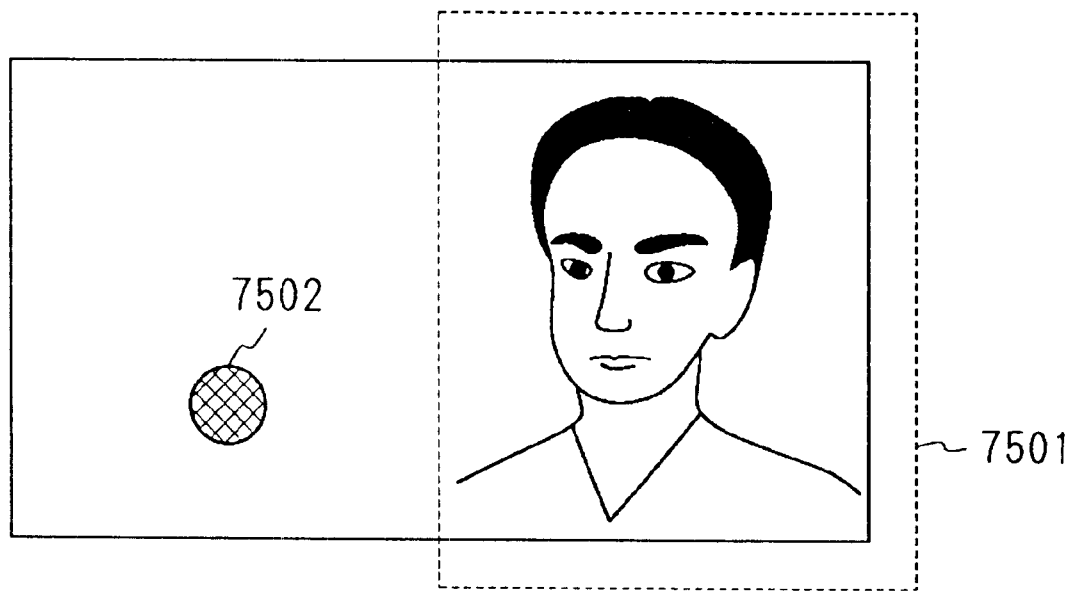
FIG. 90 is an explanation view for the portion showing two color distributions for the specific original A.

More specifically, a discrimination for the specific original A can be made by, for example, performing simultaneously (in parallel) the discrimination regarding the color tint distribution for specific original A part 1 (7501) and the discrimination regarding the color tint distribution for specific original A part 2 (7502), as illustrated in FIG. 90, and based on the two discrimination results.

Thereby, for example, when the color tint corresponding to the red-sealed portion (portion having reddish color tint distribution) of the specific original A lacks in the observed image, the image is not discriminated as the specific original A in any event, so that the correct discrimination for the specific original can be further realized.

Ninth Embodiment

Figure 76:
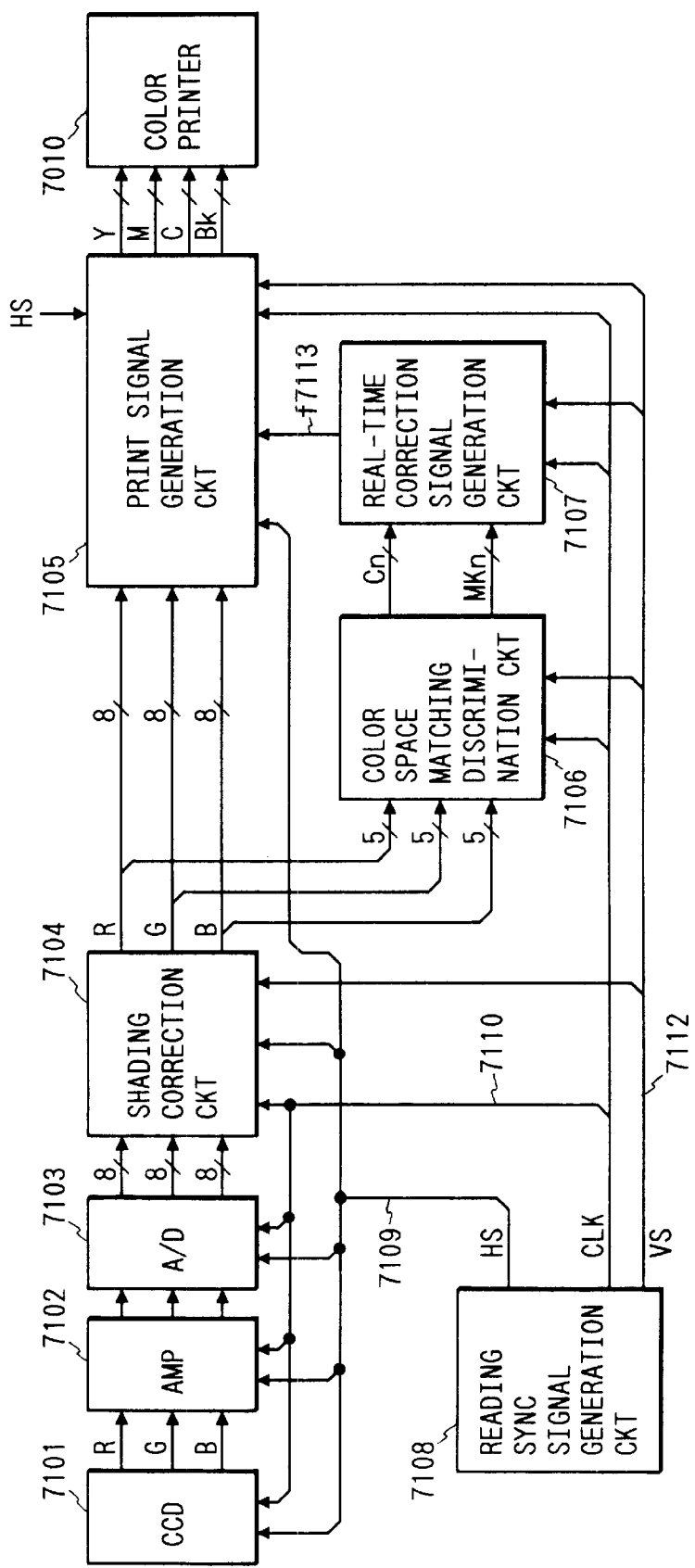
FIG. 76 is a block diagram of signal processing for a color image reading apparatus.

FIG. 76 is a signal processing block diagram for a color image reading device.

In the same figure, reference numeral 7101 represents a CCD color sensor, reference numeral 7102 represents an analog amplifier, reference numeral 7103 represents an A/D converter, and reference numeral 7104 represents a shading correction circuit for correcting the dispersion of brightness at the reading position of the image signal.

Reference numeral 7106 represents a color space matching discrimination circuit for calculating the similarity of distribution between the reading image data and the specific original, such as the bill or securities, in the three dimensional space.

The use of the color signal after the shading correction, allows the correction for the distortion in the brightness and the color tint, produced by the position of the original, so that the discrimination for the similarity in the color space can be correctly made, irrespective of the position at which the input original is placed. The shading correction circuit 7104 in the color image reading device is not detailed herein because of the known art.

Reference numeral 7105 represents a print signal generation circuit for converting the input color signal R (red), G (green) and B (blue) into the signal Y (yellow), M (magenta), C (cyan) and Bk (black). This circuit includes delay means for compensating for the time required for the discrimination to be described later. Also, it modulates the print signal with a real time correction signal f7113.

Reference numeral 7107 represents a circuit for generating the real time correction signal f7113.

Reference numeral 7108 represents a circuit for generating the reading periodic signals HS7109, CLK7110, VS7112. HS7109 is a main scanning interval signal, CLK7110 is a pixel reading basic clock signal, and VS7112 is an interval signal indicating the effective area in the sub-scanning direction of reading the original.

[Color Space Matching Discrimination Circuit]

Figure 77:
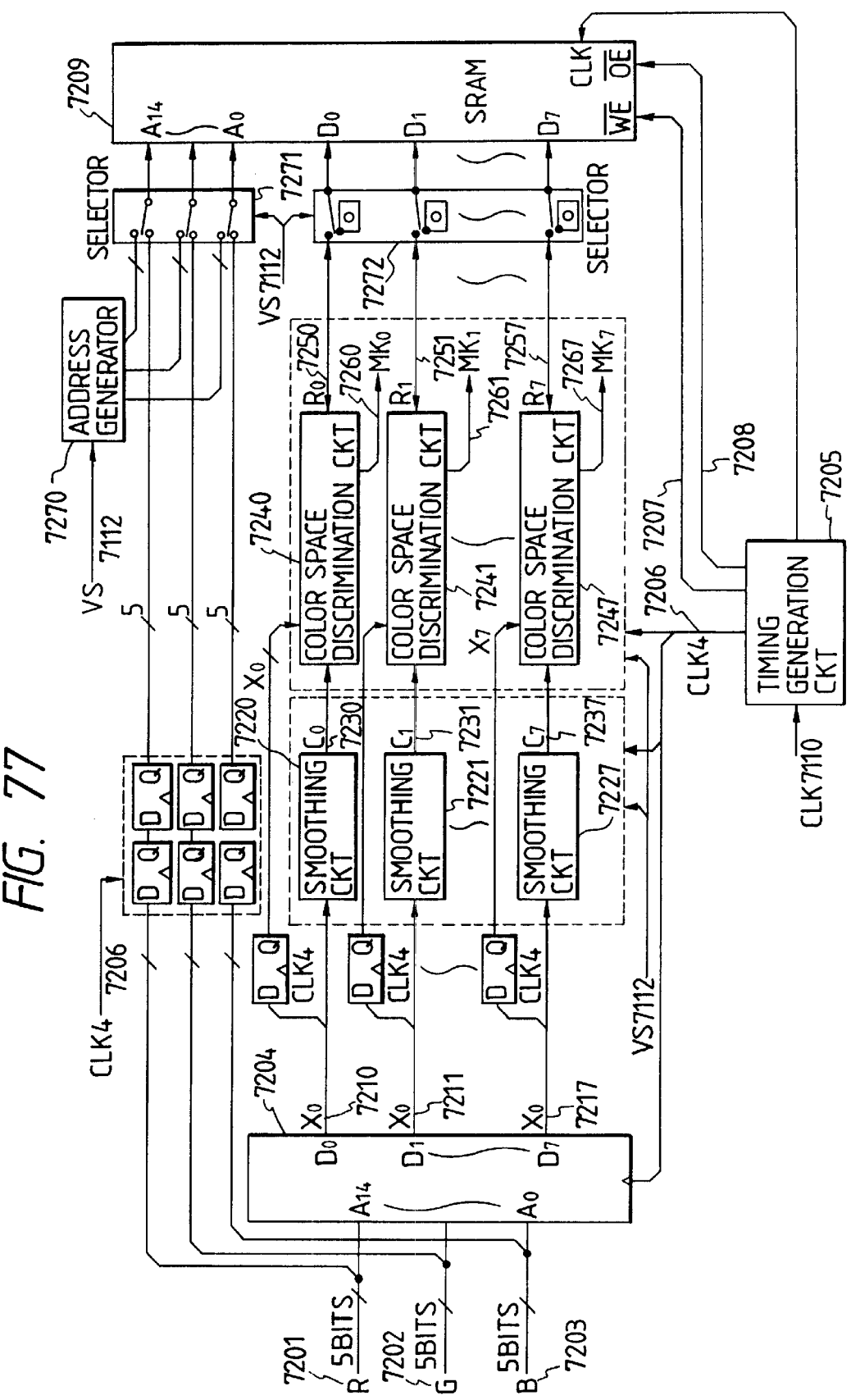
FIG. 77 is a circuit diagram for a color space matching discrimination circuit 7106.

FIG. 77 is a view illustrating a color space matching discrimination circuit 7106.

In the same figure, R7201 is a signal consisting of upper 5 bits of the R (red) signal composed of 8 bits from the shading correction circuit 7104. Likewise, G7202 is a 5-bit G (green) signal, and B7203 is a 5-bit B (blue) signal.

Reference numeral 7204 represents a ROM (read-only-memory) in which the information regarding the color tint of a plurality of types of specific original is stored. The R, G, B signal is input into the address $A_0$ to $A_{14}$ and the discrimination signal indicating whether or not the input R, G, B signal is coincident with the color tint of any of the plurality of types of specific original is output to the data $D_0$ to $D_7$.

Figure 84:
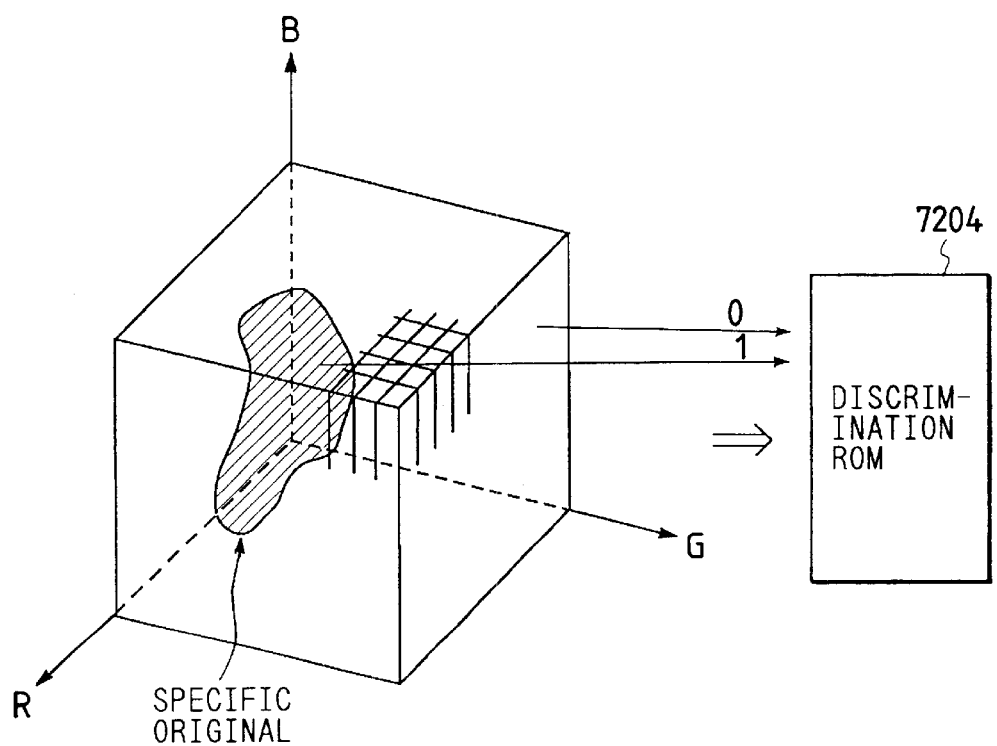
FIG. 84 is a view showing the relation between the shape of specific original in the color space and a discrimination ROM 7204.

The ROM 7204 has stored the information regarding the color tint of the specific original as illustrated in FIG. 84, wherein 1 if the coincidence with the color tint of specific original takes place, or otherwise 0, is output to $D_0$ to $D_7$. $D_0$ to $D_7$ corresponds to 8 types of specific original image from the zeroth to the seventh.

Figure 88:
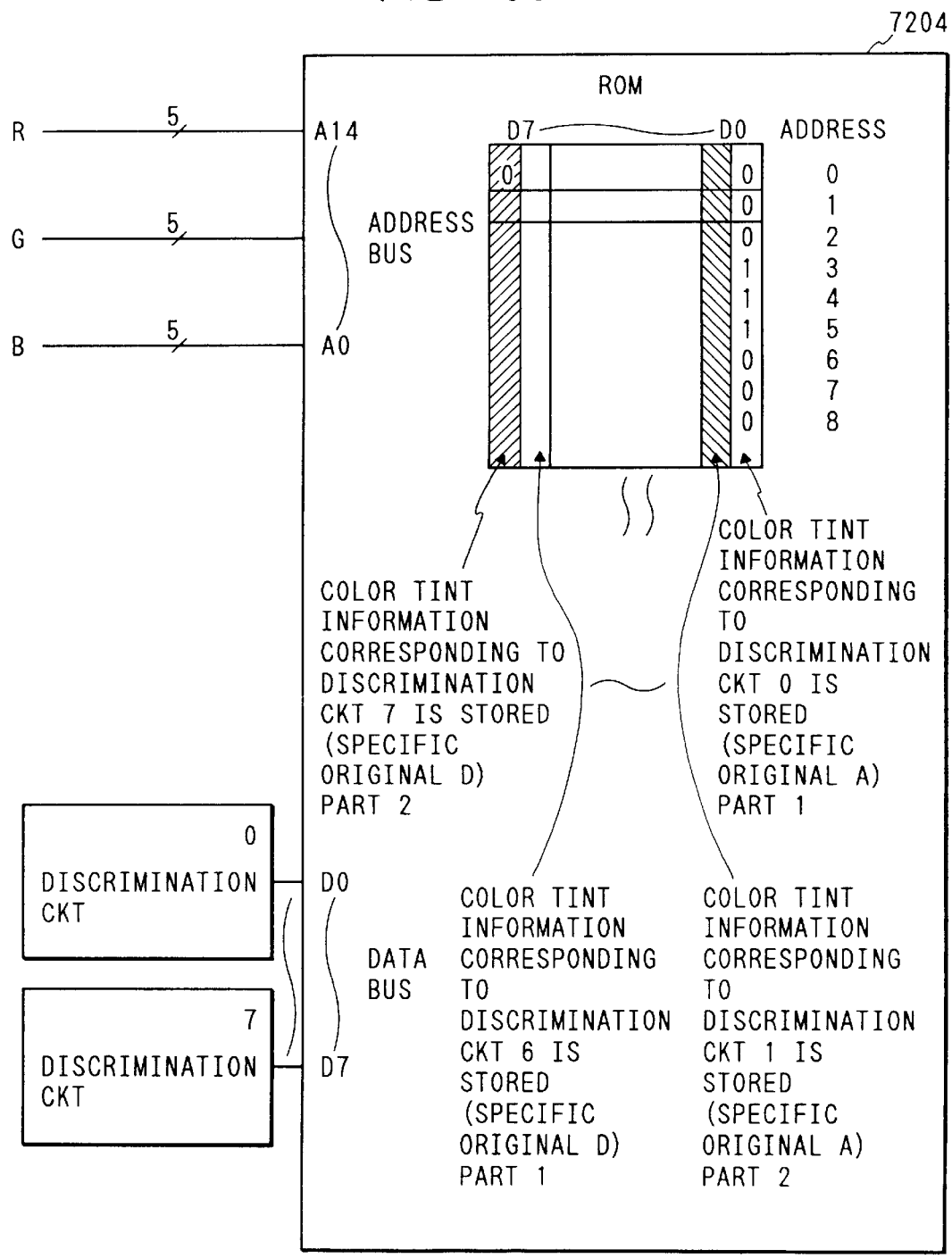
FIG. 88 is a diagram showing the relation between data regarding multiple originals stored in the ROM 7204 and the bit location of ROM 7204.

FIG. 88 is a view illustrating the relation between the data regarding the color tint for a plurality of originals stored in the ROM 7204 and the bit position of the ROM 7204. Hence, for the input pixel data, the information for 8 types of different color tint discriminations regarding the specific original from $D_0$ to $D_7$ is output in parallel.

Figure 82:
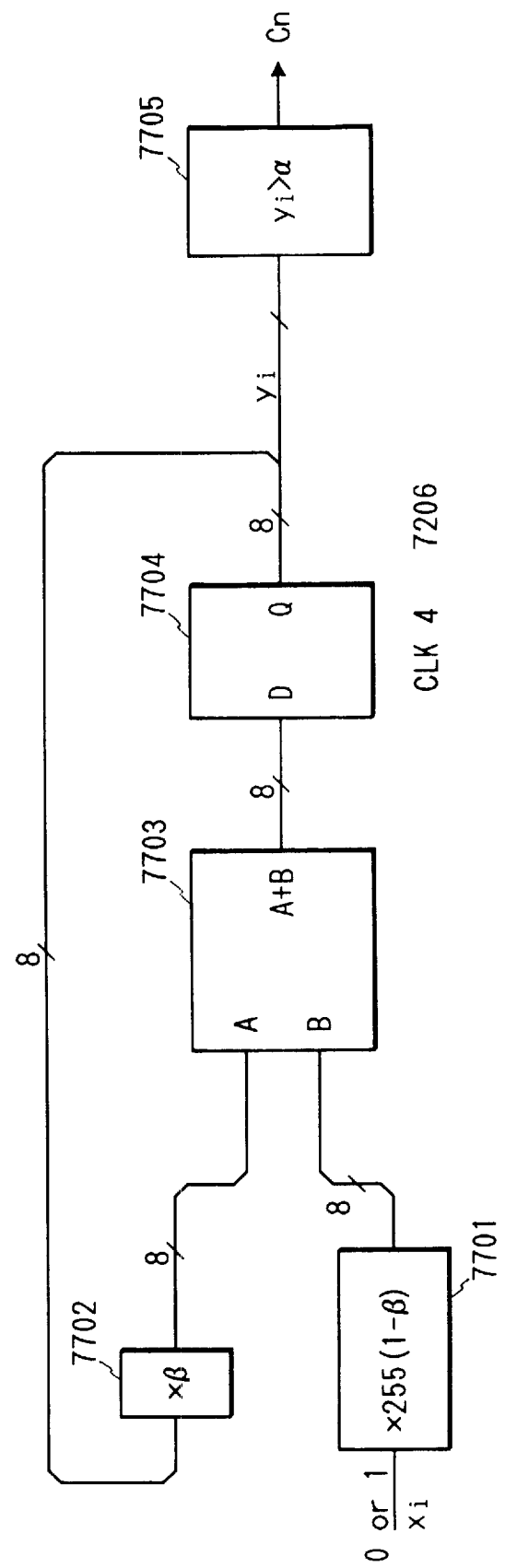
FIG. 82 is a circuit block diagram showing the circuit configuration of smoothing circuits 7220 to 7227.
Figure 83:
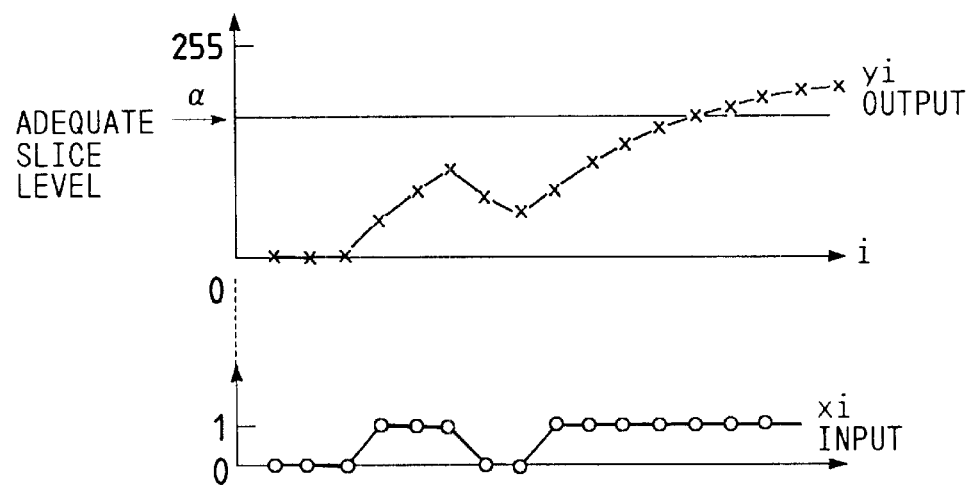
FIG. 83 is a chart showing the relation between input Xi and smooth calculation value Yi.

Reference numerals 7220 to 7227 represent circuits for the smoothing operation, as illustrated in FIGS. 82 and 83, using the color tint discrimination signals $X_0$ 7210 to $X_7$ 7217.

In the same figure, reference numerals 7701, 7702 represent multipliers, reference numeral 7703 represents an adder, reference numeral 7704 represents a latch circuit, and reference numeral 7705 represents a comparator. Using the weighted average between the input data from multipliers 7701, 7702 and adder 7703, and the previous data, the discrimination in consideration of the continuity as illustrated in FIG. 83 is enabled.

FIG. 83 is a view illustrating the relation between the input $X_i$ and the smoothing operation value $Y_i$. If the value of the input $X_i$ is 1 in succession, the value of $Y_i$ increases.

Hence, where the input R, G, B signal is coincident with the color tint of the specific original in succession, the signals 7230 to 7237 get 1, allowing correcter discrimination without being affected by the noise.

Figure 89:
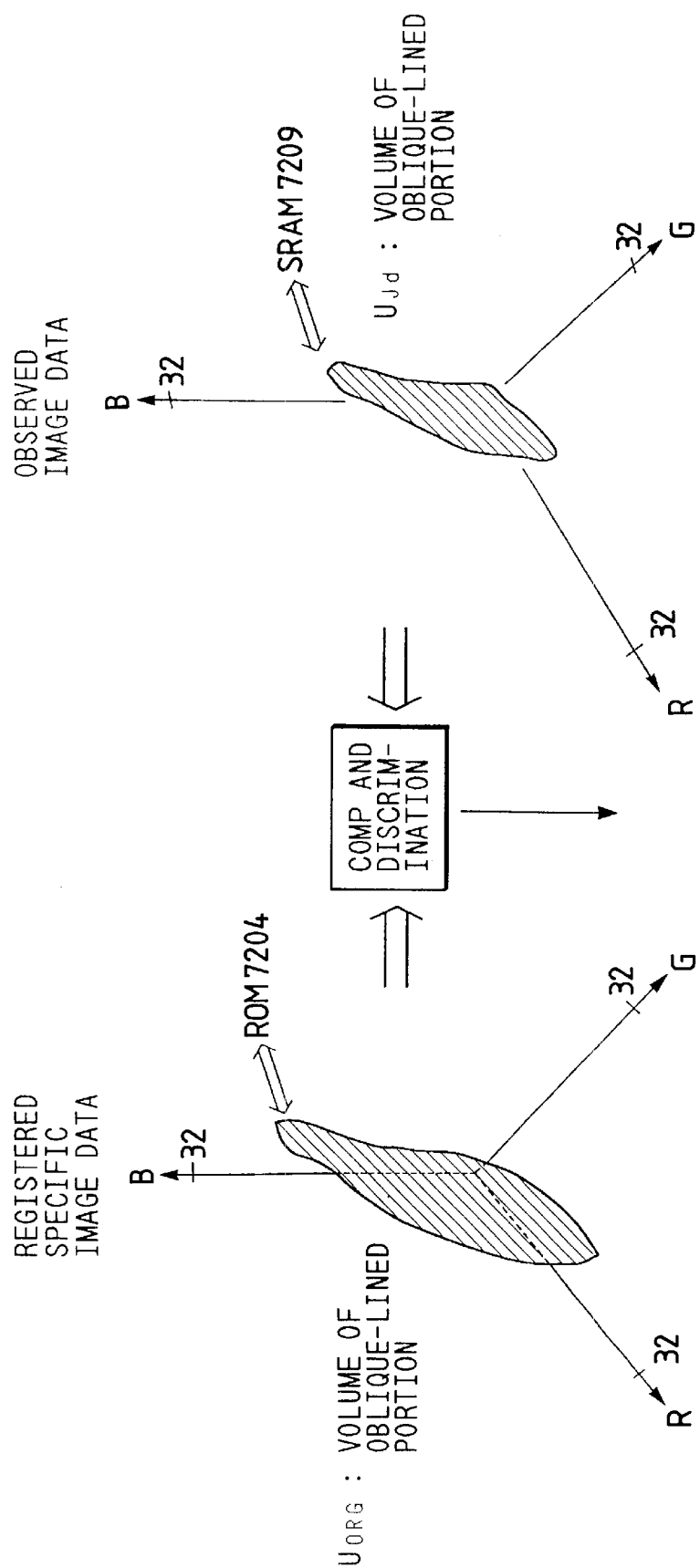
FIG. 89 is a view conceptually showing the discrimination for similarity between the distribution of input color image in the color space and the color distribution of specific original.

In the color space discrimination circuits 7240 to 7247, the similarity between the specific image data in the R, G, B color space as illustrated in FIG. 89 and the input color signal is calculated in real time to produce the color space similarity discrimination signals $MK_0$ 7260 to $MK_7$ 7267.

Figure 78:
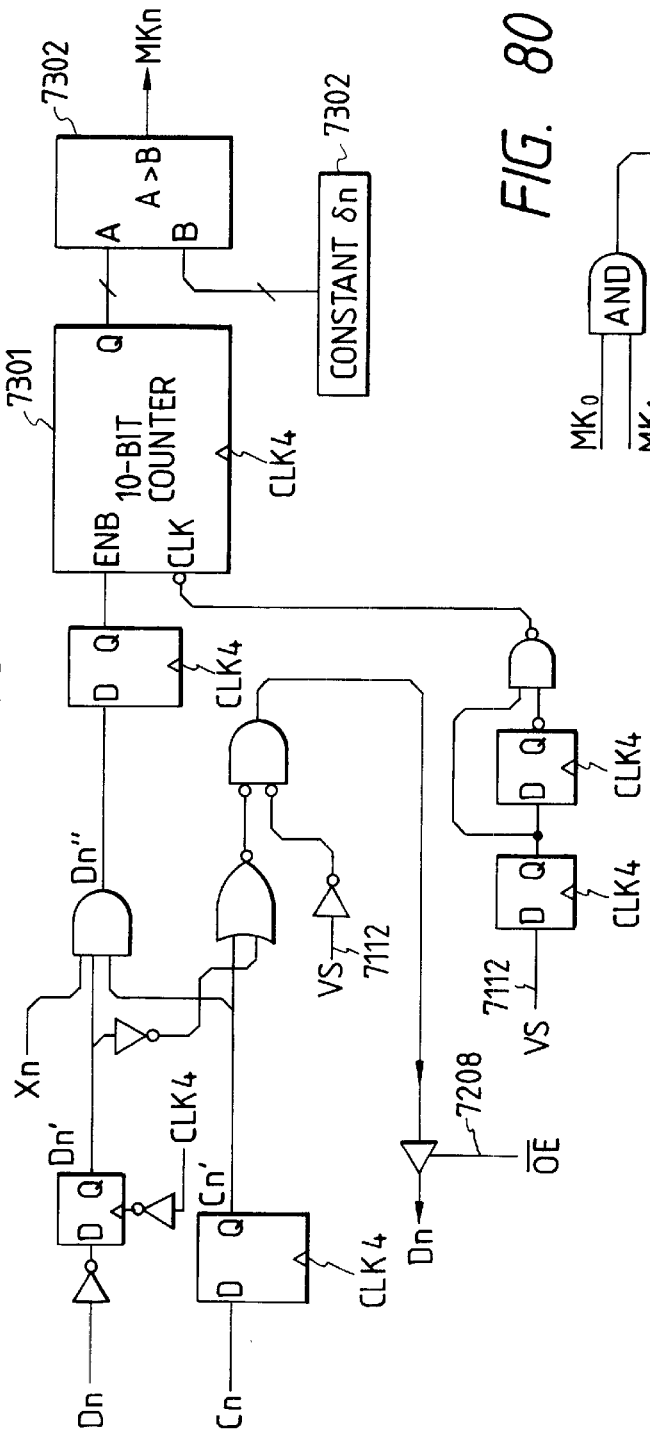
FIG. 78 is a block diagram for color space discrimination circuits 7240 to 7247.

FIG. 78 is a circuit block diagram of the color space discrimination circuits 7240 to 7247.

With this circuit configuration, the data Dn from the SRAM 7209 and the signal Cn from the smoothing circuit are ORed, and written into the SRAM 7209. Also, only if the data Dn transits from 0 to 1, the counter 7301 is counted up. The counter 7301 is cleared at the first transition of the sub-scanning interval signal VS7112. The output value Zn from the counter 7301 and the constant δn of register 7302 are compared by the comparator 7302, wherein MKn=1 for Zn>δn, and MKn=0 for Zn≦δn. The value of δn is set at a value of 1% of $U_{ORG}$ (in this embodiment, 1=90%).

$$δn=1/100×U_{ORG}$$

Where $U_{ORG}$ is a numerical value where a cube is a unit volume, and R, G, B coordinate axes are divided into 32 sections in FIG. 89.

With the above processing, if the observed image data or the data of input color signals take substantially the same shape as that of the specific image data in the R, G, B color space, the color space similarity discrimination signals $MK_0$ 7260 to $MK_7$ 7267 are set to 1.

The selectors 7271, 7272 clear the SRAM 7209 to zero when the sub-scanning interval signal VS7112 is 0 (LOW). An address generator 7270 is a circuit for generating all the addresses of the SRAM 7209 sequentially. When the VS7112 is LOW, the SRAM 7209 is cleared to zero in accordance with the address signal generated by the address generator 7270.

Reference numeral 7205 represents a timing generation circuit for generating the timing signal.

CLK4 7206 represents a clock signal with the basic clock CLK 7110 divided into four sections, reference numeral 7207 represents a signal controlling the write enable terminal of the SRAM 7209, and reference numeral 7208 represents a signal controlling the output enable terminal of the SRAM 7209.

[Real time correction signal generation]

Figure 80:
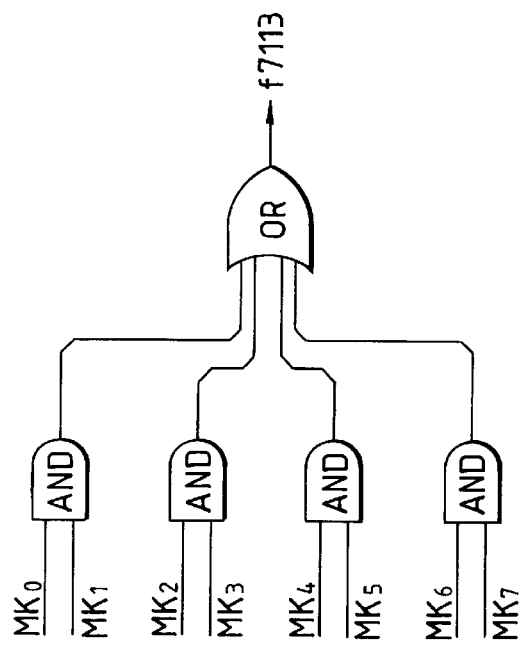
FIG. 80 is a circuit block diagram for a real-time correction signal generating circuit 7107.

FIG. 80 is a circuit block diagram illustrating a real time correction signal generation circuit 7107.

Discrimination ROM 7204 has the color tint information shown in FIG. 88 stored therein. Therefore, in this case, $MK_0$ is a discrimination signal regarding the specific original A part 1 (7501) and $MK_1$ is a discrimination signal regarding the specific original part 2 (7502).

The logical operation of $MK_0$ and $MK_1$ assures the discrimination of similarity of two parts (7501, 7502) of the specific original A with the observed image data in the color space, thereby allowing the correcter discrimination.

[Print Signal Generation Circuit]

Figure 81:
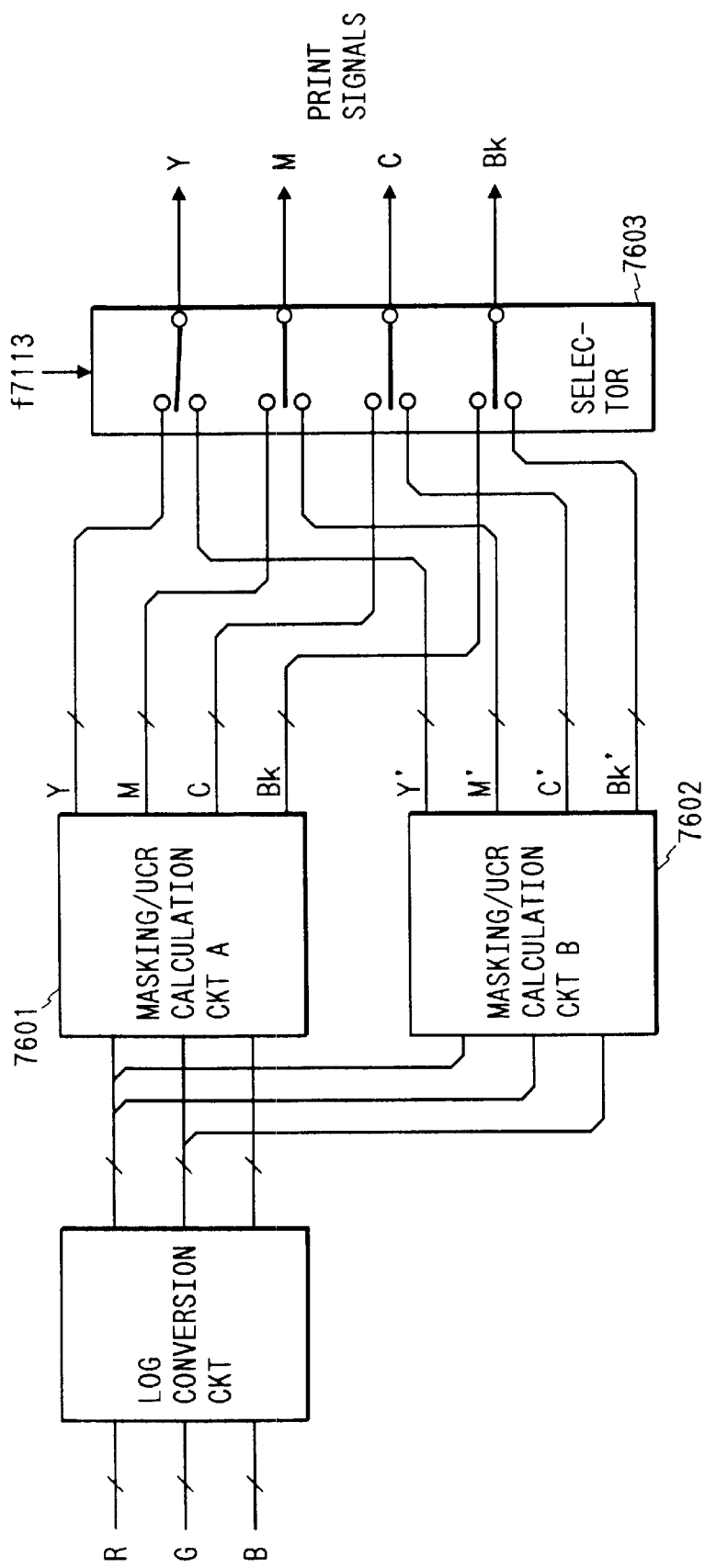
FIG. 81 is a circuit block diagram for a print signal generating circuit 7105.

FIG. 81 is a circuit block diagram illustrating a print signal generation circuit.

A masking UCR operation circuit A7601 is a circuit for generating a print YMCBk signal with the input RGB signal at the normal time.

A masking UCR operation circuit B7602 is a circuit for generating a print YMCBk signal with the color tint changed (e.g., reddish), if the input color signal is discriminated to coincide with the specific original.

A selector 7603 allows only the area discriminated to coincide with the specific original to be printed with different color tint, by selectively outputting the signals of circuits 7601, 7602 with the real time correction signal f7113.

Also, if the similarity with the specific original is discriminated, the normal image formation is inhibited by, for example, painting reproduced image with black, or turning off the power.

Tenth Embodiment

Figure 91:
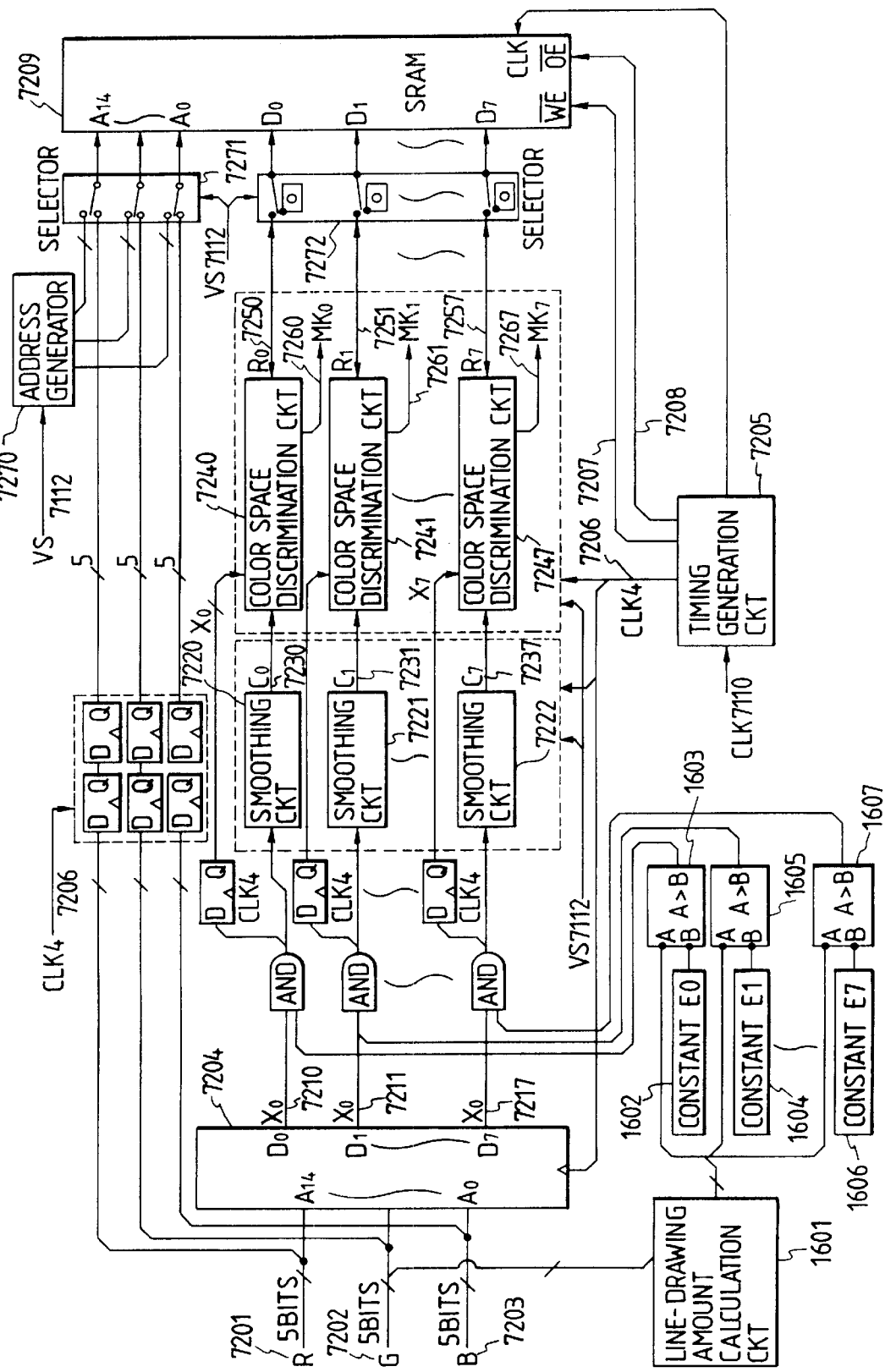
FIG. 91 is a block diagram of color image reading signal process in the second embodiment.
Figure 92:
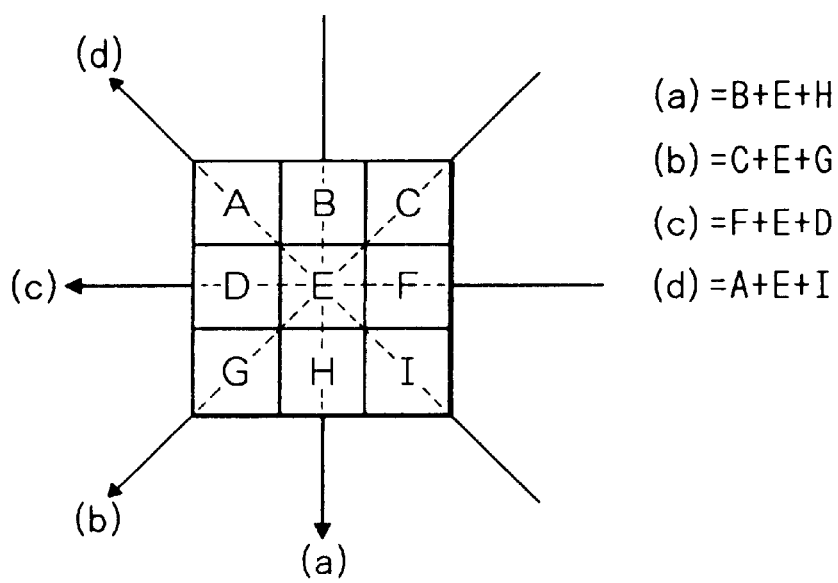
FIG. 92 is a diagram showing a total drawing amount calculation circuit 1601.

FIGS. 91 and 92 are views relating to the tenth embodiment of the present invention.

In the previous ninth embodiment, the correct discrimination of the specific original is made by discriminating the similarity of the color distribution with the observed image in a plurality of different portions for one specific original.

In this tenth embodiment, when calculating the similarity of the color tint in the line-drawing portion, the similarity of the color tint with the specific original is discriminated for each line-drawing region extracted at a different line-drawing extraction threshold.

The tenth embodiment will be described below using the drawings.

In FIG. 91, reference numeral 7601 represents a circuit for calculating the line-drawing amount V as shown in FIG. 92. Reference numeral 7603 represents a comparator for making a comparison between the line-drawing amount and the constant E0-7602.

The constant E0-7602 is set to extract the line-drawing portion of the specific original A part 1 as shown in FIG. 90.

The constant E1-7604 is set to extract the line-drawing portion of the specific original A part 2. The correct discrimination can be made by carrying out the similarity discrimination regarding the color tint distribution by extracting the line-drawing portion at a line-drawing extraction threshold adapted for each of the image areas.

As described above, a correcter discrimination for the specific original can be implemented by providing a plurality of discrimination conditions regarding the color distribution for the same specific original in discriminating the specific original.

While in the above-described embodiment, a copying machine was exemplified, the present invention is applicable to not only a single image scanner but also a reading device connected to the host computer.

Also, the present invention is of course applicable to the system or apparatus to which a program is supplied.

In the above-described embodiment, a laser beam printer was exemplified as the image forming apparatus, but the present invention is not limited thereto, and also applicable to an ink jet printer and a thermal transfer printer. In particular, it is applicable to the printer of the so-called bubble jet system using the head of the type in which ink droplets are discharged by the use of film boiling caused by the thermal energy.

While in the above-described embodiments the original image was input by the image scanner unit, the present invention is limited thereto, and is effective when the original image is input by the still video camera or video camera, and further created by the computer graphics.

The present invention is not limited to the above-described embodiments, and various changes and modifications can be effected without departing from the scope as defined by the appended claims.

In particular, the combination of the techniques as shown by the above-described embodiments is also included within the spirit and scope of the invention.

What is claimed is:

1. An image processing apparatus comprising:
   an input unit for inputting a color image signal;
   a discriminating circuit, having a memory storing data representing a feature of a specific image for which copying is prohibited, for discriminating based on the data stored in said memory and the color image signal input by said input unit whether an image represented by the color image signal is the specific image;
   connection means for connecting said discriminating circuit to said image processing apparatus; and
   detection means for detecting based on a predetermined signal obtained from said discriminating circuit whether said discriminating circuit connected by said connection means has been altered.

2. An image processing apparatus according to claim 1, wherein said detection means performs the detection based on identification information stored in said memory.

3. An image processing apparatus according to claim 2, wherein the memory is a read only memory (ROM).

4. An image processing apparatus according to claim 1, further comprising control means for controlling said apparatus in accordance with the detection result by said detection means.

5. An apparatus according to claim 1, wherein said image processing apparatus is a color printer.

6. An apparatus according to claim 1, wherein the specific image represents valuable papers.

7. An apparatus according to claim 1, wherein said discrimination means discriminates whether or not a predetermined pattern is included in the input image.

8. An apparatus according to claim 7, wherein the predetermined pattern is a red seal.

9. An apparatus according to claim 7, wherein the predetermined pattern is a line image.

10. A discrimination apparatus connected to an image processing apparatus, comprising:

an input unit for inputting a color image signal from said image processing apparatus;

a memory storing data representing a feature of a specific image for which copying is prohibited;

discriminating means for discriminating based on the color image signal input by said input unit and the data stored in said memory whether an image represented by the color image signal is the specific image; and detection means for detecting based on predetermined data stored in said memory whether said memory has been altered.

11. An apparatus according to claim 10, wherein said memory is a read-only memory.

12. An apparatus according to claim 10, wherein said image processing apparatus controls the operation of said image processing apparatus in accordance with the detection result of said detection means.

13. An image processing apparatus comprising:

an input unit for inputting a color image signal;

an image formation unit for performing color image formation on a recording medium on the basis of the color image signal;

a discriminating circuit, having a memory storing data representing a feature of a specific image for which copying is prohibited, for discriminating based on the data stored in said memory and the color image signal input by said input unit whether an image represented by the color image signal is the specific image;

connection means for connecting said discriminating circuit to said image processing apparatus;

detection means for detecting based on a predetermied signal obtained from said discriminating circuit whether said discriminating circuit connected by said connection means has been altered; and control means for causing said image formation unit to be unable to perform the color image formation, when it is detected by said detection means that said discriminating circuit been altered.

* * * * *

UNITED STATES PATENT AND TRADEMARK OFFICE
CERTIFICATE OF CORRECTION

PATENT NO.   : 6,346,989 B1
DATED        : February 2, 2002
INVENTOR(S)  : Funada et al.

It is certified that error appears in the above-identified patent and that said Letters Patent is hereby corrected as shown below:

Please delete original specification, and substitute therefor new specification attached.

Signed and Sealed this

Twenty-third Day of March, 2004

JON W. DUDAS
*Acting Director of the United States Patent and Trademark Office*

IMAGE PROCESSING APPARATUS AND METHOD

This application is a continuation of application Ser. No. 08/111,158 filed Aug. 23, 1993, now abandoned.

BACKGROUND OF THE INVENTION

1. Field of the Invention

The present invention relates to an image processing apparatus and method, and more specifically to an image processing apparatus, such as a copying machine or the like, provided with a detection function for detecting a specific original, and a method therefor.

2. Related Background Art

In recent years, it has become clear that a specific original which should not be copied may be counterfeited, due to the development of copying machines capable of making color copies of high image quality.

To allow an image processing apparatus such as a copying machine to recognize a specific original, a method has been proposed in which the feature data of the specific original is prestored within the apparatus, and compared with the features of an input image signal to determine whether or not it is the specific original.

In the above-mentioned conventional example, to discriminate the presence of the specific original, reference data regarding the discrimination of specific original is preheld in memory. However, when the memory or peripheral circuit is intentionally removed, or exchanged, or is out of order, it is impossible to detect such state, resulting in the disenabling the discrimination of specific original with the apparatus.

Also, in the above-mentioned conventional example, in discriminating the specific original, if any reference value of the white/black level of an image signal input into the image processing apparatus or any characteristic of the color space associated with an input color image signal is changed, the feature data must be changed in every case, and therefore the individual feature data for each apparatus must be changed. Further, when a plurality of kinds of images obtained from another apparatus such as an image scanner, a still video, a film scanner, a VTR or the like are input into one image processing apparatus to discriminate the presence of the specific original for all such kinds of images, it is requisite condition that feature data for all the apparatuses are stored.

Conventionally, a so-called frame-sequential printer has been known in which an image with a plurality of color components is formed corresponding to a plurality of scanning operations with the scanner to form a color image on the same paper. In such a printer, the technique for detecting a specific original different in each scanning operation has been disclosed in U.S. Pat. No. 5,227,871.

In the above conventional example, the discrimination reference data of a specific original is prestored in a memory, and is switched depending on the kind of specific original to be discriminated during multiple image formation operations. However, in the above conventional example, the kind of specific original to be discriminated in forming each image is assigned without regard to the degree of significance of the specific original the machine should be inhibited from copying the most significant specific originals.

Therefore, it is difficult to make a reasonable discrimination in accordance with the degree of significance of the specific original. Also, one of the techniques for inhibiting the copying of an original which should not be copied has been proposed by the present applicant in U.S. patent application Ser. No. 715,922 filed on Jun. 14, 1991, wherein the specific original is identified by preregistering specific original data in the color space, and discriminating whether or not the distribution of input original image data is substantially the same as that of specific original data in the color space.

However, in the above conventional example, because the color distribution of an original to be detected is compared in the form of collective information as a whole, there was a drawback that when the distribution area of important information (e.g., red-sealed portion in FIG. 90) in the color space is small, image data may be discriminated as the specific original, even if the distribution area of the important portion of the image lacks the image to be discriminated.

SUMMARY OF THE INVENTION

The present invention has been developed in the light of the aforementioned drawback associated with the conventional examples, and its objective is to provide an image processing apparatus which can inhibit any false copying of a specific original when a memory or peripheral circuit storing the discrimination reference data of specific original is removed or exchanged, or is out of order.

To accomplish such objective, according to the present invention, there is disclosed an image processing apparatus comprising, connection means for connecting a discrimination means for discriminating whether or not an input image is a predetermined image, and certification means for certifying whether the discrimination means connected with the connection means is genuine or not.

Also, it is another object of the present invention to provide an image processing apparatus which is capable of discriminating the specific original by using the same feature data of the specific original even if an image is input from a different input apparatus.

To accomplish such an object, there is disclosed an image processing apparatus comprising, input means for inputting a color image signal representing a color original, correction means for correcting a signal characteristic of the color image signal, and discrimination means for discriminating whether the color original is a predetermined image based on the color image signal whose signal characteristic is corrected by the correction means.

It is still another object of the invention to make a discrimination in accordance with the degree of significance of the specific original, when discriminating the identity of any of a plurality of specific originals and the input image.

To accomplish such an object, there is disclosed an image processing apparatus comprising, input means for inputting image data representing an original, and discrimination means for discriminating whether the original is at least one of a plurality of predetermined images, wherein the discrimination means makes a discrimination in accordance with the degree of significance of the plurality of predetermined images.

Further, it is another object of the invention to make a discrimination of good accuracy based on a plurality of color tints for the specific original.

To accomplish such an object, there is disclosed an image processing apparatus comprising, input means for inputting color image data representing a color original, first discrimination means for discriminating whether the color original is a predetermined image based on a first color of the predetermined image, second discrimination means for discriminating whether the color original is the predetermined image based on a second color of the predetermined image which is different from the first color, and third discrimination means for discriminating whether the color original is the predetermined image based on the discrimination results of the first and second discrimination means.

Other objects and forms of the present invention will be apparent from the following description with reference to the drawings and the appended claims.

BRIEF DESCRIPTION OF THE DRAWINGS

Figure 79:
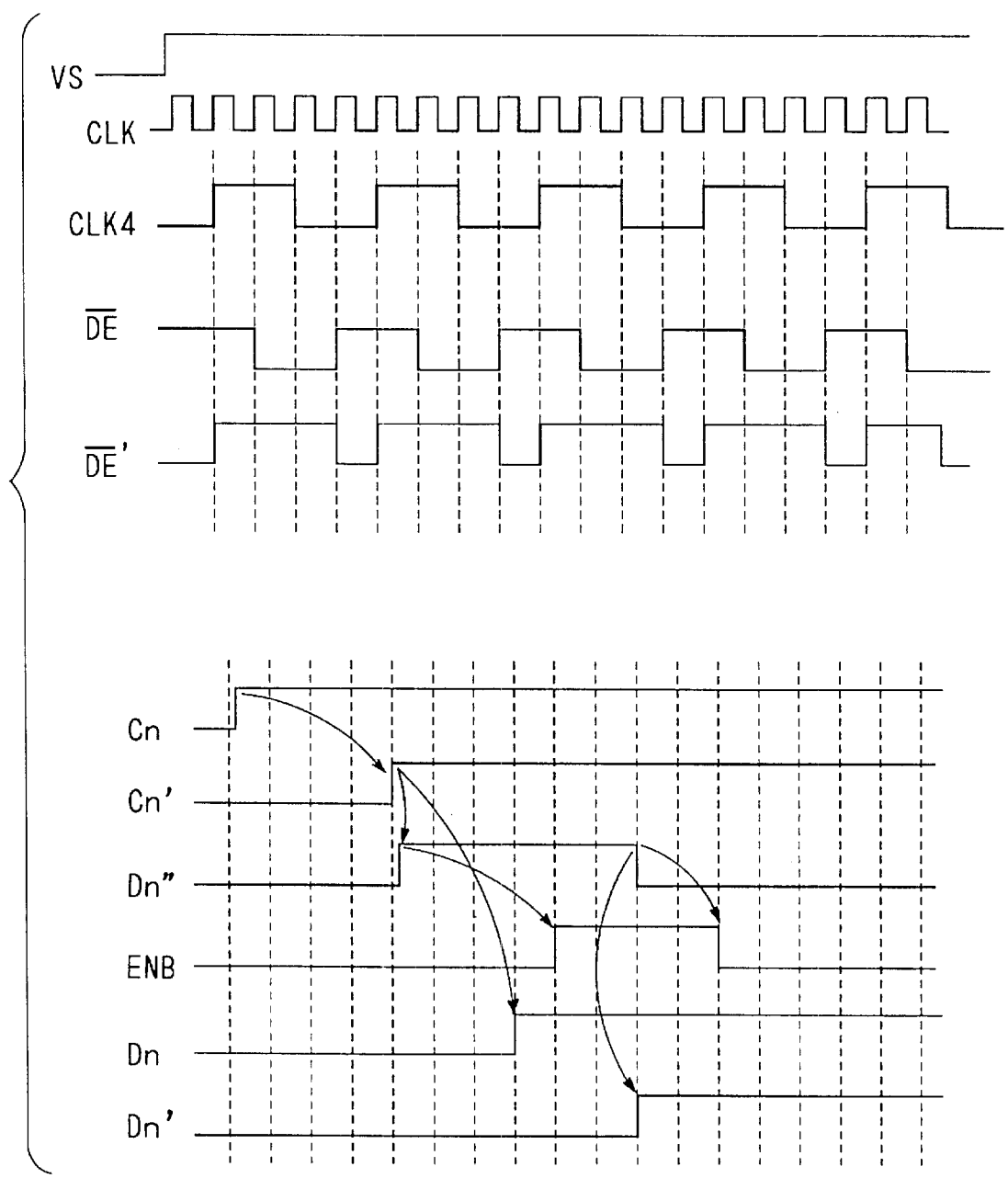
FIG. 79 is a timing chart involving the reading and writing of data from and into an SRAM 7209.
Figure 85:
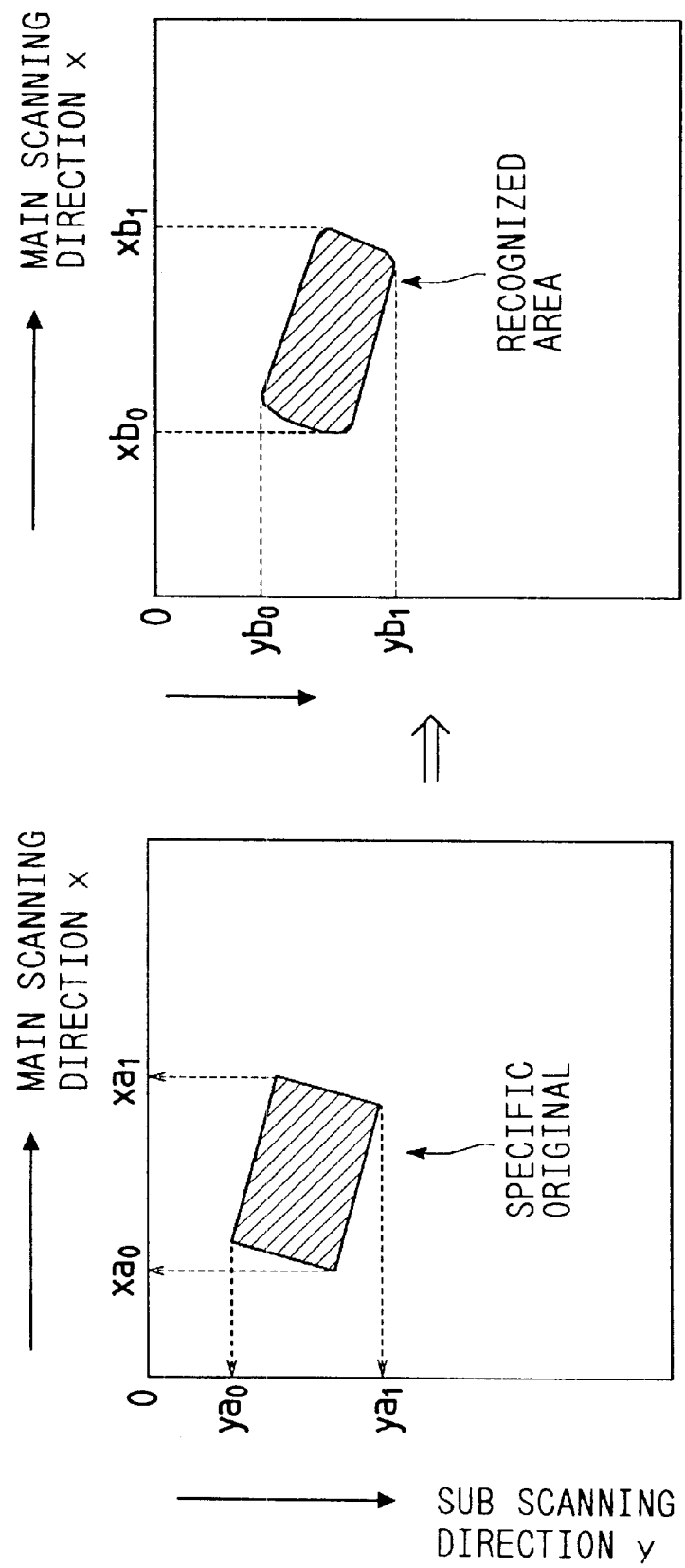
FIG. 85 is a view showing the relation between the position of specific original on the original plate and the recognized area.

FIG. 1 is a schematic view of an apparatus according to one embodiment of the present invention;

FIG. 2 is a block diagram showing an example of the signal flow in an image scanner of this embodiment;

FIG. 3 is a timing chart showing an example of synchronizing signal in this embodiment;

FIG. 4 is a view showing an example of a 4×4 pixel block in this embodiment;

FIG. 5 is a block diagram showing a configurational example of a discrimination circuit of this embodiment;

FIG. 6 is a block diagram showing another configurational example of a discrimination circuit of this embodiment;

FIG. 7 is a block diagram showing another configurational example of a discrimination circuit of this embodiment;

FIG. 8 is a block diagram showing a detailed configurational example of a division circuit of this embodiment;

FIGS. 9A and 9B are a block diagram showing a detailed configurational example of a thinning circuit and a timing chart showing an operation example in this embodiment;

FIG. 10 is a diagram showing a detailed configurational example of a correction circuit of this embodiment;

FIGS. 11A and 11B are a block diagram showing a detailed configurational example of P/S 105 and a timing chart showing an operation example in this embodiment;

FIGS. 12A and 12B are a timing chart exemplifying the signal FE1 to FE3 which are output from an FIFO control unit and a table showing the states of FIFOs 107 to 109 and a bi-directional buffer 106;

FIGS. 13A and 13B are a block diagram showing a configurational example of S/Ps 112 to 114 and a timing chart showing an operation example in this embodiment;

FIG. 14 is a diagram showing an example of a 3×3 pixel block around a subject pixel E in this embodiment;

FIG. 15 is a block diagram showing a configurational example of a line drawing/flat portion separation circuit in this embodiment;

FIG. 16 is a timing chart showing an operation example of the like-drawing/flat-portion separation circuit in this embodiment;

FIG. 17 is a block diagram showing a detailed configurational example of a binary-coding discrimination circuit of this embodiment;

FIG. 18 is a block diagram showing another detailed configurational example of a binary-coding discrimination circuit of this embodiment;

FIG. 19 is a timing chart showing an operation example of the binary-coding discrimination circuit of this embodiment;

FIGS. 20A and 20B are views showing examples of the color tint distribution of a normal specific original on an RGB space;

FIGS. 21A and 21B are a block diagram showing a configuration example of a bank switch portion and a timing chart showing an operation example in this embodiment;

FIG. 22 is a table showing an example of information which a ROM b of this embodiment holds;

FIG. 23 is a block diagram showing a configurational example of an integrating circuit a of this embodiment;

FIGS. 24A and 24B are block diagrams showing the configurational example of S/P as shown in FIG. 23;

FIG. 25 is a flowchart showing an operation example of S/P as shown in FIG. 23;

FIG. 26 is a block diagram showing a configurational example of an IIR filter as shown in FIG. 23;

FIGS. 27A to 27C are graphs exemplifying processed results of the integrating circuit a of this embodiment;

FIGS. 28A and 28B are a block diagram showing a configurational example of an average circuit and a timing chart showing an operation example in this embodiment;

FIGS. 29A and 29B are a block diagram showing a configurational example of P/S as shown in FIG. 23 and a timing chart showing an operation example;

FIG. 30 is a block diagram showing a configuration example of an integrating circuit b of this embodiment;

FIG. 31 is a block diagram showing a configuration example of an IIR filter as shown in FIG. 30;

FIGS. 32A to 32D are graphs exemplifying processed results of the integrating circuit b of this embodiment;

FIG. 33 is a block diagram showing a configurational example of a volume ratio discrimination circuit of this embodiment;

FIG. 34 is a block diagram showing another configurational example of a volume ratio discrimination circuit of this embodiment;

FIG. 35 is a diagram showing an operation example of the volume ratio discrimination circuit of this embodiment;

FIG. 36 is a table showing the operation example of the volume ratio discrimination circuit of this embodiment;

FIG. 37 is a block diagram showing a configurational example of a counter as shown in FIG. 34;

FIG. 38 is a block diagram showing a configurational example of S/P as shown in FIG. 33;

FIG. 39 is a timing chart showing an operation example of S/P as shown in FIG. 33;

FIG. 40 is a flow chart showing an operation example in an ID reading mode of this embodiment;

FIG. 41 is a block diagram showing a configurational example of a discrimination circuit according to the second embodiment of the present invention;

FIG. 42 is a block diagram showing another configurational example of a discrimination circuit in the second embodiment;

FIG. 43 is a block diagram showing another configurational example of a discrimination circuit in the second embodiment;

FIG. 44 is a table exemplifying information which a ROM b of the second embodiment holds;

FIGS. 45A and 45B are a block diagram showing a configurational example of bank switch portion and a timing chart showing its operation example in the second embodiment;

FIG. 46 is a timing chart showing the read timing of signal HIT in the first embodiment;

FIG. 47 is a view showing a copied example in the first embodiment;

FIG. 48 is a block diagram showing the configuration of a discrimination circuit 5409 according to the third embodiment of the invention;

FIG. 49 is a block diagram showing the configuration of a bank switch circuit 5312 in the third embodiment;

FIG. 50 is a block diagram showing the configuration of an image data correction circuit 5320 in the third embodiment;

FIG. 51 is a circuit diagram showing the configuration of a thinning circuit in the third embodiment;

FIG. 52 is a circuit diagram showing the configuration of a division circuit 5310 in the third embodiment;

FIG. 53 is a block diagram showing the configuration of an integrator 5306 in the third embodiment;

FIG. 54 is a block diagram showing the configuration of an image scanner unit 5201 in the third embodiment;

FIG. 55 is a timing chart of a main scanning operation in the normal control mode of the third embodiment;

FIG. 56 is a timing chart for the bank switch circuit 5312 in the third embodiment;

FIG. 57 is a chart showing an example of the input/output of the integrator in the third embodiment;

FIG. 58 is a chart showing another example of the input/output of the integrator in the third embodiment;

FIG. 59 is a view exemplifying copied results in the third embodiment;

FIG. 60 is a flow chart of an ID reading mode in the third embodiment;

FIG. 61 is a block diagram showing the configuration of a discrimination circuit according to the fourth embodiment of the present invention;

FIG. 62 is a block diagram showing the configuration of a bank switch circuit 5312' in the fourth embodiment;

FIG. 63 is a timing chart of the bank switch circuit 5312' in the fourth embodiment;

FIG. 64 is a block diagram showing the configuration of a discrimination circuit according to the firth embodiment of the present invention;

FIG. 65 is a diagram showing the relation between a CNO signal and the print output in the third embodiment;

FIG. 66 is a table showing the content held at each address of a ROM 5311 and the access condition thereof;

FIG. 67 is a table showing the content held at each address of a ROM 5311' corresponding to ROM 5311 in the third embodiment and the access condition thereof;

FIG. 68 is a block diagram showing the configuration of a discrimination circuit 6409 according to the sixth embodiment;

FIG. 69 is a block diagram showing the configuration of an image scanner unit 6201 in the sixth embodiment;

FIG. 70 is a timing chart between A1, D1 and WE;

FIG. 71 is an upper view showing an operation plane of an operation unit 6250 in the sixth embodiment;

FIG. 72 is a flow chart for describing the rewrite procedure of an LUT 6302 in the sixth embodiment;

FIG. 73 is a block diagram showing the configuration of an image data correction circuit according to the seventh embodiment;

FIG. 74 is a block diagram showing the configuration of an image scanner unit 201 according to the eighth embodiment;

FIG. 75 is a block diagram showing the configuration of a correction circuit according to the first embodiment;

FIG. 76 is a block diagram of a signal processing device for a color image reading apparatus;

FIG. 77 is a circuit diagram for a color space matching discrimination circuit 7106;

FIG. 78 is a block diagram for color space discrimination circuits 7240 to 7247;

FIG. 79 is a timing chart involving the reading and writing of data from and into an SRAM 7209;

FIG. 80 is a circuit block diagram for a real-time correction signal generating circuit 7107;

FIG. 81 is a circuit block diagram for a print signal generating circuit 7105;

FIG. 82 is a circuit block diagram showing the circuit configuration of smoothing circuits 7220 to 7227;

FIG. 83 is a chart showing the relation between input Xi and smooth calculation value Yi;

FIG. 84 is a view showing the relation between the shape of specific original in the color space and a discrimination ROM 7204;

FIG. 85 is a view showing the relation between the position of specific original on the original plate and the recognized area;

FIG. 86 is a view showing the distribution shape of specific originals part 1 and part 2 in the color space;

FIG. 87 is a view showing the shape of specific original B in the color space;

FIG. 88 is a diagram showing the relation between data regarding multiple originals stored in the ROM 7204 and the bit location of ROM 7204;

FIG. 89 is a view conceptually showing the discrimination for similarity between the distribution of input color image in the color space and the color distribution of a specific original;

FIG. 90 is an explanation view for the portion showing two color distributions for the specific original A;

FIG. 91 is a block diagram of a color image reading signal process in the second embodiment; and FIG. 92 is a diagram showing a total drawing amount calculation circuit 1601.

DETAILED DESCRIPTION OF THE PREFERRED EMBODIMENTS

<Embodiments>

An image processing apparatus according to the embodiment of the present invention will be described below with reference to the drawings. In the following embodiments, a copying machine is exemplified as an application example of the present invention, but the present invention is not limited thereto, and is applicable to other apparatuses including a printer and a printer interface without departing from the scope of the invention. Also, the specific original herein used is meant to encompass all originals ranging from copying forbidden originals such as banknotes and securities to special purpose originals such as confidential documents.

First Embodiment

A copying machine according to a first embodiment of the present invention will now be described.

[Shape of Apparatus]

FIG. 1 is a schematic view which illustrates an example of the structure of an apparatus according to an embodiment of the present invention.

Referring to FIG. 1, reference numeral 201 represents an image scanner that is a section of the apparatus for reading an original document to subject it to a digital signal process.

Reference numeral 202 represents a printer for printing out a full color image corresponding to an image of the original document read by the image scanner 201 onto a paper sheet.

In the image scanner 201, reference numeral 200 represents a mirror-surface pressure plate. An original document 204 placed on an original-document frame glass (hereinafter called a "platen") 203 is irradiated by a lamp 205. The image of the original document is introduced to mirrors 206 to 208, followed by forming the image on a 3-line sensor 210 by a lens 209 to be decomposed into full-color information, that is, color components red (R), green (G) and blue (B). As a result, the image is, in the form of a signal denoting the intensity of light of each component, transmitted to a signal processing portion 211. The mechanical movement of the lamp 205 and the mirror 206 at speed v and that of the mirrors 207 and 208 at speed v/2 each performed in the perpendicular direction with respect to the electronical scanning (the main scanning) direction of the CCD 210 cause the entire surface of the original document to be scanned (sub-scanned). The image of the original document thus read is transmitted to the signal processing portion 211.

In the signal processing portion 211, the image signal supplied from the image scanner 210 is electrically processed so that it is decomposed into color components magenta (M), cyan (C), yellow (Y) and black (K), followed by transmitting the signals denoting the color components to the printer 202. Any one of components M, C, Y or K is generated whenever the image scanner 201 performs one scanning operation, followed by transmitting the color component to the printer 202. That is, four scanning operations for scanning the original document are required to enable one printing out to be completed.

The image signals denoting M, C, Y and K transmitted from the image scanner 201 are transmitted to a laser driver 212. The laser driver 212 modulates and actuates a semiconductor laser 213 in accordance with the transmitted image signal. Laser beams scan the surface of a photosensitive drum 217 via a polygonal mirror 214, an f-θ lens 215 and a mirror 216.

Reference numeral 218 represents a rotary developing device composed of a magenta developing section 219, a cyan developing section 220, a yellow developing section 221 and a black developing section 222. The foregoing four developing sections alternately come in contact with the photosensitive drum 217 so that a static latent image formed on the photosensitive drum 217 is developed with toner.

Reference number 223 represents a transferring drum to which a paper sheet supplied from a paper-sheet cassette 224 or 225 is wound to transfer the image developed on the photosensitive drum 217.

After the four colors M, C, Y and K have been sequentially transferred as described above, the paper sheet passes through a fixing unit 226 so that the toner is fixed to the paper sheet before the paper is discharged.

Reference numeral 227 represents an IC card to be inserted into a card reader 228 included by the image scanner 201 so that it transfers information to be stored to the signal. processing portion 211 and so forth.

[Image Scanner]

FIG. 2 is a block diagram which illustrates an example of the flow of the signal supplied from the image scanner 201.

Referring to FIG. 2, reference numerals 210-1 to 210-3 represent CCD sensors each having R, G and B spectrum sensitivity characteristics to transmit, for example, an 8-bit signal that has been converted from an analog signal to a digital signal. Therefore, each of R, G and B colors is classified into levels from 0 to 255 in accordance with the intensity thereof. The CCD sensors 210-1 to 210-3 are included in the 3-line sensor 210 shown in FIG. 1.

Since the CCD sensors 210-1 to 210-3 according to this embodiment are disposed at predetermined intervals, delays 301 and 302 are used to correct their spatial deviations.

Reference numerals 303 to 305 represent logarithmic converters formed into a look-up table each comprising a ROM or a RAM to convert the image signals supplied form the CCD sensors 210-1 to 210-3 via the delays 301 and 302 from brightness signals into density signals.

Reference numeral 306 represents a known masking/UCR (Under Color Removal) circuit. Although a detailed description about it is omitted here, the masking/UCR circuit 306 transmits M, C, Y and K signals in response to the supplied three signals at each reading operation, the M, C, Y and K signals being transmitted in a plane sequential manner while having a predetermined bit length, for example, 8 bits.

Signal CNO to be individually supplied to the masking/UCR circuit 306 is a 2-bit plane sequential signal, an example of which is shown in Table 1. The signal CNO controls the sequential order of the four reading operations to switch the operation conditions of the masking/UCR circuit 306.

TABLE 1

| CNO | Print Output |
|-----|--------------|
| 0   | Magenta (M)  |
| 1   | Cyan (C)     |
| 2   | Yellow (Y)   |
| 3   | Black (K)    |

Reference numeral 307 represents a known spatial filter circuit for correcting the spatial frequency of the output signal.

Reference numeral 308 represents a density conversion circuit for correcting the density characteristics of the printer 202, the density conversion circuit 308 being formed into a look-up table comprising a ROM or a RAM.

Reference numeral 309 represents a discrimination circuit for discriminating a specific original document image. Although its detailed description will be described later, a discrimination is made as to whether or not at least one of a plurality of the specific original document images is being read, resulting in transmission of discrimination signal HIT.

Reference numeral 311 represents a CPU for controlling the structure according to this embodiment. The CPU 311 controls the discrimination circuit 309 to transmit copy inhibition signal INHIBIT in accordance with the discrimination signal HIT supplied from the discrimination circuit 309.

When the discrimination circuit 309 receives control signal RID supplied from the CPU 311, it transmits signal ROM1-ID and signal ROM2-ID so that the CPU 311 is, in response to the foregoing signal, given a specific number ID added to the ROM included by the discrimination circuit 309.

Reference numeral 310 represents a selector for selecting and transmitting either, for example, an 8-bit signal V supplied from the density conversion circuit 308 or a fixed value, for example, "80"(HEX) in response to the signal INHIBIT supplied from the CPU 311 to a selection terminal S. That is, the selector 310 selects and transmits the signal V supplied from the density conversion circuit 308 if the signal INHIBIT is "1", while the same selects and transmits the fixed value, for example "80" (HEX) if the signal INHIBIT is "0".

Namely, the selector 310 transmits "80" (HEX) if a discrimination has been made by the discrimination circuit 309 that the specific original document is being read regardless of the value of the signal V, while the same transmits the same output as the signal V in the residual cases.

[Timing Chart of Synchronizing Signal]

FIG. 3 is a timing chart which illustrates an example of a synchronizing signal according to this embodiment.

Referring to FIG. 3, reference numeral 401 represents the main scanning timing, 402 represents the sub-scanning timing for a short region, and 403 represents the sub-scanning timing for a long region.

In a section 401, signal CLK that in a standard clock signal causes image processing for a pixel unit to be performed in this embodiment in synchronization with the first transition of the signal CLK.

Signal HSYNC is a main-scanning synchronizing signal so that the start of the main scanning is synchronized in this embodiment with the first transition of the signal HSYNC.

Signal CLK4 is a block signal obtained by dividing the signal CLK into four sections, the signal CLK4 being used, together with the signal CLK, to synchronize the basic operation of the discrimination circuit 309.

Signal XPHS is a phase signal of the main scanning operation, the signal XPHS repeating values from 0 to 3 in response to the signal CLK4.

Signal XDO is a signal to be described later, the signal XDO being "0" when the signal XPHS is "0" and being "1" when the signal XPHS is not "0".

As shown in section 402, signal YPHS is a phase signal for the sub-scanning operation, the signal YPHS repeating values from 0 to 3 in synchronization with the first transition of the signal HSYNC.

Signal HS4 is a signal to be described Slater, the signal HS4 being "1" at a period which is four times that of the signal HSYNC in only one period of the signal CLK4.

As shown in section 403, signal VS is a sub-scanning enable signal which forms images in a sequential order as M, C, Y and K in a period in which the signal VS is "1" in this embodiment.

Signal CNO is the foregoing plane sequential signal which is 0, 1, 2, and 3 in synchronization with the first transition of the signal VS.

[Unit for Discrimination]

The discrimination circuit 309 performs discrimination in units of blocks composed of pixels 4×4.

FIG. 4 illustrates an example of a block composed of 4×4 pixels.

The discrimination circuit 309 subjects, for example, a block 501 composed of 4×4 pixels shown in FIG. 4. In synchronization with the 4×4 pixel block, the signal XPHS repeats the values 0, 1, 2 and 3 in the main scanning direction, while the signal YPHS repeats the values 0, 1, 2 and 3 in the sub-scanning direction.

In this embodiment, for example, 8 types of specific original documents are discriminated in a time-division manner with the values from 0 to 3 of the signal YPHS so that, for example, 32 types of specific original documents are discriminated.

[Discrimination Means]

FIGS. 5, 6 and 7 are block diagrams which illustrate an example of the discrimination circuit 309.

The main structure of the discrimination circuit 309 is formed into an LSI structure as represented by reference numeral 101 so that the discrimination circuit 309 receives RGB signals, that are digital color image signals, to transmit the signal HIT denoting the result of the discrimination.

The components of the discrimination circuit 309 will now be described.

Coefficient Register 148

A coefficient register 148 stores a variety of set coefficients for operating the LSI 101. A coefficient ROM (hereinafter called a "ROM a") 147 previously stores coefficients to be set in the coefficient register 148.

The addresses generated by a counter b144 pass through a 3-state gate 145, followed by being received by address terminals A0 to A7 of the ROMa 147. The ROMa 147 sequentially transmits the coefficients, which corresponds to the addresses, to the coefficient register 148.

Although the control of the 3-state gate 145 will be described later, control input RID of the 3-state gate 145 "0" in the usual case.

Division Circuit 102

A division circuit 102 divides the signals CLK and HSYNC.

FIG. 8 is a block diagram which illustrates an example of the detailed structure of the division circuit 102.

Referring to FIG. 8, reference numerals 601 and 604 represent inverters, 602 represents a 2-bit counter, and 603 represents an OR gate.

The counter 602 transmits the foregoing signal XPHS. The signal XPHS is initialized to "0" when the signal HSYNC is "1", that is, at the standard position for main scanning, while it repeating the values from 0 to 3 in synchronization with the first transition of the signal CLK.

The OR gate 603 receives both bits of the signal XPHS to transmit its logical sum as the foregoing signal XDO.

An inverter 604 inverts the lower bit (bit 0) of the signal XPHS to transmit it as the foregoing signal CLK4.

As a result of the foregoing structure, the control signal 401 shown in FIG. 3 can be obtained.

Reference numeral 605 represents a 2-bit counter, 606 represents a NOR gate, 607 and 608 represent flip-flops (hereinafter called "F/Fs"), and 609 represents an AND gate.

The counter 605 transmits the foregoing signal YPHS. The signal YPHS repeats the value from 0 to 3 in synchronization with the first transition of the signal HSYNC.

The NOR gate 606 receives both bits of the signal YPHS to transmits its NOR signal. That is, the output from the NOR gate 606 is "1" in only a case where the signal YPHS is "00".

The F/Fs 607 and 608 respectively delay the supplied signals in synchronization with the signal CLK4.

The AND gate 609 receives a positive logical output from the F/F 607 and a negative logical output from the F/F 608 to transmit their logical product signal. That is, the AND gate 609 transmits the signal HS4 immediately after the signal YPHS has been "00", the signal HS4 having the pulse width that is substantially the same as one period of the signal CLK4.

As a result of the foregoing structure, the control signal 402 shown in FIG. 3 can be obtained.

Thinning Circuit 103

A thinning circuit 103 thins out the supplied RGB signals in the main scanning direction.

FIG. 9A is a block diagram which illustrates an example of the detailed structure of the thinning circuit 103. FIG. 9B is a timing chart which illustrates an example of the operation of the thinning circuit 103. The thinning circuit 103 is composed of three circuits for respectively processing the RGB signals. Since the three circuits have substantially the same structure, FIG. 9A illustrates only the circuit for processing the signal R, and the descriptions of the circuits for processing the signals G and B are omitted here.

Referring to FIG. 9A, reference numerals 701, 703 and 704 represent F/Fs, 702 represents a 2-input 1-output selector.

The F/F 701 delays the supplied signal R in synchronization with the first transition of the signal CLK to transmit signal Sr.

If the selector 702 receives the signal XDO, the value of which is "0", at a selection terminal S thereof, it selects and transmits a signal supplied to a terminal A. If the value of the supplied signal XDO is "1", the selector 702 selects and transmits a signal supplied to a terminal B. That is, the selector 702 selects and transmits signal DR supplied to the terminal A, that is, delayed by the F/F 701 in only a case where the signal XDO is "0", that is, the signal XPHS is "00".

The F/F 703 delays the signal supplied from the selector 701 in synchronization with the first transition of the signal CLK to transmit the signal SR.

That is, if the signal XPHS is not "00", the signal XDO is "1" as shown in FIG. 9B, resulting in the selector 702 selecting the signal supplied to the terminal B thereof to transmit it. Therefore, the signal SR to be transmitted from the F/F 703 is held until the signal XPHS is "00".

As a result, the signal R when the signal XPHS is "00" to "10" is thinned as shown in FIG. 9B so that the signal R in the case where the signal XPHS is "11" is the signal SR.

Then, the signal SR is made to be in synchronization with the first transition of the signal CLK4 by the F/F 704 to be transmitted as signal R'.

Also, thinning from the signal G to the signal G' and that from the signal B to the signal B' are performed in a similar manner to that described above.

Correction Circuit 104

A correction circuit 104 corrects scattering of the characteristics of the CCD 210 and so forth by correcting the gain or by performing an offset correction of the supplied signal.

FIG. 10 illustrates an example of the detailed structure of the correction circuit 104. The correction circuit 104 is composed of three circuits for respectively processing the RGB signals. Since the three circuits are structured similarly, FIG. 10 illustrates only the circuit for processing the signal R', and descriptions about the circuits for processing the signals G' and B' are omitted here.

Referring to FIG. 10, reference numeral 901 represents a multiplier, 902 represents an adder, 903 represents a limiter, and 904 represents a F/F.

The multiplier 901 receives the signal R' and the gain corrected value Gr to transmit, for example, a 9-bit result of multiplication R'×Gr/32. It should be noted that the gain correction value Gr is, for example, a 6-bit signal, the value of which is set to a range from 0 to 63.

The adder 902 receives the output from the multiplier 901 and an offset correction value Or to transmit, for example, a 10-bit result of addition R'×Gr/32+Or. It should be noted that the offset correction value Or is, for example, a 6-bit signal, the value of which is set to a range from −32 to +32.

The gain correction value Gr and the offset correction value Or are stored in the foregoing coefficient register 148.

A limiter 903 controls the output from the adder 902 to make the output from the correction circuit 104 to be included in the width of, for example, 8 bits. The limiter 903 controls, for example, an input, that is larger than 255, to be 255 and controls an input, that is smaller than 0, to be 0.

The F/F 904 transmits the signal supplied from the limiter 903 as signal R" in synchronization with the first transition of the signal CLK4.

Also, the correction from the signal G' to the signal G" and that from the signal B' to the signal B" are performed in a similar manner to the foregoing descriptions of the correction operation.

Parallel/Serial Converter 105

FIG. 11A is a block diagram which illustrates an example of the detailed structure of a parallel/serial converter (hereinafter called a "P/S") 105. FIG. 11B is a timing chart which illustrates an example of the operation of the P/S 105.

Referring to FIG. 11A, reference numeral 1101 represents a 4-input 1-output selector, and 1103 represents a F/F.

The selector 1101 selects the signal R", the signal G", the signal B" or "00" from the correction circuit 104 in synchronization with the signal XPHS supplied to the selection terminal S. That is, the selector 1101 selects and transmits the signal R" if the signal XPHS is "0", selects and transmits the signal G" if the signal XPHS is "1", selects and transmits the signal B" if the signal XHPS is "2", selects and transmits "00" if the signal XPHS is "3".

The F/F 1103 transmits the signal supplied from the selector 1101 as the signal ND in synchronization with the first transition of the signal CLK.

Specifically, the P/S 105 is operated as shown in FIG. 11B for example. When the P/S 105 in parallel receives the signals R", G" and B" the values of which are a, b and c respectively, it transmits signal ND the value of which is a when the signal XPHS is "1", transmits signal ND the value of which is b when the signal XPHS is "2", and transmits signal ND the value of which is c when the signal XPHS is "3". That is, the RGB signals supplied to the P/S 105 in parallel are sequentially transmitted serially.

Control of FIFO

Referring to FIGS. 5, 6 and 7, reference numeral 106 represents a bi-directional buffer, 107 to 109 represent FIFO memories (hereinafter called "FIFOs"), 110 represents an inverter, and 112 to 114 represent serial/parallel converters (hereinafter called "S/Ps").

Reference numeral 111 represents an FIFO control portion for controlling enable signals for the FIFOs 107 to 109.

The FIFOs 107 to 109 respectively realize delays of 4 lines, the FIFOs 107 to 109 being constituted by M66251 (manufactured by Mitsubishi Electric Corp.). The FIFOs 107 to 109 have writing reset terminal WRES and reading reset terminal RRES which receive signals obtained by making the signal HSYNC to be a negative logarithm by the inverter 110.

The FIFO control portion 111 transmits signals FE1, FE2 and FE3, the signal FE1 being supplied to a write-enable terminal WE of the FIFO 107 and to an output enable terminal of the bi-directional buffer 106. The signal FE2 is supplied to a read-enable terminal RE of the FIFO 107, while the signal FE3 is supplied to write-enable terminals WE of the FIFOs 108 and 109. It should be noted that the read-enable terminals of the FIFOs 108 and 109 are grounded so that they are always in the enable state.

FIG. 12A is timing chart which illustrates an example of signals FE1 to FE3 to be transmitted from the FIFO control portion 111. FIG. 12B illustrates an example of states of the FIFOs 107 to 109 and the bi-directional buffer 106.

That is, the signal FE1 is "0" when the signal YPHS is "0", and the same is "1" when the signal YPHS is "1", "2" or "3". The signal FE2 is "1" when the signal YPHS is "0", and the same is "0" when the signal YPHS is "1", "2" or "3". The signal FE3 is "1" when the signal YPHS is "0", "1") or "2", and the same is "0" when the signal YPHS is "3".

Therefore, the enabled states of writing and reading of the FIFOs 107 and 109 and the classification of the input and the output of the bi-directional buffer 106 are shown in FIG. 12B for example.

That is, the terminals WE and RE of the FIFO 107 are enabled and disabled respectively if the signal YPHS is "0". They are made to be disabled and enabled respectively when the signal YPHS is "1", "2" or "3". The terminals WE of the FIFOs 108 and 109 are made to be disabled if the signal YPHS is "0", "1" or "2", and the same is enabled if the signal YPHS is "3".

If the signal YPHS is "0", the signal ND transmitted from the P/S 105 is written on the FIFO 107 via the bi-directional buffer 106, the signal ND being, as signal NDA, simultaneously transmitted to the serial/parallel converter (hereinafter called a "S/P") 112. If the signal YPHS is "1", "2" or "3", the signal read from the FIFO 107 is, as the signal NDA, transmitted to the S/P 112 via the bi-directional buffer 106. As a result, the signal ND, transmitted from the P/S 105 in the case where the signal YPHS is "0", is, as the repeating signal NDA, transmitted to S/P 112 in the case where the signal YPHS is "0", "1", "2" or "3".

On the other hand, the FIFOs 108 and 109 are brought into the write-enable state if the signal YPHS is "3", resulting in the always read-enable state. As a result, output signal NDB from the FIFO 108 is delayed from the signal NDA by four lines (that is, four cycles of the signal HSYNC), followed by transmitting it to the S/P 113. Output signal NDC from the FIFO 109 is delayed from the signal NDB by four lines, followed by transmitting it to the S/P 114.

That is, data in the case where the signal YPHS is "0" is repeatedly read from the FIFO, resulting in data in the sub-scanning direction being thinned. Therefore, data is thinned to ¼ in both the main scanning direction and the sub-scanning direction in cooperation of the foregoing thinning circuit 103.

S/Ps 112 to 114

FIG. 13A is a block diagram which illustrates an example of the structure of the S/P. FIG. 13B is a timing chart which illustrates an example of the operation of the S/P.

Referring to FIG. 13A, reference numerals 1401 to 1403 represent F/Fs, 1404 represents a 2-input 1-output selector, and 1406 and 1407 represent F/Fs.

The F/Fs 1401 to 1403 sequentially delay the supplied signals by one period of the signal CLK in synchronization with the signal CLK to transmit them.

The selector 1404 selects any one of the signals supplied to terminals A1 to A3 or signals supplied to terminals B1 to B3 in response to the signal XDO supplied to the selection terminal S to transmit the selected signal. That is, the selector 1404 selects and transmits the signal supplied to the terminals A1 to A3 if the signal XPHS is "0", that is, if the signal XDO is "0". The selector 1404 selects and transmits the signal supplied to the terminals B1 to B3 if the signal XPHS is "1", "2", or "3", that is, if the signal XDO is "1".

The F/F 1406 transmits the signal supplied from the selector 1404 as signals A1, B1 and C1 in synchronization with the first transition of the signal CLK.

The F/F 1407 transmits the signal supplied from the F/F 1406 as signals A, B and C. in synchronization with the first transition of the signal CLK4. As a result, the S/P converts signals, which have been sequentially supplied in serial, into parallel signals.

Referring to FIGS. 5, 6 and 7, the RGB signals converted into serial signals by the P/S 105 are again changed to parallel RGB signals by the S/Ps 112 to 114. Since the signal NDB is delayed from the signal NDA by four lines (the four periods of the signal HSYNC) and the signal NDC is delayed from the signal NDB by four lines (the four periods of the signal HSYNC), the RGB signals transmitted from the S/Ps 112 to 114 are relatively delayed by a degree corresponding to the four lines.

Line-Drawing/Flat-Portion Separation Circuit 115

The discrimination circuit 309 is arranged to discriminate a specific original document in the form of a line drawing as the foregoing specific original document to be discriminated. Therefore, the line-drawing/flat-portion separation circuit 115 detects and separates a line drawing portion and a flat portion from images supplied from the S/Ps 112 to 114.

For example, terminals R1, G1 and B1 of the line-drawing/flat-portion separation circuit 115 receive the RGB signals (hereinafter called signals "R1, G1 and B1") supplied from the S/P 112, terminals R2, G2 and B2 of the same receive the RGB signals (hereinafter called signals "R2, G2and B2") supplied from the S/P 113 delayed by the four lines, and terminals R3, G3 and B3 of the same receive the RGB signals (hereinafter called signals "R3, G3 and B3") supplied from the S/P 114 delayed by the four lines. The line-drawing/flat-portion separation circuit 115 detects the line drawing with 3×3 pixels as shown in FIG. 14 for example, formed from the supplied three sets of RBG signals, and composed of peripheral pixels A to D and F to I around a subject pixel E which has been thinned.

FIG. 15 is a block diagram which illustrates an example of the structure of the line-drawing/flat-portion separation circuit 115. FIG. 16 is a timing chart which illustrate an example of the operation of the line-drawing/flat-portion separation circuit 115.

Referring to FIG. 15, reference numeral 1601 represents a line-drawing detection portion r to detect the line drawing from the signals R1, R2 and R3. Reference numeral 1602 represents a line-drawing detection portion g to detect the line drawing from the signals G1, G2 and G3. Reference numeral 1603 represents a line-drawing detection portion b to detect the line drawing from the signals B1, B2 and B3. Since the line-drawing detection portions 1601 to 1603 have a similar structure, an example of the detailed structure of the line-drawing detection portion r 1601 is shown in FIG. 15 and the residual line-drawing detection portions 1602 and 1603 are omitted from the description below.

Reference numerals 1604 to 1612 represent F/Fs for delaying the supplied signals R1, R2 and R32 in synchronization with the first transition of the signal CLK4 to form a 3×3 pixel block from the image signals thinned to ¼ in both the main scanning direction and the sub-scanning direction.

Reference numerals 1613 to 1616 represent adders for transmitting the arithmetic mean (A+B)/2 of the signals supplied to input terminals A and B.

Reference numerals 1617 and 1618 respectively represent maximum-value/minimum-value circuits for transmitting either of the signals supplied to the input terminal A or B that has a larger value from an output terminal max, and transmitting either of the signals supplied to the input terminal A or B that has a smaller value from an output terminal min.

Reference numeral 1619 represents a maximum-value circuit for transmitting either of the signals supplied to the input terminal A or B that has a larger value.

Reference numeral 1620 represents a minimum-value circuit for transmitting either of the signals supplied to the input terminal A or B that has a smaller value.

Therefore, the maximum-value circuit 1619 transmits the maximum value among the outputs from the four adders 1613 to 1616. The maximum-value circuit 1620 transmits the minimum value among the outputs from the four adders 1613 to 1616.

Reference numeral 1621 represents a subtractor for transmitting the result of a subtraction of the output from the minimum-value circuit 1620 from the output from the maximum-value circuit 1619. Although omitted from the detailed description, the output from the subtractor 1621 is large in the line drawing portion, while the same is small in the flat portion.

Reference numeral 1622 represents a F/F for latching the output from the subtractor 1621 at the first transition of the signal CLK4.

Similarly, the line drawing detection portion g1602 and the line drawing detection portion b1603 detect the line drawing from the signals G1, G2 and G3 and from the signals B1, B2 and B3.

Reference numeral 1623 represents a maximum-value circuit for transmitting the maximum value of the signals supplied from the line drawing detection portions 1601 to 1603. Although omitted from the detailed description, the output from the maximum-value circuit 1623 is relatively larger in the line drawing portion, while the same is relatively small in the flat portion.

Reference numeral 1624 represents a binary discrimination circuit for binary-coding the signal supplied from the maximum-value circuit 1623 with a predetermined threshold value to discriminate that the processed pixel is included in the line drawing portion or in the flat portion, to transmit discrimination signal SZ denoting the result of a discrimination whether or not the processed pixel is included in the line drawing portions of the 8 types of the specific original documents, and to transmit discrimination signal FZ denoting the result of a discrimination whether or not the processed pixel is included in the flat portions of the 8 types of the specific original documents.

As shown in FIG. 16, the line-drawing/flat-portion separation circuit 115 transmits the result of the substraction from the subtractor 1621 while being delayed by three periods of the signal CLK4 from the supplied signal, and transmits the discrimination signals SZ and FZ while being delayed by the three periods of the signal CLK4.

FIGS. 17 and 18 are block diagrams which illustrate an example of the detailed structure of the binary-coding discrimination circuit 1624. FIG. 19 is a timing chart which illustrates an example of the operation of the binary-coding discrimination circuit 1624.

Referring to FIGS. 17 and 18, reference numeral 1901 represents a 2-input 1-output selector for selecting the signal supplied to the terminal A or that supplied to the terminal B in response to signal XD3 supplied from a NAND gate 1902 to the selection terminal S to transmit the selected signal. The signal XD3 is "1" if the signal XPHS is "0", "1" or "2", and is "0" if the signal XPHS is "3". The selector 1901 selects the signal supplied to the terminal A if the signal XD3 is "0", and selects the signal supplied to the terminal B if the signal XD3 is "1" to transmit the selected signal.

Reference numeral 1903 represents a F/F for latching the output from the selector 1901 at the first transition of the signal CLK to transmit the latched output as signal X1.

Reference numerals 1904, 1905, 1915 and 1916 represent 16-input 1-output selectors for selecting any one of the signals supplied to terminal X0 to X15 in response to a signal supplied to the selection terminal S and composed of the signal YPHS as the upper 2 bits and of the signal XPHS as the lower 2 bits to transmit the selected signal. The selector selects the signal supplied to the terminal X0 if the selection signal is "0" ("0000"), selects the signal supplied to the terminal X1 if the selection signal is "1" ("0001"), and selects the signal supplied to the terminal X15 if the selection signal is "15" ("1111") to transmit the selected signal.

Signals S00 to S31 to be supplied to the selectors 1904 and 1905 denote the fixed values stored by the foregoing coefficient register 148, the fixed values being threshold values for discriminating whether or not the subject pixel is the line drawing portion. Signals F00 to F31 to be supplied to the selectors 1915 and 1916 denote the fixed values stored by the coefficient register 148, the fixed values being threshold values for discriminating whether or not the subject pixel is the flat portion.

Reference numerals 1906, 1907, 1917 and 1918 represent comparators for subjecting the signals supplied to the terminals A and B, resulting in transmitting "1" if A>B and transmitting "0" if A≧B.

Reference numerals 1908 to 1911, 1913, 1919 to 1922 and 1924 represent F/Fs for latching the supplied signal synchronization with the first transition of the signal CLK.

Reference numerals 1912 and 1923 represent 2-input 1-output selectors for selecting the signal supplied to the terminal A if the signal XDO supplied to the selection terminal S is "0", and selecting the signal supplied to the terminal B if the signal XDO is "1".

Reference numerals 1914 and 1925 represent F/Fs for latching the supplied signal in synchronization with the first transition of the signal CLK4.

As shown in FIG. 19, the comparator 1906 subjects the signal XI supplied from the F/F 1903 and any one of the signals S00 to S15 supplied from the selector 1904 to a comparison. The comparator 1907 subjects the signal X1 supplied from the F/F 1903 and any one of the signals S16 and S31 supplied from the selector 1905 to a comparison.

The F/F 1908 receives the output from the comparator 1906 as bit 0 and the output from the comparator 1907 as bit 0 to delay the outputs by one period of the signal CLK. The F/F 1909 delays the output from the F/F 1908 by one period of the signal CLK. The F/F 1910 delays the output from the F/F 1909 by one period of the signal CLK. The F/F 1911 delays the output from the F/F 1910 by one period of the signal CLK.

The outputs from the F/F 1908 to 1911 are collected to an 8-bit signal in such a manner that the output from the F/F 1908 is made to be bits 7 and 6, the output from the F/F 1909 is made to be bits 5 and 4, the output from the F/F 1910 is made to be bits 3 and 2 and the output from the F/F 1911 is made to be bits 1 and 0 to be supplied to the terminal A of the selector 1912.

The output from the selector 1912 is supplied to the F/F 1913, followed by delaying it by one period of the signal CLK. Then, the delayed output is supplied to the F/F 1914 and the terminal B of the selector 1912.

The F/F 1914 transmits the signal supplied from the F/F 1913 as 8-bit discrimination signal SZ in synchronization with the first transition of the signal CLK4.

The discrimination signal SZ denotes the possibility that the image signal supplied to the discrimination circuit 309 is, for example, included in the line drawing portion of, for example, the 8 types of the specific original documents. The discrimination circuit 309 supplies the signal YPHS to the control terminal S of each of the selectors 1904 and 1905 to change the type of the specific original document to be discriminated in accordance with the value of the signal YPHS.

The comparator 1917 subjects the signal X1 supplied from the F/F 1903 and any one of the signals F00 to F15 supplied from the selector 1915 to a comparison. The comparator 1918 subjects the signal X1 supplied from the F/F 1903 and any one of the signals F16 to F31 supplied from the selector 1916 to a comparison.

Although the description about the line drawing discrimination performed by the F/F 1925 is omitted because it is substantially the same as the foregoing discrimination, the F/F 1925 transmits the signal supplied from the F/F 1924 as an 8-bit discrimination signal FZ in synchronization with the first transition of the signal CLK4.

The discrimination signal Fz denotes the possibility that the image signal supplied to the discrimination circuit 309 is, for example, included in the flat portion of, for example, the 8 types of the specific original documents. The discrimination circuit 309 supplies the signal YPHS to the control terminal S of each of the selectors 1915 and 1916 to change the type of the specific original document to be discriminated in accordance with the value of the signal YPHS. ps ROMb 121

The ROMb 121 discriminates whether or not the color tone of the supplied signal approximates the color tone of the specific original document. The ROMb 121 comprises a 256 k×16-bit ROM, for example, M5M27C402K (manufactured by Mitsubishi Electric Corp.).

FIGS. 20A and 20B illustrate an example of the color tone distribution in an RGB space of a certain specific original document. FIG. 20A illustrates the color tone distribution in a line drawing portion, while FIG. 20B illustrates the color tone distribution in a flat portion.

A specific original document has the specific color tone distributions as shown in FIGS. 20A and 20B. ROMb 121 previously stores color tone information about the line drawing portion and the flat portion of, for example, 32 types of specific original documents. That is, the ROMb 121 subjects the color tone distribution of the specific original document and the color tone distribution of the supplied image to a comparison.

For example, 5 upper bits (totalling 15 bits) of the RGB signals transmitted from the S/P 113 pass through a selector 117 and a 3-state gate 119 to be described later, followed by supplying them to address terminals A0 to A14 of the ROMb 121. The ROMb 121 uses the lower 8 bits D0 to D7 of the data terminal thereof to transmit discrimination signal FC denoting whether or not the color tone distribution of the flat portion of 8 types of certain specific original documents and the color tone distribution of the supplied image coincide with each other. The ROMb 121 uses the upper 8 bits D8 to D15 of the data terminal thereof to transmit discrimination signal SC denoting whether or not the color tone distribution of the line drawing portion of 8 types of certain specific original documents and the color tone distribution of the supplied image coincide with each other.

The selector 117 is a 2-input 1-output selector for selecting a signal supplied from a counter all a116 to be described later if signal CCL to be described later and supplied to the selection terminal S is "0", and selects a signal supplied from the S/P 113 if the signal CCL is "1" to transmit the selected signal. In a usual discrimination operation, the control signal CCL to be supplied to the selection terminal S is "1". The case where the counter all 6 and the signal CCL are made to be "0" will be described later in the description about "RAM Clear Control".

In the usual discrimination operation, control signal RID of the 3-state gate 119 is "0". The case where the signal RID is made to be "1" will be described later in the description about "ID Reading Mode".

Reference numeral 118 represents a bank switch portion for transmitting a 3-bit signal PSEL to be supplied to the upper address of the ROMb 121 when the 15-bit RGB signals transmitted from the selector 117 are supplied to the lower address of the ROMb 121.

FIG. 21A is a block diagram which illustrates an example of the structure of the bank switch portion 118. FIG. 21B is a timing chart which illustrates an example of the operation of the bank switch portion 118. FIG. 22 illustrates an example of information that is stored by the ROMb 121.

Referring to FIG. 21A, reference numeral 2101 represents a NAND gate, and 2101 represents an AND gate.

The NAND gate 2101 receives 2-bit signal YPHS to transmit the NAND of the both bits.

The AND gate 2102 receives the output from the NAND gate 2101 and the lower bit CNO (0) of the plane sequential signal CNO to transmit the AND of them.

The bank switch portion 118 transmits the signal PSEL in which bit 0 and bit 1 are made to be 2 bits of the signal YPHS and bit 2 is made to be the output from the AND gate 2102. Therefore, the signal PSEL repeats 0 to 3 in synchronization with the first transition of the signal HSYNC if the signal CNO (0) is "0". The signal PSEL repeats 4 to 6 in synchronization with the first transition of the signal HSYNC if the signal CNO (0) is "1Z".

Referring to FIG. 21B, the signal CNO (0) is "0", "1", "0" and "1" with respect to each of developed colors M, C, Y and K. Therefore, if the developed color is M and Y, the signal PSELs repeats 0 to 3 in synchronization with the first transition of the signal HSYNC. If the developed color is C and K, the signal PSEL repeats 4 to 6 and 3 in synchronization with the first transition of the signal HSYNC.

That is, the image processing mode of this embodiment has the arrangement that address "00000" to address "37FFF" of the ROMb 121 shown in FIG. 22 are accessed in such a manner that the address "00000" to "1FFFF" are accessed if the developed color is M and Y. If the developed color is C and K, the address "18000" to "37FFF" are accessed.

In this embodiment, in the usual image processing mode, for example, 8 types of specific original documents are discriminated simultaneously. Furthermore, the type of the specific original document is changed over in accordance with each value of the signal PSEL. Therefore, this embodiment has an arrangement that the specific original document is sequentially changed over in units of, for example, four main scanning lines. Hence, for example, 32 types of specific original documents are discriminated.

In this embodiment, the signal PSEL is changed over also in accordance with the developed color. Therefore, for example, 56 types of specific original documents can be discriminated although a partial overlap (from address "18000" to address "1FFFF") occurs.

The "Image Processing Mode", the "ID Reading Mode" and the signal RID shown in FIG. 22 will be described later.

Then, the type of the specific original document and the address assignment in the ROMb 121 will be described. In this embodiment, the assignment in the ROMb 121 is changed in accordance with the degree of importance of the specific original document (the specific original document that must be first inhibited from being copied).

Since, for example, 8 types of specific original documents stored in the address "18000" to the address "1FFFF" are discriminated at the time of forming each of the images of M, C, Y and K in contrast with the other specific original documents, the most reliable result of the discrimination can be obtained.

For example, 24 types of specific original documents stored in the address "00000" to address "17FFF" are discriminated at the time of forming the M image at the first scanning and at the time of forming the Y image at the third scanning. If the presence of the specific original documents is detected at the time of forming the M or the Y image, the output image is painted over with black at the time of forming the K image so that copying of the specific original documents can be prevented.

For example, 24 types of specific original documents stored in the address "20000" to address "37FFF" are discriminated at the time of forming the C image at the second scanning and at the time of forming the K image at the fourth scanning. If the presence of the specific original documents is detected at the time of forming the K image, the output image is painted over with the black at the time of forming the K image so that copying of the specific original documents can be prevented.

That is, the specific original document stored in the address "00000" to the address "17FFF" can be further reliably inhibited from being copied than the specific original document stored in the address "20000" to the address "37FFF".

Hence, the most important specific original document is assigned to the address "18000" to the address "1FFFF", and second most important specific original document is assigned to the address "00000" to the address "17FFF", and the residual specific original documents are assigned to the address "20000" to the address "37FFF".

Integrating Circuit a122

An integrating circuit a122 receives the signal FC transmitted from ROMb 121 and the signal FZ transmitted from the line-drawing/flat-portion separation circuit 115 to remove noise of the signal FC by a 2-D (in directions X and Y) IIR digital filter. As described above, the signal FC is the discrimination signal denoting whether or not the color tone distribution of the image supplied to the discrimination circuit 309 coincides with the color tone distribution of the flat portion of certain 8-types specific original documents. The signal FZ is a discrimination signal denoting the possibility that the foregoing image is the flat portion of, for example, the 8 types of the specific original documents.

The integrating circuit a122 transmits a 16-bit signal FOA to the FIFOs 140 and 141, and receives a 16-bit signal FIA supplied from the FIFOs 140 and 141.

FIG. 23 is a block diagram which illustrates an example of the structure of the integrating circuit a122.

Referring to FIG. 23, reference numerals 2401 and 2402 represent S/Ps, 2403-1 to 2403-8 represent IIR filters that are integrators, and 2404 and 2405 represent P/Ss.

The S/Ps 2401 and 2402 serial/parallel converts signal FIA supplied from the FIFOs 140 and 141.

FIGS. 24A and 24B are block diagrams which illustrate an example of the structure of the S/P 2401 (2402). FIG. 25 is a flow chart which illustrates an example of the operation of the S/P 2401 (2402).

Referring to FIGS. 24A and 24B, reference numerals 2501 to 2504 represent F/Fs that latch the supplied signals at the first transition of the signal CLK4.

Reference numerals 2505 represents a 2-input 1-output selector that selects the input A or B in accordance with signal X4D1 to be described later and supplied to the selection terminal S to transmit the selected signal.

Reference numerals 2506 and 2507 represent F/Fs for latching the supplied signal at the first transition of the signal CLK4.

Reference numeral 2508 represents an inverter, 2509 represents a 3-bit counter, and 2510 represents a 2-input 4-output decoder, the operation logic of which is as shown in FIG. 24B.

The S/P 2401 (2402) receives signal X in synchronization with the first transition of the signal CLK4. The signal X is sequentially delayed by the F/Fs 2501 to 2504, and is supplied to the input A of the selector 2505.

Signal X4PHS to be transmitted from the counter 2509 repeats values 0 to 7 in synchronization with the first transition of the signal CLK4, while its two lower bits X4PHS (1-0) repeat values 0 to 3.

Signal X4D1 to be transmitted from the decoder 2510 is "0" only when the signal X4PHS (1-0) is "1" ("01"), while the same is "1" in the other cases. Therefore, the selector 2505 selects the input A to which the signal X is connected at one time during four periods of the signal CLK4. It selects the input B to which the output from the F/F 2506 is connected at the residual three times. That is, as shown in FIG. 25, values a, b, c and d sequentially supplied as the signal X are transmitted in parallel from the F/F 2506 as signals A0, B0, C0 and D0. Then, the signal are delayed by the F/F 2507 by one period of the signal CLK4 to be transmitted as signals A, B, C and D.

Referring back to FIG. 23, the IIR filter 2403 performs the process corresponding to the different specific original documents.

FIG. 26 is a block diagram which illustrates an example of the structure of the IIR filter 2403.

Referring to FIG. 26, reference numerals 2701 to 2703 represent 3-input 1-output selectors for selecting any one of signals supplied to terminals A to C in response to a 2-bit signal supplied to the selection terminal S to transmit the selected signal. The signal to be supplied to the selection terminal S is formed by combining the same bit of the discriminal signal FC and the discriminal signal FZ, the combined signal being arranged in such a manner that the foregoing bit of the discrimination signal FC is bit 1 and the foregoing bit of the discrimination signal FZ is bit 0. The selectors 2701 to 2703 select the input terminal A if the signal supplied to the selection terminal S is "00" or "01", select the input terminal B if the signal is "10", and select the input terminal C if the signal is "11".

Signals $\alpha 1$, $\alpha 2$ and $\alpha 3$ to be supplied to the selector 2701, signals $\beta 1$, $\beta 2$ and $\beta 3$ to be supplied to the selector 2702 and signals $\gamma 1$, $\gamma 2$ and $\gamma 3$ to be supplied to the selector 2703 are values previously determined by the foregoing coefficient register 148. By properly setting the foregoing values, the signal FC can be integrated to eliminate the noise.

Reference numerals 2705 and 2706 represent multipliers for transmitting the product (A×B)/32 of the inputs A and B.

Reference numeral 2707 represents an adder for transmitting the sum A+B+C of inputs A, B and C.

Reference numeral 2708 represents a F/F for latching a supplied signal at the first transition of the signal CLK4.

Assuming that symbol i denotes the sub-scanning position after thinning has been performed and j denotes the main scanning position after thinning has been performed, the output from the adder 2707 is $y_{(i,j)}$, and the output from the F/F 2708 is $y_{(i,j-1)}$. Signal FI to be supplied to the integrator 2705 via the selectors 2401 and 2402 shown in FIG. 23 is delayed in the sub-scanning direction by making use of the FIFO, the signal FI being expressed as $y_{(i-1,j)}$ which is expressed as follows:

$$y^{(i,j)} = (\alpha/32)y_{(i-1,j)} + (\beta/32)y_{(i,j-1)} + \gamma \quad (1)$$

FIGS. 27A to 27C illustrate an example of a result of the process performed by the integrating circuit a122. FIG. 27A illustrate an example of the signal FC ("1" denotes coincidence and "0" denotes non-coincidence). FIG. 27B illustrates an example of the signal FZ (where "1" denotes a flat portion and "0" denotes a non-flat portion). By making α1, α2, α3, β1, β2, β3, γ1, γ2 and γ3 to be proper values, output $y_{(i,j)}$ from the adder 2702 as shown in FIG. 27C can be obtained. That is, $y_{(i,j)}$ having a waveform formed by smoothing noises 3201 and 3202 can be obtained. By binary-coding with threshold ε, noise components 3203 and 3204 can be removed completely.

Referring back to FIG. 26, reference numeral 2710 represents a comparator for transmitting, as the signal FL, the result of a comparison made between the output from the F/F 2708 and the threshold ε. The signal FL is a signal denoting the similarity between the specific original document and the flat portion.

Reference numeral 2709 represents an average circuit for transmitting the average value of four values sequentially supplied from the F/F 2708.

FIG. 28A is a block diagram which illustrates an example of the structure of the average circuit 2709. FIG. 28B is a timing chart which illustrates an example of the operation of the average circuit 2709.

Referring to FIG. 28A, reference number 2801 represents an AND gate, and 2802 represents an adder.

Reference numerals 2803, 2805 and 2807 represent F/Fs for latching the signal supplied in synchronization with the signal CLK4.

Reference numerals 2804 and 2806 represent 2-input 1-output selectors for selecting the signal supplied to the terminal A if the values of signals X4D0 AND X4D3 supplied to the selection thermal S are "0", and for selecting the signal supplied to the terminal B if the values is "1" to transmit the selected signal. The signals X4DO and X4D3 are signals to be transmitted from the foregoing decoder 2510, the signal X4DO being "0" only when signal X4PHS (1-0) is "0", and being "1" only when signal X4PHS (1-0) is "0" and being "1" in the other cases. The signal X4D3 is "0" only when signal X4PHS (1-10) is "3", and is "1" in the other cases.

Therefore, if the input signal X sequentially has values a, b, c and d to correspond to the change of the signal X4PHS (1-0) from 0 to 3 as shown in FIG. 28B, the average circuit 2709 transmits the average (a+b+c+d)/4 of the four continuous values.

The output from the integrating circuit a122 is fed back via the FIFOs 140 and 141, the average of the four continuous values being stored in the FIFOs 140 and 141, resulting in the memory capacity of the FIFOs 140 and 141 being reduced to ¼.

As shown in FIG. 27C, the output from the integrating circuit a122 does not contain high frequency components, resulting in a significant reduction of the influence of the substitution of the four continuous values by their average.

Referring back to FIG. 23, the signal FO transmitted from the IIR 2403-1 to 2403-8 passes through the PISs 2404 and 2405, followed by transmitting the signal FO to the FIFOs 140 and 141 as the signal FOA. Then, it again passes through the S/Ps 2401 and 2402 as the signal FIA, followed by feeding back to the IIR 2403-1 to 2403-8.

FIG. 29A is a block diagram which illustrates an example of the structures of the P/Ss 2404 and 2405. FIG. 29B is a timing chart which illustrates an example of the operation of the P/Ss 2404 and 2405.

Referring to FIG. 29A, reference numeral 3001 represents a 4-input 1-output selector for selecting the signal supplied to the terminal A if the value of the 2-bit signal X4PHS (1-0) supplied to the selection terminal S is "0", selecting the signal supplied to the terminal B if the value is "1", selecting the signal supplied to the terminal C if the value is "2", and selecting the signal supplied to the terminal D if the value is "3" to transmit the selected value.

Reference numerals 3002 and 3005 represents F/Fs for latching the supplied signal in synchronization with the signal CLK4.

Therefore, the PISs 2404 and 2405 sequentially serially transmit the values a, b, c and d supplied in parallel to the terminals A, B, C and D of the selector 3001 as shown in FIG. 29B.

That is, the integrating circuit a122 according to this embodiment serially transmits the signal FOA to the FIFOs 140 and 141 by the P/Ss 2404 and 2405, and in parallel converts the signal FIA supplied from the FIFOs 140 and 141. As a result, the number of the FIFOs and the input/output pins required in the LSI structure can be decreased, causing the cost to be reduced and the reliability of the circuit including the LSI to be improved.

Referring back to FIG. 23, the signal FL transmitted from the IIR 2403-1 to 2403-8 is, as an 8-bit signal FLSG, supplied to an integrating circuit b123 to be described later. The signal FL is a signal denoting the similarity between the image supplied to the discrimination circuit 309 and the flat portion of the specific original document.

Write control signal FWE and read control signal FRE of the FIFOs 140 and 141 are generated by the FIFO control circuit 111 to make the integrating circuit a122 satisfy the foregoing equation (1) by considering the delay of the integrating circuit a122.

Integrating Circuit b123

The integrating circuit b123 receives the signal SC transmitted from the ROMb 121, the signal SZ transmitted from the line-drawing/flat-portion separation circuit 115, and the signal FLSG transmitted from the integrating circuit a122 to remove the noise from the signal SC by the 2-D IIR digital filter in a similar manner to the foregoing integrating circuit a122. The signal SC is a discrimination signal denoting whether or not the color tone distribution of the image supplied to the discrimination circuit 309 coincides with the color tone distribution of the line drawing portion of the 8 certain types of special original documents. The signal SZ is a discrimination signal denoting the possibility that the foregoing image is the line drawing portion of, for example, the 8 types of specific original documents.

The integrating circuit b123 transmits 16-bit signal FOB to the FIFOs 142 and 143 in a similar manner to the integrating circuit a122. It receives 16-bit signal FIB supplied from the FIFOs 142 and 143.

FIG. 30 is a block diagram which illustrates an example of the structure of the integrating circuit b123. The structures of the integrating circuit b123 that are the same as those of the integrating circuit a122 shown in FIG. 23 are given the same reference numerals, and their descriptions are omitted here.

Referring to FIG. 30, reference numerals 3303-1 to 3301-8 represent IIR filters that are integrators.

FIG. 31 is a block diagram which illustrates an example of the structure of the IIR filter 3303.

Referring to FIG. 31, reference numerals 3401 to 3403 represent 5-input 1-output selectors for selecting the signal supplied to the terminal A if the 3-bit value supplied to the selection terminal S is 0 to 3, selecting the signal supplied to the terminal B if the 3-bit value is 4, selecting the signal supplied to the terminal C if the 3-bit value is 5, selecting the signal supplied to the terminal D if the 3-bit value is 6, and selecting the signal supplied to the terminal E if the 3-bit value is 7 to transmit the selected signal. The signal to be supplied to the selection terminal S is arranged in such a manner that its bit 0 is one bit of the signal FLSG, its bit 1 is formed by delaying one bit of the signal SC by one period of the signal CLK4 by the F/F 3411, and its bit 2 is formed by delaying one bit of the signal SZ by one period of the signal CLK4 by the F/F 3411.

Assuming that output from the adder 2707 is $y'_{(i,j)}$, the output from the F/F 2708 is $y'_{(i,j-1)}$. The signal FI supplied to the integrator 2705 via the selectors 2401 and 2402 shown in FIG. 30 is obtained by delaying $y'_{(i,j)}$ in the sub-scanning direction by making use of the FIFO, the signal FI being expressed by $y'_{(i-1, j)}$ which is expressed as follows:

$$y'_{(i,j)} = (\alpha/32) y'_{(i-1,j)} + (\beta/32) y'_{(i,j-1)} + Y \quad (2)$$

FIGS. 32A to 32D illustrate an example of a result of the process performed by the integrating circuit b123. FIG. 32A illustrates an example of the signal SC ("1" denotes coincidence and "0" denotes non-coincidence). FIG. 32B illustrates an example of the signal SZ (where "1" denotes a flat portion and "0" denotes a non-flat portion). FIG. 32C illustrates an example of the signal FLSG (where "1" denotes a line drawing portion and "0" denotes a non-line-drawing portion). By making α1' to α5', β1' to β5', and γ1' to γ5' to be proper values, output $y'_{(i,j)}$ from the adder 2702 is shown in FIG. 32D can obtained. That is $y'_{(i,j)}$ having a waveform obtained by smoothing noises 3501 and 3502 can be obtained. By binary-coding with threshold ε, noise components 3503 and 3504 can be removed completely.

Reference numerals 3411 and 3413 represent F/Fs and 3412 and 3414 represent AND gates. The AND of the output from the comparator 2710, the signal SC and the signal SZ is obtained by the AND gate 3414 to be transmitted as the signal CN. The signal CN is "1" if the image supplied to the discrimination circuit 309 has a good possibility that it is a portion of the line drawing portion of the specific original document.

Referring to FIG. 30, the signals CN transmitted from the IIR circuits 3303-1 to 3303-8 are, as 8-bit signals CEN, collectively supplied to a volume ratio discrimination circuit 128 to be described later.

The structures and operations of the integrating circuit b123 that are substantially the same as those of the integrating circuit a122 are omitted from description.

Volume Ratio Discrimination and Final Discrimination

The volume ratio discrimination circuit 128 receives the signal CEN transmitted from the integrating circuit b123 to obtain the volume ratio and the number of hit pixels to finally discriminate whether or not the specific original document is present. The "volume ratio" is the ratio of the share of pixel groups, in which each bit of the signal CEN is "1", among the color tone distribution volume as shown in FIG. 20A. The "number of hit pixels" is the number of pixels, in which each bit of the signal CEN is "1", under the condition that the volume ratio is higher than a predetermined value.

Data buses of static RAMS (hereinafter called "SCRAMs") 136 to 139 are connected to the volume ratio discriminating circuit 128 via a bi-directional buffer 130.

Reference numeral 124 represents a delay circuit for synchronizing the 17 lower bits of the address signal of the ROMb 121 with the degree of the delay of the integrating circuit a122 and that of the integrating circuit b123. The address signal transmitted from the delay circuit 124 passes through a 3-state gate 125, followed by separating the address signal into 15 lower bits (that is, each 5 bits of RBG) and 2 upper bits (that is, the signal YPHS). Signal SRA denoting the 15 lower bits is supplied to each address terminal of the SRAMs 136 to 139, while signal YPHS denoting the 2 upper bits is supplied to a decoder 131. The logic of the operation of the decoder 131 is shown in Table 2.

TABLE 2

| Input | Output | | | |
|---|---|---|---|---|
| X | Y0 | Y1 | Y2 | Y3 |
| 00 | 0 | 1 | 1 | 1 |
| 01 | 1 | 0 | 1 | 1 |
| 10 | 1 | 1 | 0 | 1 |
| 11 | 1 | 1 | 1 | 0 |

The AND of four outputs Y0 to Y3 from the decoder 131 and the signal CCL is obtained by AND gates 132 and 135, followed by supplying the AND output to a chip select terminal CS of the SRAMs 136 to 139. Therefore, the SRAM 136 is accessed if the signal YPHS is "0", and the SRAM 137 is accessed if the signal YPHS is "1", the SRAM 138 is accessed if the signal YPHS is "2", and the SRAM 139 is accessed if the signal YPHS is "3".

After the SRAMs 136 to 139 have been initialized (cleared to zero), each address receives each 5 bits of the RGB signals that have accessed the ROMb 121. When any bit of the signal CEN is "1", "1" is written to the address showing the value of the corresponding RGB signals. The initialization of the SRAMs 136 to 139 will be described later.

Reference numeral 129 represents an SRAM control circuit for generating write control signal RWE and output control signal ROE for the SRAMs 136 to 139 and generating control signal RID for the bi-directional buffer 130.

Reference numeral 126 represents an inverter, and 127 represents a 3-state gate. Either of the two 3-state gates 125 and 127 is activated in response to the control signal CCL. However, since the signal CCL is "1" in the usual operation, the 3-state gate 125 is activated.

FIGS. 33 and 34 are block diagrams which illustrate an example of the structure of the volume ration discrimination circuit 128. FIGS. 35 and 36 illustrate an example of the operation of the volume ratio discrimination circuit 128.

Referring to FIG. 35, the signal RID is a signal for controlling the transmission direction of the bi-directional buffer 130, the signal RWE is a write control signal for the SRAMs 136 to 139, and the signal ROE is an output control signal for the SRAMs 136 to 139, the foregoing signals being generated by the SRAM control circuit 129.

As shown with reference numeral 402 of FIGS. 35 and 36, when the signal XPHS is "0" 1 or "1", the signal RID is "1". Therefore, the transmission direction of the bi-directional buffer 130 is (SCRAM)→(Volume Ratio Discrimination Circuit). Furthermore, the signal RWE is "1" and the signal ROE is "0", causing the SRAMs 136 to 139 to be brought to the read-enable state.

When the signal XPHS is "2", the signal RID is "0". Therefore, the transmission direction of the bi-directional buffer 130 is (Volume Ratio Discrimination Circuit)→ (SCRAM). Furthermore, the signal RWE is "0" and the signal ROE is "1", causing the SRAMs 136 to 139 to be brought to the write-enable state.

When the signal XPHS is "3", the signal RID is "0". Therefore, the transmission direction of the bi-directional buffer 130 is (Volume Ratio Discrimination Circuit)→(SCRAM). Furthermore, the signal RWE is "1" and the signal ROE is "1", causing the SRAMs 136 to 139 to be brought to non-read-enable and non-write-enable states.

Since the address signal SRA of the SRAMs 136 to 139 is changed in synchronization with the first transition of the signal CLK4 and is not changed in one period (0 to 3) of the signal XPHS, the operation of the SRAMs 136 to 139 is a so-called "read/modify/write" operation.

Referring to FIGS. 33 and 34, reference numeral 3601 represents a 2-input 1-output selector for selecting signal RO supplied to the terminal A if the signal ROE supplied to the selection terminal S is "0", and selecting signal RO1 supplied to the terminal B if the signal is "1" to transmit the selected signal. The signal R1 is, for example, an 8-bit signal read from the SRAMs 136 to 139.

Reference numeral 3603 represents a F/F for latching the signal supplied from the selector 3601 in synchronization with the first transition of the signal CLK to transmit it as the signal RO1.

Reference numeral 3605 represents a F/F for latching the signal CEN in synchronization with the first transition of the signal CLK4 to transmit it as the signal CEN.

Reference numeral 3606 represents an AND gate for receiving signals R01, CEN1 and CCL via an inverter 3604 to transmit their AND as signal TEN. Each bit of the signal TEN is "1" only when the corresponding bit of the signal RO1 is "0" and the signal CEN is "1" because the signal CCL is usually "1".

Reference numeral 3608 represents an AND gate for receiving and AND signal of the signal RO1 and the signal CEN1, and receiving the signal CCL and the signal VS from an OR gate 3607 to transmit their AND as the signal RI. The signal RI is the OR of each bit of the signal RO1 and the corresponding bit of the signal CEN because the signal CCL and the signal VS are "1" at the time of reading an image.

Reference numerals 3609-1 to 3609-8 represent counters for increasing the count value when the corresponding bit of the 8-bit signal TEN is "1".

Therefore, after the SRAMs 136 to 139 have been initialized, the AND of the signal CEN and data stored in the address corresponding to the RGB signals in the SRAMs 136 to 139 at the subject point is written on the foregoing address of the SRAMs 136 to 139.

If any one of the bit of each data in the SRAMs 136 to 139 has made the transition from "0" to "1" 1 1, the corresponding bit of the signal TEN is "1". By counting the number of times at which each bit of the signal TEN is "1" by the counter 3609, the "volume ratio" can therefore be obtained.

FIG. 37 is a block diagram which illustrates an example of the structure of the counter 3609.

Referring to FIG. 37, reference numeral 3701 represents a 2-input 4-output decoder for transmitting signals shown in Table 3 in response to the supplied signal YPHS.

TABLE 3

| Input | Output | | | |
|---|---|---|---|---|
| YPHS | Y0 | Y1 | Y2 | Y3 |
| 00 | 1 | 0 | 0 | 0 |
| 01 | 0 | 1 | 0 | 0 |
| 10 | 0 | 0 | 1 | 0 |
| 11 | 0 | 0 | 0 | 1 |

Reference numerals 3703 to 3706 represent AND gates for calculating the AND of the output from the corresponding decoder 3701 and the signal EN.

Reference numerals 3707 to 3710 represent counters which are cleared in response to the signal CCL and which count the signal CLK4 if the corresponding AND signal of the AND gates 3703 to 3706 is "1".

Reference numeral 3712 represent a 4-input 1-output selector for transmitting the output from the counter 3707 supplied to the thermal A if the signal supplied from the F/F 3711 to the selection terminal S is "0", transmitting the output from the counter 3708 supplied to the terminal B if the signal is "1", transmitting the output from the counter 3709 supplied to the terminal C if the signal is "2", and transmitting the output from the counter 3710 supplied to the terminal D if the signal is "3" to transmit the selected output as signal Q. The F/F 3711 transmits the signal YPHS latched at the first transition of the signal CLK4.

If the signal YPHS is "0", the counter 3707 counts the signal. If the signal YPHS is "1", the counter 3708 counts the signal. If the signal YPHS is "2", the counter 3709 counts the signal. If the signal YPHS is "3", the counter 3710 counts the signal. Then, the counted value is transmitted as the signal Q.

That is, the volume ratio discrimination circuit 128 performs the time-division process in response to the signal YPHS to discriminate whether or not the subject is included in, for example, the 8 types of the specific original document.

Referring to FIGS. 33 and 34, reference numeral 3610 represents an 8-input 1-output selector for selecting the counted value of the counter 3609-1 supplied to the terminal A if a 3-bit signal X4PHS supplied to the selection terminal S is "0", selecting the counted value of the counter 3609-2 supplied to the terminal B if the signal is "1", and selecting the counted value of the counter 3609-8 supplied to the terminal H if the signal is "7" to transmit the selected counted value.

Reference numerals 3611 and 3612 represent 16-input 1-output selectors for selecting the values corresponding to, for example, 32 types of specific original documents supplied from the coefficient register 148 in response to totalling a 5-bit signal composed of the 3 upper bits are the signal X4PHS and the 2 lower bits are the signal YPHS to transmit the selected value.

The selector 3611 receives predetermined insensitive band values MS00 to MS31 of the count of the hit pixel number to be described later. The selector 3611 selects the predetermined insensitive band value MS00 if the 5-bit signal supplied to the selection terminal S is "0", selects the predetermined insensitive band value MS01 if it is "1", . . . , selects the predetermined insensitive band value MS31 if it is 31 to transmit the selected value.

The selector 3612 receives mask signal M00 to M31 denoting the result of counting of the number of hit pixels to be described later. The selector 3612 selects the mask signal M00 if a 5-bit signal supplied to the selection terminal S is "0", selects the mask signal M01 if the signal is "1", . . . , and selects the mask signal M31 if the signal is "31" to transmit the selected signal.

Reference numeral 3613 represents a comparator for subjecting counted value Q transmitted from the selector 3610 and the predetermined insensitive band value MS transmitted from the selector 3611 to a comparison. If Q>MS, the comparator 3613 transmits "1". If Q≦MS, if transmits "0".

Reference numeral 3614 represents a comparator for subjecting counted value Q transmitted from the selector 3610 and the mask signal M transmitted from the selector 3612 to a comparison. If Q>M, the comparator 3614 transmits "1". If Q≦M, it transmits "0".

That is, the comparators 3613 and 3614 perform the process in a time division manner in response to the signal X4PHS. The result of the comparison is transmitted to the S/Ps 3615 and 3616, respectively.

FIG. 38 is a block diagram which illustrates an example of the structure of the S/Ps 3615 and 3616. FIG. 39 is a timing chart which illustrates an example of the operation of the S/Ps 3615 and 3616.

Referring to FIG. 38, reference numeral 3801 to 3808 represent F/Fs for latching the signal supplied serially in synchronization with the first transition of the signal CLK4.

Reference numeral 3810 represents a selector for selecting the signal supplied from the F/Fs 3801 to 3808 to the terminal A if the bit-2 OR signal of the signal X4DO and the signal X4PHS supplied from the OR gate to the selection terminal S is "0", and selects the signal supplied to the terminal B if the OR signal is "1".

Reference numerals 3812 and 3813 represent F/Fs for respectively latching the signal supplied from the selector 3810 and the signal supplied from the F/F 3813 in synchronization with the first transition of the signal CLK4.

Therefore, the signal MASK transmitted from the S/P 3615 and the signal MK transmitted from the S/P 3616 are used to substantially simultaneously transmit the result of the process about, for example, 8 types of specific original documents in spite of occurring at somewhat of a delay.

Referring to FIGS. 33 and 34, reference numerals 3618-1 to 3618-8 represent hit-pixel number counters comprising an AND gate 3619 for obtaining the AND of each bit of the signal CEN and the signal MASK, a counter 3620 which is cleared in response to the signal CCL and which counts the signal CLK4 if the output from the AND gate 3619 is "1", and a comparator 3621 for subjecting the counted value of the counter 3620 and a signal supplied from a selector 3626 to be described later to a comparison.

Reference numerals 3626-1 to 3626-8 represent 4-input 1-output selectors for selecting either of values GS supplied from the coefficient register 148 in response to the signal YPHS supplied to the selection terminal S. That is, the selector 3626-1 selects value GS00 if the signal YPHS is "0", selects value GS08 if the signal YPHS is "1", selects value GS16 if the signal YPHS is "2", and selects value GS24 if the signal YPHS is "3" to transmit the selected value. Similarly, the selector 3626-2 selects and transmits any one of the values GSO1, GSO9, GS17 or GS25, the selector 3626-3 selects and transmits any one of values GS202, GS10, GS18 OR GS26, . . . , and the selector 3626-8 selects and transmits any one of values GS07, GS15, GS23 or GS31.

That is, the bit of the volume ratio discrimination circuit 128, to which the signal MASK corresponds, is "1" if the result of counting the number of times at which each bit of the signal TEN is "1" by the counter 3609, that is, if the volume ratio is larger than the values MS00 to MS07 in the case where the signal YPHS is "0", if the volume ratio is larger than the values MS08 to MS15 in the case where the signal YPHS is "1", if the volume ratio is larger than the values MS16 to MS23 in the case where the signal YPHS is "2", and if the volume ratio is larger than the values MS24 to MS31 in the case where the signal YPHS is "3". The counter 3620 starts counting the number of times at which the bit, to which the signal CEN corresponds, is "1".

The AND gates 3622-1 to 3622-8 transmit "1" only when the result of counting performed by the counter 3620 is larger than values GS00 to GS07 in the case where the signal YPHS is "0", when the result of counting is larger than values GS08 to GS15 in the case where the signal YPHS is "1", when the result of counting is larger than values GS16 to GS23 in the case where the signal YPHS is "2", and when the result of counting is larger than values GS24 to GS31 in the case where the signal YPHS is "3", and only when the volume ratio is larger than the values M00 to M07 in the case where the signal YPHS is "0", when the volume ratio is larger than the values M08 to M15 in the case where the signal YPHS is "1", when the volume ratio is larger than the values M16 to M23 in the case where the signal YPHS is "2", and when the volume ratio is larger than the values M24 to M31 in the case where the signal YPHS is "3".

Reference numeral 3623 represent an OR gate for obtaining the OR of the outputs from the AND gates 3622-1 to 3622-8. That is, if the output from the OR gate 3623 is "1", it means a discrimination has been made that at least one type of a specific original document image is included in the image supplied to the discrimination circuit 309.

Reference numeral 3624 represents a JK-F/F which is cleared in response to signal VSTR generated at the first transition of the signal VS and which alternately transmits the output from the OR gate 3623 and "0" as signal HIT in synchronization with the signal CLK4.

Process to be Performed in Case Where Specific Original Document is Present

If the foregoing process has determined that at least one type of the specific original document image is included in the image supplied to the discrimination circuit 309, the signal HIT transmitted from the volume ratio discrimination circuit 128 is "1".

Referring to FIG. 2, the CPU 311, which has received the signal HIT="1", makes the signal INHIBIT to be "1", while the selector 310 transmits, for example, "80"(HEX) regardless of the image signal V supplied from the density conversion circuit 308. Therefore, a "solid image" is formed.

FIG. 46 is a timing chart which illustrates an example of the timing relationship between reading of the signal HIT and copy inhibition.

As shown in FIG. 46, the CPU 311 reads the signal HIT at the last transition of the signal VS, that is, at the timing at which the effective region of the sub-scanning for image reading is completed.

Referring to FIG. 46, this embodiment has an arrangement that an M image is formed in a region 4504, and a C image is ordinarily formed if the signal HIT of the timing 4501 is "0" in a region 4505, and a C image is formed with the fixed value "80" (HEX) if the signal HIT of the timing 4501 is "1".

This embodiment has an arrangement that Y image is ordinarily formed if the signal HIT of the timing 4501 and that of the timing 4502 are "0" in a region 4506. If the signal HIT of the timing 4501 or the timing 4502 is "1", the Y image is formed with the fixed value of "80" (HEX).

This embodiment has an arrangement that, if the signal HIT in each of the timing 4501 to timing 4503 is "0" in a region 4507, a K image is ordinarily formed. If at least one signal HIT at the timing 4501 to timing 4503 is "1", the K image is formed with the fixed value (HEX).

FIG. 47 illustrates an example of an output obtained when a specific original document is copied.

Referring To FIG. 47, if a specific original document example 4601 is copied in this embodiment, the signal HIT is "1" at the timing 4501 shown in FIG. 46, resulting in that the M image is ordinarily formed. However, the C, Y and K images are formed with, for example, the fixed value of "80" (HEX).

If the printer 202 according to this embodiment has a gradation expressing performance of, for example, 8 bits, the M image first formed can be visually recognized in the case where the density is about "80" (HEX) in comparison to the highest density "FF". As a result, the obtained output cannot be used as the forgery of the specific original document, and the subject of copying can be recognized.

According to this embodiment, if the copying operation has not been performed ordinarily, whether the erroneous operation of the apparatus has taken place or a specific original document has been intended to be copied can be judged from the output.

Initialization of SRAM and Each Counter

Reference numeral 149 represent a CCL generation circuit for receiving the signal VS to generate the signals CCL and VSTR. The signal CCL initializes (zero-clears) the SRAMs 136 to 139 for counting the volume ratio and the number of the hit pixels and each of the counters 3707 to 3710 and 3620. The signal VSTR initializes the signal HIT denoting the result of the final discrimination.

An example of the timing 401 of the signal CCL and the signal VSTR is shown in FIG. 35.

Referring to FIG. 35, the signal VS is a signal which is "1" in the image forming region, while the signal VSTR is "0" at the first transition (the start of the image forming region) of the signal VS to initialize the signal HIT, and it is "1" in the other cases.

The signal CCL repeats "0" (period t1) and "1" (period t2) from the first transition of the signal VS.

In the region in which the signal CCL is "0", the counter a116 counts from "0000" to "3FFF", the result of counting performed by the counter a116 passing through the selector 117 and the 3-state gate 127, followed by supplying the result to the address terminals of the SRAMS 136 to 139.

In the region in which the signal CCL is "0", the outputs from the AND gates 132 to 135 are "0", and all of the terminals CS of the SRAMS 136 to 139 are "0", resulting in that the foregoing SRAMs are accessed.

In the region in which the signal CCL is "0", the output from the AND gate shown in FIGS. 33 and 34 is "0", and all of the signals RI to be supplied to the SRAMs 136 to 139 are "0".

Since the SRAM control circuit 129 generates the signals RWE at the timing 401 shown in FIG. 35, "0" is written on each address of the SRAMs 136 and 139, causing the foregoing SRAM to be initialized.

After the initialization of the SRAMs 136 to 139 has been completed, the signal CCL is "1", followed by shifting to the foregoing ordinary discriminating operation. After region t2 has been passed, the operation, in which the foregoing SRAM is again initialized, is repeated.

Image Processing Mode and ID Reading Mode

This embodiment has two modes, an image processing mode and an ID reading mode.

In the image processing mode, ordinary image processing is performed, and the ROMa 147 and the ROMb 121 are used as tables for discriminating the presence of the specific original document.

In the ID reading mode, the ID previously stored in the uppermost address of each of the ROMa 147 and ROMb 121 is read out.

The ROMa 147 and ROMb 121 are controlled in each mode by the signals RID and PSEL.

In the image processing mode, the signal RID is set to "0" by the CPU 311. The signal PSEL supplied from the bank switch portion 118 is set to the two upper bits of the address signal of the ROMb 121, and outputs "R", "G" and "B" from the S/Ps 112 to 114 are set to the 15 lower bits of the address signal.

In the ID reading mode, the signal RID is set to "1" by the CPU 311. In this case, the outputs from the 3-state gates 119 and 145 are brought to high impedance. Pull-up resistors 120 and 146 cause all of the address terminals of the ROMb 121 and ROMa 147 to be "1". At this time, the ROMb 121 transmits data stored in address "3FFFF" that is the uppermost address. The uppermost address of the ROMb 121 previously stores data, the 8 lower bits of which are the ID for the foregoing ROM, as shown in FIG. 22. The CPU 311 reads the foregoing data as ROM2-ID.

The ROMa 147 transmits data stored in address "FF" that is the uppermost address. The uppermost address of the ROMa 147 previously stores 8-bit data, which is the ID for the foregoing ROM. The CPU 311 reads the data as ROM1-ID.

Although the ID is an 8-bit code, it is stored at the address except for "00" and "FF". The reason for this is that, if the ROMa 147 or the ROMb 121 is intentionally removed, or intentionally exchanged or is out of order, there is a good possibility that the address is "00" in which all of the 8 bits are "0" or "FF" in which all of the 8 bits are "1". The arrangement is characterized in that the address "00000" to address "37FFF" of the ROMb 121 are accessed in the image processing mode, and the address "3FFFF" is accessed in the ID reading mode to perform control while preventing an overlap.

ID Reading Operation

FIG. 40 is a flow chart which illustrates an example of the operation of the ID reading mode.

Referring to FIG. 40, the CPU 311 sets the signal RID to "1" in step S1. As a result, the address of each of the ROMa 147 and ROMb 121 is set to the uppermost address so that the ID previously stored in the foregoing address is read out.

Then, the CPU 311 reads the ROM1-ID in step S2, and it discriminates the ROM1-ID in step S3. If ROM1-ID≠"00", the flow proceeds to step S4. If ROM1-ID="00", the CPU 311 discriminates that the ROMa 147 or its peripheral circuit is out of order, resulting in stoppage of the operation of the apparatus.

If ROM1-ID≠"00", the CPU 311 again discriminates the ROM1-ID in step S4. If ROM1-ID≠"FF", the flow proceeds to step S5. If ROM1-ID="FF", the CPU 311 discriminates that the ROMa 147 or its peripheral circuit is out of order, resulting in stoppage of the operation of the apparatus.

If ROM1-ID≠"FF", the CPI 311 reads ROM2-ID in step S5, and then the ROM2-ID is discriminated in step S6. If ROM2-ID≠"00", the flow proceeds to step S7. If the ROM2-ID="00", the CPU 311 discriminates that the ROMb 121 or its peripheral circuit is out of order, resulting in stoppage of the operation of the apparatus.

If ROM2-ID≠"00", the CPU 311 again discriminates the ROM2-ID in step S7. If ROM2-CD≠"FF", the flow proceeds to step S8. If ROM2-CD="FF", the CPU 311 discriminates that the ROMb 121 or its peripheral circuit is out of order, resulting in stoppage of the operation of the apparatus.

If ROM2-ID≠"FF", the CPU 311 subjects the two IDs to a comparison in step S8. If ROM1-ID=ROM2-ID, the CPU 311 discriminates that the state is normal. If ROM1-ID≠ROM2-ID, the CPU 311 discriminates that the ROMa 147 or ROMb 121 or its peripheral circuit is out of order, resulting in stoppage of the operation of the apparatus.

Although the foregoing description and FIG. 40 shows the discrimination is made whether or not the proper ROMs are combined in accordance with whether or not the ROM1-ID and the ROM2-ID are the same, this embodiment is not limited to this. For example, arbitrary ROMs which have been previously registered may be combined. Furthermore, the number of the ROMs for discriminating the ID is not limited to the two, and therefore, an arbitrary number of ROMs may be employed if a plurality of ROMs are used.

As described above, according to this embodiment, the read original document image is examined. Furthermore, if the specific original document image is detected in the image, copying is inhibited.

According to this embodiment, assignment to the ROMb 121 is performed as follows: the most important original document is assigned to the address "18000" to "1FFFF", the second most important original document is assigned to the address "00000" to "17FFF", and the residual original documents are assigned to the address "20000" to "37FFF". Therefore, for example, 8 types of specific original documents assigned to the address "18000" to the address "1FFFF" are discriminated at the time of forming each of the images of M, C, Y and K. Hence, the most reliable result of the discrimination can be obtained. As a result, copying of the specific original document can be prevented reliably. For example, 24 types of specific original documents assigned to the address "00000" to address "17FFF" are discriminated at the time of forming the M image at the first scanning and at the time of forming the Y image at the third scanning. If the presence of the specific original documents is detected at the time of forming the M or the Y image, the output image is painted over with black at the time of forming the K image so that copying of the specific original documents can be prevented. For example, 24 types of specific original documents stored in the address "20000" to address "37FFF" are discriminated at the time of forming the C image at the second scanning and at the time of forming the K image at the fourth scanning. If the presence of the specific original documents is detected at the time of forming the K image, the output image is painted over with black at the time of forming the K image so that copying of the specific original documents can be prevented.

<Second Embodiment>

A second embodiment of the present invention will now be described. In the second embodiment, substantially the same structures as those according to the first embodiment are given the same reference numerals and their descriptions are omitted here.

FIGS. 41, 42 and 43 are block diagrams which illustrate an example of the structure of the discrimination circuit 309 according to this embodiment. FIG. 44 illustrates an example of information stored by the ROMb 121.

In the image processing mode, the signal RID is set to "0" by the CPU 311. The signal PSEL supplied from a bank switch portion 4202 is set to the two upper bits of the address signal of the ROMb 121, and outputs "R", "G", and "B" from the S/Ps 112 to 114 are set to the 15 lower bits of the address signal.

FIG. 45A is a block diagram which illustrates an example of the structure of the bank switch portion 4202. FIG. 45B is a timing chart which illustrates an example of the operation of the bank switch portion 4202.

Referring to FIG. 45A, reference numeral 4301 represents a NOR gate, and 4302 represents an OR gate.

the NOR gate 4301 receives a 2-bit signal YPHS to transmit the NOR of the both bits.

The OR gate 4302 receives the output from the NOR gate 4301 and the lower bit CNO (0) of the plane sequential signal CNO to transmit the their OR.

The bank switch portion 4202 transmits the signal PSEL in which bit 0 and bit 1 are made to be 2 bits of the signal YPHS and bit 2 is made to be output from the AND gate 2102. Therefore, the signal PSEL repeats 4 and 1 to 3 in synchronization with the first transition of the signal HSYNC if the signal CNO (0) is "0". The signal PSEL repeats 4 to 7 in synchronization with the first transition of the signal HSYNC if the signal CNO (0) is "1".

Referring to FIG. 45B, the signal CNO (0) is "0", "1", "0" and "1" with respect to each of developed colors M, C, Y and K. Therefore, if the developed color is M and Y, the signal PSEL repeats 4 and 1 to 3 in synchronization with the first transition of the signal HSYNC. If the developed color is C and K, the signal PSEL repeats 4 to 7 in synchronization with the first transition of the signal HSYNC.

That is, the image processing mode of this embodiment has the arrangement that address "08000" to address "3FFFF" of the ROMb 121 shown in FIG. 44 are accessed in such a manner that address "08000" to address "27FFF" are accessed if the developed color is M and Y. If the developed color is C and K, address "20000" to address "37FFF" are accessed.

In this embodiment, for example, 8 types of specific original documents are discriminated simultaneously in the usual image processing mode. Furthermore, the type of the specific original document is changed over in accordance with each value of the signal PSEL. Therefore, this embodiment has an arrangement that the specific original document is sequentially changed over in units of, for example, four main scanning lines. Hence, for example, 32 types of specific original documents can be discriminated.

In this embodiment, the signal PSEL is changed over also in accordance with the developed color. Therefore, for example, 56 types of specific original documents can be discriminated although a partial overlap (from address "20000" to address "27FFF") occurs.

In the ID reading mode, the signal RID is set to "1" by the CPU 311. In this case, the output from the 3-state gate 119 is brought to high impedance. A pull-up resistor 4201 causes all of the address signals of the ROMb 121 to be "0". At this time, the ROMb 121 transmit data stored in address "00000" that is the lowermost address. The uppermost address of the ROMb 121 previously stores data, the 8 lower bits of which are the ID for the foregoing ROM, as shown in FIG. 44. The CPU 311 reads the foregoing data as ROM2-ID.

The ID for the ROM may be stored in any predetermined specific address even if it is not the uppermost or the lowermost address.

As described above, according to this embodiment, a substantially similar effect to that obtainable from the first embodiment can be obtained. The read original document image is examined, and copying is inhibited if the specific original document image is detected in the read image.

According to this embodiment, assignment to the ROMb 121 is performed as follows: the most important original document is assigned to the address "200000" to "27FFF", the second most important original document is assigned to the address "08000" to "1FFFF", and the residual original documents are assigned to the address "28000" to "3FFFF". Therefore, for example, 8 types of specific original documents assigned to the address "20000" to the address "27FFF" are discriminated at the time of forming each of the images of M, C, Y and K. Hence, the most reliable result of the discrimination can be obtained. As a result, copying of the specific original document can be prevented reliably. For example, 24 types of specific original documents assigned to the address "08000" to address "1FFFF" are discriminated at the time of forming the M image at the first scanning and at the time of forming the Y image at the third scanning. If the presence of the specific original documents is detected at the time of forming the M or the Y image, the output image is painted over with black at the time of forming the K image so that copying of the specific original documents can be prevented. For example, 24 types of specific original documents stored in the address "28000" to address "3FFFF" are discriminated at the time of forming the C image at the second scanning and at the time of forming the K image at the fourth scanning. If the presence of the specific original documents is detected at the time of forming the K image, the output image is painted over with black at the time of forming the K image so that copying of the specific original documents can be prevented.

As described above, according to this embodiment of the present invention, there is provided an image forming apparatus for discriminating the similarity in accordance with the degree of significance of the specific original.

<Third Embodiment>

The schematic view of apparatus in this embodiment is the same as that of FIG. 1.

[Image Scanner Unit]

FIG. 54 is a block diagram which illustrates the configuration of an image scanner unit 5201 according to the third embodiment. In the same figure, reference numerals 5210-1, 5210-2 and 5210-3 represent CCD (solid state image pick-up devices) sensors having spectral sensitivity characteristics of red (R), green (G) and blue (B), respectively, each transmitting an 8-bit signal of 0 to 255 after the A/D conversion.

Since the CCD sensors 5210-1, 5210-2 and 5210-3 according to this embodiment are disposed at predetermined intervals, delay elements 5401 and 5402 are arranged to correct for their spatial deviations.

Reference numerals 5403, 5404 and 5405 represent logarithmic converters formed into look-up tables of a ROM or a RAM for the conversion from a brightness signal into a density signal. Reference numeral 5406 represents a known masking/UCR (Under Color Removal) circuit. Although a detailed description about it is omitted here, the masking/UCR circuit 5406 transmits magenta (M), cyan (C), yellow (Y) and black (Bk) signals in response to the supplied three signals at each reading operation, the M, C, Y and Bk signals being transmitted in a plane sequential manner while having a predetermined bit length, for example, 8 bits.

Reference numeral 5407 represents a known spatial filter circuit for correcting the spacial frequency of the output signal. Reference numeral 5408 represents a density conversion circuit for correcting the density characteristic of the printer 5202, the density conversion circuit 5408 being formed into a look-up table comprising a ROM or a RAM, like the logarithmic converters 5403 to 5405.

Reference numeral 5414 represents a microcomputer for controlling this apparatus (hereinafter referred to as "CPU"), reference numeral 5415 represents a ROM for storing programs for operating the CPU 5414, and reference numeral 5416 represents a RAM for use as the work area for executing a variety of programs.

Reference numeral 5409 represents a discrimination circuit for discriminating a specific original document image by making a discrimination as to whether or not at least one of a plurality of different specific originals prepared within the same circuit is being read, so that the discrimination signal H is output which is equal to "0" or "1". That is, if at least one of a plurality of different specific originals is being read, H="1" is output, or otherwise H="0" is output. Also, the discrimination circuit 409, as will be described later, comprises a thinning circuit 5301 and a division circuit 5310 as shown in FIGS. 51 and 52, for effecting a thinning process of input R, G, B signals.

Herein, a CNO signal is a two-bit plane sequential signal, i.e., a control signal for controlling the sequential order of the four reading operations to effect the printing with M, C, Y, Bk. In FIG. 59, the relation between the CNO signal and the print output in the third embodiment is shown.

The CNO signal is generated by the CPU 5414 to be input into a masking/UCR circuit 5406 to be used as the signal to switch the operation conditions of the same circuit 5406.

Further, the CNO signal is also input into the discrimination circuit 5409 for discriminating a different specific original document image by changing over the discriminating reference every time any of the four reading operations as above described is performed.

Reference numeral 5410 represents an OR gate circuit for performing a logical OR operation between the 8-bit output V of the density conversion circuit 5408 and the discrimination signal H which is an output from the discrimination circuit 5409 to transmit V'.

As a result, when the discrimination signal H is equal to "1", that is, the specific original is determined to being read, the output becomes V'=FF/Hex(255), irrespective of the value of input signal V, while when the discrimination signal H is equal to "0", that is, the specific original is determined not to be being read, the value of input signal V is directly output as the output signal V'.

[Timing Chart]

FIG. 51 is a circuit diagram showing the configuration of a thinning circuit according to the third embodiment, and FIG. 54 is a circuit diagram showing the configuration of a division circuit 5310 according to the third embodiment. FIG. 55 is a timing chart of the main scanning in the normal control mode of the third embodiment.

In FIG. 55, signal HSYNC is a main-scanning synchronizing signal so that the start of the main scanning is synchronized in this embodiment. Signal CLK is a transfer clock signal which is a basic clock for various image processing operations in this embodiment.

On the other hand, signal CLK' is a clock signal obtained by dividing the signal CLK into four sections, which serves as the basic clock signal in discrimination circuit 5409 as will be described later. SEL signal is a timing signal for use in thinning circuit 5301 as will be described later, which is generated in the division circuit 5310 as shown in FIG. 52. The division circuit 5310 is comprised of an inverter 5451, a two-bit counter 5452, an inverter 5453 and an AND gate 5454. The two-bit counter 5452, after being cleared (initialized) by the HSYNC signal which is a main scanning synchronizing signal, counts the CLK signal to transmit a count value of two bits (D0, D1). The upper bit D1 of the count value (D0, D1) is output as the CLK' signal, the logical sum between the inversion of the lower bit D0 and the upper bit D1 being output as the SEL signal.

The thinning circuit 5301 as shown in FIG. 51 is comprised of flip-flops 5455, 5456, 5457 and 5461, 5462, 5463 for holding data with the CLK signal, selectors 5458, 5459, 5460, and flip-flops 5464, 5465, 5466 for holding data with the CLK' signal.

Accordingly, the thinning circuit 5301 allows R (or G, B) transferred with the CLK signal to be thinned at a rate of ¼, and synchronized by the CLK' signal to provide R' (or G', B') signal, as shown in FIG. 55.

[Discrimination Circuit]

FIG. 48 is a block diagram showing the configuration of a discrimination circuit 5409 according to the third embodiment.

In the same figure, reference numeral 5301 represents a thinning circuit as shown in FIG. 51 for thinning out data to reduce the load of a processing circuit with the discrimination circuit 5409 to provide R', G', B' signals as thinned out from R, G, B signals. Reference numeral 5310 represents a division circuit for generating the CLK' signal and the SEL signal required for the thinning circuit 5301.

Reference numeral 5320 represents a correction circuit for image data, for correcting the gain/offset of an input image composed of R', G', B' signals of each 8 bits to provide R", G", B" signals each of 5 bits having the characteristic corrected. Herein, WR64, WR65, . . . , WR69 indicate constant set values in characteristic correction conditions.

Reference numeral 5311 represents a color tint matching ROM (e.g., M5M27C402K made by Mitsubishi Electric) for storing a discrimination result of the color tint of a subject pixel obtained by its comparison with the color tint distribution pre-examined for a plurality of kinds of specific originals. Further, reference numeral 5312 represents a bank switch circuit as shown in FIG. 49 for controlling the upper address of ROM 5311.

Reference numeral 5313 represents a tri-state gate, with it output being pulled up to high level "H" by a pull-up resistor 5314. It is controlled by a control signal RID signal.

That is, if the RID signal is "0", the ROM 5311 has an R" signal, a G" signal and a B" signal each composed of 5 bits at the lower 15 bits of the address, and a bank switch signal PSEL at the upper 3 bits of the address, while if the RID signal is "1", all the address of ROM 311 is "1".

Reference numerals 5303-1, 5303-2, . . . , 5303-32 represent sixteen color tint discrimination circuits each comprised of the same hardware, including an integrator 5306 and a comparator 5308, for making a discrimination as to whether or not any specific original resides within the original. WR00 to WR63 are constants α, β, γ of each integrator 5306 within the color tint discrimination circuits 5303-1 to 5303-16 and set values of the comparator 5308.

Reference numeral 5309 represents a logical OR circuit, wherein if the presence of specific original is discriminated in at least one or more outputs from the color tint discrimination circuits 5303-1, 5303-2, . . . , 5303-32, the value "1" is output as the discrimination signal H.

On the other hand, reference numeral 5315 represents a CPU for controlling this discrimination circuit 5409, and reference numeral 5316 represents an I/O circuit which is controlled by the CPU 5315, wherein the RID signal for the control of tri-state gate 5313, the constants WR00 to WR63 of the color tint discrimination circuit 5303-1 to 5303-16, and the constants WR64 to WR69 of the correction circuit 5320 are set to respective desired values by the CPU 5315.

Note that reference numeral 5317 represents a register for carrying the value of constant WR00 to WR69 which are set via the I/O circuit 5316 by the CPU 5316.

[Image Processing Mode and ID Reading Mode]

The third embodiment is provided with two modes of an image processing mode and an ID reading mode. In the former image processing mode, this apparatus performs the thermal image processing, and ROM 5311 is used as a table for discriminating the presence of a specific original. In the latter ID reading mode, the ROM ID which is preheld at the uppermost address of the ROM 5311 is read out. The control of the ROM in each mode is performed by the RID signal and the PSEL signal.

FIG. 66 illustrates the holding content held at each address of the ROM 5311 and its access condition.

First, in the image processing mode, the RID signal from the I/O circuit 5316 is set to "0" by the CPU 5315, with a PSEL signal supplied from the bank switch circuit 5312 input into the upper two bits of the address of ROM 5311, and the outputs R", G" and B" from the correction circuit input into the lower 15 bits of the address.

FIG. 49 is a block diagram showing the configuration of bank switch circuit 5312 according to the third embodiment. In the same figure, 5121 is a 2-bit counter which counts up at the timing of the first transition of the HSYNC signal, resulting in its output being the lower two bits of PSEL signal. 5122 is a NAND gate, to which the two-bit output from the counter 5121 is input. 5123 is an AND gate to which the lower 1 bit CNO (0) of two-bit plane sequential signal CNO as previously described and the output of the NAND gate 5122 are input, resulting in its output being the upper one bit of the PSEL signal.

Therefore, the signal PSEL repeats "0", "1", "2" and "3" in synchronization with the first transition of the signal HSYNC if the signal CNO (0) is "0", while the signal PSEL repeats "4", "5" "6" and "3" in synchronization with the first transition of the signal HSYNC if the signal CNO (0) is "1".

FIG. 56 is a timing chart in the bank switch circuit 5312 according to the third embodiment.

First, the signal CNO (0) is "0", "1", "0" and "1" with respect to each developed colors M, C, Y and Bk. Therefore, if the developed color is M and Y, the signal PSEL repeats "0", "1", "2" and "3" in synchronization with the first transition of the signal HSYNC. If the developed color is C and Bk, the signal PSEL repeats "4", "5", "6" and "3" in synchronization with the first transition of the signal HSYNC.

That is, the image processing mode has the arrangement that address "00000" to address "37FFF" of the ROM 5311 as shown in FIG. 66 are accessed in such a manner that address "00000" to address "1FFFF" are accessed if the developed color is M and Y. If the developed color is C and Bk, address "18000" to address "37FFF" are accessed.

Note that in the image processing mode, 16 types of different specific original documents are discriminated simultaneously, and the type of the specific original document used for the discrimination is changed over in accordance with each value of the signal PSEL. Further, the PSEL signal is changed over also in accordance with the developed color, and 112 types of specific original documents in total can be discriminated, even though a partial overlap (address "18000" to address "1FFFF") occurs.

On the other hand, in the ID reading mode, the signal RID is set to "1" via the I/O circuit 5316 by the CPU 5315 in FIG. 3. In this case, the output from the tri-state gate 5313 is brought to a high impedance. A pull-up resistor 5314 causes all of the address signals of the ROM 5311 to be "0", resulting in the data output from the ROM 5311 being the content held at the uppermost address "3FFFF". The uppermost address of the ROM 5311 previously stores data, the 8 lower bits of which are the ID from the ROM, and read via the I/O circuit 5316 into the CPU 5315.

Although the ID is an 8-bit code, it is stored at the address except for "00/HEX" and "FF/HEX". The reason for this is that, if the ROM 5311 is intentionally removed, or out of order, or exchanged to inappropriate ROM, there is a good possibility that the address is "00/HEX " in which all of the 8 bits are "0" or "FF/HEX" in which all of the 8 bits are "1".

The arrangement is characterized in that the address "00000" to address "37FFF" of the ROM 5311 are accessed in the image processing mode, and the address "37FFF" is accessed in the ID reading mode to perform control while preventing an overlap.

[ID Reading Operation]

FIG. 60 is a flowchart in the ID reading mode according to the third embodiment.

First, at step S901, the signal RID is set to "1". Then, the address of the ROM 311 is set at the uppermost address "37FFF", as previously described, and at step S902, the ID (hereinafter referred to as "ROM-ID") prestored at the address is read.

At step S903, if the ROM-ID is "11/H", it is determined that the ROM 311 or its peripheral circuit is unmounted or out of order, or has been maliciously modified, and the operation of the apparatus is stopped. Likewise, if the ROM-ID is "FF/H" at step S904, and further if the ROM-ID is not preregistered at step S905, it is determined that the ROM 5311 or its peripheral circuit is unmounted or not of order, or has been maliciously modified, the operation of the apparatus is stopped.

[Image Data Correction Circuit]

FIG. 50 is a block diagram illustrating the configuration of an image data correction circuit 5320 according to the third embodiment.

The typical image reading apparatus has the value of the white/black level of an image signal determined intrinsic to the apparatus, but the image data correction circuit 5320 corrects its intrinsic characteristic to obtain the same characteristic by subjecting the input image signal R', G', B' to the gain/offset correction with the linear calculation to output the R", G", B" signal.

Reference numeral 5321 represents a multiplier for gain correction to transmit A×sB/32 for the inputs A, B, and reference numeral 5323 represents an adder for offset correction to transmit A+B for the inputs A, B, WR64 being input as the gain correction value Gr, and WR65 being as the offset correction value Or. The adder 323 transmits a result of addition R'×Gr/32+Or. It should be noted that the Gr is preset to a desired value ranging from 0 to 63, and Or is preset to a desired value ranging from −32 to +31.

Reference numeral 5325 represents a limiter circuit for controlling the input having the corrected result of gain and offset that is larger than 255, to be 255 and controls the input having the corrected result of gain and offset that is negative, to be 0.

Further, the limiter circuit 5325 limits the output of 8 bits to the upper 5 bits to be output as the R" signal.

Likewise, reference numeral 5326 represents a multiplier for gain correction to transmit a result of multiplication of A×B/32 for the inputs A, B, and reference numeral 5328 represents an adder for offset correction to transmit A+B for the inputs A, B, WR66 being input as the gain correction value Gg, and WR67 being input as the offset correction value Og. The adder 5328 transmits a result of addition G'×Gg/32+Og. It should be noted that Gg is preset to a desired value ranging from 0 to 63, and Og is preset to a desired value ranging from −32 to +31.

Reference numeral 5330 represents a limiter circuit for controlling the input having the corrected result of gain and offset that is larger than 255, to be 255 and controls the input having the corrected result of gain and offset that is negative, to be 0.

Further, the limiter circuit 5330 limits the output of 8 bits to the upper 5 bits to be output as the G" signal.

Likewise, reference numeral 5331 represents a multiplier for gain correction to transmit a result of multiplication of A×B/32 for the inputs A, B, and reference numeral 5333 represents an adder for offset correction to transmit A+B for the inputs A, B, WR68 being input as the gain correction value Gb, and WR69 being input as the offset correction value Ob. The adder 5333 transmits a result of addition B'×Gb/32+Ob. It should be noted that Gb is preset to a desired value ranging from 0 to 63, and Ob is preset to a desired value ranging from −32 to +31.

Reference numeral 5335 represents a limiter circuit for controlling the input having the corrected result of gain and offset that is larger than 255, to be 255 and controls the input having the corrected result of gain and offset that is negative, to be 0.

Further, the limiter circuit 5335 limits the output of 8 bits to the upper 5 bits to be output as B" signal.

[Integrator]

FIG. 53 is a block diagram illustrating the configuration of an integrator 5306 according to the third embodiment. The integrator 5306 integrates discrimination results $x(x_{i,j})$ (i denotes the main scanning position after thinning to ¼ has been performed, and j denotes the sub-scanning position in units of four lines) of the discrimination circuit 5310 in two dimensions to remove the noise contained in the discrimination results to transmit $y(y_{i,j})$.

Reference numerals 5501, 5502 and 5507 represent flip-flops for holding data at the timing of the first transition of the CLK' signal. Reference numerals 5503, 5504 represent multipliers for transmitting the product (A×B/256) of 8 bits for the input of two signals (A, B) of 8 bits. Also, reference numeral 5505 represents a multiplier for transmitting the product of (A×B) of 8 bits for the input of one-bit signal (A) and 8-bit signal (B).

Reference numeral 5506 represents an adder for transmitting the sum (A+B) of 8 bits for input of two signals (A, B) of 8 bits. Reference numeral 5508 represents an FIFO (First in First Output) memory, for example, M66251 manufactured by Mitsubishi Electric Co., for delaying the signal by 4n−1 pixels when the effective number of pixels in one line is n pixels, and transmitting $Y_{i,j-1}$ when $y_{i-1,j}$ is input.

As a result, in this integrator, the 8-bit output signal $y_{i,j}$ for the two-valued input signal $x_{i,j}$ is expressed by the following expression (1) to operate as the two-dimensional IIR (Infinite Impulse Response) filter.

$$y_{(i,j)} = (\alpha/256)y_{i-1,j} + (\beta/256)y_{i,j-1} + \gamma x_{i-1,j} \qquad (3)$$

where $\alpha$, $\beta$, $\gamma$ are pres constants, which determine various characteristics of the integrator.

For example, in the case of $\alpha=124$, $\beta=124$ and $\gamma=8$, an example of the input/output of this integrator is illustrated in FIGS. 57 and 58. That is, for the input $x_{i,j}$ as illustrated in FIG. 57, the output $y_{i,j}$ as illustrated in FIG. 58, is transmitted. Herein, the transverse line is i (main scanning position) or j (sub-scanning position), wherein the same characteristic is indicated in either cross section in the main scanning or sub-scanning direction.

Herein, the input of "1" surrounded by substantial "0" such as points indicated by 5701, 5702, and the input of "0" surrounded by substantial "1" such as a point indicated by 5703 are considered as noise.

The noise can be removed in such a manner as to process the noise with the integrator, set an appropriate threshold indicated by 5704 to a register 5317 of FIG. 48, and binary-coding the output $y_i$ from the integrator with the threshold.

[Copied Result]

FIG. 59 is a view illustrating an example of the copied result according to the third embodiment. In the same FIG. 5801 is an original having a specific original 5803 to be discriminated on this apparatus in a part of the image. The output result of the original when copied by this apparatus is represented by 5802. The portion corresponding to the specific original 5803 is painted over as indicated by 5804, so that the portion of the specific original 5803 can not be copied normally.

[Fourth Embodiment]

The fourth embodiment will be described below. In the fourth embodiment, substantially the same whole configuration as that of the first embodiment is given, and different portions from those of the third embodiment are only described.

FIG. 61 is a block diagram illustrating the configuration of a discrimination circuit according to the fourth embodiment of the present invention.

The portions common to those of FIG. 48 are given the same reference numerals and their description is omitted here.

FIG. 67 illustrates the holding content held at each address of the ROM 5311' corresponding to the ROM 5311 of the fourth embodiment, as well as its access condition.

First, in the image processing mode, the RID signal from the I/O circuit 5316 is set to "0" by the CPU 5315, with a PSEL signal supplied from the bank switch circuit 5312', corresponding to the bank switch circuit 5312 according to the third embodiment, input into two bits at the uppermost address of ROM 5311, and the outputs R", G" and B" from the correction circuit input into 15 bits at the lowermost address.

FIG. 62 is a block diagram illustrating the configuration of the bank switch circuit 5312' according to the fourth embodiment. In the same figure, 5121 is a 2-bit counter which counts up at the timing of the first transition of the HSYNC signal, resulting in its output being two bits at the lowermost address of the PSEL signal. 5122' is a NOR gate, to which the two-bit output from the counter 5121 is input. 5123' is an OR gate to which the 1-bit CNO (0) at the lower address of the two-bit plane sequential signal CNO and the output of the NOR gate 5122' are input, resulting in its output being one bit at the uppermost address of the PSEL signal.

Therefore, the signal PSEL repeats "4", "1", "2" and "3" in synchronization with the first transition of the signal HSYNC if the signal CNO (0) is "0", while the signal "PSEL repeats "4", "5", "6" and "7" in synchronization with the first transition of the signal HSYNC if the signal CNO (0) is "1".

FIG. 63 is a timing chart in the bank switch circuit 5312' according to the fourth embodiment.

First, the signal CNO (0) is "0", "1", "0" and "1" with respect to each of developed colors M, C, Y and Bk. Therefore, if the developed color is M and Y, the signal PSEL repeats "4", "1", "2" and "3" in synchronization with the first transition of the signal HSYNC. If the developed color is C and Bk, the signal PSEL repeats "4", "5", "6" and "7" in synchronization with the first transition of the signal HSYNC.

That is, the image processing mode has the arrangement that address "08000" to address "3FFFF" of the ROM 5311' as shown in FIG. 67 are accessed in such a manner that address "08000" to address "27FFF" are accessed if the developed color is M and Y. If the developed color is C and Bk, address "20000" to address "3FFFF" are accessed.

Note that in the image processing mode, 16 types of different specific original documents are discriminated simultaneously, and the type of the specific original document used for the discrimination is changed over in accordance with each value of the signal PSEL. Further, it is changed over sequentially in units of the four main scanning lines, and 64 types of specific original documents in total can be discriminated. Further, the PSEL signal is changed over also in accordance with the developed color, and 112 types of specific originals in total can be discriminated, even though a partial overlap (address "20000" to address "27FFF") occurs.

On the other hand, in the ID reading mode, the signal RID is set to "1" via the I/O circuit 5316 by the CPU 5315 in FIG. 61. In this case, the output from the tri-state gate 5313 is brought to a high impedance. A pull-down resistor 5314' causes all of the address signals of the ROM 5311' to be "0", resulting in the data output from the ROM 5311' being the content held at the lowermost address "00000". The lowermost address of the ROM 5311 previously stores data, the 8 lower bits of which are the ID for the ROM, and read via the I/O circuit 5316 into the CPU 5315.

Note that the ROM ID may be stored at any of the addresses, without regard to the uppermost address or the lowermost address.

<Fifth Embodiment>

The fifth embodiment will be described below. In the fifth embodiment, substantially the same whole configuration as that of the first embodiment is used, and different portions from those of the third embodiment are only described.

FIG. 64 is a block diagram illustrating the configuration of a discrimination circuit according to the fifth embodiment of the present invention. The same portions as those of FIG. 48, as previously described, are given the same reference numerals and their description is omitted here.

In the third embodiment, the register 5317 has a desired value set by the CPU 5316, but in this embodiment, it has set a value prestored in the ROM 5332.

In FIG. 64, reference numeral 5330 represents a control circuit for setting the address of the ROM 5332 via the tri-state gate 5331, as well as setting a holding content of the ROM 5332 to the register 5317 by generating a write control signal to the register.

As in the third embodiment, in the ID reading mode of the ROM, the signal RID is set to "1" by the CPU 5315. In this case, the output from the tri-state gate 5331 is brought to a high impedance. A pull-up resistor 5333 causes the address of the ROM 5332 to be the uppermost address "7F/H", so that the CPU 5315 can read the "ID" of the ROM 5332 preheld at the uppermost address "7F/H" of the ROM 5332. Also, at the same time, the "ID" of the ROM 5311 can be read as in the third embodiment.

As described above, according to the above-described embodiments 3 to 5, the specific original can be inhibited from being copied falsely, even if the memory having discrimination information for the specific original stored or its peripheral circuit may be out of order, or unmounted.

<Sixth Embodiment>

[Image Scanner]

FIG. 69 is a block diagram which illustrates the configuration of an image scanner unit 6201 according to the sixth embodiment. In the same figure, reference numerals 6210-1, 6210-2 and 6210-3 represent CCD (solid state image pick-up devices) line sensors having spectral sensitivity characteristics of red (R), green (G) and blue (B), respectively, each transmitting an 8-bit signal of 0 to 255 after the A/D conversion.

Since the CCD line sensors 6210-1, 6210-2 and 6210-3 for use in this embodiment are disposed at predetermined intervals, delay elements 6401 and 6402 are arranged to correct for their spatial deviations.

Reference numerals 6403, 6404 and 6405 represent logarithmic converters formed into lock-up tables of a ROM or a RAM for the conversion from brightness signal to density signal. Reference numeral 6406 represents a known masking/UCR (Under Color Removal) circuit. Although a detailed description about it is omitted here, the masking/

UCR circuit 6406 transmits magenta (M), cyan (C), yellow (Y) and black (Bk) signals in response to the supplied three signals at each reading operation, the M, C, Y and Bk signals being transmitted in a plane sequential manner while having a predetermined bit length, for example, 8 bits.

The CNO signal is a 2-bit plane sequential signal, and controls the sequential order of the four reading operations (scanning operations) to switch the print operation conditions for each color image of Y, M, C and Bk. In accordance with the relation of Table 4, the operation conditions of the masking/UCR circuit 406 can be switched.

TABLE 4

| CNO Signal | Print Output |
|---|---|
| 0 | Magenta (M) |
| 1 | Cyan (C) |
| 2 | Yellow (C) |
| 3 | Black (Bk) |

Reference numeral 6407 represents a known spatial filter circuit for correcting the spatial frequency characteristic (MTF) of the output signal. Reference numeral 6408 represents a density conversion circuit for correcting the density characteristic of the printer 6202, comprise of a ROM or a RAM, like the logarithmic converters 6403 to 6405.

Reference numeral 6409 represents a discrimination circuit for discriminating the specific original document image. A discrimination is made as to whether or not at least one of a plurality of the specific original document images is read, resulting in transmission of a discrimination signal H being one bit of "0" or "1". That is, if at least one of a plurality of the specific original document images is being read, H="1" is transmitted, or otherwise H="0" is transmitted.

Further, the CNO signal as above described is also input into the discrimination circuit 6409, a discrimination for the specific original can be made by switching the discrimination criteria for each of the four reading operations.

Reference numeral 6410 represents an OR gate circuit for taking a logical OR between the 8-bit output V of density conversion circuit 6408 and the discrimination signal H which is an output from discrimination circuit 6409 to transmit V'.

As a result, when the discrimination signal H is equal to "1", that is, the specific original is determined to be being read, the output becomes V'=FF/Hex(255), irrespective of the value of input signal V, while when the discrimination signal H is equal to "0", that is, the specific original is determined not to be being read, the value of input signal V is directly output as the output signal V'.

Note that the discrimination conditions of the discrimination circuit 6409 can be changed in accordance with the information from the card reader 6228. The manner of changing the discrimination conditions will be described later.

[Discrimination Circuit]

FIG. 68 is a block diagram (illustrating the configuration of a discrimination circuit 6409 according to the sixth embodiment. In the same figure, reference numeral 6301 represents a thinning circuit as shown in FIG. 4 for thinning out data to reduce the load of a processing circuit with the discrimination circuit 6409, providing R", G", B" signals which are corrected from R', G', B' signals as thinned out from R, G, B signals.

Reference numeral 6310 represents a color tint matching circuit comprised of a color tint matching look-up table RAM (hereinafter referred to "LUT") 6302, tri-state gates 6311, 6312, 6313, an inverter 6314, a control circuit 6315, and a battery for holding the stored content of a RAM 6302 irrespective of the on/off state of the power source in the apparatus itself.

The LUT 6302 stores a result of discrimination as to whether or not the color tint of a subject pixel is coincident with that of the specific original, in which the color tint distributions are investigated beforehand for 32 types of specific original to enable the matching of color tint with a plurality of kinds of specific originals, and it can hold its contents even when the apparatus itself is disconnected from the power source of battery 6316. Herein, the 32 types of specific originals involve 8 types of specific original each of which is assigned to four scanning operations for forming the image of M, C, Y, Bk.

The control circuit 6315 controls the reading and writing operation of the LUT 6302 and the tri-state gates 6311, 6312, 6313 by transmitting an MSEL signal and a WE signal as the control signal. The control circuit 6315 includes two control modes of:

(1) a normal control mode in which the LUT 6302 operates as the look-up table; and (2) a RAM rewrite control mode in which the LUT 6302 is rewritten.

In the normal control mode, the control circuit 6315 places the tri-state gate 6311 in the enable state and the tri-state gates 6312 and 6313 in the disenable state, and sets an OE (Output Enable) terminal of the LUT 6302 to '0' by fixing the MSEL signal '1'. Further, it places the data output from the LUT 6302 in the enable state by fixing a WE (Wright Enable) signal to '0', resulting in the LUT 6302 serving as the look-up table.

That is, the LUT 6302 has the CNO signal which is a plane sequential signal input at the upper two bits of the address, and the upper 5 bits of the image signal for each color of RGB thinned out input at the lower 15 bits of the address. At the value 0 to 3 of each plane sequential signal CNO, an indication of 6302, whether or not the color tint of the pixel is coincident with that of any of 8 types of specific original is transmitted, along with 8-bit data, and 32 types of specific original in total are discriminated in four reading scanning operations.

Reference numerals 6303-1, 6303-2, . . . , 6303-8 represent color tint discrimination circuits each comprised of the same hardware, including an integrator 6306, a register 6307 and a comparator 6308, for making a discrimination as to whether or not any specific original resides within the original.

Reference numeral 6309 represents a logical OR circuit, wherein if the presence of subject specific original is discriminated in at least one or more outputs from the color tint discrimination circuits 6303-1, 6303-2, . . . , 6303-8 the value "1" is output as the discrimination signal H.

On the other hand, in the RAM rewrite control mode, the control circuit 6315 rewrites the LUT 6302, based on the data transferred from the card reader 6228. That is, the control circuit 6315 places the tri-state gate 6311 in the disenable state and the tri-state gates 6312 and 6313 in the-enable state by fixing the MSEL signal to '0'. Further, it can rewrite the holding content of the LUT 6302 by generating an A1 signal as the address of the LUT 6302, a D1 signal as the data, and a WE signal into the WE terminal of the LUT 6302, at the timing as shown in FIG. 70. FIG. 70 illustrates a timing chart between A1, D1 and WE.

Further, the content of the LUT 6302 once updated is held independently of the power source of the apparatus itself by virtue of the battery 6316, and is held until next updated, even if the power source of the apparatus is turned off. Reference numeral 6320 represents an image data correction circuit.

[Image Data Correction Circuit]

The configuration of the image data correction circuit 6320 according to the sixth embodiment is the same as illustrated in the block diagram of FIG. 50. Also, the configuration of thinning circuit 6301 and division circuit 6310 is the same as illustrated in FIGS. 51 to 53, and its description is therefore omitted.

[RAM Data Update Procedure]

The configuration of the image data correction circuit 6320 according to the sixth embodiment is the same as illustrated in the block diagram of FIG. 50. Also, the configuration of thinning circuit 6301 and division circuit 6310 is the same as illustrated in FIGS. 51 to 53, and its description is therefore omitted.

[RAM Data Update Procedure]

The data of the LUT 6302 should not be readily updated. If it can be readily updated, there is a risk that it may be intentionally altered or used for an evil purpose. Therefore, this embodiment avoids that risk by not only providing the insertion of the IC card, but also by the input of a secret number not publicly known through an operation unit 6250 to be described later.

FIG. 71 is a top view illustrating an operation panel of the operation unit 6250 according to the sixth embodiment. In the same figure, reference numeral 6901 represents the operation unit arranged on the entire face of the apparatus, reference numeral 6902 represents a ten key, reference numeral 6903 represents a copy start key for starting the copying operation, reference numeral 6904 represents a reset key for resetting the set mode, and reference numeral 6905 represents a liquid crystal display with a touch panel for setting various modes.

The input of the secret number is performed by the use of the ten key 6902. That is, the secret number present is input in the order of, for example, *, 2, 0, 4, 2, 9, C, and *.

FIG. 72 is a flowchart for illustrating the rewrite procedure of the LUT 6302 according to the sixth embodiment.

At step S1001, a discrimination is made as to whether or not a predetermined IC card is inserted. If the predetermined IC card is inserted, the procedure process to the next step S1002. At step S1002, a discrimination is made as to whether or not the secret number is input. If the secret number is not correctly input, the procedure returns to the first step S1001, while if it is correctly input, the content of the LUT 6302 is updated at step S1003.

As described above, in the sixth embodiment, there is provided a function of correcting the characteristic of the input image signal so that the image signal is corrected to have the same characteristic by correcting the characteristic of the image signals with a variety of characteristics, whereby the specific original can be discriminated by the same characteristic data of the specific original even if the image is input from a different input apparatus.

<Seventh Embodiment>

Now, the overall configuration of a color copying machine according to the seventh embodiment is the same as in the sixth embodiment, and its description is omitted, except for different structures and functions detailed.

[Correction with LUT]

While in the sixth embodiment, the correction for gain/offset was performed by the linear calculation circuit for the input image signal, the present invention is not limited thereto, and provides for the seventh embodiment as will be described below.

FIG. 73 is a block diagram illustrating the configuration of an image data correction circuit according to the seventh embodiment. In the same figure, reference numeral represents a RAM (rewritable memory) having prewritten a correction table by the CPU, not shown, so that the R' signal before correction may be input into the address A7 to A0 and its corrected result be output.

Likewise, reference numerals 6102 and 6103 represent a RAM for correcting the G' signal/B' signal before correction and providing the G" signal/B" signal.

In this way, the correction for the look-up tables of RAMs 6101 to 6103 allows any of the corrections to be made, including the non-linear correction which is typically difficult to perform by calculation, resulting in the advantage that the application can be extended.

<Eighth Embodiment>

Now, the overall configuration of a color copying machine according to the eighth embodiment is the same as in the sixth embodiment, and its description is therefore omitted, except for the different structures and functions detailed.

[Correction for Color Space]

FIG. 74 is a block diagram illustrating the configuration of an image scanner unit 6201 according to the eighth embodiment. In FIG. 74, like circuit components are given the same reference numerals as in FIG. 69. In FIG. 74, reference numeral 6411 represents an external interface unit serving for the input of an image signal from the still video, film scanner, other image scanners, and computer graphics, and reference numeral 6412 represents a selector for switching between the image signal from the external equipment and the read signal with the CCD line sensors 6210-1 to 6210-3 by a control signal SEL from the CPU, not shown. For these various image signals, the color spaces for defining the color image signals are different, for which the appropriate correction is required.

FIG. 75 is a block diagram illustrating the configuration of a correction circuit according to the sixth embodiment. The correction circuit as illustrated in FIG. 75 corrects the R', G', B' signals before correction to produce the R", G", B" signals. Reference numerals 6301, 6302, 6303 represent the look-up table RAMs, similar to those indicated by reference numerals 6101, 6102, 6103 of FIG. 73, for allowing the non-linear correction of R', G', B' signals. Also, reference numeral 6304 represents a masking calculation circuit, which performs a linear masking calculation of 3×3 as expressed by the following expression. That is, $$\begin{bmatrix} R'' \\ G'' \\ B'' \end{bmatrix} = \begin{bmatrix} a_{11} & a_{12} & a_{13} \\ a_{21} & a_{22} & a_{23} \\ a_{31} & a_{32} & a_{33} \end{bmatrix} \begin{bmatrix} R' \\ G' \\ B' \end{bmatrix}$$

Also, reference numerals 6301', 6302', 6303' and 6304' perform the same correction with the characteristic different from that of reference numerals 6301, 6302, 60303 and 6304.

These look-up tables and the masking calculation allow the discrimination of whether or not any specific original is present, with the same characteristic data, for various types of image signals.

The circuit of FIG. 75 is provided within a selector 6412, having the correction characteristics set to enable different corrections for the input from the external interface unit 6411 and the input from the image scanner unit 6201. Eventually, either one of the outputs R", G", B" is selected.

As described above, according to the present invention, the discrimination of the specific original can be made with the same characteristic data of the specific original even if the image input takes place from different input equipment.

The ninth and tenth embodiments of the present invention, as will be described below, allow the correct discrimination while preventing any detection error, as above described, by dividing the color distribution of one specific original into a plurality of color distribution scopes, and discriminating the similarity with the specific original based on the correlation between respective color distribution scopes and the input image data.

More specifically, a discrimination for the specific original A can be made by, for example, performing simultaneously (in parallel) the discrimination regarding the color tint distribution for specific original A part 1 (7501) and the discrimination regarding the color tint distribution for specific original A part 2 (7502), as illustrated in FIG. 90, and based on the two discrimination results.

Thereby, for example, when the color tint corresponding to the re-sealed portion (portion having reddish color tint distribution) of the specific original A lacks in the observed image, the image is not discriminated as the specific original A in any event, so that the correct discrimination for the specific original can be further realized.

<Ninth Embodiment>

FIG. 76 is a signal processing block diagram for a color image reading device.

In the same figure, reference numeral 7101 represents a CCD color sensor, reference numeral 7102 represents an analog amplifier, reference numeral 7103 represent an A/D converter, and reference number 7104 represents a shading correction circuit for correcting the dispersion of brightness at the reading position of the image signal.

Reference number 7106 represents a color space3 matching discrimination circuit for calculating the similarity of distribution between the reading image data and the specific original, such as the bill or securities, in the three dimensional space.

The use of the color signal after the shading correction, allows the correction for the distortion in the brightness and the color tint, produced by the position of the original, so that the discrimination for the similarity in the color space can be correctly made, irrespective of the position at which the input original is placed. The shading correction circuit 7104 in the color image reading device is not detailed herein in view of the known art.

Reference numeral 7105 represents a print signal generation circuit for converting the input color signal R (red), G (green) and B (blue) into the signal Y (yellow), M (Magenta), C (cyan) and Bk (black). This circuit includes delay means for compensating for the time required for the discrimination to be described later. Also, it modulates the print signal with a real time correction signal f7113.

Reference numeral 7107 represents a circuit for generating the real time correction signal f7113.

Reference numeral 7108 represents a circuit for generating the reading periodic signals HS7109, CLK7110, VS7112. HS7109 is a main scanning interval signal, CLK7110 is a pixel reading basic clock signal, and VS7112 is an interval signal indicating the effective area in the sub-scanning direction of reading the original.

[Color Space Matching Discrimination Circuit]

FIG. 77 is a view illustrating a color space matching discrimination circuit 7106.

In the same figure, R7201 is a signal consisting of upper 5 bits of the R (red) signal composed of 8 bits from the shading correction circuit 7104. Likewise, G7202 is a 5-bit G (green) signal, and B7203 is a 5-bit B (blue) signal.

Reference numeral 7204 represents a ROM (read-only-memory) in which the information regarding the color tint of a plurality of types of specific originals is stored. The R, G, B signal is input into the address $A_0$ to $A_{14}$ and the discrimination signal indicating whether or not the input R, G, B signal is coincident with the color tint of any of the plurality of types of specific original is output to the data $D_0$ to $D_7$.

The ROM 7204 has stored the information regarding the color tint of the specific original as illustrated in FIG. 84, wherein 1 if the coincidence with the color tint of specific original takes place, or otherwise 0, is output to $D_0$ to $D_7$. $D_0$ to $D_7$ corresponds to 8 types of specific original images from the zeroth to the seventh.

FIG. 88 is a view illustrating the relation between the data regarding the color tint for a plurality of originals stored in the ROM 7204 and the bit position of the ROM 7204. Hence, for the input pixel data, the information for 8 types of different color tint discriminations regarding the specific original from $D_0$ to $D_7$ is output in parallel.

Reference numeral 7220 to 7227 represents circuits for the smoothing operation, as illustrated in FIGS. 82 and 83, using the color tint discrimination signals $X_0$ 7210 to $X_7$ 7217.

In the same figure, reference numerals 7701, 7702 represent multipliers, reference numeral 7703 represents an adder, reference numeral 7704 represents a latch circuit, and reference numeral 7705 represents a comparator. Using the weighted average between the input data from multipliers 7701, 7702 and adder 7703, and the previous data, the discrimination in consideration of the continuity as illustrated in FIG. 83 is enabled.

FIG. 83 is a view illustrating the relation between the input $X_i$ and the smoothing operation value $Y_i$. If the value of the input $X_i$ is 1 in succession, the value of $Y_i$ increases.

Hence, where the input R, G, B signal is coincident with the color tint of the specific original in succession, the signals 7230 to 7237 get 1, allowing corrector discrimination without being affected by the noise.

In the color space discrimination circuits 7240 to 7247, the similarity between the specific image data in the R, G, B color space is illustrated in FIG. 89 and the input color signal is calculated in real time to produce the color space similarity discrimination signals $MK_0$ 7260 to $MK_7$ 7267.

FIG. 78 is a circuit block diagram of the color space discrimination circuits 7240 to 7247.

With this circuit configuration, the data Dn from the SRAM 7209 and the signal Cn from the smoothing circuit are ORed, and written into the SRAM 7209. Also, only if the data Dn makes the transition from 0 to 1, the counter 7301 is counted up. The counter 7301 is cleared at the first transition of the sub-scanning interval signal VS7112. The output value Zn from the counter 7301 and the constant $\delta n$ of register 7302 are compared by the comparator 7302, wherein MKn=1 for Zn>$\delta$n, and MKn=0 for Zn$\leq\delta$n. The value of $\delta$n is set at a value of 1% of $U_{ORG}$ (in this embodiment, 1=90%).

$$\delta n = 1/100 \times U_{ORG}$$

where $U_{ORG}$ is a numeral value where a cube is a unit volume, and R, G, B coordinate axes are divided in to 32 sections in FIG. 89.

With the above processing, if the observed image data or the data input color signals take substantially the same shape as that of the specific image data in the R, G, B color space, the color space similarity discrimination signals $MK_0$ 7260 to $MK_7$ 7267 are set to 1.

The selectors 7271, 7272 clear the SRAM 7209 to zero when the sub-scanning interval signal VS7112 is 0 (LOW). An address generator 7270 is a circuit for generating all the addresses of the SRAM 7209 sequentially. When the VS7112 is LOW, the SRAM 7209 is cleared to zero in accordance with the address signal generated by the address generator 7270.

Reference numeral 7205 represents a timing generation circuit for generating the timing signal.

CLK4 7206 represents a clock signal with the basic clock CLK 7110 divided into four sections, reference numeral 7207 represents a signal controlling the write enable terminal of the SRAM 7209, and reference numeral 7208 represents a signal controlling the output enable terminal of the SRAM 7209.

[Real Time Correction Signal Generation]

FIG. 80 is a circuit block diagram illustrating a real time correction signal generation circuit 7107.

Discrimination ROM 7204 has the color tint information shown in FIG. 88 stored therein. Therefore, in this case, $MK_0$ is a discrimination signal regarding the specific original A part 1 (7501) and $MK_1$ is a discrimination signal regarding the specific original part 2 (7502).

The logical operation of $MK_0$ and $MK_1$ assures the discrimination of similarity to two parts (7501, 7502) of the specific original A with the observed image data in the color space, thereby allowing the correcter discrimination.

[Print Signal Generation Circuit]

FIG. 81 is a circuit block diagram illustrating a print signal generation circuit.

A masking UCR operation circuit A 7601 is a circuit for generating a print YMCBk signal with the input RGB signal at the normal time.

A masking UCR operation circuit B7602 is a circuit for generating a print YMCBk signal with the color tint changed (e.g., reddish), if the input color signal is discriminated to coincide with the specific original.

A selector 7603 allows only the area discriminated to coincide with the specific original to be printed with a different color tint, by selectively outputting the signals of circuits 7601, 7602 with the real time correction signal f7113.

Also, if the similarity with the specific original is discriminated, the normal image formation is inhibited by, for example, painting the reproduced image with black, or tuning off the power. ps <Tenth Embodiment>

FIGS. 91 and 92 are views relating to the tenth embodiment of the present invention.

In the previous ninth embodiment, the correct discrimination of the specific original is made by discriminating the similarity of the color distribution with the observed image in a plurality of different portions for one specific original.

In this tenth embodiment, when calculating the similarity of the color tint in the line-drawing portion, the similarity of the color tint with the specific original is discriminated for each line-drawing region extracted at a different line-drawing extraction threshold.

The tenth embodiment will be described below using the drawings.

In FIG. 91, reference numeral 7601 represents a circuit for calculating the line-drawing amount V as shown in FIG. 92. Reference numeral 7603 represents a comparator for making a comparison between the line-drawing amount and the constant E0-7602.

The constant E0-7602 is set to extract the line-drawing portion of the specific original A part 1 as shown in FIG. 90.

The constant E1-7604 is set to extract the line-drawing portion of the specific original A part 2. The correct discrimination can be made by carrying out the similarity discrimination regarding the color tint distribution by extracting the line-drawing portion at a line-drawing extraction threshold adapted for each of the image areas.

As described above, a correcter discrimination for the specific original can be implemented by providing a plurality of discrimination conditions regarding the color distribution for the same specific original in discriminating the specific original.

While in the above-described embodiment, a copying machine was exemplified, the present invention is applicable to not only a single image scanner but also a reading device connected to the host computer.

Also, the present invention is of course applicable to the system or apparatus to which a program is supplied.

In the above-described embodiment, a laser beam printer was exemplified as the image forming apparatus, but the present invention is not limited thereto, and also applicable to an ink jet printer and a thermal transfer printer. In particular, it is applicable to the printer of the so-called bubble jet system using the head of the type in which ink droplets are discharged by the use of film boiling caused by the thermal energy.

While in the above-described embodiments the original image was input by the image scanner unit, the present invention is limited thereto, and is effective when the original image is input by the still video camera or video camera, and further created by the computer graphics.

The present invention is not limited to the above-described embodiments, and various changes and modifications can be effected without departing from the scope as defined by the appended claims.

In particular, the combination of the techniques as shown by the above-described embodiments is also included within the spirit and scope of the invention.

What is claimed is:

1. An image processing apparatus comprising:
   an input unit for inputting a color image signal;
   a discriminating circuit, having a memory storing data representing a feature of a specific image for which copying is prohibited, for discriminating based on the data stored in said memory and the color image signal input by said input unit whether an image represented by the color image signal is the specific image;
   connection means for connecting said discriminating circuit to said image processing apparatus; and
   detection means for detecting based on a predetermined signal obtained from said discriminating circuit whether said discriminating circuit connected by said connection means has been altered.

2. An image processing apparatus according to claim 1, wherein said detection means performs the detection based on identification information stored in said memory.

3. An image processing apparatus according to claim 2, wherein the memory is a read only memory (ROM).

4. An image processing apparatus according to claim 1, further comprising control means for controlling said apparatus in accordance with the detection result by said detection means.

5. An apparatus according to claim 1, wherein said image processing apparatus is a color printer.

6. An apparatus according to claim 1, wherein the specific image represents valuable papers.

7. An apparatus according to claim 1, wherein said discrimination means discriminates whether or not a predetermined pattern is included in the input image.

8. An apparatus according to claim 7, wherein the predetermined pattern is a red seal.

9. An apparatus according to claim 7, wherein the predetermined pattern is a line image.

10. A discrimination apparatus connected to an image processing apparatus, comprising:

an input unit for inputting a color image signal from said image processing apparatus;

a memory storing data representing a feature of a specific image for which copying is prohibited;

discriminating means for discriminating based on the color image signal input by said input unit and the data stored in said memory whether an image represented by the color image signal is the specific image; and detection means for detecting based on predetermined data stored in said memory whether said memory has been altered.

11. An apparatus according to claim 10, wherein said memory is a read-only memory.

12. An apparatus according to claim 10, wherein said image processing apparatus controls the operation of said image processing apparatus in accordance with the detection result of said detection means.

13. An image processing apparatus comprising:

an input unit for inputting a color image signal;

an image formation unit for performing color image formation on a recording medium on the basis of the color image signal;

a discriminating circuit, having a memory storing data representing a feature of a specific image for which copying is prohibited, for discriminating based on the data stored in said memory and the color image signal input by said input unit whether an image represented by the color image signal is the specific image;

connection means for connecting said discriminating circuit to said image processing apparatus;

detection means for detecting based on a predetermined signal obtained from said discriminating circuit whether said discriminating circuit connected by said connection means has been altered; and control means for causing said image formation unit to be unable to perform the color image formation, when it is detected by said detection means that said discriminating circuit has been altered.

* * * * *